(12) United States Patent
Tsuyama et al.

(10) Patent No.: US 6,404,940 B1
(45) Date of Patent: Jun. 11, 2002

(54) OPTICAL CROSS CONNECT APPARATUS AND OPTICAL NETWORK

(75) Inventors: Isao Tsuyama, Yokohama; Ichiro Nakajima; Satoshi Kuroyanagi, both of Kawasaki, all of (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/558,553

(22) Filed: Apr. 25, 2000

(30) Foreign Application Priority Data

Apr. 27, 1999 (JP) .......................................... 11-120082
Mar. 3, 2000 (JP) ...................................... 2000-059434

(51) Int. Cl.[7] .............................. G02B 6/35; G02B 6/28
(52) U.S. Cl. ............................ 385/17; 385/24; 359/128
(58) Field of Search ...................... 385/17, 24; 359/128

(56) References Cited

U.S. PATENT DOCUMENTS 5,450,224 A * 9/1995 Johansson ................... 359/128

FOREIGN PATENT DOCUMENTS

| JP | 6-153248 | 5/1994 |
|---|---|---|
| JP | 8-195972 | 7/1996 |
| JP | 9-238370 | 9/1997 |

* cited by examiner

*Primary Examiner*—John D. Lee
*Assistant Examiner*—Jerry T Rahll
(74) *Attorney, Agent, or Firm*—Staas & Halsey LLP

(57) ABSTRACT

In an optical cross connect apparatus, an optical multiplexing/distributing section wavelength-multiplexes optical signals of wavelengths after routing by an optical input switch section and distributively outputs the resultant multiplexed optical signal as input optical signals to an optical output switch section. In addition, an optical wavelength selecting section conducts wavelength selection processing so that, of the resultant multiplexed optical signal, an optical signal of a desired wavelength is outputted to an output port. With this configuration, it is possible to economically offer an optical cross connect apparatus having an excellent extensibility on a change (particularly, an increase) of the number of wavelengths to be accommodated per port.

33 Claims, 66 Drawing Sheets

BASIC CONFIGURATION (TYPE-1) OF OCCS

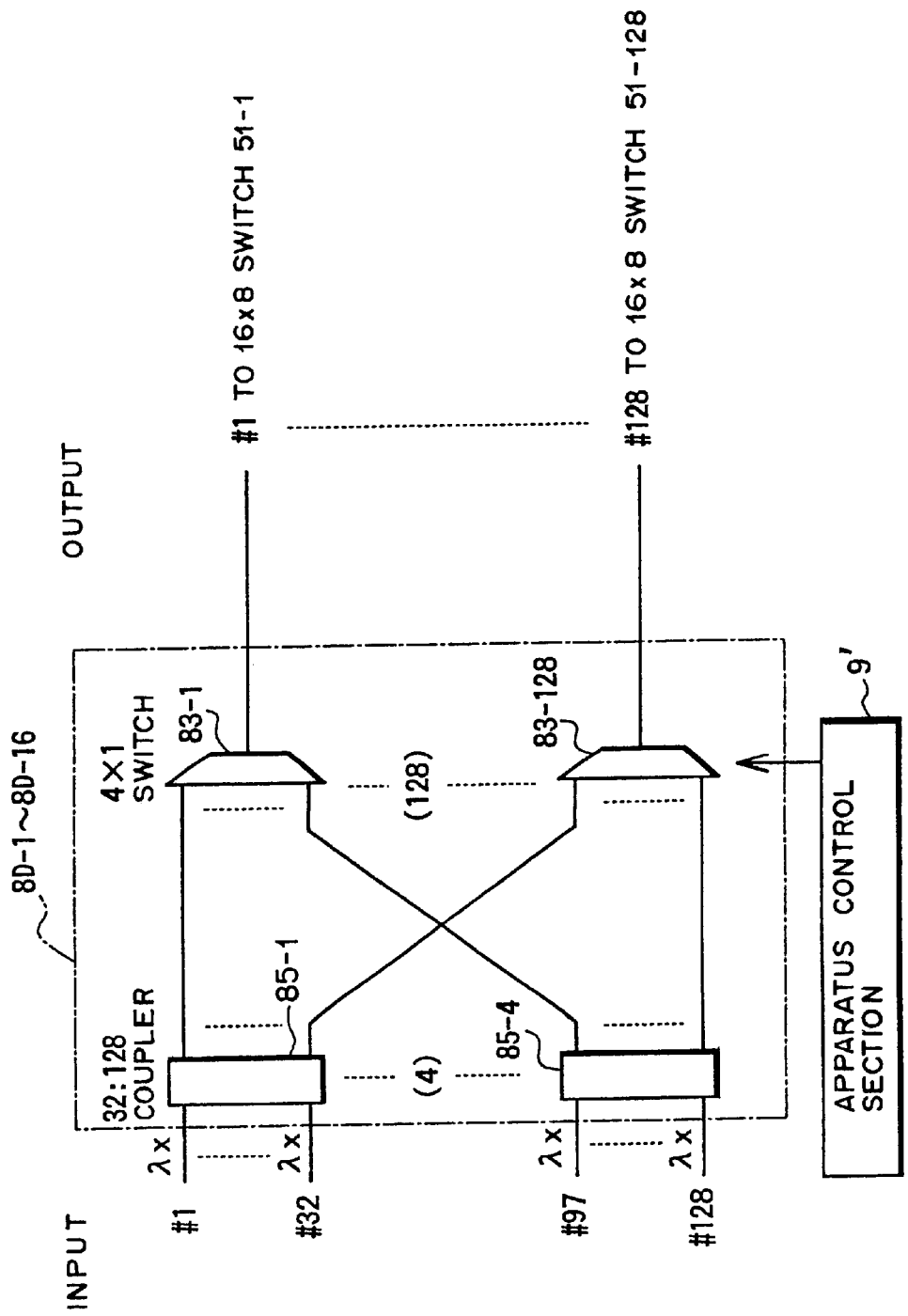
F I G. 51

WAVELENGTH BAND IN TRANSMISSION LINE
(128 WAVES, WAVELENGTH INTERVAL 0.8nm)

INTRA-APPARATUS WAVELENGTH BAND EXAMPLE 1
(32 WAVES, WAVELENGTH INTERVAL 0.8nm)

INTRA-APPARATUS WAVELENGTH BAND EXAMPLE 2
(32 WAVES, WAVELENGTH INTERVAL 0.8nm)

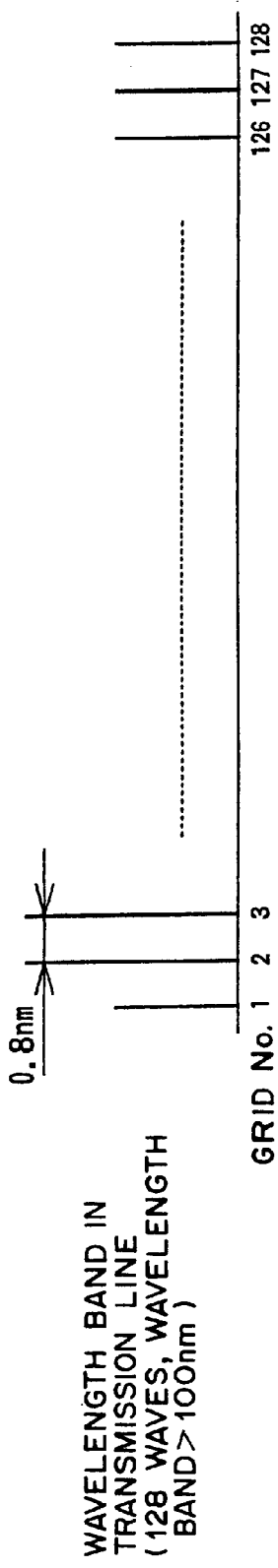
FIG. 57A  WAVELENGTH BAND IN TRANSMISSION LINE (128 WAVES, WAVELENGTH BAND>100nm)
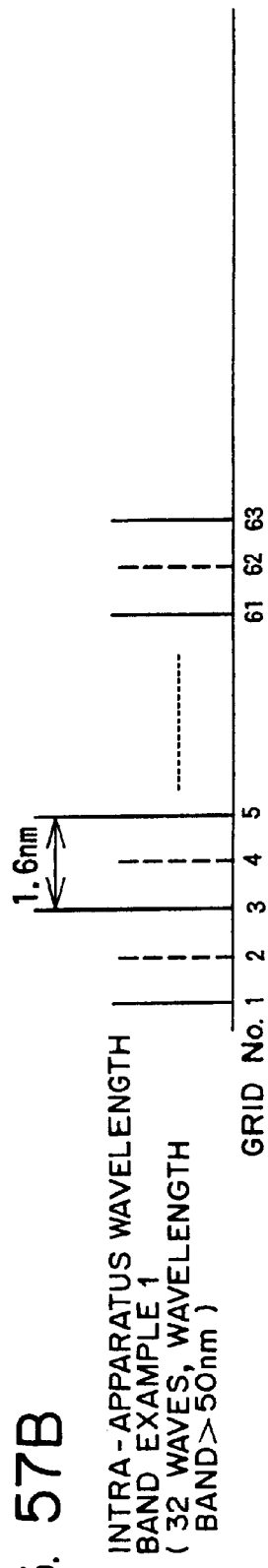
FIG. 57B  INTRA-APPARATUS WAVELENGTH BAND EXAMPLE 1 (32 WAVES, WAVELENGTH BAND>50nm)
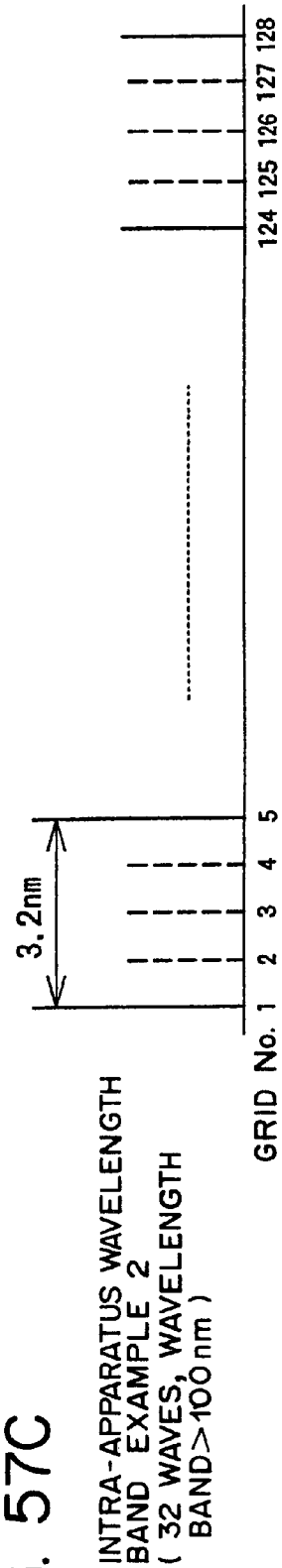
FIG. 57C  INTRA-APPARATUS WAVELENGTH BAND EXAMPLE 2 (32 WAVES, WAVELENGTH BAND>100nm)

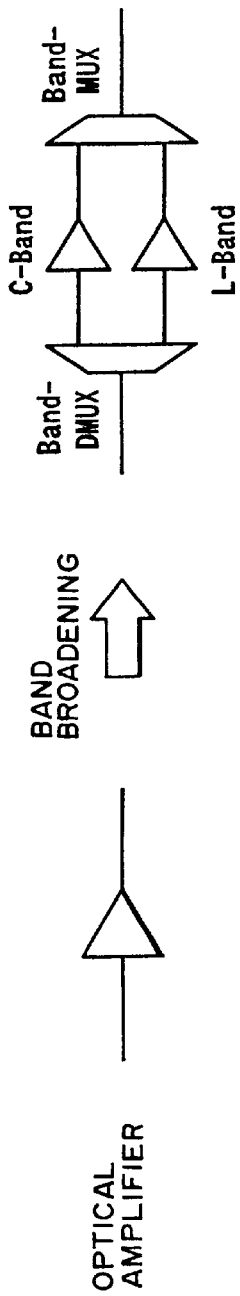
FIG. 58A OPTICAL AMPLIFIER
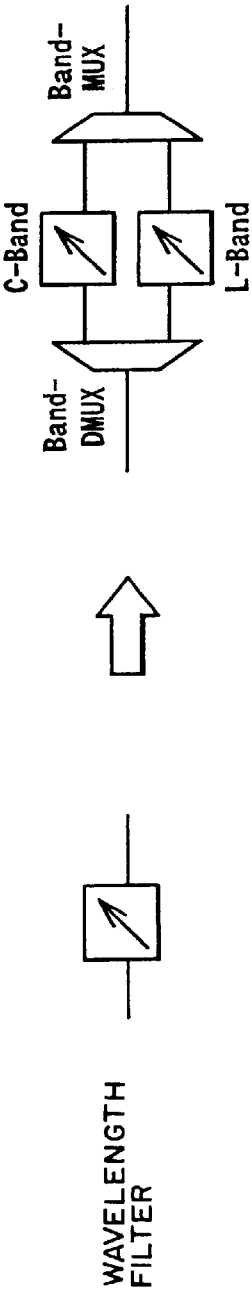
FIG. 58B WAVELENGTH FILTER
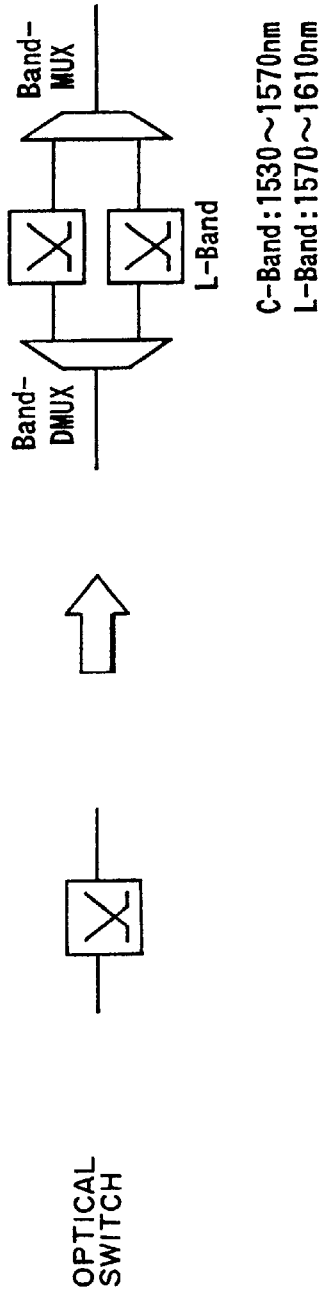
FIG. 58C OPTICAL SWITCH
C-Band: 1530~1570nm
L-Band: 1570~1610nm CONFIGURATIONAL EXAMPLE (SPACE SW TYPE) OF 8x8-SW

CONFIGURATIONAL EXAMPLE (GATE-SW TYPE) OF 8×16-SW

CONFIGURATIONAL EXAMPLE (DISCRETE TYPE) OF TUNABLE WAVELENGH SELECTOR

CONFIGURATIONAL EXAMPLES (DISCRETE TYPE) OF WAVELENGTH CONVERTION O/E/O AND TUNABLE-LD

OPTICAL CROSS CONNECT APPARATUS AND OPTICAL NETWORK

BACKGROUND OF THE INVENTION (1) Field of the Invention

The present invention relates to an optical cross connect apparatus or system and an optical network, to which the WDM (Wavelength Division Multiplex) transmission technique is applicable.

(2) Description of the Related Art

So far, optical communications have principally employed point-to-point TDM (Time Division Multiplex) transmission. However, with the spread of the Internet or the like, the communication traffic volume (information communication volume) is on the explosive increase and an expectation or possibility exists that the information communication volume further increases afterwards; therefore, two approaches, that is, the speed-up of the TDM transmission and the high-density multiplexing in the WDM transmission, have taken place in the recent years.

Of these, the WDM transmission is expected as a technique to increase the communication volume without gaining the signal rate by utilizing the optical broadband characteristics effectively. The WDM transmission has been introduced initially for the purpose of increasing the number of wavelengths to be multiplexed in the field of the existing point-to-point transmission. Additionally, the configuration of a high-flexibility high-reliability optical network (such as a ring network) has started through the employment of the optical ADM (Add Drop Multiplexer) capable of dropping/adding optical signals in units of wavelengths.

In such a technical background, for example, an optical cross connect system (OCCS), designated generally at reference numeral 100 in FIG. 63, is expected as a next-generation system capable of constructing a higher-flexibility higher-reliability optical network.

In FIG. 63, the OCCS 100, in contrast with the existing systems, can accommodate a large number of input/output optical fibers and, additionally, can accept optical signals different in transmission rate from each other, such as an OC (Optical Carrier)-192 (STM (Signal Transfer Module)-64 ≈(almost equal) 10 Gb/s) and an OC-48 (STM-16≈2.5 Gb/s) and an OC-12 (STM-4≈620 Mb/s), through proper optical interfaces 300 to 600 so that the setting [exchange (cross connect)] of optical paths in units of wavelengths is feasible in a manner that an optical routing section (cross connect section) 200 conducts switching (routing) among output paths or performs wavelength conversion for or on these optical signals in units of wavelengths.

Accordingly, for example, if, as shown in FIG. 63, the OCCS 100 accommodates optical fibers constituting a trunk line system for a ring network or the like to form optical links (Inter-Office Link) 700A and 700B and additionally accommodates optical fibers organizing a different network to establish an optical link (Intra-Office Link) with the different network, it becomes possible to add an optical signal from the different network to the trunk line system in units of wavelengths or to drop a portion of an optical signal running on the aforesaid trunk line system to the different network.

In consequence, the OCCS 100 is capable of setting up a connection between the existing ring networks put individually in operation or of making a connection of the existing network other than ring networks to a ring network, thus constructing a new large-capacity optical network. For this reason, as a system which plays most important role in a future optical network, much attention has been focused on this OCCS 100.

A detailed description will be given hereinbelow of the aforesaid routing section 200 constituting an essential part of the OCCS 100. FIG. 64 is a block diagram showing one example of principle configuration of the optical routing section 200. In FIG. 64, the optical routing section 200 employs a typical non-blocking type switch circuit (three-stage switch configuration), referred to as a cross (Clos) type.

Furthermore, as FIG. 64 shows, the first-stage switch unit 200A comprises k n-input 2n-output (n×2n) type switch circuits 201, the second-stage (intermediate-stage) switch unit 200B comprises 2n k-input k-output (k×k) type switch circuits 202, and the third-stage switch unit 200C comprises k 2n-input n-output (2n×n) type switch circuits 203.

Incidentally, the "M×M switch circuit" taken here signifies a switch which exhibits an ability to switch (selectively establish an output path) any one of M inputs (M denotes an integer being two or more) to any one of the M outputs. Furthermore, the aforesaid k corresponds to the number of input ports (output ports), for example, one optical fiber is connected (accommodated) to one port. Still furthermore, the aforesaid n is equivalent to the number of wavelengths multiplexed (the number of input wavelength types), for example, if an optical signal to be transmitted through the one optical fiber forms a 16-wavelength multiplexed optical signal, n=16, and if it forms a 32-wavelength multiplexed optical signal, n=32. That is, the number N of input/output channels of the optical routing section 200 shown in FIG. 64 becomes N=n×k.

FIG. 65 shows a detailed configurational example of the optical routing section 200 based upon the foregoing three-stage cross type switch circuit arrangement. This configuration shown in FIG. 65 is such that the number of input ports (output ports) is set at k=8 and the number of wavelengths to be multiplexed per port assumes n=32 ($\lambda 1$ to $\lambda 32$), that is, the total number of input/output channels assumes N=8×32=256, while the first-stage switch unit 200A employs 16 16×32 switch circuits 201, the second-stage switch unit 200B uses 32 16×16 switch circuits 202 and the third-stage switch unit 200C uses 16 32×16 switch circuits 203.

In addition, each of the 16=32 switch circuits 201 of the first-stage switch unit 200A and each of the 32×16 switch circuits 203 of the third-stage switch unit 200C are constructed using two 16×16 switch circuits 211 and 16 1×2 switch circuits 210. That is, in the configuration shown in FIG. 65, the basic size of the switch circuits (basic switch size) becomes 16×16.

Furthermore, in FIG. 65, reference numeral 204 depicts each of 8 optical demultiplexer (filters) provided with each of the input ports. Each of these optical demultiplexers 204 demultiplexes a wavelength multiplexed optical signal from the corresponding input port according to each of wavelengths $\lambda 1$ to $\lambda 32$ so that, for example, the optical signals respectively having wavelengths of $\lambda 1$ to $\lambda 16$ are inputted to the 16×32 switch circuits 201 in odd numbers while the remaining optical signals respectively having wavelengths of $\lambda 17$ to $\lambda 32$ are inputted to the even-numbered 16=32 switch circuits 201.

Still furthermore, reference numeral 205 denotes each of wavelength converters, whose number equals the total number of input/output channels (namely, 256), for converting a wavelength $\lambda x$ (where x=1 to 32) of an optional input optical signal after subjected to the switching (routing) by the switch units 201 to 203 into a predetermined wavelength to an output port, and the wavelength converters 205 allow the optical routing section 200 to output an optical signal with an optional wavelength to an optical input port as an optical signal with a desired wavelength (idle channel) at a desired output port.

Moreover, reference numeral 206 designates each of 8 optical multiplexers provided with each of the output ports, and each of the optical multiplexers 206 multiplexes (wavelength-multiplexes) the optical signals, respectively converted in wavelength in the wavelength converters 205, at every output wavelengths ($\lambda 1$ to $\lambda 32$) to each of the output ports, and outputs the multiplexed optical signal to the corresponding output port.

Still moreover, reference numeral 207 (208) represents each of optical amplifiers, whose number is 8×2=16, provided with each of the input ports (each of the output ports), and the optical amplifiers 207 (208) are appropriately used for compensating for an optical loss or the like occurring due to the routing of the optical signals in the switch units 200A to 200C (switch circuits 201 and 202) (the installation of the optical amplifiers 207 (208) is not required particularly if the loss is disregardable).

With the above-described configuration, the foregoing optical routing section 200 can output an optical signal with an arbitrary wavelength to an arbitrary input port as an optical signal with a desired wavelength to a desired output port [that is, it is capable of accomplishing the path setting (cross connect) in units of wavelengths]. For example, in a case in which an optical signal with an input wavelength of $\lambda 1$ to the uppermost output port (1) is outputted as an optical signal with an output wavelength of $\lambda 32$ to the lowermost output port (8), the optical signal with the input wavelength of $\lambda 1$ to the output port (1) is inputted to the lowermost wavelength converter 205. Accordingly, the switching setting for the switch units 200A to 200C (switch circuits 201 and 202) is made to achieve this input of the optical signal.

As described above, the OCCS 100 provides a large-scale optical switching system different from the existing systems.

Meanwhile, the WDM transmission technique handling a level up to 32-wavelength multiplexing has already been available, and the techniques handling higher levels, such as 64-wavelength multiplexing and 128-wavelength multiplexing are currently at the trial and study stage. For this reason, the aforesaid OCCS 100 needs to accept all of these signals, and reaches a large system scale naturally.

Hence, the following two points exist chiefly as important objects arising with the OCCS 100. That is, one point is the size reduction of the system which tends to have a larger scale and the other is to offer an OCCS 100 with a proper system size matching with the needed value of information. The latter can namely be handled as an object in the extensibility of the system. In general, for the WDM transmission technique, an increase in the number of wavelengths to be multiplexed is made to cope with an increase in volume of information, which leads naturally to an increase in the system size of the OCCS 100, while it is desirable that this system size is proportional to the increase/decrease in the number of wavelengths.

That is, in addition to tackling the size reduction and economization of the system, the excellent extensibility coping with the increase in the number of wavelengths to be accepted or accommodated constitutes an important point on the development of the OCCS 100 (especially, the optical routing section 200). Additionally, conceivably, for the extension mentioned above, the construction of the OCCS 100 using the existing parts but not using special (new) parts, if possible, also constitutes an important point in view of economy, development procedure, cost reduction and others.

However, in the case of the above-described conventional OCCS 100, the increase in the number of wavelengths being accommodated per optical fiber (namely, per input port) requires a substantial alteration of the configuration of the optical routing section 200, which is remote from excellent extensibility and economy. For example, in the configuration described above with reference to FIGS. 64 and 65, let it be assumed that, in the continuous satisfaction of the non-blocking conditions, the number n of wavelengths to be accommodated in each input port is increased from 32 to 128 and the total number N of input/output channels is increased from 256 to 1024.

In this case, in the optical routing section 200, as FIG. 66A shows, for the first-stage (third-stage) switch unit 200A (200C), 64 16=32 switch circuits 201 (32×16 switch circuits 203) each identical to that in the configuration shown in FIG. 65 can be put to use so that the increase in the numbers of the switch circuits 201 and 203 due to the extension is proportional to the increase in the number of wavelengths to be accommodated, whereas, for the second-stage switch unit 200B, there is a need to use 32 64×64 switch circuits 202' different in basic switch size.

Thus, basically, the change of the basic switch size does not constitute the extension of the system. That is, as well known, of optical parts, a switch circuit for use in the optical routing section 200 especially encounters difficulty in large-scale integration and further creates serious problems in technique and cost, and an extremely disadvantageous situation exists in that there is a need to newly develop the 64×64 switch circuit 202'.

For the possible solution to this, conceivably, according to the principle configuration described above with reference to FIG. 64, as shown in FIG. 66B, each of the 64×64 switch circuits 202' is reconstructed as a three-stage configuration comprising 8 16×16 switch circuits 202, 16 4×8 switch circuits 202a and 16 8×4 switch circuits 202b, which are implemented in basic switch sizes. However, in this instance, the optical routing section 200 results in a five-stage configuration as a whole, which causes the alteration of the system itself and is naturally remote from excellent extensibility.

In addition, in the case of increasing the number of wavelengths to be accommodated per input, since the interval (distance) between the wavelengths close to each other becomes extremely short, the band characteristics (an effective wavelength band, a transmission band characteristic, a wavelength splitting characteristic, and other characteristics) an optical device to be used requires become extremely severe, so limitation is imposed on optical devices available.

Incidentally, although a configuration to provide the extensibility to an OCCS in preparation for the increase in the number of optical fibers to be accommodated has been disclosed, for example, in Japanese Unexamined Patent Publication No. (Hei) 6-153248 or (Hei) 9-238370, these are merely for coping with the increase in the number of optical fibers, rather than for handling the "extensibility" of the OCCS accompanying the increase in the number of wavelengths to be multiplexed per optical fiber at all. Accordingly, if the number of wavelengths to be multiplexed per optical fiber is increased under the techniques disclosed in the foregoing publications, the above-mentioned alteration in basic switch sizes and others will likewise take place.

As stated above, in an optical network using the WDM transmission technique, the number of wavelengths to be multiplexed is increased to deal with the increase in communication capacity, and the increase in the number of optical fibers, by contrast, is seldom taken for coping therewith. This is because the installation of new optical fibers incurs extremely high cost and the original purpose of the WDM transmission technique is to increase the volume of information to be communicated by utilizing the already installed optical fiber resource effectively. In addition, with an increase in the number of wavelengths to be accommodated per port, there is a need to relieve band characteristics, such as an effective wavelength band, a transmission band characteristic, a wavelength splitting characteristic and others, an optical device requires.

SUMMARY OF THE INVENTION

Accordingly, the present invention has been developed in consideration of the above-described objects, and it is therefore an object of the invention to less expensively provide an optical cross connect apparatus having excellent flexibility (extensibility) to cope with a change (particularly, an increase) in the number of wavelengths to be accommodated per input port, and additionally to provide an optical network equipped with the same optical cross connect.

For this purpose, according to an aspect of this invention, an optical cross connect apparatus comprises the following components:
(1) a plurality of input ports capable of accommodating optical signals of a plurality of kinds of input wavelengths, respectively;
(2) a plurality of output ports capable of accommodating optical signals of a plurality of kinds of output wavelengths;
(3) an optical input switch section using switch circuits corresponding in number to kinds of accommodation wavelengths for accommodating optical signals from the input ports for same input wavelength group to route the accommodated optical signals;
(4) an optical output switch section using switch circuits corresponding in number to the kinds of accommodation wavelengths for routing input optical signals to a desired output port for same output wavelength group;
(5) an optical multiplexing/distributing section provided between the optical input switch section and the optical output switch section, for multiplexing optical signals of the wavelengths after the routing operation by the switch circuits of the optical input switch section and for distributively outputting the resultant multiplexed optical signal as an input optical signal to the switch circuits of the optical output switch section; and
(6) an optical wavelength selecting section for conducting wavelength selecting processing to lead, of the multiplexed optical signal, an optical signal with a desired wavelength to a desired output port.

Thus, with the optical cross connect apparatus according to this invention, even if the number of accommodation wavelengths increases or decreases, a change in the number of switch circuits corresponding to this increase/decrease in only the input switch section and the output switch section can cope with the increase/decrease without changing the basic configuration of the optical multiplexing/distributing section, thereby economically realizing an optical cross connect apparatus showing extremely excellent flexibility on the increase/decrease in the number of wavelengths being accommodated.

In this case, in the aforesaid optical output switch section, it is also appropriate to provide a first wavelength converting section for converting an optical signal with an optional input wavelength after the routing operation by the switch circuits of the optical output switch section into an optical signal with a desired output wavelength so that the optical signal with the optional input wavelength coming in the optional input port is outputted as the optical signal with the desired output wavelength through the output port.

In addition, in the aforesaid optical input switch section, a second wavelength converting section, which converts an optical signal with an optical input wavelength before the routing operation by the switch circuits of the optical input switch section into an optical signal with a desired output wavelength can also be provided so that the optical signal with the optional input wavelength coming in the optional input port is outputted as the optical signal with the desired output wavelength through the output port.

Thus, the wavelength converting section, which converts an optical signal with an optional input wavelength into an optical signal with a desired output wavelength, is provided in the input switch section or in the output switch section so that the optical signal with the optional input wavelength to an optional input port is outputted as the optical signal with the desired output wavelength through a desired output port; therefore, it becomes possible to avoid the event that optical signals having the same wavelength are outputted simultaneously to the same output port to cause the optical signals with the same wavelength to interfere with each other, which contributes greatly to the improvement of reliability of this system.

Furthermore, if this optical cross connect apparatus accommodates k (k: an integer equal to or more than 2) input ports and k output ports, it is also appropriate that this optical cross connect apparatus is equipped with the following devices.

(1) Optical Input Switch Section
  1) k×2k switch circuits provided for same input wavelength group, each for accommodating k optical signals with the same input wavelength to route them to any one of 2k outputs.

(2) Optical Multiplexing/Distributing Section
  1) 2k first multiplexing/distributing units for multiplexing the outputs of the k×2k switch circuits for different input wavelengths to distributively output the resultant multiplexed optical signal to routes corresponding in number to the kinds of accommodation wavelengths.

(3) Optical Output Switch Section
  1) 2k×k switch circuits provided for same output wavelength group for accommodating outputs of the first multiplexing/distributing units for the same output wavelength to route the accommodated outputs to any one of the k outputs.
  2) wavelength selectors provided for each of accommodation wavelengths for selecting, of the multiplexed optical signal after the routing operation by the 2k×k switch circuits, an optical signal having an input wavelength to be converted into a desired output wavelength.
  3) wavelength converters provided for each accommodation wavelength for converting the wavelength of the optical signal selected by each of the wavelength selectors into the output wavelength.

In this case, the wavelength selectors constitute the optical wavelength selecting section, while the wavelength converters organize the first wavelength converting section.

Still furthermore, if k (k is an integer equal to or more than 2) input ports and k output ports are each provided to accommodate an optical signal having a plurality of kinds of wavelength bands each composed of a plurality of kinds of wavelengths, this optical cross connect apparatus can also be equipped with the following devices.

(1) Optical Input Switch Section 1) k×2k switch circuits provided for same input wavelength group of each input wavelength bands, each for accommodating k optical signals with the same input wavelength in the same input wavelength band, coming in the input ports, and for routing them to any one of 2k outputs.

(2) Optical Multiplexing/Distributing Section 1) 2k second multiplexing/distributing units for multiplexing outputs of the k×2k switch circuits for different input wavelengths in the same input wavelength band, and for band-multiplexing the resultant multiplexed optical signals in the wavelength band to distributively output the band-multiplexed optical signal to routes corresponding in number to the kinds of accommodation wavelengths.

(3) Optical Output Switch Section 1) 2k×k switch circuits provided for output wavelength group of each output wavelength bands, each for accommodating 2k outputs of the second multiplexing/distributing units for the same output wavelength in the same output wavelength band to said output port and for routing the accommodated 2k outputs to any one of the k outputs.

2) wavelength selectors provided for each accommodation wavelength, each for selecting an optical signal with an input wavelength to be converted into a desired output wavelength from the multiplexed optical signal after the routing operation by the 2k×k switch circuits.

3) wavelength converters provided for each accommodation wavelength, each for converting the wavelength of the optical signal selected by the wavelength selector into an output wavelength.

Also, in this case, the aforesaid wavelength selectors constitute the optical wavelength selecting section, while the aforesaid wavelength converters organize the first wavelength converting section.

Moreover, if k (k is an integer equal to or more than 2) input ports and k output ports exist, this optical cross connect apparatus can also include the following devices.

(1) Optical Input Switch Section 1) wavelength converters provided for each accommodation wavelength, each for converting an optical signal with a wavelength from each of the input ports into a desired output wavelength.

2) k×2k switch circuits provided for the input wavelength group, each for accommodating k outputs of the wavelength converters for the same input wavelength before the wavelength conversion and for routing the accommodated k outputs to any one of the 2k outputs.

(2) Optical Multiplexing/Distributing Section 1) 2k first coupling/demultiplexing units for coupling the outputs of the k×2k switch circuits for different input wavelengths before the wavelength conversion and further for demultiplexing the coupled signal.

(3) Optical Output Switch Section 1) 2k×k switch circuits provided for the output wavelength group, each for accommodating the 2k outputs of the first coupling/demultiplexing units for the same output wavelength to the output ports and for routing the accommodated 2k outputs to any one of the k outputs.

In this case, the aforesaid first coupling/demultiplexing units constitute the optical wavelength selecting section, while the aforesaid wavelength converters organize the second wavelength converting section.

Furthermore, if k (k is an integer equal to or more than 2) input ports and k output ports are provided to each accommodates an optical signal having a plurality of kinds of wavelength bands each composed of a plurality of kinds of wavelengths, this optical cross connect apparatus can also be equipped with the following devices.

(1) Optical Input Switch Section 1) wavelength converters provided for each accommodation wavelength, and each of which is capable of converting an optical signal having the wavelength from each of the input ports into a desired output wavelength.

2) k×2k switch circuits provided for the input wavelength group of each input wavelength bands, each for accommodating k optical signals with the same input wavelength in the same input wavelength band, coming in the input ports, and for routing them to any one of the 2k outputs.

(2) Optical Multiplexing/Distributing Section 1) second coupling/demultiplexing units each for coupling the outputs of the k×2k switch circuits for different input wavelengths before the wavelength conversion and then for band-demultiplexing the coupled output signal into optical signals pertaining to the wavelength bands to demultiplex an optical signal pertaining to each of the wavelength bands after the band demultiplexing.

(3) Optical Output Switch Section 1) 2k×k switch circuits provided for the output wavelength group of each output wavelength bands, each for accommodating the outputs of the aforesaid second coupling/demultiplexing units for the same output wavelength in the same output wavelength band to the output ports and for routing them to any one of the k outputs.

In this case, the aforesaid second coupling/demultiplexing units constitute the optical wavelength selecting section, while the aforesaid wavelength converters organize the second wavelength converting section.

Still furthermore, if k (k is an integer equal to or more than 2) input ports and k output ports exist, this optical cross connect apparatus can also include the following devices.

(1) Optical Input Switch Section 1) k×2k switch circuits provided for the input wavelength group, each for accommodating k optical signals with the same input wavelength, coming in the input ports, and for routing them to any one of 2k outputs.

(2) Optical Multiplexing/Distributing Section 1) 2k first coupling/distributing units each for coupling the outputs of the k×2k switch circuits for different input wavelengths and for distributively outputting the resultant coupled optical signal to routes corresponding in number to the kinds of accommodation wavelengths.

2) wavelength selectors provided for each of the distributed output signals, each for selecting an optical signal having an input wavelength to be converted into a desired output wavelength, from each of the distributed output signals of the first coupling/distributing units.

(3) Optical Output Switch Section 1) 2k×k switch circuits provided for the output wavelength group, each for accommodating the 2k outputs of the wavelength selectors for the same output wavelength and for routing the accommodated 2k outputs to any one of k outputs.

2) wavelength converters provided for all the accommodation wavelengths, each for converting the output of the 2k×k switch circuit into the desired output wavelength.

In this case, the aforesaid wavelength selectors constitute the optical wavelength selecting section, while the aforesaid wavelength converters organize the first wavelength converting section.

Yet furthermore, if k (k is an integer equal to or more than 2) input ports and k output ports are provided to each accommodates an optical signal having a plurality of kinds of wavelength bands each composed of a plurality of kinds of wavelengths, this optical cross connect apparatus can also be equipped with the following devices.

(1) Optical Input Switch Section 1) k×2k switch circuits provided for the input wavelength group of each input wavelength bands, each for accommodating k optical signals with the same input wavelength in the same input wavelength band, coming in the input ports and for routing them to any one of the 2k outputs.

(2) Optical Multiplexing/Distributing Section 1) 2k second coupling/distributing units each for coupling the outputs of the k×2k switch circuits for different input wavelengths and for distributively outputting the resultant coupled output signal to routes corresponding in number to all the kinds of accommodation wavelengths.

2) wavelength selectors provided for each of distributed output signals, each for selecting, from the distributed output signals of the second coupling/distributing units, an optical signal having an input wavelength to be converted into a desired output wavelength.

(3) Optical Output Switch Section 1) 2k×k switch circuits provided for same output wavelength group of each output wavelength bands, each for accommodating the 2k outputs of the wavelength selectors for the same output wavelength in the same output wavelength band to the output ports and for routing the accommodated 2k outputs to any one of the k outputs.

2) wavelength converters provided for each accommodation wavelength, each for converting the wavelength of each of the optical signals from the 2k×k switch circuits into the output wavelength.

In this case, the wavelength selectors constitute the optical wavelength selecting section, while the wavelength converters constitute the first wavelength converting section.

Moreover, k input ports (k is equal to or more than 2) and k output ports are provided, this optical cross connect apparatus can include the following devices.

(1) Optical Input Switch Section 1) wavelength converters provided for each accommodation wavelength, each for converting an optical signal having each of the wavelengths from the input ports into a desired output wavelength.

2) k×2k switch circuits provided for same input wavelength group, each for accommodating the k outputs of the wavelength converters for the same input wavelength before the wavelength conversion and for routing the accommodated k outputs to any one of the 2k outputs.

(2) Optical Multiplexing/Distributing Section 1) 2k third coupling/distributing units for coupling the outputs of the k×2k switch circuits for different input wavelengths before the wavelength conversion and for distributively outputting the resultant coupled output signal to routes corresponding in number to the kinds of accommodation wavelengths.

2) wavelength selectors provided for each distributed output signal, each for selecting, from the distributed output signals of the third coupling/distributing units, an optical signal having an input wavelength to be converted into a desired output wavelength.

(3) Optical Output Switch Section 1) 2k×k switch circuits provided for the output wavelength group, each for accommodating the 2k outputs of the wavelength selectors for the same output wavelength to the output ports and for routing the accommodated 2k outputs to any one of the k outputs.

In this case, the wavelength selectors constitute the optical wavelength selecting section, while the wavelength converters constitute the second wavelength converting section.

Furthermore, if k (k is an integer equal to or more than 2) input ports and k output ports are provided to each accommodates an optical signal having a plurality of kinds of wavelength bands each composed of a plurality of kinds of wavelengths, this optical cross connect apparatus can also be equipped with the following devices.

(1) Optical Input Switch Section 1) wavelength converters provided for each accommodation wavelength, each capable of converting an optical signal with an wavelength from each of the input ports into a desired output wavelength.

2) k×2k switch circuits provided for the input wavelength group of each input wavelength bands, each for accommodating k optical signals having the same input wavelength in the same input wavelength band, coming in the input ports, and for routing the accommodated k optical signals to any one of the 2k outputs.

(2) Optical Multiplexing/Distributing Section 1) 2k fourth coupling/distributing units each for combining the outputs of the k×2k switch circuits for different input wavelengths before the wavelength conversion and for distributively outputting the resultant coupled output signal to routes corresponding in number to the kinds of accommodation wavelengths.

2) wavelength selectors provided for each distributed output signal, each for selecting, from the distributed output signals of the fourth coupling/distributing units, an optical signal having an input wavelength to be converted into-a desired output wavelength.

(3) Optical Output Switch Section 1) 2k×k switch circuits provided for the output wavelength group of each output wavelength bands, each for accommodating the 2k outputs of the wavelength selectors for the same output wavelength in the same output wavelength band to the output ports and for routing the accommodated 2k outputs to any one of the k outputs.

In this case, the wavelength selectors constitute the optical wavelength selecting section, while the wavelength converters organize the second wavelength converting section.

As described above, in a case in which the input ports (output ports) are k in number, the input switch section and the output switch section can accept the use of the existing (k×2k) switch circuit and the existing (2k×k) switch circuit, while the optical multiplexing/distributing section can accept the employment of the optical parts, such as a multiplexing/distributing unit, a coupling/demultiplexing unit, which have been used in the existing WDM transmission system; therefore, there is no need to newly design and develop optical parts even if an increase/decrease in the number of wavelengths to be accommodated takes place, thus realizing a system according to this invention within an extremely short period of time and at an extremely low cost.

In addition, even in a case in which optical signals pertaining to a plurality of types of wavelength bands, each of which is composed of optical signals of a plurality of kinds of wavelengths, are accommodated per port, if the (k×2k) switch circuit and (2k×k) switch circuit are used for the input switch section and the output switch section for each of the above-mentioned wavelengths while a multiplexing/distributing unit or the like capable of accomplishing the multiplexing/distribution at each wavelength is additionally incorporated into the optical multiplexing/ distributing section (some configurations do not require the additional installation thereof), it is possible to cope with this case, thus realizing a larger-capacity optical cross connect apparatus within a short period of time and at a low cost.

Still additionally, in this optical cross connect apparatus, it is also appropriate that each of the above-mentioned input ports each accommodates a wavelength-multiplexed optical signal having a plurality of kinds of input wavelengths while each of the above-mentioned output ports accommodates a wavelength-multiplexed optical signal having a plurality of kinds of output wavelengths.

Moreover, in this optical cross connect apparatus, it is also appropriate that a portion of the above-mentioned input ports each accommodates a wavelength-multiplexed optical signal having a plurality of kinds of input wavelengths while the remaining input ports are each used for adding an optical signal having an arbitrary wavelength, and a portion of the above-mentioned output ports each accommodates a wavelength-multiplexed optical signal having a plurality of kinds of output wavelengths while the remaining output ports are each used for dropping an optical signal having an arbitrary wavelength.

Furthermore, in this optical cross connect apparatus, it is also possible that only the output ports each accommodates a wavelength-multiplexed optical signal having a plurality of kinds of output wavelengths, or that only the input ports each accommodates a wavelength-multiplexed optical signal having a plurality of kinds of wavelengths.

Thus, if a portion of or all of each of the input ports and the output ports, or either the input ports or the output ports is made to accommodate a wavelength-multiplexed optical signal having a plurality of kinds of wavelengths, each of the ports can be allocated properly to dedicated station-to-station transmission, station-to-station/in-station transmission, transmission terminal stations, receive terminal station and others, thereby realizing and providing an optical cross connect apparatus suitable for desired using modes with considerable ease.

In addition, in accordance with this invention, there is provided an optical network including at least one optical cross connect apparatus having the above-described configuration.

Accordingly, when an optical network is constructed using each of the above-described optical cross connect apparatus, an optical network capable of setting various alternative routes at the occurrence of troubles becomes realizable.

In addition, the optical cross connect apparatus according to this invention is characterized by comprising the following sections:

(1) a plurality of input ports for accommodating optical signals of a plurality of kinds of input wavelengths;
(2) a plurality of output ports for accommodating optical signals of a plurality of kinds of output wavelengths;
(3) an input wavelength converting section for converting the input wavelengths into intra-apparatus wavelengths less in number of kinds than the number of kinds of input wavelengths;
(4) a wavelength multiplexing/distribution routing section for multiplexing, in terms of wavelengths, optical signals with the intra-apparatus wavelengths from the aforesaid input wavelength converting section to distribute and route the resultant intra-apparatus wavelength multiplexed optical signal as an optical signal including a desired output wavelength to a desired output port;
(5) an optical wavelength selecting section for selecting an optical signal with a desired intra-apparatus wavelength from the wavelength multiplexed optical signal; and
(6) an output wavelength converting section for converting the wavelength of the optical signal, selected by the optical wavelength selecting section, into the aforesaid output wavelength.

In this case, when the numbers of the input ports and the output ports are respectively taken as k (k is an integer equal to or more than 2), the number of kinds of wavelengths each of the ports accommodates is taken as n (n is an integer equal to or more than 2) and the number of kinds of intra-apparatus wavelengths is taken as m (m is an integer which satisfies $2 \leq m < n$), the input wavelength converting section, preferably the wavelength multiplexing/distribution routing section and the output wavelength converting section are constructed, for example, as follows.

1) Input Wavelength Converting Section m fixed wavelength converting sections for converting the optical signals of the aforesaid input wavelengths into optical signals of the same intra-apparatus wavelengths in units of p waves [where p is an integer satisfying $p = n/m$ ($<k$)].

2) Wavelength Multiplexing/Distribution Routing Section a) n k×2k switches each for accommodating the k outputs of the fixed wavelength converting sections for same input wavelength before the wavelength conversion into the intra-apparatus wavelengths to route the accommodated k outputs to any one of 2k outputs.

b) 2k n×n routing sections for multiplexing, in terms of wavelengths, optical signals with p sets of different intra-apparatus wavelengths from the k×2k switches to distributively route the resultant intra-apparatus wavelength multiplexed optical signal.

c) n 2k×k switches each for accommodating the outputs of the n×n routing sections at every intra-apparatus wavelength to be converted into the same output wavelength to route them to a desired output port.

3) Output Wavelength Converting Section L k×n fixed output wavelength converters for converting the outputs of the 2k×k switches into optical signals of predetermined output wavelengths.

In addition, it is also appropriate that each of the n×n routing sections includes p m:n multiplexing/distributing sections for multiplexing, in terms of wavelengths, optical signals of p sets of different intra-apparatus wavelengths from the k×2k switches and further for distributing the resultant intra-apparatus wavelength multiplexed optical signal in the form of n optical signals, n p×1 switches each for selecting a desired intra-apparatus wavelength multiplexed optical signal from the p sets of intra-apparatus wavelength multiplexed optical signals from the m:n multiplexing/distributing sections, and n tunable (variable) wavelength filters each for selecting an optical signal of desired intra-apparatus wavelengths from the outputs of the p×1 switches, with n tunable wavelength filters constituting the aforesaid optical wavelength selecting section.

Still additionally, it is also appropriate that each of the n×n routing sections includes m p×2p switches each for accommodating optical signals of p sets of different intra-apparatus wavelengths from the k×2k switches for same intra-apparatus wavelength to route them to arbitrary routes, 2p m:m multiplexing/distributing sections for multiplexing the different intra-apparatus wavelengths of the outputs of the p×2p switches to distribute the resultant intra-apparatus wavelength multiplexed optical signal in the form of m optical signals, m 2p×p switches each for routing the 2p outputs from the m:m multiplexing/distributing sections to any one of p outputs, and n tunable wavelength filters each for selecting an optical signal of desired intra-apparatus wavelength from the outputs of the 2p×p switches, with the n tunable wavelength filters constituting the aforesaid optical wavelength selecting section.

Furthermore, it is also appropriate that the aforesaid optical wavelength selecting section includes n tunable wavelength filters provided outside the n×n routing section but not provided inside the n×n routing section, for example, provided at a rear stage of each of the aforesaid 2k×k switches for selecting an optical signal with a desired intra-apparatus wavelength from the intra-apparatus wavelength multiplexed optical signal from the 2k×k switches.

In this case, preferably each of the n×n routing sections includes p m:n multiplexing/distributing sections for multiplexing, in terms of wavelengths, optical signals of p sets of different intra-apparatus wavelengths from the k×2k switches to distribute the resultant intra-apparatus wavelength multiplexed optical signal in the form of n optical signals, and n p×1 switches each for selecting a desired intra-apparatus wavelength multiplexed signal from the outputs of the m:n multiplexing/distributing sections.

Additionally, in this case, it is also possible that each of the n×n routing sections includes m p×2p switches each for accommodating optical signals of p sets of different intra-apparatus wavelengths from the k×2k switches to route them to any one of 2p outputs, 2p m:m multiplexing/distributing sections for multiplexing different intra-apparatus wavelengths of the outputs of the p×2p switches to distribute the resultant wavelength multiplexed optical signal in the form of m optical signals, and m 2p×p switches for routing the 2p outputs from the m:m multiplexing/distributing sections to any one of p outputs.

In this instance, it is also possible that each of the m:m multiplexing/distributing sections is constructed as an m:m routing section including M (M<m) (m/M)×(2m/M) switches each for accommodating, of the outputs of the p×2p switches, optical signals with the same intra-apparatus wavelength to route them to arbitrary routes, 2m/M M:M couplers for multiplexing different intra-apparatus wavelengths of optical signals from the (m/M)×(2m/M) switches to distribute the resultant wavelength multiplexed optical signal in the form of M optical signals, and M (2m/M)×(m/M) switches for routing the outputs from the M:M couplers to any one of (m/M) outputs. Meanwhile, the input wavelength converting section, the wavelength multiplexing/distribution routing section and the output wavelength converting section can be constructed in a state equipped with the following sections 1) Input Wavelength Converting Section k×n variable wavelength converters for converting optical signals of input wavelengths into optical signals of arbitrary intra-apparatus wavelengths of p sets of different intra-apparatus wavelengths.

2) Wavelength Multiplexing/Distribution Routing Section a) an optical input switch section having n k×2k switches each for accommodating optical signals from the variable wavelength converters for same input wavelength prior to intra-apparatus wavelength conversion to route them;

b) 2k n×n routing sections for multiplexing, in terms of wavelengths, optical signals of p sets of different intra-apparatus wavelengths from the k×2k switches to distributively route the resultant intra-apparatus wavelength multiplexed optical signal; and c) an optical output switch section having n 2k×k switches each for accommodating the outputs from the n×n routing sections at every intra-apparatus wavelength to be converted into the same output wavelength to route them to desired output ports.

3) Output Wavelength Converting Section k×n fixed output wavelength converters for converting optical signals of p sets of identical intra-apparatus wavelengths from the 2k×k switches into optical signals of predetermined output wavelengths.

In this case, preferably each of the n×n routing sections includes p m:n multiplexing/distributing sections for multiplexing, in terms of wavelengths, optical signals of p sets of different intra-apparatus wavelengths from the k×2k switches to distribute the resultant intra-apparatus wavelength multiplexed optical signal in the form of n optical signals, n p×1 switches for selecting desired intra-apparatus wavelength multiplexed optical signals from the p sets of intra-apparatus wavelength multiplexed optical signals of the m:n multiplexing/distributing sections, and n fixed wavelength filters for selecting optical signals of predetermined intra-apparatus wavelengths from the outputs of p×1 switches, with the n fixed wavelength filters constituting the aforesaid optical wavelength selecting section.

Furthermore, it is also appropriate that each of the n×n routing sections includes m p×2p switches each for routing the optical signals of the p sets of different intra-apparatus wavelengths from the k×2k switches to any one of 2p outputs, 2p m:m multiplexing/distributing sections for multiplexing the outputs of the p×2p switches for different intra-apparatus wavelengths to distribute the resultant intra-apparatus wavelength multiplexed optical signal in the form of m optical signals, m 2p×p switches each for routing the 2p sets of outputs from m:m multiplexing/distributing sections to desired 2k×k switches, and n fixed wavelength filters each for selecting an optical signal of predetermined intra-apparatus wavelength from the outputs of the 2p×p switches, with the n fixed wavelength filters constituting the aforesaid optical wavelength selecting section.

Also in this case, the aforesaid optical wavelength selecting section can be provided in the exterior of the n×n routing section but not in the interior thereof. That is, it is also possible to use n fixed wavelength filters for selecting an optical signal of predetermined intra-apparatus wavelengths from the outputs of the 2k×k switches.

In this instance, preferably each of the n×n routing sections includes m p×2p switches each for routing optical signals of p sets of different intra-apparatus wavelengths from the aforesaid k×2k switches to any one of 2p outputs, 2p m:m multiplexing/distributing sections for multiplexing different intra-apparatus wavelengths of the outputs of the p×2p switches to distribute the resultant intra-apparatus wavelength multiplexed optical signal in the form of m optical signals, and m 2p×p switches each for routing the 2p sets of outputs of the m:m multiplexing/distributing sections to desired 2k×k switches.

In this case, it is also appropriate that each of the m:m multiplexing/distributing sections is constructed as an m:m routing section including M (M<m) (m/M)×(2m/M) switches for accommodating (m/M)optical signals of arbitrary intra-apparatus wavelengths from the aforesaid p×2p switches to route them to any one of (2m/M) outputs, 2m/M M:M couplers for multiplexing, in terms of wavelengths, optical signals of different intra-apparatus wavelengths from the (m/M)×(2m/M) switches to distribute the resultant intra-apparatus wavelength multiplexed optical signal in the form of M optical signals, and M (2m/M)×(m/M) switches each for routing the 2m/M outputs from the M:M couplers to desired 2k×k switches.

As the above-mentioned intra-apparatus wavelengths, continuous wavelength-grid wavelengths are acceptable, and incontinuous wavelength-grid wavelengths are also acceptable. Furthermore, it is also possible that the above-mentioned multiplexing/distribution routing section is replaceable with the existing routing section which does not perform the wavelength multiplexing/distribution. That is, an optical cross connect apparatus according to this invention can be composed of the following parts:
(1) a plurality of input ports for accepting optical signals of a plurality of kinds of input wavelengths;
(2) a plurality of output ports for accepting optical signals of a plurality of kinds of output wavelengths;
(3) an input wavelength converting section for converting optical signals of a plurality of kinds of input wavelengths inputted from the input ports into intra-apparatus wavelengths less in number of kinds than the input wavelengths;
(4) a routing section for routing optical signals of intra-apparatus wavelengths from the input wavelength converting section to desired output ports; and
(5) an output wavelength converting section for converting the wavelengths of the optical signals from the routing section into predetermined output wavelengths.

As described above, according to the optical cross connect apparatus, in a state where input wavelengths are converted into intra-apparatus wavelengths to decrease the number of wavelengths to be handled in the interior of the apparatus while optical signals of the intra-apparatus wavelengths are multiplexed in terms of these wavelengths, the optical signals are distributively routed and optical signals of intra-apparatus wavelengths to be converted into desired output wavelengths to desired output ports are selected from the intra-apparatus wavelength multiplexed optical signals. Accordingly, the given band characteristics required in optical devices to be put to use can be relieved so that, with respect to an increase/decrease (particularly, increase) in number of input wavelengths per port, it is possible to use the existing optical devices, the existing optical switch techniques and the existing wavelength multiplexing techniques. This can provide economically a large-capacity optical cross connect apparatus exhibiting an excellent flexibility (extensibility) with respect to the increase/decrease in number of input wavelengths per port, without requiring new technical developments.

In this case, the wavelength conversion of the input wavelengths into the intra-apparatus wavelengths can be done by converting the input wavelengths into predetermined wavelengths through the use of fixed input wavelength converters, alternatively can rely on the conversion thereof into wavelengths corresponding to arbitrary output wavelengths through the use of variable input wavelength converters. In either case, the aforesaid wavelength selection processing can be conducted at a front stage of the optical output switch section (2k×k switches) or at a rear stage thereof, which can increase the choices of apparatus configuration.

Particularly, in the case in which the aforesaid wavelength selection processing is conducted at a rear stage of the optical output switch section (2k×k switches), it is possible to cut the number of variable/fixed wavelength filters required so that the apparatus scale is reducible. Additionally, in this case, when the m:m multiplexing/distributing sections for wavelength-multiplexing and distributing the optical signals of the intra-apparatus wavelengths are constructed as wavelength multiplexing/distribution m:m routing sections, a further decrease in number of intra-apparatus wavelengths is feasible, which can additionally relieve the given band characteristics required in optical devices to be put to use.

If continuous wavelength-grid wavelengths are allocated to the aforesaid intra-apparatus wavelengths, it is possible to relieve the effective wavelength band to be required in optical devices to be put to use. On the other hand, if incontinuous wavelength-grid wavelengths are allocated thereto, it is possible to ease the transmission band characteristics the optical wavelength selecting section is required to have. In both cases, a large-capacity optical cross connect apparatus is realizable easily using the existing optical devices.

Incidentally, the optical signal routing after the conversion into the intra-apparatus wavelengths is also achievable using the existing routing processing which does not perform the wavelength multiplexing/distribution, also in which case, it is possible to ease the band characteristics required in optical devices to be put to use.

BRIEF DESCRIPTION OF THE DRAWINGS

FIG. 51 is a block diagram showing a configuration of a 128×128 routing section shown in FIG. 50;

FIGS. 57A to 57C are illustrations for explaining an intra-apparatus allocation wavelength grid (incontinuous);

FIGS. 58A to 58C are block diagrams showing hybridization of optical devices;

DESCRIPTION OF THE PREFERRED EMBODIMENTS

Embodiments of the present invention will be described hereinbelow with reference to the drawings.

(A) Description of a Basic Configuration of an Optical Cross Connect System or Apparatus (OCCS)

First of all, a description will be given hereinbelow of basic configurations (Type-1 to Type-8) of an OCCS according to an embodiment of this invention.

(A.1) Description of a Basic Configuration of an OCCS

Figure 1:
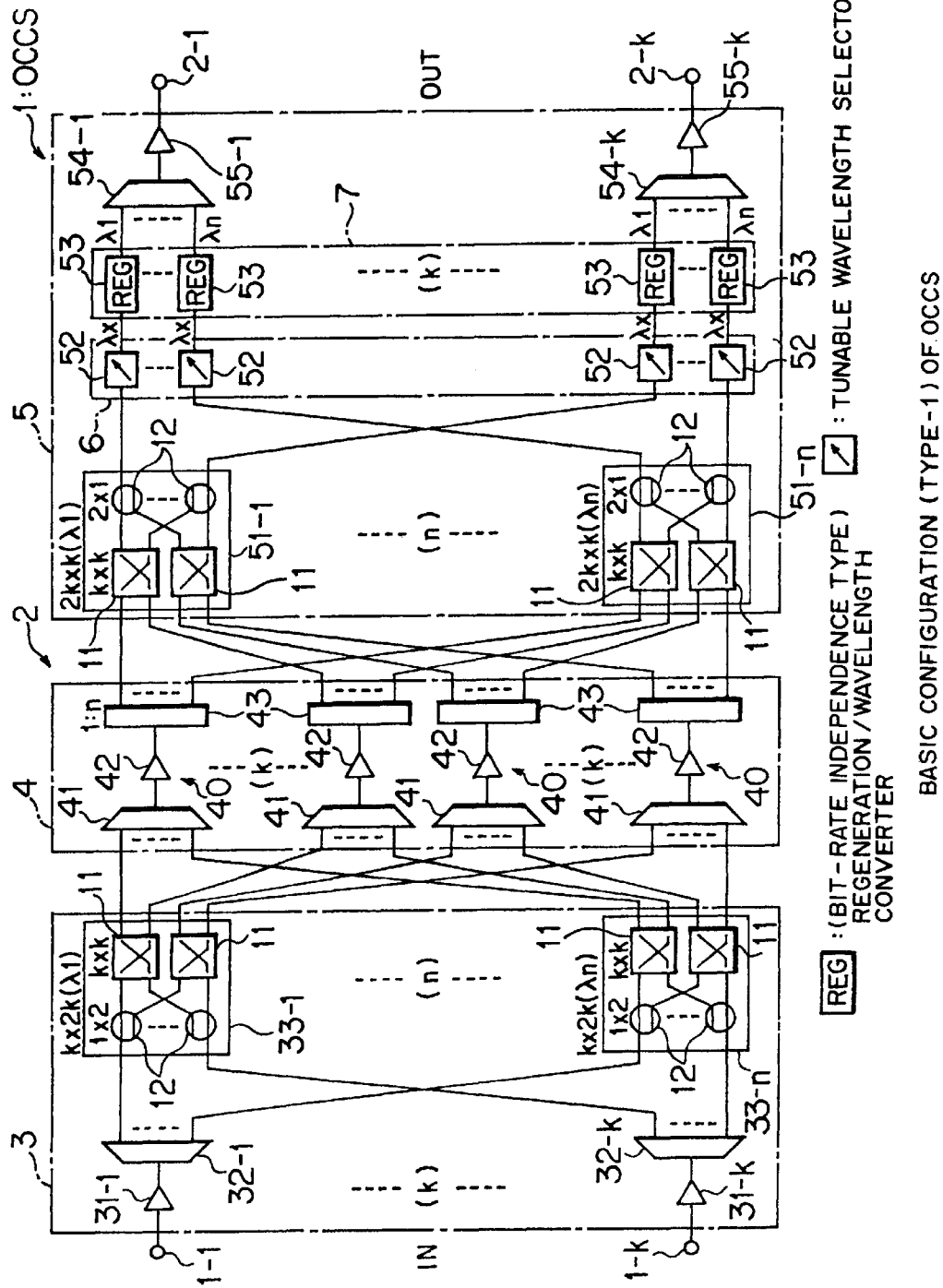
FIG. 1 is a block diagram showing a first type (Type-1) of basic configurations of an OCCS (Optical Cross Connect System or Apparatus), which constitutes an embodiment of the present invention.

FIG. 1 is a block diagram showing a first type (Type-1) of a basic configuration of an OCCS according to an embodiment of this invention. In FIG. 1, the OCCS 1 (Type-1) is equipped with k input ports 1-1 to 1-k and k output ports 2-1 to 2-k, and an optical routing section 2 for routing (cross-connecting) input optical signals coming in arbitrary input ports 1-i (where i=1 to k) to desired output ports 2-i is composed of an optical input switch section 3, an optical multiplexing/distributing section 4 and an optical output switch section 5.

Each of the input ports 1-i accommodates an input optical fiber (not shown) for transmitting a wavelength multiplexed optical signal (WDM signal) produced by multiplexing, in terms of wavelengths (wavelength-multiplexing), optical signals of n (n denotes an integer being two or more) kinds of wavelengths (input wavelengths) $\lambda 1$ to $\lambda n$, thereby taking in the optical signals of the n kinds of input wavelengths $\lambda 1$ to $\lambda n$, while each of the output ports 2-i accommodates an output optical fiber (not shown) for transmitting a WDM signal produced by wavelength-multiplexing the optical signals of the n kinds of wavelengths (output wavelengths) $\lambda 1$ to $\lambda n$, thereby taking in the optical signals of the n kinds of output wavelengths $\lambda 1$ to $\lambda n$. That is, in this OCCS 1, the number of input/output channels (total number of G accommodation wavelengths) is $N=n \times k$.

The optical input switch section 3 uses switch circuits, whose number corresponds to the number n of kinds of accommodation wavelengths (=the number of accommodation wavelengths per port), for routing the optical signals from the input ports 1-i according to the identification of wavelengths $\lambda j$ (in units of identical wavelengths $\lambda j$) (where j=1 to n). In this embodiment, the optical input switch section 3 is made up of k optical amplifiers 31-1 to 31-k each provided for each of the input ports 1-1 to 1-k, k optical demultiplexers 32-1 to 32-k each provided for each of the input ports 1-1 to 1-k, and n k×2k optical space switch circuits 33-1 to 33-n.

In this configuration, each of optical amplifiers 31-i is used properly for amplifying (compensating for) an optical level (power) of an incoming WDM signal from the input port 1-i up to an optimal level, while each of the optical demultiplexers 32-i branches the WDM signal from the corresponding optical amplifier 31-i (input port 1-i) into optical signals of wavelengths $\lambda 1$ to $\lambda n$.

Each of k×2k optical space switch circuits (each of which will hereinafter be referred to simply as a "k×2k switch" or a "optical switch") 33-j is for accommodating (accommodating), of the optical signals of the wavelengths $\lambda 1$ to $\lambda n$ resulting from the branch in the k optical demultiplexers 32-i, optical signals with the same wavelength $\lambda j$ of k systems to route them to any one of outputs of 2k systems. That is, each of these k×2k switches 33-j is provided in connection with each of groups each comprising identical wavelengths $\lambda j$, with one k×2k switch 33-j corresponding to one wavelength $\lambda j$.

Furthermore, the optical multiplexing/distributing section 4 is provided between the optical input switch section 3 and the optical output switch section 5 for again wavelength-multiplexing the optical signals of the wavelengths $\lambda 1$ to $\lambda n$ after the routing by the k×2k switches 33-j of the optical input switch section 3 to distributively output the resultant WDM signals as input optical signals to 2k×k optical space switch circuits 51-1 to 51-n of the optical output switch section 5, which will be described below.

Thus, this optical multiplexing/distributing section 4 is made up of 2k optical multiplexers 41 for multiplexing (n-wavelength multiplexing) the outputs of the k×2k switches 33-j of the optical input switch section 3, and 2k 1:n optical couplers 43 for distributively outputting 2k-system WDM signals from these 2k optical multiplexers 41 as n optical signals.

This means that these sets of optical multiplexers 41 and the 1:n optical couplers 43 function as n:n optical multiplexing/distributing units (first multiplexing/distributing units) 40 for multiplexing (wavelength re-multiplexing) the outputs of the k×2k switches 33-j in terms of different wavelengths $\lambda j$ to distributively output the resultant WDM signals as optical signals whose number is the number n of kinds of accommodation wavelengths.

Figure 64:
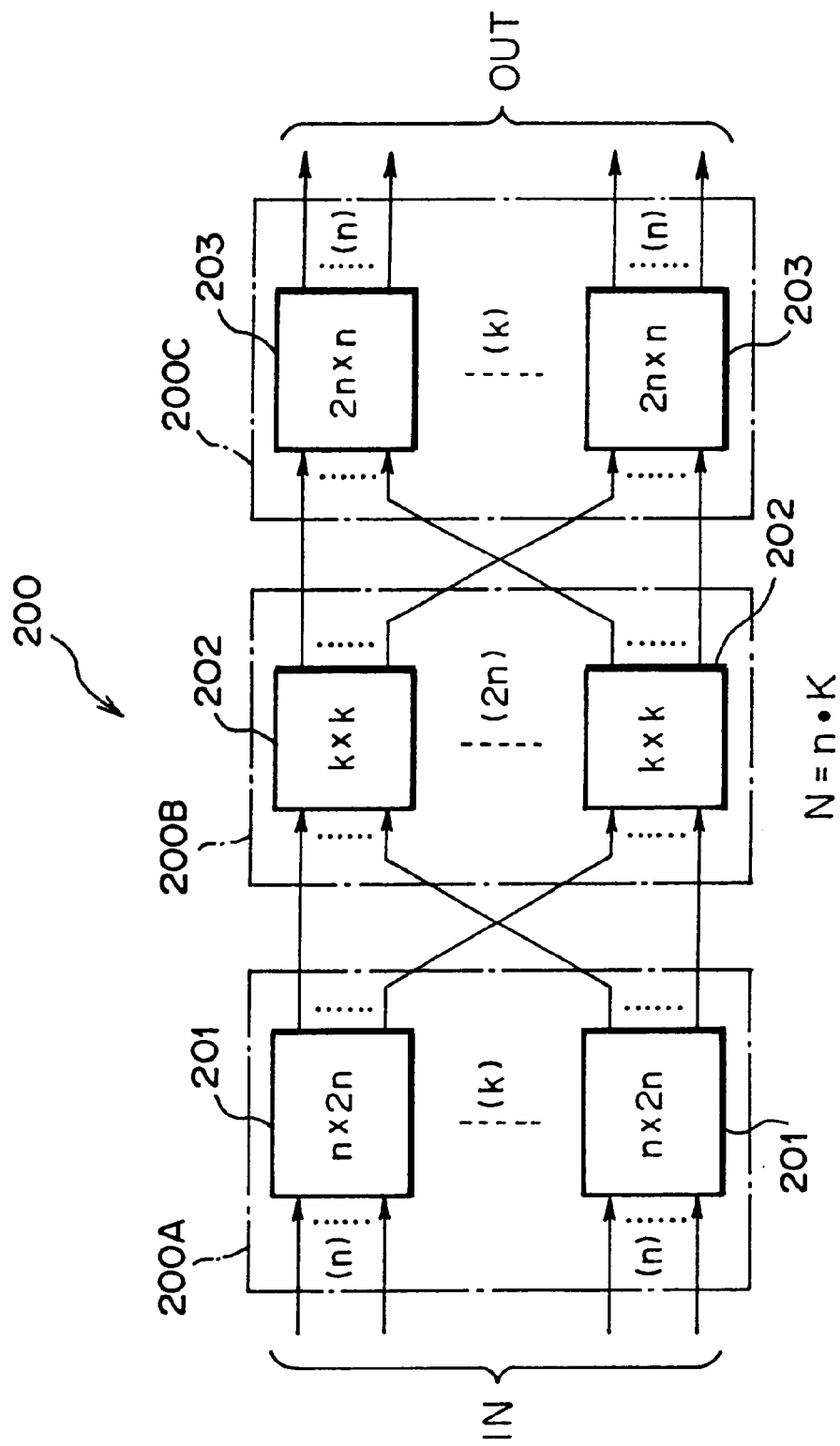
FIG. 64 is a block diagram a configurational example of an optical routing section of the existing OCCS.
Figure 65:
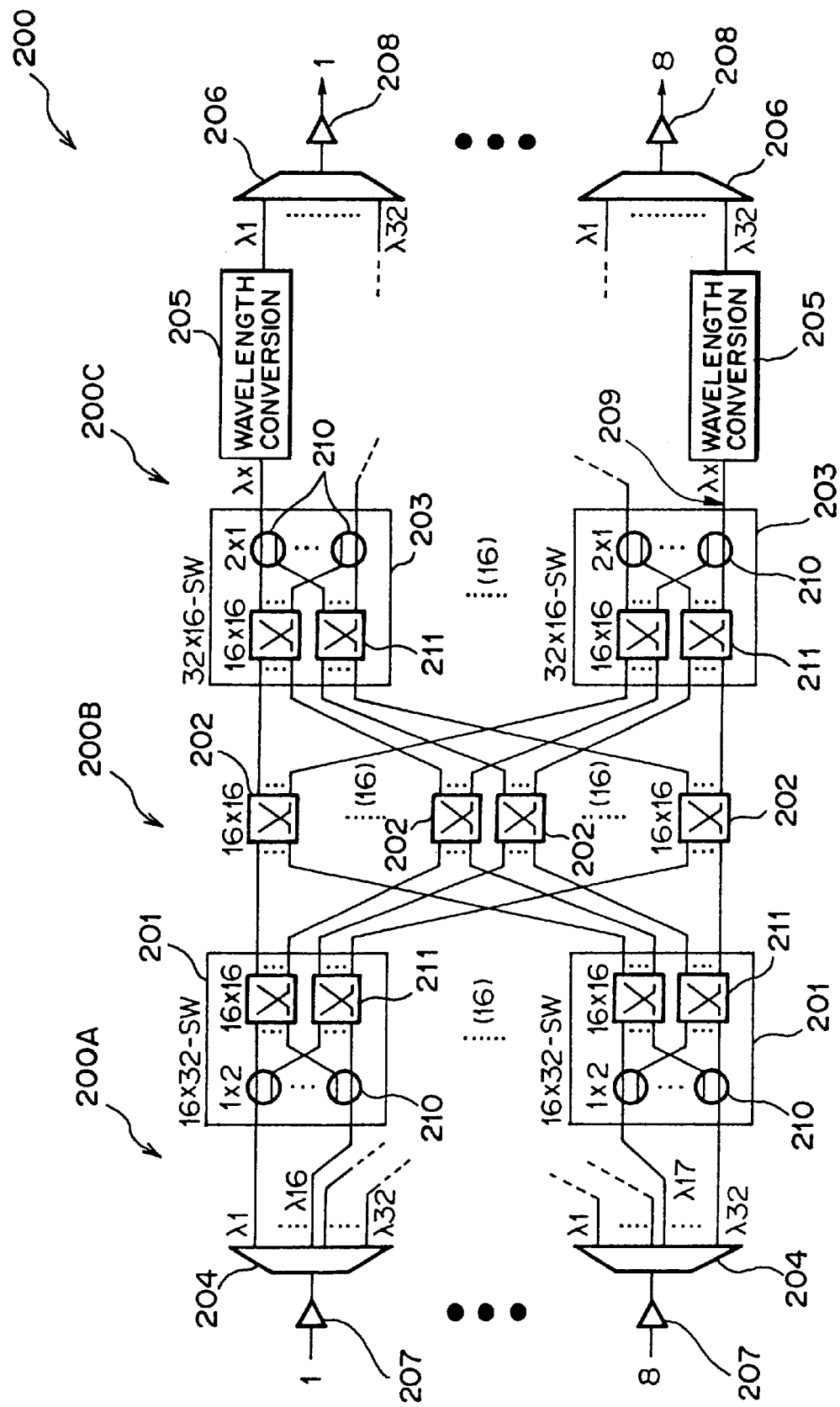
FIG. 65 is a block diagram a detailed configurational example of the optical routing section of the existing OCCS.
Figures 66A, 66B:
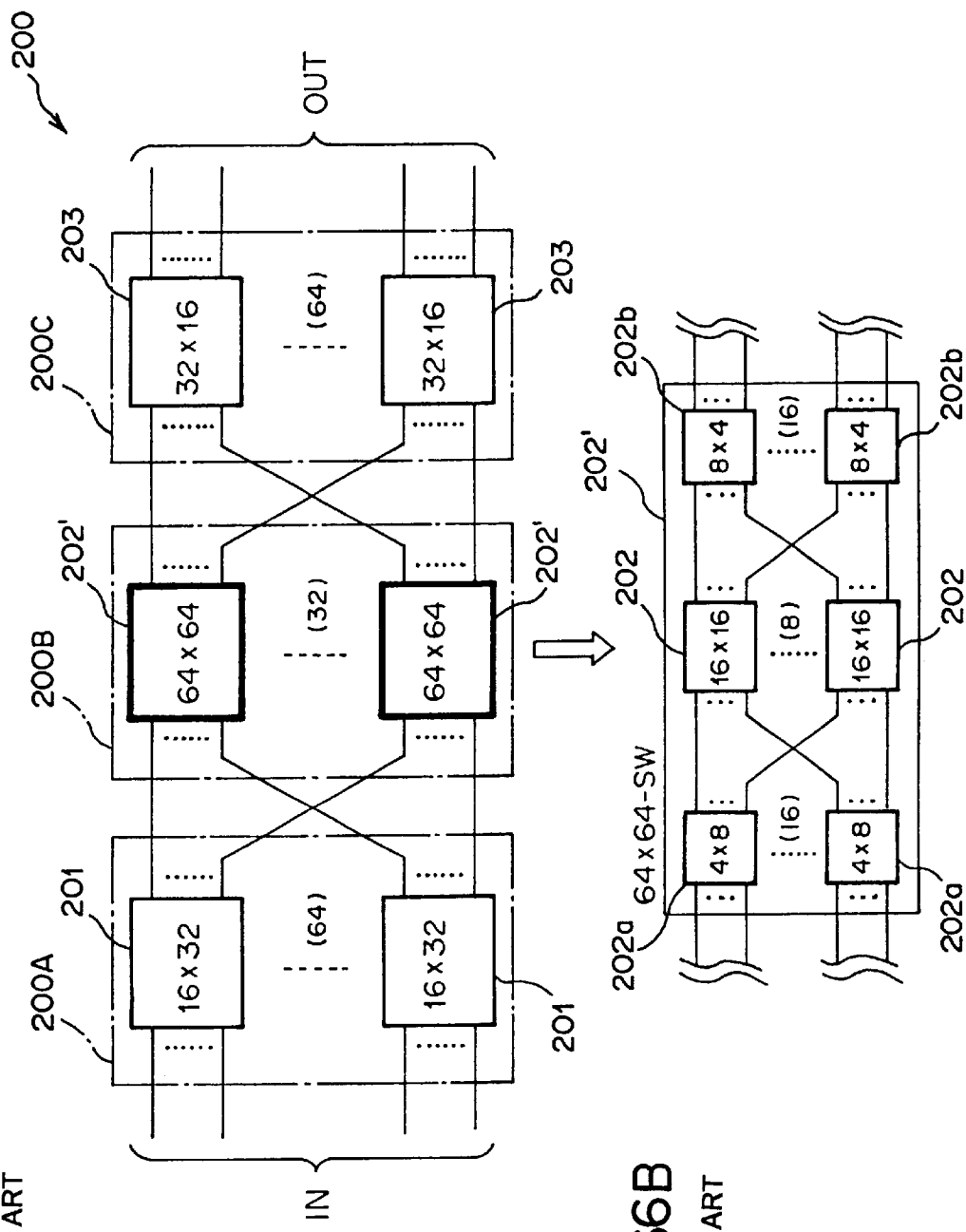
FIGS. 66A and 66B are block diagrams for explaining the problems inherent in the optical routing section of the existing OCCS.

In this way, when 2k n:n optical multiplexing/distributing units 40 each comprising a combination of the optical multiplexer 41 and the 1:n optical coupler 43 are put to use, it is considered that the optical multiplexing/distributing section 4 is equivalent to switch groups including 2k n×n switches, which satisfies the non-blocking condition on the three-stage switch construction shown above in FIG. 64. Reference numeral 42 designates 2k optical amplifiers provided properly for compensating for the loss of the like of the optical power of the WDM signals after the wavelength re-multiplexing.

Still furthermore, the optical output switch section 5 uses switch circuits, whose number corresponds to the number n of kinds of accommodation wavelengths, for routing the input optical signals according to the identification of wavelengths to desired output ports 2-i. In this embodiment, the optical output switch section 5 is composed of n 2k×k optical space switch circuits 51-1 to 51-n, n×k (=N) (namely, every accommodation wavelength) tunable wavelength selectors 52, n×k regeneration/wavelength converters (REG) 53, k optical multiplexers 54-1 to 54-k each provided corresponding to each of the output ports 2-i, and k optical amplifiers 55-1 to 55-k each provided corresponding to each of the output ports 2-i.

In this case, each of the 2k×k optical space switch circuits (each of which will hereinafter be referred to simply as a "2k×k switch" or an "optical switch") 51-j is for accommodating the WDM signals from the 1:n optical couplers 43 of the optical multiplexing/distributing section 4 according to the identification of output wavelengths to the output ports 2-i to rout them to any one of k-system outputs. That is, one 2k×k switch 51-j corresponds to one wavelength (output wavelength) $\lambda j$ to be converted. For example, each of the outputs of the uppermost 2k×k switch 51-1 is connected to the wavelength $\lambda 1$ line of each of the output ports 2-i, while each of the outputs of the lowermost 2k×k switch 51-n is connected to the wavelength λn line of each of the output ports 2-i.

As FIG. 1 shows, each of the aforesaid optical switches 33-j and 51-j is made up of two k×k optical space switch circuits 11 and k 1×2 optical space switch circuits 12. That is, the basic size of the optical switches (basic switch size) used in the configuration shown in FIG. 1 is k×k.

Moreover, each of the tunable wavelength selectors (wavelength selectors) 52 is for selecting, of the WDM signals after the routing by each of the 2k×k switches 51-j, optical signals of input wavelengths λx (where x=1 to n) to be converted into desired output wavelengths, while each of REGs 53 is for converting the wavelength λx of the optical signal selected in the corresponding tunable wavelength selector 52 into the aforesaid output wavelength λj through the use of a dedicated fixed wavelength light source (not shown). Incidentally, as will be described later, when the input ports 1-i accommodate optical signals of different signaling rates (bit rates), these REGs 53 are required to have a function independent of that bit rate.

That is, the tunable wavelength selectors 52 function as an optical wavelength selecting section 6 for conducting wavelength selection processing whereby, of the wavelength re-multiplexed WDM signals, an optical signal with a desired input wavelength λj is outputted to a desired output port 2-i (through which it is to be outputted).

Furthermore, the REGs 53 function as a first wavelength converting section 7 for converting an optical signal of an arbitrary input wavelength λj after the routing by each of the 2k×k switches 51-j into an optical signal of a desired output wavelength λj so that an optical signal with an arbitrary input wavelength λj coming in an arbitrary input port 1-i is outputted from the output port 2-i as an optical signal of a desired output wavelength λj. In this arrangement, this first wavelength converting section 7 is provided in the optical output switch section 5.

Each of the optical multiplexers 54-i is for multiplexing, in terms of n wavelengths, the optical signals wavelength-converted in the REGs 53, while each of the optical amplifiers 55-i is provided properly in order to amplifying the WDM signal from the corresponding optical multiplexer 54-i to a desired optical power.

A description will be given hereinbelow of an operation of the OCCS 1 (optical routing section 2) according to this embodiment thus constructed.

First, a WDM signal to each of the input ports 1-i is amplified up to a desired optical power in the corresponding optical amplifier 31-i, and then branched through the optical demultiplexer 32-i into optical signals of wavelengths λ1 to λn, with the optical signals from the optical demultiplexer 32-i being inputted to the first-stage n k×2k switches 33-j according to the identification of wavelengths.

Following this, each of the k×2k switches 33-j routes the input optical signal λj to an arbitrary optical multiplexer 41 in the second-stage (optical multiplexing/distributing section 4) in accordance with a routing manner set in advance from the external. The optical multiplexer 41 again wavelength-multiplexes the optical signals from the k×2k switches 33-j in terms of different wavelengths. The resultant WDM signals (2k systems) are amplified in the corresponding optical amplifiers 42 to a desired power and are distributed evenly through the 1:n optical couplers 43 to the 2k×k switches 51-j in the third-stage (optical output switch section 5).

This means that the optical signals (WDM signals) with the same condition are inputted to the 2k×k switches 51-j in the third-stage. The 2k×k switches 51-j route the inputted WDM signals in the condition of the WDM signals according to the routing manner set in advance to output them to arbitrary tunable wavelength selectors (each of which will hereinafter be referred to simply as a "wavelength selector") 52.

Each of the wavelength selectors 52 selects, from the inputted WDM signals, only an optical signal of a wavelength (wavelength to be converted and set in advance from the external) λx to be converted into a wavelength λj. The optical signal with the wavelength λx selected is converted into the optical signal with the wavelength λj in the corresponding REG 53 and then outputted to the optical multiplexer 54-i, where it is multiplexed together with optical signals of different wavelengths in the optical multiplexer 54-i (n-wavelength multiplexing). Thereafter, the multiplexed optical signals are amplified together in the optical amplifier 55-i (for compensating for loss) and then outputted to the output port 2-i.

Figure 9:
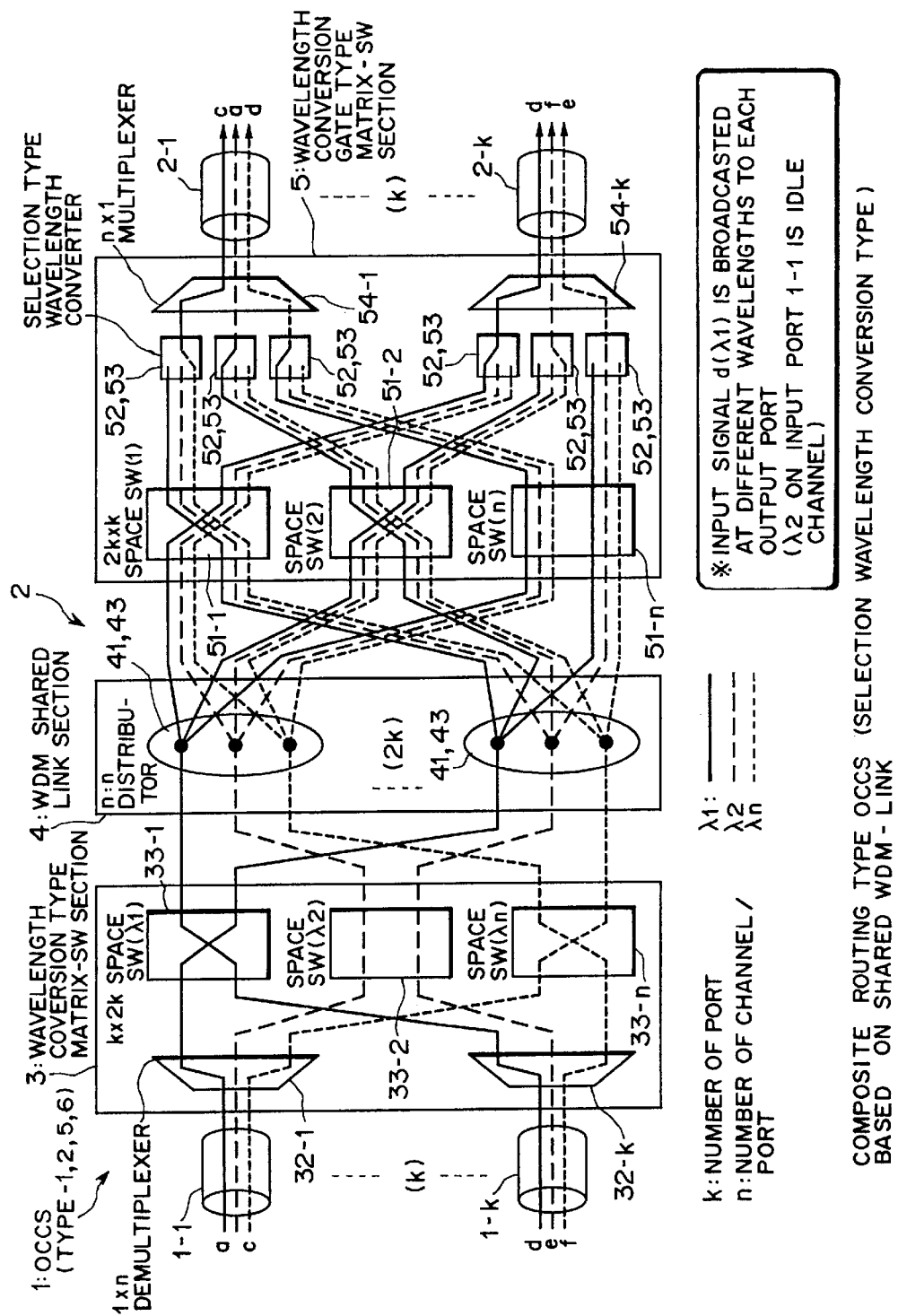
FIG. 9 is an illustration useful for describing a basic operation of the OCCS according to this embodiment.

Referring to FIG. 9, a more detailed description will be given hereinbelow of the above-described operation. In FIG. 9, reference letters a and c to f denote individual optical signals, while paths indicated by solid lines signify paths of an optical signal of a wavelength λ1, paths indicated by thick dotted lines signify paths of an optical signal of a wavelength λ2, and paths indicated by thin dotted lines signifies an optical signal of a wavelength λn. Additionally, the optical amplifiers 31-i, 42 and 55-i are omitted from the illustration.

First, in FIG. 9, taking an optical signal d (wavelength λ1:solid line) to the input port 1-k for instance, this optical signal d is branched in the optical demultiplexer 32-k and then routed to the second-stage optical multiplexing/distributing section 4 through the k×2k switch 33-1 for the wavelength λ1.

Subsequently, this optical multiplexing/distributing section, through the use of the n:n optical multiplexing/distributing unit 40 (the optical multiplexer 41, the 1:n optical coupler 43), evenly distributes, to all the 2k×k switches 51-j of the third-stage output optical switch section 5, the WDM signal produced by the remultiplexing with the optical signals of the other wavelengths λj. At this time, let it be assumed that the aforesaid optical signal d is converted into a wavelength λn (dotted line) and sent to the output port 2-1.

In this case, the k×2k switch 51-n corresponding to the wavelength λn to be converted is switched to the output port 2-1 side. Additionally, if the selected wavelength λx in the wavelength selector 52 corresponding to the designated wavelength)n to the output port 2-1 is set at the original wavelength λ1 of the signal d, the optical signal of that wavelength λ1 is converted into an optical signal of the wavelength λn in the REG 53 and outputted to the output port 2-1.

That is, the flow of the optical signal processing in this embodiment is demultiplexing→space switching (single light)→re-multiplexing/distribution→space switching (WDM signal)→wavelength (channel) selection/wavelength conversion→wavelength multiplexing, and the output port selection operation is realized with the first-stage and third-stage switches 33-j and 51-j while the conversion operation into desired wavelengths is realized with the third-stage wavelength selectors 52 and REGs 53 (namely, the optical output switch section 5 performs both the port selection function and the routing function for desired wavelength λj).

In FIG. 9, as described above, the branching (wavelength division) is conducted in the optical input switch section 3 and the re-multiplexing (re-editing) of optical signals of wavelengths λj is performed in the optical multiplexing/distributing section 4 and distributed in common to the optical output switch section 5 to establish an optical link with the optical output switch section 5 and even the wavelength selection/conversion is done in the optical output switch section 5. Accordingly, these sections 3 to 5 are expressed as "wavelength division type Matrix-SW section 3", "WDM shared link section 4" and "wavelength conversion Gate type Matrix-SW section 5", respectively. In the following description, the OCCS 1 of a type performing the wavelength conversion processing in the optical output switch section 5 will sometimes be referred to hereinafter as a "composite routing (selection type wavelength conversion) type".

Furthermore, in FIG. 9, the signal d is also transmitted to the output port 2-k at the wavelength λ1. That is, the signal d is broadcasted to the respective output ports 2-i at different wavelengths. In other words, the OCCS 1 shown in FIG. 1 additionally has a broadcast function. However, it is not complete, the broadcasting cannot be accomplished at the same wavelength λj and in the case of no existence of a idle channel (non-used wavelength) (in FIG. 9, the channel corresponding to the optical signal b in the input port 1-1 is a idle channel.).

As described above, in the foregoing OCCS 1 (Type-1), since each of the switches 33-j and 51-j of the first stage (optical input switch section 3) and the third stage (optical output switch section 5) corresponds to one wavelength λj, even for an increase in the number n of accommodation wavelengths (the number of wavelengths to be multiplexed), switches identical to the optical switches 33-j and 51-j can be additionally used in proportion to that increase.

That is, in this OCCS 1 (Type-1), the sizes of all the optical switches 33-j and 51-j are determined by only the number k of ports, and the number of optical switches 33-j and 51-j is proportional to the number n of accommodation wavelengths per port. Accordingly, for the first stage of the optical routing section 2 and the third stage of the optical output switch section 5, there is no need to change the basic switch size of the optical switches 33-j and 51-j in connection with the enlargement of the communication information capacity, but optical switches having the same size can merely be used additionally in accordance with the number of added wavelengths.

On the other hand, since the second stage (optical multiplexing/distributing section 4) uses the n:n optical multiplexing/distributing units 40 comprising the n multiplexers 41 and 1:n optical couplers 43, even if the number n of wavelengths to be multiplexed increases as mentioned above, there is no need to use additional n:n optical multiplexing/distributing units 40 (n optical multiplexers 41 and 1:n optical couplers 43) (no need exists to change the basic configuration). Additionally, since the optical multiplexers 41 and the 1:n optical couplers 43 have been put to use in the existing WDM terminal station (transmission) system for the point-to-point transmission, it can be considered that they are the existing optical parts, and it is possible to use them in constructing the OCCS 1.

Thus, for the above-mentioned increase in the number of accommodation wavelengths, there is no need to design and develop new optical parts (particularly, optical switches) (in other words, it is possible to enlarge the system by fully using the existing technology), which provide extremely high extensibility and economical efficiency, and which enables the construction of a very-large-capacity OCCS 1 matching with the existing WDM transmission systems for an extremely short time.

That is, if some n-wavelength multiplexing technique has been established in the point-to-point WDM transmission technology, it is possible to offer an n-wavelength accommodation OCCS 1 immediately. For example, if there are a 128-wavelength multiplexing WDM terminal system, a relaying amplifying technique therefor and an 8×8-size optical switch, it is possible to offer 1024×1024-size OCCS 1 immediately. In consequence, this contributes greatly to that a large-capacity OCCS 1 is put on the market at an early stage and that a large-capacity optical network is constructed for a short time, resulting in improvement of optical communication service.

Moreover, in the foregoing OCCS 1 (Type-1), since the REGs 53 (first wavelength converting section 7) corresponding to the number N (=n×k) of input/output channels are provided in the optical output switch section 5, the mutual interference between the optical signals of the respective channels resulting from the optical signals with the same wavelength λj being simultaneously outputted to the same output port 2-i is avoidable, which contributes greatly to the improvement of reliability of this OCCS 1.

(A. 2) Description of Basic Configuration (Type-2) of OCCS

Figure 2:
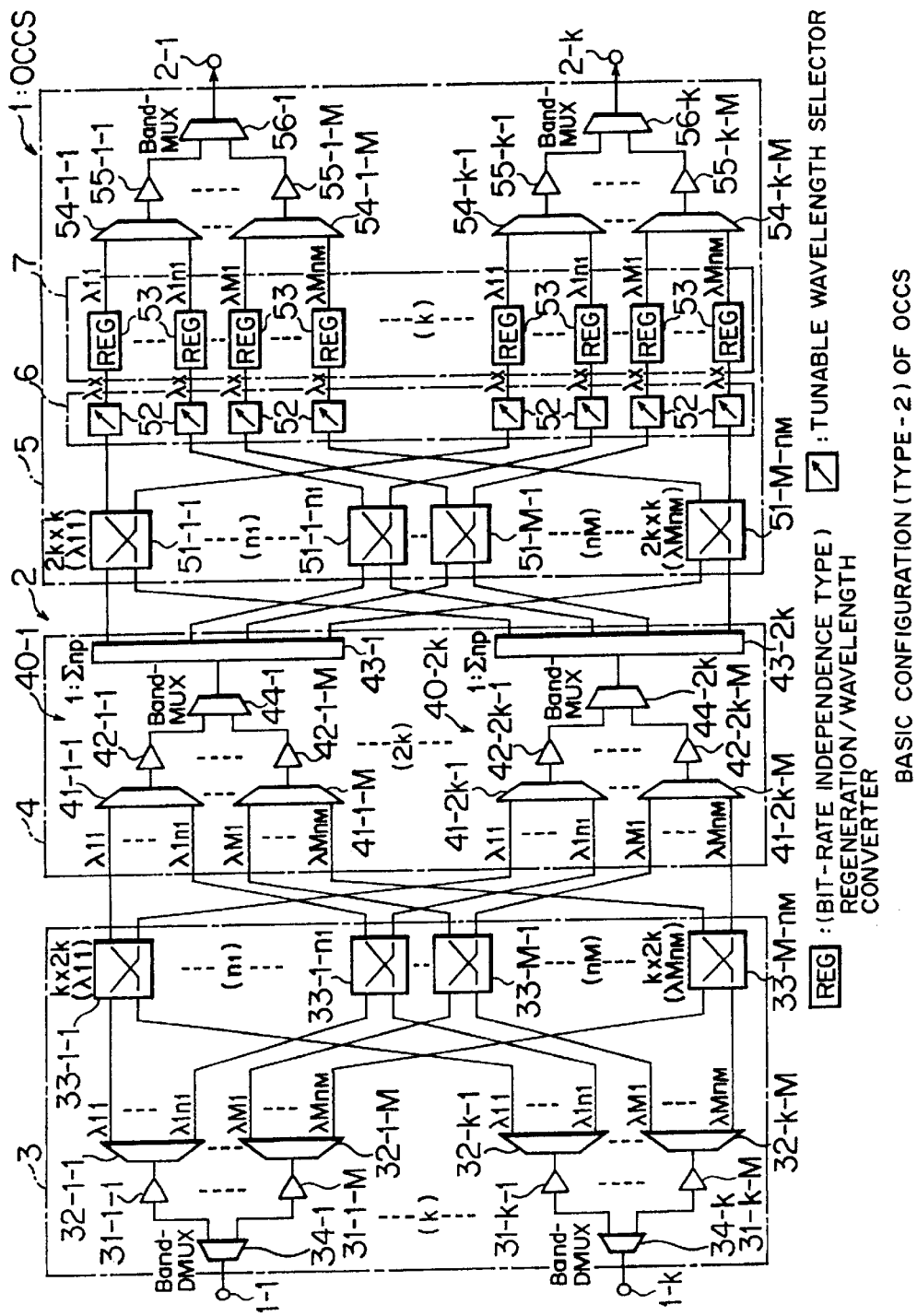
FIG. 2 is a block diagram showing a second type (Type-2) of the basic configurations of the OCCS, which constitutes an embodiment of this invention.

FIG. 2 is a block diagram showing a second type (Type-2) of the basic configuration of the OCCS according to the embodiment of this invention. The OCCS 1 (Type-2) shown in FIG. 2 is based on the OCCS 1 (Type-1: "composite routing (selection type wavelength conversion) type") shown in FIG. 1, but is constructed to accommodate more wavelengths.

As well known, among commercial wavelength bands, there are 1.55 ($\mu$m) band, 1.3 ($\mu$m) band and new 1.6 ($\mu$m) band. Commonly, optical amplifiers are employed for compensating for the transmission loss. However, severe difficulty is experienced in covering all the bands through the use of one optical amplifier, and optical amplifiers dedicated to each of wavelength bands are on the development.

For this reason, in the case in which the OCCS 1 routes optical signals spreading over all these wavelength bands, that is, when the ports 1-i and 2-i accommodate optical signals of M (M is an integer equal to or more than 2) kinds of wavelength bands (Band-1 to Band-M) and each of the wavelength bands comprises a plurality of kinds [for example, Band-p (p=1 to M)=$n_p$ kinds consisting of λp1 to λp$n_p$, where $n_p$ is an integer equal to or more than 2] of optical signals (the number N of input/output channels= $\Sigma n_p \times k$, where $\Sigma n_p$ is the sum total of $n_1$ to $n_M$), the same routing as that in the OCCS 1 shown in FIG. 1 can be conducted on the condition that an optical amplifier dedicated to each of the wavelength bands Band-p is used for compensating for the loss.

Accordingly, in this OCCS 1 (Type-2) shown in FIG. 2, an optical input switch section 3 is composed of k wavelength band demutiplexers 34-1 to 34-k each provided in connection with each of the input ports 1-i, optical amplifiers 31-1-p to 31-k-p (amounting to M×k) for the wavelength bands Band-p provided according to the input port 1-i, 1:$n_p$ optical demultiplexers 32-1-p to 32-k-p (M×k in total) for the wavelength bands Band-p provided according to the input port 1-i, and k×2k switches 33-p-1 to 33-p-$n_p$ (Σnp in total) provided according to the number $n_p$ of kinds of accommodation wavelengths in each of wavelength bands Band-p.

Furthermore, an optical multiplexing/distributing section 4 is composed of 2k $n_p$:1 optical multiplexers 41-1-p to 41-2k-p (M×2k in total) provided for each of the wavelength bands Band-p, optical amplifiers 42-1-p to 42-2k-p (M×2k in total) for wavelength bands Band-p provided for the wavelength bands Band-p (2k for each of the wavelength bands), 2k wavelength band multiplexers 44-1 to 44-2k, and 2k (1:$\Sigma n_p$) optical couplers 43-1 to 43-2k.

Still furthermore, an optical output switch section 5 is made up of 2k×k switches 51-p-1 to 51-p-$n_p$ ($\Sigma n_p$ in total) provided according to the number np of kinds of accommodation wavelengths according to the wavelength bands Band-p, tunable wavelength selectors 52 and REGs 53 provided according to accommodation wavelength (=the number of input/output channels: $\Sigma n_p \times k$), optical muptiplexers 54-1-p to 54-k-p (M×k in total) for the wavelength bands Band-p provided according to output port 2-i, optical amplifiers 55-1-p to 54-k-p (M×k in total) for the wavelength bands Band-p provided according to wavelength band Band-p, and k wavelength band multiplexers 56-1 to 56-k provided in connection with output ports 2-i, respectively.

In this configuration, in the optical input switch section 3, each of the wavelength band demultiplexers 34-i is for demultiplexing an input WDM signal from the input port 1-i into optical signals according to wavelength band Band-p, while each of the optical amplifiers 31-i-p is for amplifying (loss-compensating) an input optical signal to a desired power in order to compensate for the losses of the optical signals in the wavelength band Band-p after the demultiplexing by the wavelength band demultiplexers 34-i.

Each of the optical demultiplexers 32-i-p is for branching an optical signal in the wavelength band Band-p into optical signals of wavelengths λp1 to λ$pn_p$, while the k×2k switches 33-p-q (q=1 to $n_p$) are for accommodating (accommodating) the outputs of these optical demultiplexers 32-i-p according to wavelength band Band-p identification and wavelength λpq identification to route them to any one of 2k systems. That is, one k×2k switch 33-p-q corresponds to one wavelength λpq of one of wavelength band Band-p.

Furthermore, in the optical multiplexing/distributing section 4, each of the optical multiplexers 41-r-p (where r=1 to 2k) is for re-multiplexing the different wavelengths λp1 to $\mu n_p$ constituting the same wavelength band Band-p of the outputs of the k×2k switches 33-p-q, while each of the optical amplifiers 42-r-p is for amplifying the output of the corresponding optical multiplexer 41-r-p to a desired power (loss compensation).

Still furthermore, each of the wavelength band multiplexers 44-r is for band-multiplexing the outputs of the optical amplifiers 42-r-p in terms of optical signals of different wavelength bands Band-p, while each of the (1:$\Sigma n_p$) optical couplers 43-r is for distributively outputting the output (WDM signal) of the corresponding wavelength band multiplexer according to $\Sigma n_p$.

That is, the optical multiplexers 41-r-p, sets of the wavelength band multiplexers 44-r and the (1:$\Sigma n_p$) optical couplers 43-r function as 2k ($\Sigma n_p$:$\Sigma n_p$) multiplexing/distributing units (second multiplexing/distributing units) 40-r for multiplexing the outputs of the k×2k switches 33-p-q in terms of different input wavelengths $\mu$pq of the same input wavelength band Band-p to band-multiplex the resultant multiplexed optical signals of the wavelength bands Band-p and then distributively output them according to the number $\Sigma n_p$ of kinds of accommodation wavelength bands.

Moreover, in the optical output switch section 5, the 2k×k switches 51-p-q are for accommodating the outputs of the (1:$\Sigma n_p$) optical couplers 43-r according to output wavelength band Band-p identification and output wavelength λpq identification to the output ports 2-i to route them to any one of the k-system outputs. That is, the 2k×k switches 51-p-q are provided according to output wavelength band Band-p identification and output wavelength λpq identification, with one 2k×k switch 51-p-q corresponding to one output wavelength λpq of one output wavelength band Band-p.

Each of the tunable wavelength selectors 52 is similar to that shown in FIG. 1, and is for selecting an optical signal of an input wavelength λpq to be converted into a desired output wavelength λpq from the WDM signals after the routing by the 2k×k switches 51-p-q, while each of the REGs 53 is for converting the wavelength λpq of the optical signal selected in the corresponding tunable wavelength selector 52 into the desired output wavelength λpq.

Thus, also in this configuration, the aforesaid tunable wavelength selectors 53 function as an optical wavelength selecting section 6 as in the case described above with reference to FIG. 1, and the REGs 53 function as a first wavelength converting section 7 as in the case described above with reference to FIG. 1. Also in this configuration, this first wavelength converting section 7 is placed in the optical output switch section 5 [that is, this OCCS 1 is also constructed as the "composite routing (selection type wavelength conversion) type" described above with reference to FIG. 9].

In addition, each of the optical muliplexers 54-i-p is for multiplexing the wavelengths λp1 to λ$pn_p$ pertaining to the same output wavelength band Band-p, while each of the optical amplifiers 55-i-p is for amplifying (compensating for loss) the output (WDM signal on the wavelength band Band-p) of the corresponding optical multiplexer 54-i-p to a desired power, and even each of the wavelength band multiplexers 56-i is for multiplexing the outputs of the optical amplifiers 55-i-p for different wavelength bands Band-p.

With the above-described configuration, in this OCCS 1 (Type-2), after the WDM signals coming in the input ports 1-i are demultiplexed in the wavelength band demultiplexers 34-i according to the wavelength band Band-p, the routing similar to that of the OCCS 1 shown in FIG. 1 can be made according to the wavelength band Band-p while the loss compensation is accomplished through the use of the dedicated optical amplifiers 31-i-p and 42-r-p according to the wavelength band Band-p.

Accordingly, in addition to fulfilling the effects similar to those of the above-described OCCS 1 (Type-1), this can realize a large-capacity OCCS 1.

Incidentally, in the configuration shown in FIG. 2, it is also possible to omit the optical amplifiers 31-i-p and 42-r-p if the transmission losses of the WDM signals are ignorable.

(A. 3) Description of Basic Configuration (Type-3) of OCCS

Figure 3:
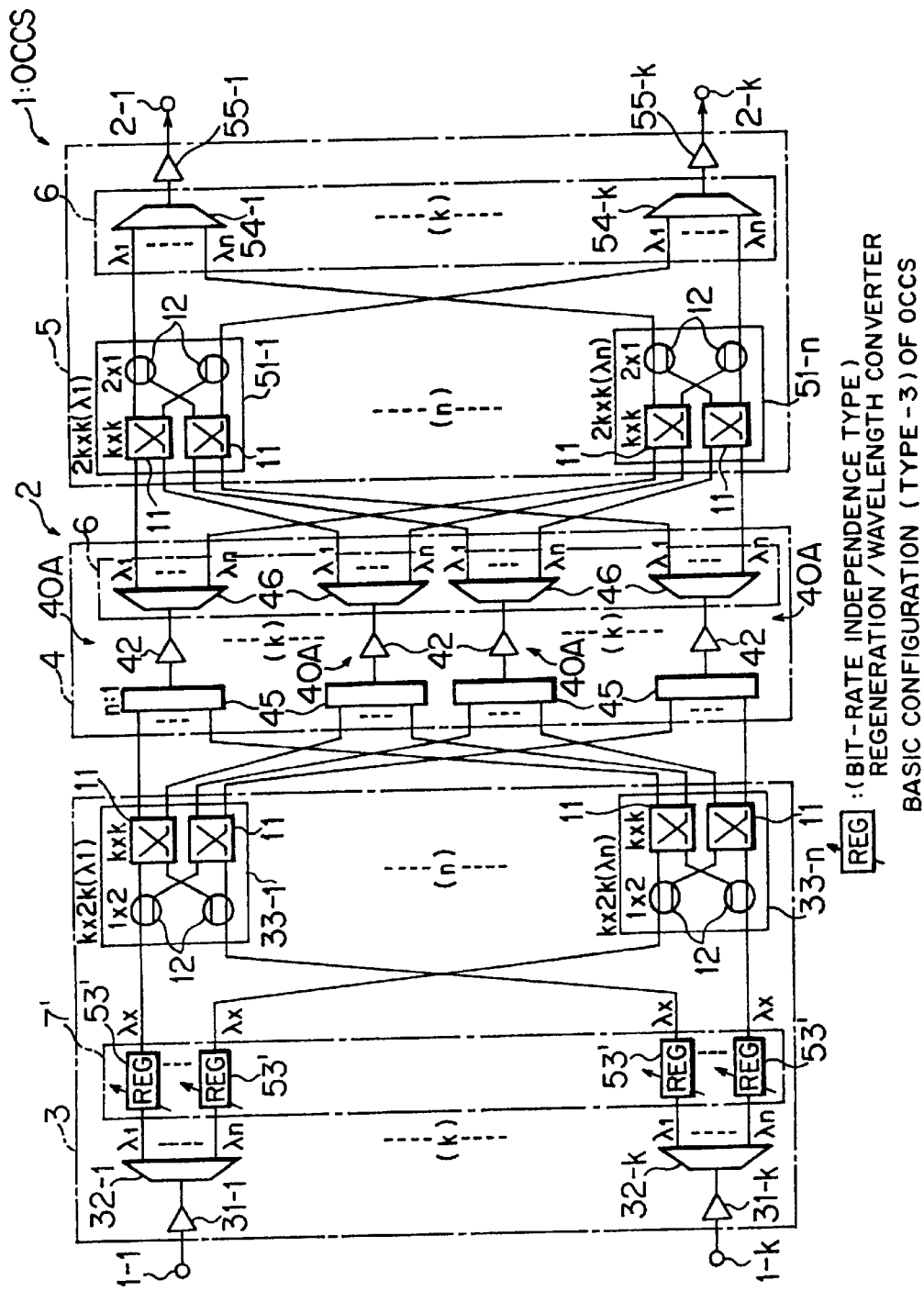
FIG. 3 is a block diagram showing a third type (Type-3) of the basic configurations of the OCCS, which constitutes an embodiment of this invention.

FIG. 3 is a block diagram showing a third type (Type-3) of the basic configuration of the OCCS according to the embodiment of this invention. With respect to the OCCS 1 (Type-1) shown in FIG. 1, the OCCS 1 (Type-3) shown in FIG. 3 differs principally in that, in an optical input switch section 3, REGs 53' are provided at the rear stages of optical demultiplexer 32-i in place of the REGs 53 of the optical output switch section 5 and, in an optical multiplexing/distributing section 4, 2k n×n coupling/demultiplexing units 40A (each comprising an n:1 optical couplers 45 and an optical demultiplexer 46 are used instead of the 2k n:n optical multiplexing/distributing units 40 (each comprising the optical multiplexer 41 and a 1:n optical coupler 42).

In this configuration, each of the REGs 53' is for converting an optical signal of a wavelength λj from the input port 1-i, produced by branching in the demultiplexer 32-i in units of wavelengths λj, into a desired output wavelength λx (=λj) through the use of a variable wavelength light source (not shown). That is, these REGs 53' function as a second wavelength converting section 7' to convert optical signals of arbitrary wavelengths λj into optical signals of desired output wavelengths λj before the routing by optical switches 33-j in the optical input switch section 3 so that the optical signals of the arbitrary input wavelengths λj coming in the arbitrary input ports 1-i are outputted as optical signals of the desired output wavelengths λj from the output ports 2-i.

Accordingly, each of the k×2k switches 33-j accommodates the outputs of the REGs 53' according to the identification of k-system input wavelengths λj coming in the input ports 1-i to route them to any one of the outputs (n×n coupling/demultiplexing units 40A) of the k systems. That is, also in this configuration (Type-3), one k×2k switch 33-j corresponds to one input wavelength λj.

Furthermore, in the optical multiplexing/distributing section 4, each of the n×n coupling/demultiplexing units (first coupling/demultiplexing units) 40A is for coupling the outputs of the k×2k switches 33-j in terms of different input wavelengths λj before the wavelength conversion and then for demltiplexing them according to the wavelength λj. Thus, the n×n coupling/demultiplexing units 40A include 2k n:1 optical couplers (combiners) 45 and 2k optical branching units 46.

Still furthermore, in the optical output switch section 5, each of 2k×k switches 51-j is similar to that shown in FIG. 1, but in this configuration, it accommodates the outputs of the n×n coupling/demultiplexing units 40A according to the identification of output wavelengths λj to the output ports 2-i to route them to any one of the outputs of the k systems. That is, one 2k×k switches 51-j corresponds to one of the converted wavelengths (output wavelengths) λj. For example, in FIG. 3, the uppermost 2k×k switches 51-1 is connected to the wavelength λ1 lines of the output ports 2-i.

In the OCCS 1 (Type-3) thus constructed, each of the WDM signals (n-wavelength multiplexed optical signals) coming in the input ports 1-i is demultiplexed into optical signals of wavelengths λ1 to λn by means of the optical demultiplexer 32-i. Additionally, the optical signals after the demultiplexing are converted through the REGs 53' into optical signals of desired output wavelengths λj and then inputted to the k×2k switches 33-j according to the input wavelength λj identification.

The k×2k switches 33-j route the optical signals with the same input wavelength λj to the arbitrary n×n coupling/demultiplexing units 40A in the second stage (optical multiplexing/distributing section 4). The n×n coupling/demultiplexing units 40A concentrate the outputs of the k×2k switches 33-j in terms of the different input wavelengths λ1 to λn before the wavelength conversion and then couple (re-multiplexing) them in the n:1 optical couplers 45 and subsequently re-branches them in the optical demultiplexers 46, thereafter routing to 2k×k switches 51-j in the third stage (optical output switch section 5) according to output wavelength λj.

That is, in this case, the optical demultiplexers 46 are made to select, of the WDM signals re-multiplexed in the n:1 optical couplers 45, optical signals of desired output wavelengths λj to the 2k×k switches 51-j.

The 2k×k switches 51-j concentrate the optical signals from the n×n coupling/demultiplexing units 40A in units of output wavelength λj identification and route these optical signals to the arbitrary output ports 2-i (optical multiplexers 54-i). The optical signals routed is multiplexed together with optical signals of other output wavelengths λj in the optical multiplexers 54-i and outputted from the output ports 2-i.

At this time, since the outputs of the 2k×k switches 51-j are connected to the input terminals set at every output wavelength λj in the optical multiplexers 54-i, unnecessary optical signals of other wavelengths λj are naturally eliminated so that selection of only the desired output wavelengths λj becomes possible.

That is, in this configuration (Type-3), in the optical input switch section 3, optical signals of input wavelengths λj are converted into optical signals of desired output wavelengths λj in advance and then routed, and through the use of the optical demultiplexers 46 and the optical multiplexers 54-i, the unnecessary wavelengths λj to the output ports 2-i are moved from the WDM signals after the coupling by the optical couplers 45 thereby selecting the desired output wavelengths λj.

This means that, in this configuration (Type-3), the optical demultiplexers 46 and the optical multiplexers 54-i function the aforesaid optical wavelength selecting section 6. Accordingly, this configuration does not require the tunable wavelength selectors 52 shown in FIG. 1. Incidentally, also in this configuration (Type-3), the optical amplifiers 31-i, 42 and 55-i are omissible if the WDM signal transmission losses are ignorable.

As described above, also in this OCCS 1 (Type-3), as in the case of the OCCS 1 (Type-1) shown in FIG. 1, the numbers of the optical switches 33-j and 51-j are proportional to the number n of accommodation wavelengths per port, and, for the first stage (the optical routing section 2) and the third stage (the optical output switch section 5), there is no need to change the basic switch size of the optical switches 33-j and 51-j in connection with the enlargement of the communication information capacity, but optical switches having the same size can merely be used additionally in accordance with the number of added wavelengths.

On the other hand, since the second stage (optical multiplexing/distributing section 4) uses the n×n optical coupling/demultiplexing units 40A each comprising the n:1 optical couplers 45 and the optical demultiplexer 46, even if the number n of wavelengths to be multiplexed increases as mentioned above, there is no need to use additional n×n optical coupling/demultiplexing units 40A (n:1 optical couplers 45 and the optical demultiplexers 46) (no need exists to change the basic configuration). Additionally, since the n:1 optical couplers 45 and the optical demultiplexers 46 have been put to use in the existing WDM terminal station (transmission) system for the point-to-point transmission, that is, since they are the existing optical parts, it is possible to use them in constructing the OCCS 1.

Thus, also in this case, for the above-mentioned increase in the number of accommodation wavelengths, there is no need to design and develop new optical parts (particularly, optical switches), which provide extremely high extensibility and economical efficiency, and which enables the construction of a large-capacity OCCS 1 matching with the existing WDM transmission systems for an extremely short time.

In addition, also in the above-described configuration (Type-3), since the REGs 53' (second wavelength converting section 7') is provided in the optical input switch section 3, the mutual interference between the optical signals of the respective channels resulting from the optical signals with the same wavelength λj being simultaneously outputted to the same output port 2-i is avoidable, which contributes greatly to the improvement of reliability of this OCCS 1.

Still additionally, in the above-described configuration (Type-3), since, through the use of the optical demultiplexers 46 and the optical multiplexers 54-i, the wavelength selection is made in both the optical multiplexing/distributing section 4 and the optical output switch section 5 (namely, the wavelength selection processing is made in two stages), the interference (crosstalk) with other unnecessary wavelengths λj (other channels) is suppressible to a minimum (namely, the wavelength demultiplexing characteristic is improvable), so its performance is considerably improvable.

Incidentally, if the optical multiplexers 54-i or the optical demultiplexers 46 have a sufficient wavelength demultiplexing characteristic, the wavelength selection processing is achievable with one stage of the optical multiplexing/distributing section 4 and the optical output switch section 5. That is, for example, if the optical multiplexers 54-i have a sufficient wavelength demultiplexing characteristic, the optical demultiplexers 46 are replaceable with the 1:n optical couplers (distributors) 43 shown in FIG. 1, respectively. On the other hand, if the optical demultiplexers 46 have a sufficient wavelength demultiplexing characteristic, the optical multiplexers 54-i are replaceable with the optical couplers 45, respectively.

Figure 10:
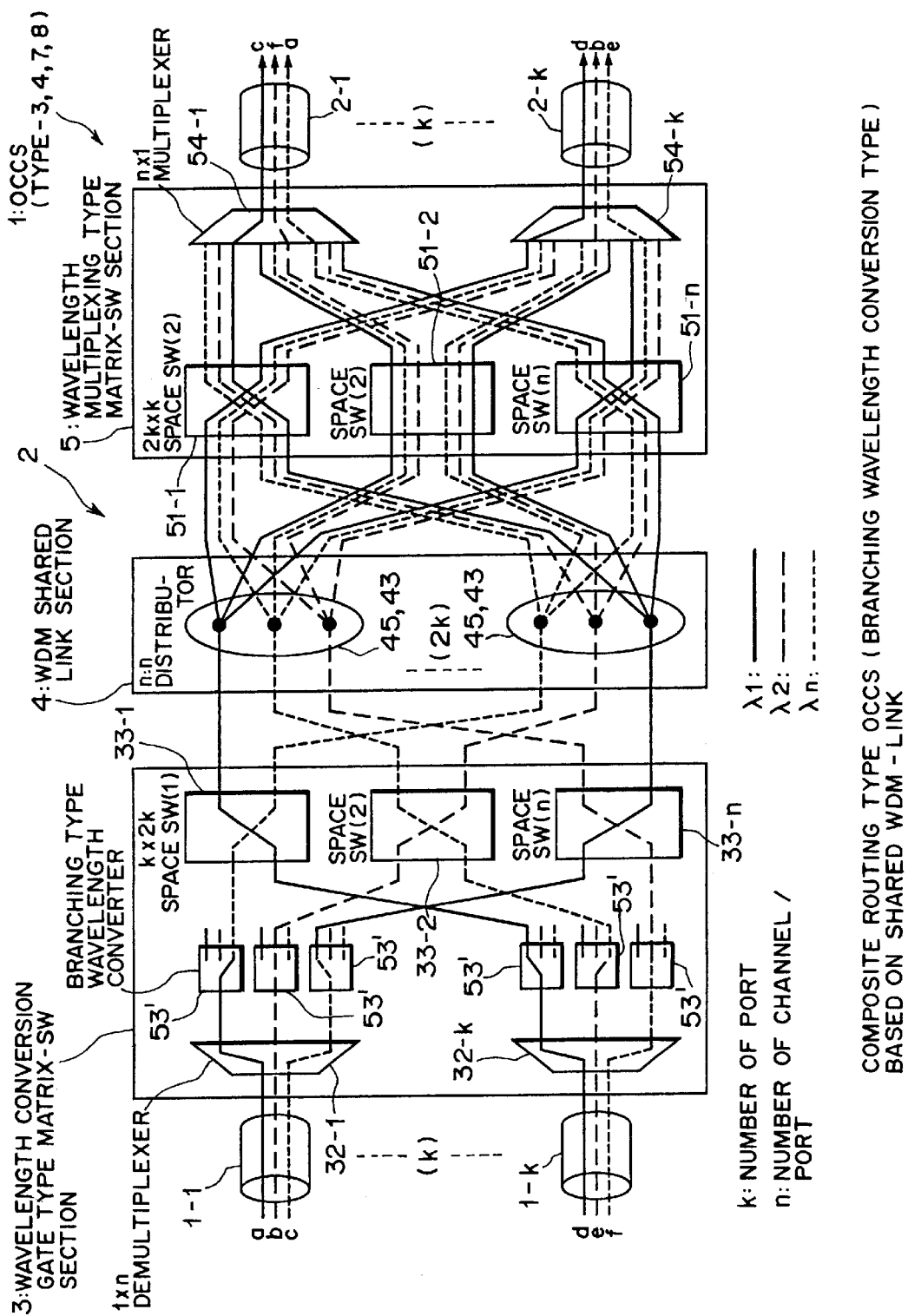
FIG. 10 is an illustration useful for describing a basic operation of the OCCS according to this embodiment.

For example, in the former case, that is, in the case in which the optical demultiplexers 46 are replaced with the 1:n optical couplers 43, respectively, the operation is as shown in FIG. 10. Also in FIG. 10, reference letters a to f denote individual optical signals, while paths indicated by solid lines signify paths of an optical signal of a wavelength λ1, paths indicated by thick dotted lines signify paths of an optical signal of a wavelength λ2, and paths indicated by thin dotted lines signifies an optical signal of a wavelength λn. Additionally, the optical amplifiers 31-i, 42 and 55-i are omitted from the illustration.

In FIG. 10, first, taking the optical signal f (wavelength λn: thin dotted line) to the input port 1-k for instance, this optical signal f is branched in the optical demultiplexer 32-k of the optical input switch section 3 and then is inputted to the REG 53' corresponding to the wavelength λn, where, assuming that the wavelength λn is made to be converted into the wavelength λ2, the optical signal of the wavelength)n is converted into an optical signal of the wavelength λ2 and then is branched and outputted to the output terminal for the wavelength λ2.

Subsequently, the optical signal after the wavelength conversion is routed to the second-stage optical multiplexing/distributing section 4 through the k×2k switch 33-2 corresponding to the input wavelength λ2 before the wavelength conversion to be coupled with optical signals of other wavelengths λj in the n:1 optical couplers 45, and then distributed in the form of n optical signals in the 1:n optical coupler 43 to be evenly given distributively to all the 2k×k switches 51-j in the output optical switch section 5. Now, let it be assumed that the aforesaid optical signal f is transmitted to the output port 2-1.

In this case, the k×2k switch 51-2 corresponding to the wavelength λ2 after the conversion is switched to the output port 2-1 (optical multiplexer 54-2) side; whereupon, the aforesaid optical signal f is automatically inputted to the wavelength λ2 input terminal of the optical multiplexer 54-2, so the optical signals of the unnecessary wavelengths λj (channels) other than the wavelength λ2 are naturally removed, thereby selecting only the optical signal of the wavelength λ2.

In this way, the wavelength conversion of the signal f at the input port 1-k to the wavelength λ2 and the routing thereof to the output port 1-1 come to an end.

That is, the flow of the optical signal processing in this configuration is branching→wavelength conversion/branching→space switching (single light)→coupling (re-multiplexing)/distribution→space switching (WDM signal)→wavelength (channel) selection/multiplexing, and the output port selection operation is realized with the first-stage and third-stage switches 33-j and 51-j while the conversion operation into desired wavelengths λj is realized with the REGs 53' in the first stage and the optical multiplexers 54-i in the third stage (namely, the optical output switch section 5 performs both the port selection function and the routing function for designated wavelength λj).

In FIG. 10, as described above, the wavelength conversion/branching are conducted in the optical input switch section 3 and the coupling (re-editing) of optical signals of wavelengths λj is performed in the optical multiplexing/distributing section 4 and distributed in common to the optical output switch section 5 to establish an optical link with the optical output switch section 5 and even the multiplexing (wavelength multiplexing) is done in the optical output switch section 5. Accordingly, these sections 3 to 5 are expressed as "wavelength conversion gate type Matrix-SW section 3", "WDM shared link section 4" and "wavelength multiplexing type Matrix-SW section 5", respectively. In the following description, the OCCS 1 of a type performing the wavelength conversion processing in the optical input switch section 3 will sometimes be referred to hereinafter as a "composite routing (branching type wavelength conversion) type".

(A. 4) Description of Basic Configuration (Type-4) of OCCS

Figure 4:
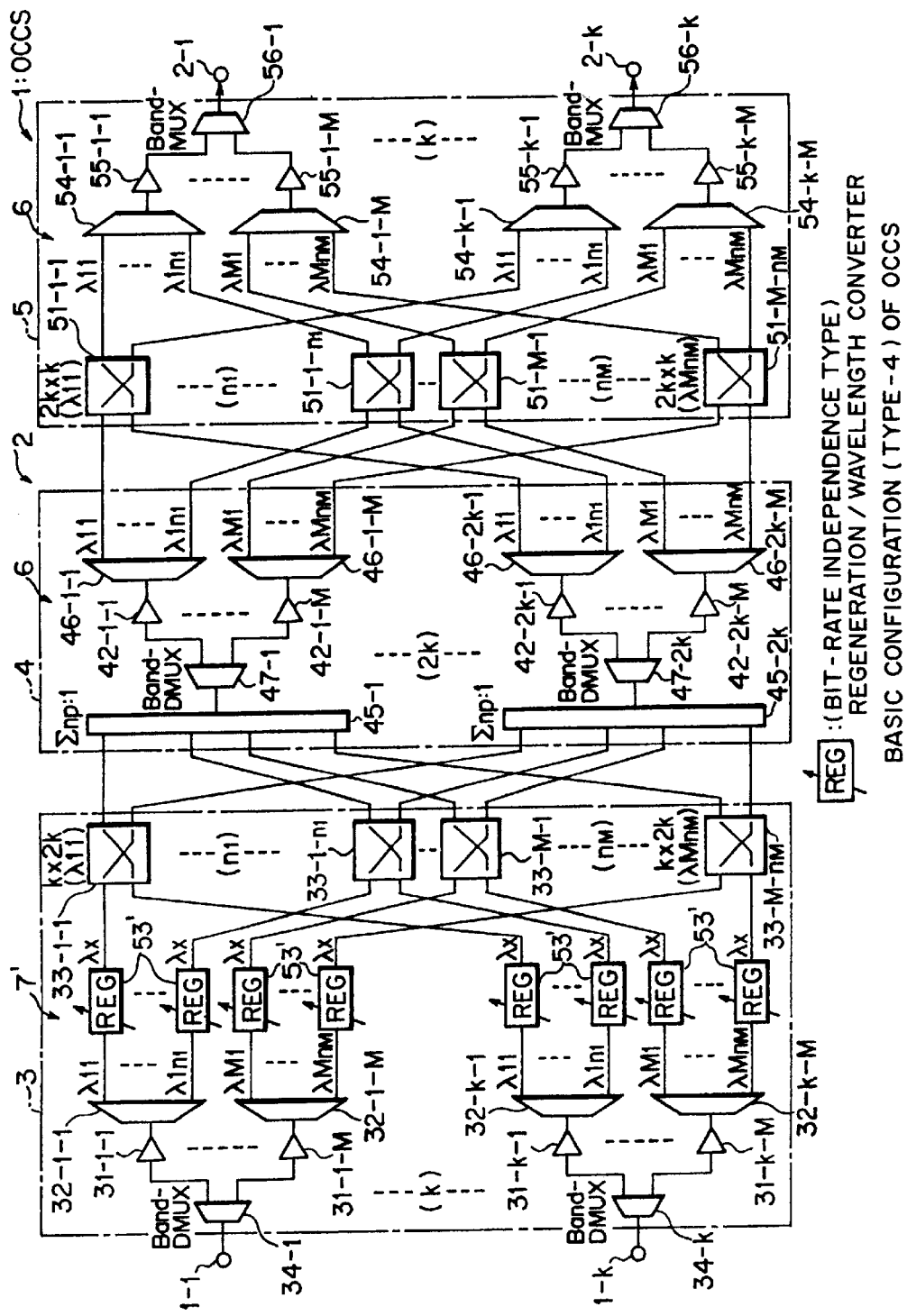
FIG. 4 is a block diagram showing a fourth type (Type-4) of the basic configurations of the OCCS, which constitutes an embodiment of this invention.

FIG. 4 is a block diagram showing a fourth type (Type-4) of the basic configuration of the OCCS according to the embodiment of this invention. The OCCS 1 (Type-4) shown in FIG. 4 involves the configuration (Type-3: "composite routing (branching type wavelength conversion" type) described above with reference to FIG. 3, and is designed to accommodate more wavelengths, as well as the configuration (Type-2) described above with reference to FIG. 2.

That is, each of the ports 1-i and 2-i accommodate optical-signals of M kinds (M is an integer equal to or more than 2) of wavelength bands (Band-1 to Band-M), and each of the wavelength bands comprises a plurality of kinds of [for example, Band-p (p=1 to M)=$n_p$ kinds:λp1 to λp$n_p$, where $n_p$ is an integer equal to or more than 2) (number N of input/output channels=$\Sigma n_p \times k$, where $\Sigma n_p$ denotes the total sum of $n_1$ to $n_M$).

Accordingly, the first stage (optical input switch section 3) includes wavelength band demultiplexers 34-i, optical amplifiers 31-i-p for wavelength bands Band-p, optical demultiplexers 32-i-p and k×2k switches 33-p-q (q=1 to $n_p$), which are similar to those shown in FIG. 2, and additionally includes REGs 53' provided at the rear stage of the optical demultiplexers 32-i-p in connection with the outputs, respectively.

Furthermore, the second stage (optical multiplexing/distributing section 4) includes 2k ($\Sigma n_p$:1) optical couplers (combiners) 45-1 to 45-2k, 2k wavelength band demultiplexers 47-1 to 47-2k, optical amplifiers 42-1-p to 42-2k-p (M×2k in total) for wavelength bands Band-p, provided 2k for the wavelength bands Band-p (2k for each of the wavelength bands), and optical demultiplexers 46-1-p to 46-2k-p (M×2k in total) provided for wavelength bands Band-p (2k for each of the wavelength bands).

Still furthermore, the third stage (optical output switch section 5) includes, as in FIG. 2, 2k×k switches 51-p-q ($\Sigma n_p$ in total), optical multiplexers 54-i-p (M×k in total) for wavelength bands Band-p, optical amplifiers (M×k in total) for the wavelength bands Band-p and k wavelength band multiplexers 56-i each provided in connection with each of the output ports 2-i.

In this configuration, in the optical input switch section 3, each of the REGs 53' is for converting an optical signal of each of the wavelengths λpq branched in the optical demultiplexer 32-i-p into a desired output wavelength λpq through the use of a non-shown variable wavelength light source also in this case. Therefore, the k×2k switches 33-p-q concentrate (accommodate) the outputs of the REGs 53' according to the input wavelength band Band-p identification and the input wavelength λpq identification before the wavelength conversion to route them to any one of the outputs (optical couplers 45-1 to 45-2k),of the 2k systems. That is, one k×2k switch 33-p-q corresponds to one wavelength λpq of one wavelength band Band-p before the wavelength conversion by the REGs 53'.

Furthermore, in the optical multiplexing/distributing section 4, each of the optical couplers 45-r (r=1 to 2k) is for accommodating the outputs of the k×2k switches 33-p-q by output to couple them, while each of the wavelength band demultiplexers 47-r is for re-demultiplexing, in terms of band, the outputs of the optical couplers 45-r into optical signals of the output wavelength bands Band-p.

Each of the optical amplifiers 42-r-p is for amplifying (loss compensation) each of the optical signals of the output wavelength bands Band-p obtained by the band-demultiplexing in the wavelength band demultiplexers 47-r, while each of the optical demutiplexers 46-r-p is for branching the optical signal of the output wavelength band Band-p from the corresponding optical amplifier 42-r-p into the optical signals of the output wavelengths λpq.

This means that the sets of the optical couplers 45-r, the wavelength band demultiplexers 47-r and the optical demultiplexers 46-r-p function as $(\Sigma n_p \times \Sigma n_p)$ coupling/demultiplexing units (second coupling/demultiplexing unit) 40A-r for wavelength-coupling the outputs of the k×2k switches 33-p-q, demultiplexing them into optical signals of the wavelength bands Band-p and branching the optical signals of the wavelength bands Band-p after the demultiplexing in units of wavelength.

Therefore, the 2k×k switches 51-p-q accommodate the outputs of the optical demultiplexers 46-r-p according to output wavelength band Band-p identification and output wavelength λpq identification to route them to any one of the outputs of the k systems. That is, also in this case, one 2k×k switch 51-p-q corresponds to one output wavelength λpq of one output wavelength band Band-p.

Also in this configuration (Type-4), as in the case of the configuration (type-3) shown in FIG. 3, the optical demultiplexers 46-r-p and the optical demultiplexers 54-i-p constitute the optical wavelength selecting section 6, while the REGs 53' organizes the second wavelength converting section 7'.

With the configuration described above, this OCCS 1 (Type-4) also can demulitiplex the WDM signals coming in the input ports 1-i in units of wavelength band Band-p in the wavelength band demultiplexers 34-i and then conduct the routing similar to that of the OCCS 1 (Type-3), shown in FIG. 3, in units of wavelength band Band-p while performing the loss compensation in units of wavelength band Band-p through the use of the dedicated optical amplifiers 31-i-p and 42-r-p.

Accordingly, the effects similar to those of the above-described OCCS 1 (Type-3) are obtainable, and a large-capacity OCCS 1 is realizable. Incidentally, also in this configuration (Type-4), the optical amplifiers 31-i-p, 42-r-p and 55-i-p are omissible if the WDM signal transmission losses are ignorable.

In addition, if the optical multiplexers 54-i-p or the optical demultiplexers 46-r-p have a sufficient wavelength demultiplexing characteristic, the optical multiplexers 54-i-p are replaceable with np:1 optical couplers (combiners), alternatively the optical demultiplexers 46-r-p are replaceable with $1:n_p$ optical couplers (distributors) so that the wavelength selection processing is made in one stage: either in the optical multiplexing/distributing section 4 or in the optical output switch section 5.

This means that this OCCS 1 (Type-4) falls under the "composite Routing (branching type wavelength conversion) type" (see FIG. 10) in which the wavelength conversion processing is conducted in the optical input switch 3.

(A. 5) Description of Basic Configuration (Type-5) of OCCs

Figure 5:
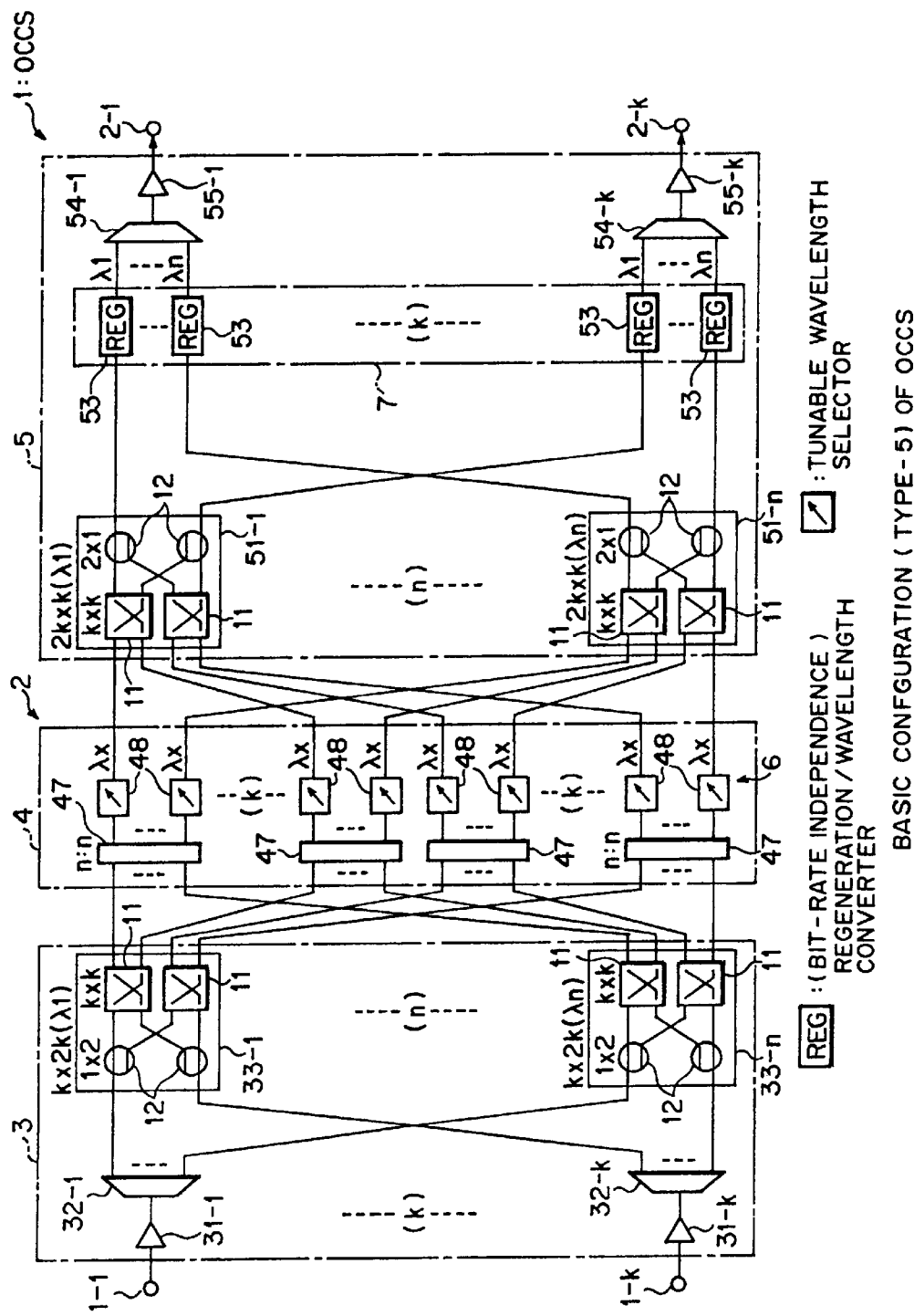
FIG. 5 is a block diagram showing a fifth type (Type-5) of the basic configurations of the OCCS, which constitutes an embodiment of this invention.

FIG. 5 is a block diagram showing a fifth type (Type-5) of the basic configuration of the OCCS according to the embodiment of this invention. The OCCS 1 (Type-5) shown in FIG. 5 differs from the OCCS 1 (Type-1) shown in FIG. 1 in that the second-stage optical mulitplexing/distributing section 4 includes 2k combinations each comprising an n:n star type optical coupler 47 and a tunable wavelength selectors 48 each provided in connection with each of the outputs of this n:n star type optical coupler 47.

Each of the n:n star type optical couplers (first coupling/distributing units) 47 is for coupling the outputs of k×2k switches 33-j in terms of different input wavelengths λj and for distributively outputting them in form of n (the number of kinds of accommodation wavelengths) optical signals, while each of the tunable wavelength selectors (wavelength selectors) 48 is for selecting, from the n distributing outputs of the n:n star type optical coupler 47 (which may hereinafter be referred to simply to a "star coupler 47"), an optical signal of an input wavelength λj to be converted into a desired output wavelength λj.

This means that, in this configuration (Type-5), the wavelength selectors 48 constitute the aforesaid optical wavelength selecting section 6. Additionally, when the second-stage configuration is regarded as being equivalent to (n×n) optical switches, this satisfies the non-blocking condition in the three-stage switch network.

Incidentally, in this case, the 2k×k switches 51-j accommodate the outputs of the wavelength selectors 48 according to the identification of output wavelength λj to the output ports 2-i to rout to any one of the outputs of the k systems. That is, also in this case, one 2k×k switch 51-j corresponds to one output wavelength λj. For example, the uppermost 2k×k switch 51-1 is connected to the wavelength λ1 line to each of the output ports 1-i. Additionally, also in this case, the REGs 53 provided in the optical output switch section 5 constitute the aforesaid first wavelength converting section 7.

In this OCCS (Type-5) thus constructed, the WDM signals (n-wavelength multiplexed optical signals) arriving at the input ports 1-i are. amplified (loss-compensated) by the corresponding optical amplifiers 31-i and then demulitplexed into optical signals of wavelengths λ1 to λn by the optical demultiplexers 32-i and even inputted to the k×2k switches 33-j according to wavelength λj, respectively.

The k×2k switches 33-j route the optical signals with the same wavelength λj from the optical demultiplexers 32-i to the star couplers 47 in the second stage (optical multiplexing/distributing section 4). That is, also in this case, one k×2k switch 33-j corresponds to one wavelength λj. Subsequently, the star couplers 47 couple (re-multiplex) the optical signals from the k×2k switches 33-j in terms of different input wavelengths λj and distributively output them as n optical signals.

Each of the distributed outputs comes in the corresponding wavelength selectors 48 which in turn, select desired input wavelengths (wavelengths to be converted) λj and outputs them to the 2k×k switches 51-j in the third stage (optical output switch section 5). The 2k×k switches 51-j concentrate the outputs of the wavelength selectors 48 according to output wavelength λj identification, with one switch corresponding to one wavelength λj to be converted.

In addition, the 2k×k switches 51-j route the optical signals of the conversion wavelengths λj, selected by the wavelength selectors 48, to the REGs 53 for the conversion output wavelengths λj. Hence, the optical signals of the wavelengths to be converted are converted into desired output wavelengths λj in the REGs 53 and then multiplexed together with optical signals of other wavelengths λj in the optical multiplexers 54-i, thereafter being outputted as WDM signals to the output ports 2-i. This means that the OCCS 1 shown in FIG. 5 also falls under the "composite routing (selection type wavelength conversion) type" (see FIG. 9) in which the wavelength conversion processing is conducted in the optical output switch section 5. Incidentally, in this case, each of the REGs 53 is equipped with a dedicated fixed wavelength light source. Also in this configuration (Type-5), the optical amplifiers 31-i-p and 55-i-p are omissible if the WDM signal transmission loss is ignorable.

As described above, also in this OCCS1 (Type-5), as in the case of the OCCS 1 (Type-1) shown in FIG. 1, the numbers of optical switches 33-j and 51-j are made to be proportional to the number n of accommodation wavelengths per port. Accordingly, for the first stage (the optical routing section 2) and the third stage (the optical output switch section 5), there is no need to change the basic switch size of the optical switches 33-j and 51-j in connection with the enlargement of the communication information capacity, but optical switches having the same size can merely be used additionally in accordance with the number of added wavelengths.

Furthermore, since the second stage (optical multiplexing/distributing section 4) uses the n:n star type optical couplers 47, even if the number n of wavelengths to be multiplexed increases as mentioned above, there is no need to use additional n:n star type optical couplers 47 (no need exists to change the basic configuration). Additionally, since the n:n star type optical couplers 47 are the existing optical parts, it is possible to use them in constructing the OCCS 1.

Thus, also in this case, for the above-mentioned increase in the number of accommodation wavelengths, there is no need to design and develop new optical parts (particularly, optical switches), which provide extremely high extensibility and economical efficiency, and which enables the construction of a large-capacity OCCS 1 matching with the existing WDM transmission systems for an extremely short time. This also contributes greatly to a construction of a large-capacity optical network for a short time.

In addition, also in the above-described configuration (Type-5), since the REGs 53 (first wavelength converting section 7) is provided in the optical output switch section 5, the mutual interference between the optical signals of the respective channels resulting from the optical signals with the same wavelength λj being simultaneously outputted to the same output port 2-i is avoidable, which contributes greatly to the improvement of reliability of this OCCS 1.

(A. 6) Description of Basic Configuration (Type-6) of OCCs

Figure 6:
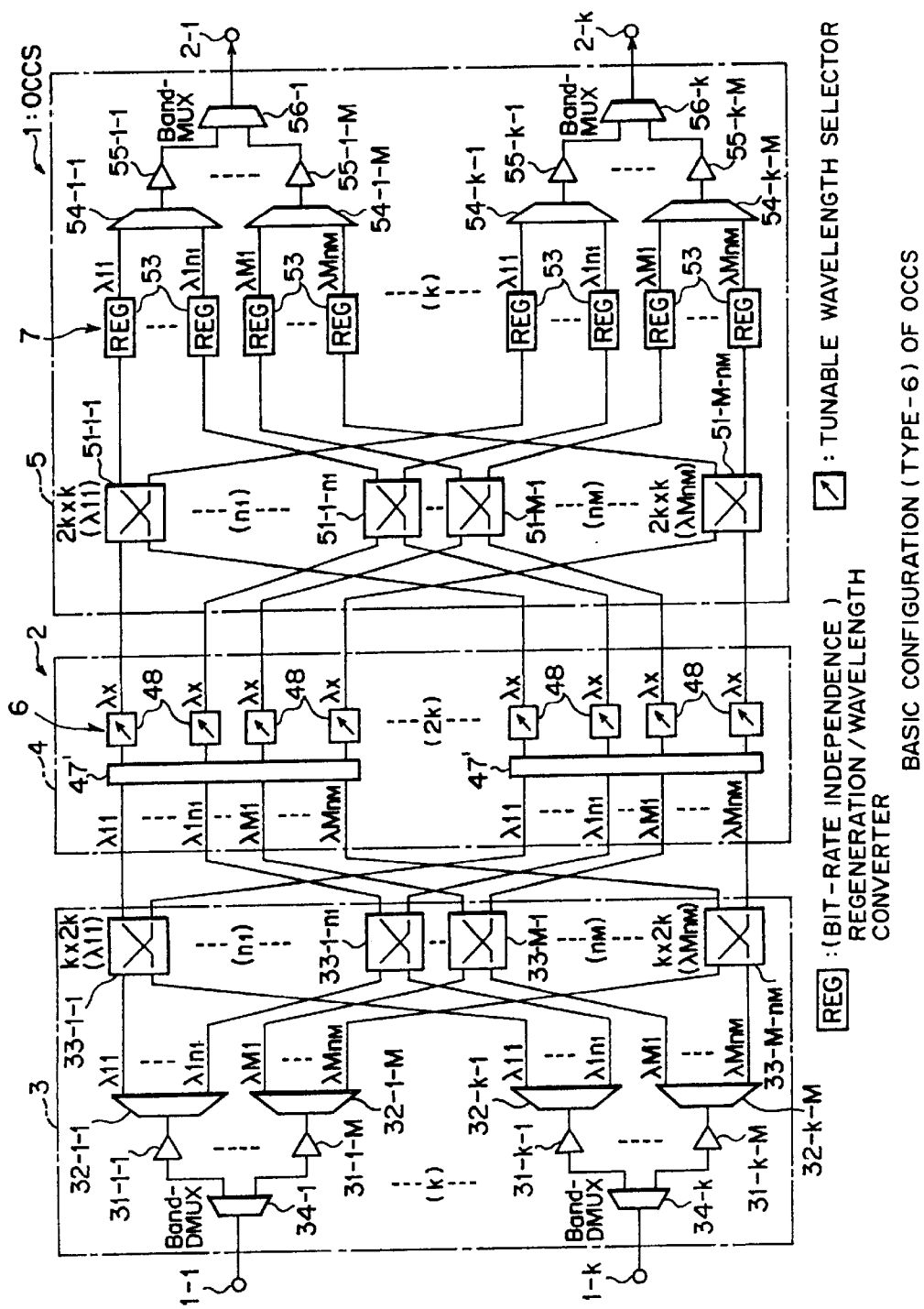
FIG. 6 is a block diagram showing a sixth type (Type-6) of the basic configurations of the OCCS, which constitutes an embodiment of this invention.

FIG. 6 is a block diagram showing a sixth type (Type-6) of the basic configuration of the OCCS according to the embodiment of this invention. This OCCS 1 (Type-6) shown in FIG. 6 is based on the configuration (Type-5: "composite routing (selection type wavelength conversion) type") described above with reference to FIG. 5, but is made to accommodate more wavelengths as well as the configuration (Type-2) described above with reference to FIG. 2.

That is, the OCCS 1 (Type-6) shown in FIG. 6 relates to a modification of the OCCS 1 (Type-2) shown in FIG. 2, as in the case of the modification of the OCCS 1 (Type-1) of FIG. 1 into the OCCS 1 (Type-5) of FIG. 5. As compared with the configuration shown in FIG. 2, the optical multiplexing/distributing section 4 includes 2k sets of $(\Sigma n_p : \Sigma n_p)$ star type optical couplers 47' and $\Sigma n_p$ tunable wavelength selectors 48 provided at every output of $\Sigma n_p$ systems from the $(\Sigma n_p : \Sigma n_p)$ star type optical couplers 47'.

The $(\Sigma n_p : \Sigma n_p)$ star type optical couplers (second coupling/distributing units) 47' are for coupling the outputs of the k×2k switches 33-p-q in terms of different input wavelengths λpq to distributively output them in the form of $\Sigma n_p$ (total number of kinds of accommodation wavelengths) optical signals, while the wavelength selectors 48 are for selecting, from the distributed outputs from the star type optical couplers 47', optical signals of the input wavelengths (conversion wavelengths) λpq to be converted into desired output wavelengths λpq.

Therefore, the 2k×k switches 51-p-q accommodate the outputs of the wavelength selectors 48 according to output wavelength band Band-p identification and output wavelength λpq identification to the output ports 2-i and route them to any one of the outputs of the k systems. Additionally, also in this configuration, the wavelength selectors 48 constitute the aforesaid optical wavelength selecting section 6, while the REGs 53 of the optical output switch section 5 organize the first wavelength converting section 7.

With the configuration described above, also in this OCCS 1 (Type-6), it is possible that the WDM signals entering the input ports 1-i are demulitplexed in the wavelength band demultiplexers 34-i in units of wavelength band Band-p and, after loss-compensated for according to wavelength band Band-p through the use of the dedicated optical amplifiers 31-i-p, routed according to wavelength band Band-p as well as the OCCS 1 (Type-5) shown in FIG. 5.

Accordingly, not only the same effects as those of the above-described OCCS 1 (Type-5) are obtainable, but also large-capacity OCCS 1 is realizable. Incidentally, also in this configuration (Type-5), the optical amplifiers 31-i-p and 55-i-p are omissible if the WDM signal transmission loss is ignorable.

(A. 7) Description of Basic Configuration (Type-7) of OCCS

Figure 7:
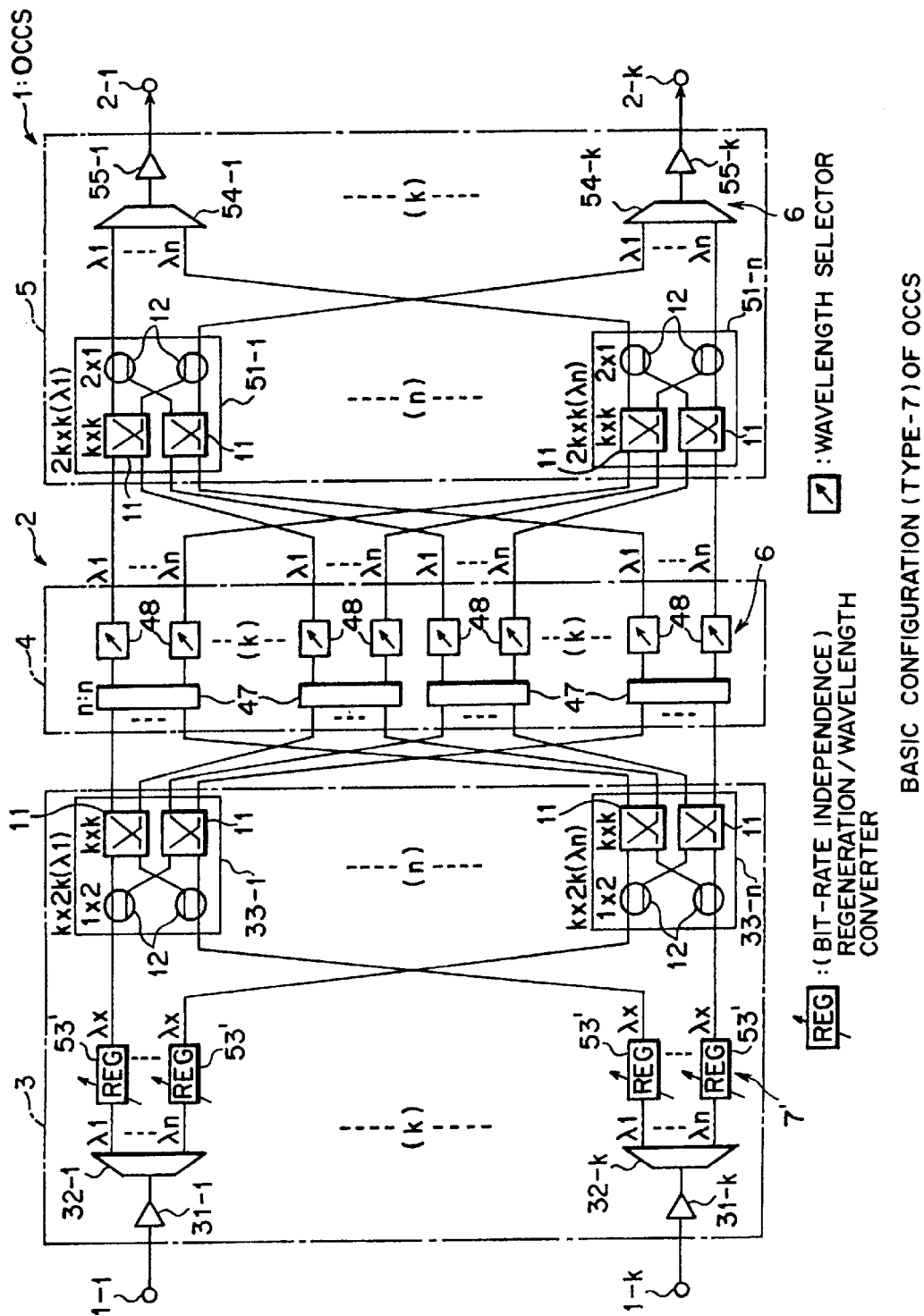
FIG. 7 is a block diagram showing a seventh type (Type-7) of the basic configurations of the OCCS, which constitutes an embodiment of this invention.

FIG. 7 is a block diagram showing a seventh type (Type-7) of the basic configuration of the OCCS according to the embodiment of this invention. The OCCS 1 (Type7) shown in FIG. 7 relates to a modification of the configuration (Type-3) shown in FIG. 3, and as compared with the configuration of FIG. 3, the 2k n×n coupling/demultiplexing units 40A in the second stage (optical multiplexing/distributing section 4) shown in FIG. 3 are replaced with sets of n:n star type optical couplers 47, similar to those described above with reference to FIG. 5, and n tunable wavelength selectors 48 provided in connection with each of the n:n star type optical couplers 47.

Also in this case, the tunable wavelength selectors 48 constitute the aforesaid optical wavelength selecting section 6, while the REGs 53' organize the second wavelength converting section 7' placed in the optical input switch section 3.

Accordingly, also in this OCCS 1 (Type-7), a routing operation similar to that of the OCCS 1 (Type-3) shown in FIG. 3 becomes possible. That is, each of the WDM signals (n-wavelength multiplexed optical signals) arriving at the input ports 1-i is amplified (loss compensation) by the corresponding optical amplifier 31-i and then demultiplexed into optical signals of wavelengths λ1 to λn by the corresponding optical demultiplexer 32-i.

Furthermore, the optical signals of the wavelengths λj are converted into desired conversion output wavelengths λj by the corresponding REGs 53' and then inputted to the k×2k switches 33-j provided at every input wavelength λj before the wavelength conversion. The k×2k switches 33-j route the optical signals inputted therein to the arbitrary star couplers 47 in the second stage. That is, also in this case, one k×2k switch 33-j corresponds to one input wavelength λj before the wavelength conversion.

Subsequently, the star couplers 47 couple the optical signals, routed by the k×2k switches 33-j, in units of different wavelengths and then distributively output them as n optical signals. The corresponding wavelength selectors 48 select the output wavelengths λj after the wavelength conversion from the distributed outputs, then routing the 2k×k switches 51-j in the third stage.

The 2k×k switches 51-j in the third stage concentrate the optical signals of the same wavelength λj from the wavelength selectors 48. That is, also in this case, one 2k×k switch 51-j corresponds to one output wavelength λj after the wavelength conversion. For example, the 2k×k switch 51-1 is connected to the wavelength λ1 line to each of the output ports 2-i. Hence, the 2k×k switch 51-1 routes an optical signal of a desired wavelength λj after the wavelength conversion to a desired output port 2-i.

As described above, also in this OCCS 1 (Type-7), the numbers of optical switches 33-j and 51-j are designed to be in proportion to the number n of accommodation wavelengths per port. Accordingly, for the first stage of the optical routing section 2 and the third stage of the optical output switch section 5, there is no need to change the basic switch size of the optical switches 33-j and 51-j in connection with the enlargement of the communication information capacity, but optical switches having the same size can merely be used additionally in accordance with the number of added wavelengths.

Furthermore, since the second stage (optical multiplexing/distributing section 4) uses the n:n star type optical couplers 47, even if the number n of wavelengths to be multiplexed increases as mentioned above, there is no need to use additional n:n star type optical couplers 47 (no need exists to change the basic configuration). Additionally, since the n:n star type optical couplers 47 are the existing optical parts, it is possible to use them in constructing the OCCS 1.

Thus, also in this case, for the above-mentioned increase in the number of accommodation wavelengths, there is no need to design and develop new optical parts (particularly, optical switches), which provide extremely high extensibility and economical efficiency, and which enables the construction of a large-capacity OCCS 1 matching with the existing WDM transmission systems for an extremely short time. This also contributes greatly to a construction of a large-capacity optical network for a short time.

In addition, also in the above-described configuration (Type-7), since the REGs 53' (second wavelength converting section 7') is provided in the optical input switch section 3, the mutual interference between the optical signals of the respective channels resulting from the optical signals with the same wavelength λj being simultaneously outputted to the same output port 2-i is avoidable, which contributes greatly to the improvement of reliability of this OCCS 1.

Still additionally, in the above-described configuration (Type-7), since, through the use of the wavelength selectors 48 and the optical multiplexers 54-i, the wavelength selection is made in both the optical multiplexing/distributing section 4 and the optical output switch section 5 (namely, the wavelength selection processing is made in two stages), the interference (crosstalk) with other unnecessary wavelengths λj (other channels) is suppressible to a minimum (namely, the wavelength demultiplexing characteristic is improvable), so its performance is considerably improvable.

Incidentally, if the wavelength selectors 48 or the optical multiplexers 54-i have a sufficient wavelength demultiplexing characteristic, the wavelength selection processing is achievable with one stage of the optical multiplexing/distributing section 4 and the optical output switch section 5 in a state where the wavelength selectors 48 are omitted or the optical mulitplexers 54-i are replaced with the n:1 optical couplers 45 shown in FIG. 3. That is, this OOCS 1 (Type-7) also falls under the composite routing (branching type wavelength conversion) type" (see FIG. 10) in which the wavelength conversion processing is conducted in the optical input switch section 3.

(A. 8) Description of Basic Configuration (Type-8) of OCCS

Figure 8:
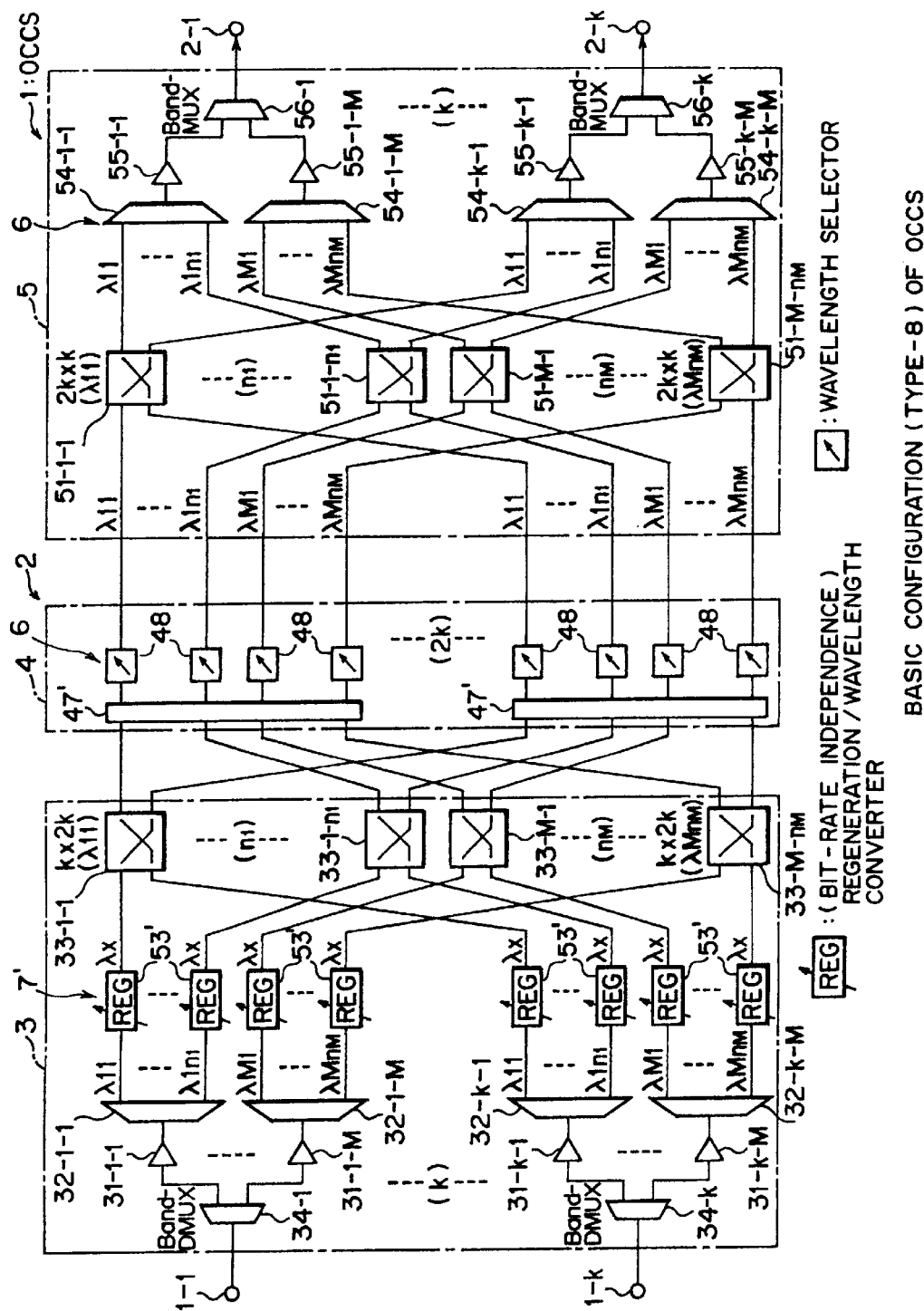
FIG. 8 is a, block diagram showing an eighth type (Type-8) of the basic configurations of the OCCS, which constitutes an embodiment of this invention.

FIG. 8 is a block diagram showing an eighth type (Type-8) of the basic configuration of the OCCS according to the embodiment of this invention. This OCCS 1 (Type-8) shown in FIG. 8 is based on the configuration (Type-7) described above with reference to FIG. 7, and is designed to accommodate more wavelengths, as in the case of the above-described configuration (Type-2) described above with reference to FIG. 2.

This means that the OCCS 1 (Type-8) shown in FIG. 8 relates to a modification of the OCCS 1 (Type-4) shown in FIG. 4 as in the modification of the OCCS 1 (Type-3) shown in FIG. 3 into the OCCS 1 (Type-7) shown in FIG. 7, and differs from the configuration shown in FIG. 4 in that the ($\Sigma n_p \times \Sigma n_p$) coupling/demultiplexing units 40A-1 to 40A-5 2k in the optical multiplexing/distributing section 4 are replaced with sets of ($\Sigma n_p : \Sigma n_p$) star type optical couplers 47' and $\Sigma n_p$ tunable wavelength selectors 48 each provided in connection with each of the outputs of the $\Sigma n_p$ systems of the star type optical couplers 47', which are similar to those shown in FIG. 6.

Also in this case, the ($\Sigma n_p : \Sigma n_p$) star type optical couplers (fourth coupling/distributing units) 47' are for coupling the outputs of the k×2k switches 33-p-q in terms of different input wavelengths λpq before the wavelength conversion to distributively output them as $\Sigma n_p$ (total number of kinds of accommodation wavelengths) optical signals, while the wavelength selectors 48 are for selecting, from the distributed outputs of the star type optical couplers 47', optical signals of input wavelengths (conversion wavelengths) λpq to be converted into desired output wavelengths.

Therefore, the 2k×k switches 51-p-q in the optical output switch section 5 accommodate the outputs of the wavelength selectors 48 according to output wavelength band Band-p identification and output wavelength λpq identification to the output ports 2-i to route them to any one of the outputs of the k systems. Also in this case, the aforesaid star type optical couplers 47' constitute a optical wavelength selecting section 6, while the REGs 53' in the optical input switch section 3 organize a second wavelength converting section 7'.

With this configuration, this OCCS 1 (Type-8) also can demultiplex the WDM signals arriving at the input ports 1-i according to wavelength band Band-p in the wavelength band demultiplexers 34-i and conduct routing, similar to that of the OCCS 1 (Type-7) shown in FIG. 7, according to wavelength band Band-p in a state where the loss compensation is accomplished according to the wavelength band Band-p through the use of the dedicated optical amplifiers 31-i-p.

Accordingly, the effects similar to those of the above-described OCCS 1 (Type-7) are obtainable, and a large-capacity OCCS 1 is realizable. Incidentally, also in this configuration (Type-8), the optical amplifiers 31-i-p and 55-i-p are omissible if the WDM signal transmission losses are ignorable.

In addition, if the wavelength selectors 48 or the optical multiplexers 54-i-p have a sufficient wavelength demultiplexing characteristic, the wavelength selection processing is also achievable with one stage of the optical multiplexing/distributing section 4 and the optical output switch section 5 in a state where the wavelength selectors 48 are omitted or the optical mulitplexers 54-i-p are replaced with the $n_p$:1 optical couplers (combiners).

That is, this OCCS 1 (Type-8) also falls under the "composite routing (branching type wavelength conversion) type" (see FIG. 10) in which the wavelength conversion processing is conducted in the optical input switch section 3.

(B) Description of Concrete Example of OCCS

FIGS. 11 to 14 are block diagrams showing four kinds (first to fourth modifications) of concrete examples of the above-described OCCS 1 (Type-1) of FIG. 1 in the case in which the numbers of input ports and output ports are taken to be 8 (that is, the aforesaid k=8), the number of wavelengths to be multiplexed (number of kinds of accommodation wavelengths) is taken as 32 (that is, the aforesaid n=32) and the number N of input/output channels (total number of accommodation wavelengths) is taken as N=k×n=256.

That is, as FIGS. 11 to 14 show, the OCCS 1 (Type-1) is equipped with 32 optical switches 33-j and 32 optical switches 51-j (where j=1 to 32), each of which basically comprises an 8×8 switch 11 and a 1×2 switch 12. Furthermore, each of the optical demultiplexers 32-i (i=1 to 8) comprises a 1:32 optical demultiplexer, each of the optical multiuplexers 41 and 54-i comprises 32:1 optical multiplexer, and each of the optical couplers 43 comprises a 1:32 optical coupler.

In addition, each of the REGs 53 is constructed as a regeneration type wavelength converter performing bit rate dependence type optical-electrical conversion (O/E) electrical-optical conversion (E/O) (which will sometimes be referred to hereinafter as "O/E/O 53"). In the illustrations, the same reference numerals as those in FIG. 1 designate the same or corresponding components, and the detailed description thereof will be omitted for brevity.

Figure 11:
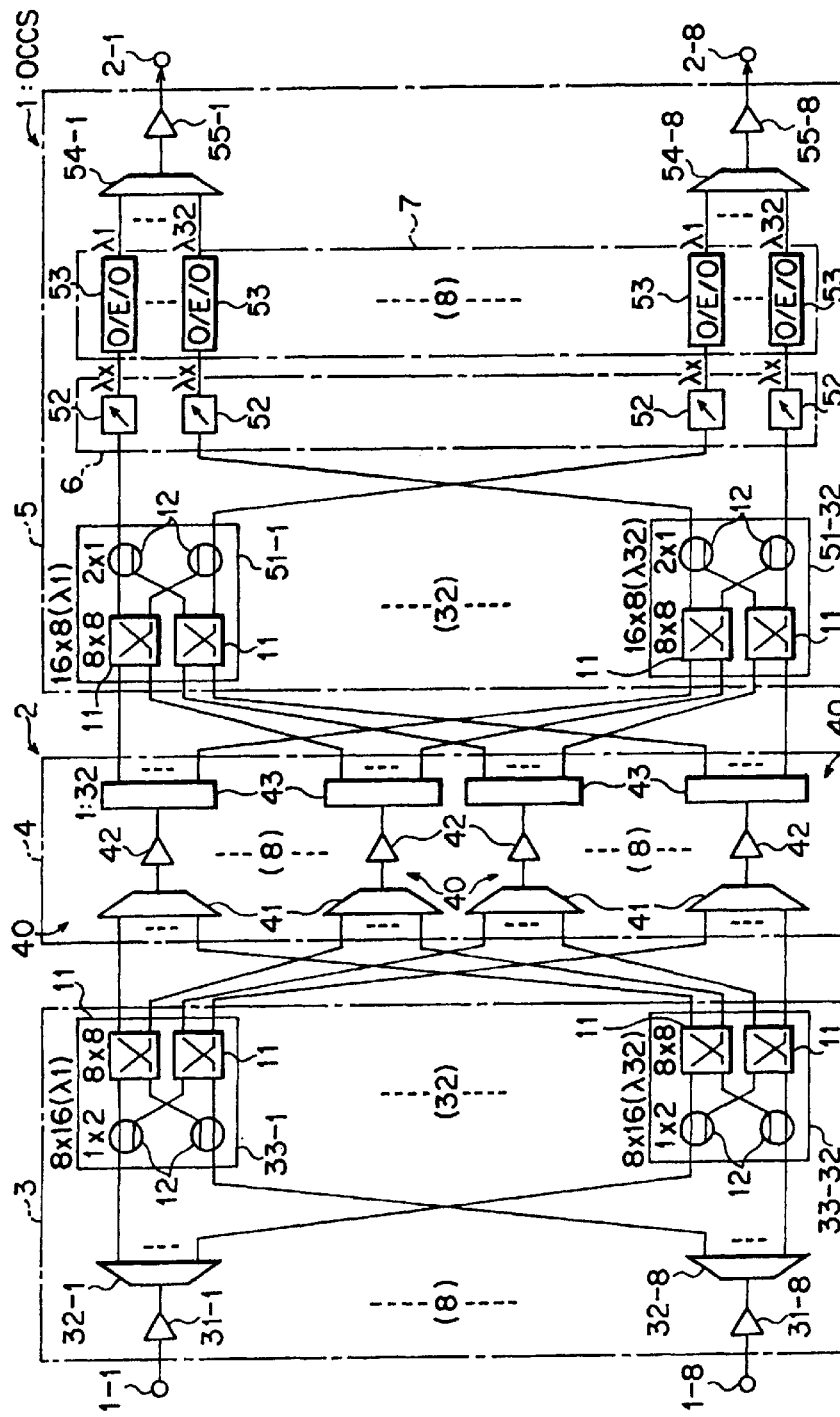
FIG. 11 is a block diagram showing a concrete example of the OCCS (Type-1: first modification) according to this embodiment.

First, the OCCS 1 (Type-1: first modification) shown in FIG. 11 is such that each of all the ports 1-1 to 1-8 and 2-1 to 2-8 is used as an inter-office transmission dedicated port which accommodates a 32-wavelength multiplexed optical signal, and the OCCS 1 with this configuration is used as the so-called "router dedicated node" in optical networks.

Furthermore, as seen from FIG. 11, in the case in which the number of accommodation wavelengths per port is increased from 32 wavelengths to 64 wavelengths, with respect to the optical input switch section 3 and the optical output switch section 5, 32 optical switches 33-j and 32 optical switches 51-j are provided additionally while 64 1:64 optical demultiplexers are used instead as the optical demultiplexers 32-i and 64 64:1 optical multiplexers are used instead as the optical multiplexers 54-i.

Still furthermore, with respect to the optical multiplexing/distributing section 4, a 64:1 optical multiplexer is used as each of the optical multiplexers 41 while a 1:64 optical coupler is used as each of the optical couplers 43 (no enlargement is necessary). In these cases, there is no need to change the basic switch size. Also in the various types of OCCSs 1 which will be described herein later, it is possible to similarly cope with the increase in number of accommodation wavelengths without changing the basic switch size.

The OCCS 1 (Type-1: second modification) has a construction in which, of the input ports 1-1 to 1-8 and the output ports 2-1 to 2-8, six input ports and six output ports (ports 1-1 to 1-6 and 2-1 to 2-6) are used as inter-office transmission dedicated ports for accommodating a 32-wavelength multiplexed optical signal, while the remaining ports (two input ports and two output ports) (that is, ports 1-7, 1-8, 2-7 and 2-8) are allocated to intra-office interface (add/drop) ports. This configuration is equivalent to a configuration of an OCCS for generally standardized inter-office/intra-office transmission (which also will be referred to hereinafter as a "standardized OCCS).

Accordingly, the optical demultiplexers 32-7 and 32-8 are removed (if the optical amplifiers 55-1 to 55-8 exist, the optical amplifiers 55-7 and 55-8 are also removed) with respect to the input ports 1-7 and 1-8 allocated to the intra-office interface, and wavelength converters (O/E/O) 53A for 32 wavelengths, which have fixed wavelength light sources covering wavelengths $\lambda 1$ to $\lambda 32$, are mounted instead to convert adding optical signals of arbitrary wavelengths $\lambda 0$ into optical signals of predetermined wavelengths $\lambda j$ (j=1 to 32) for sending (adding) them to he optical routing section 2.

On the other hand, the wavelength converters 53 and the optical multiplexers 54-7 and 54-8 (optical amplifiers 55-7 and 55-8) are removed in conjunction with the output ports 2-7 and 2-8 allocated for the intra-office interface, while the optical signals of the desired wavelength $\lambda j$ are selected by the remaining tunable wavelength selectors 52 to be branched (dropped).

Figure 12:
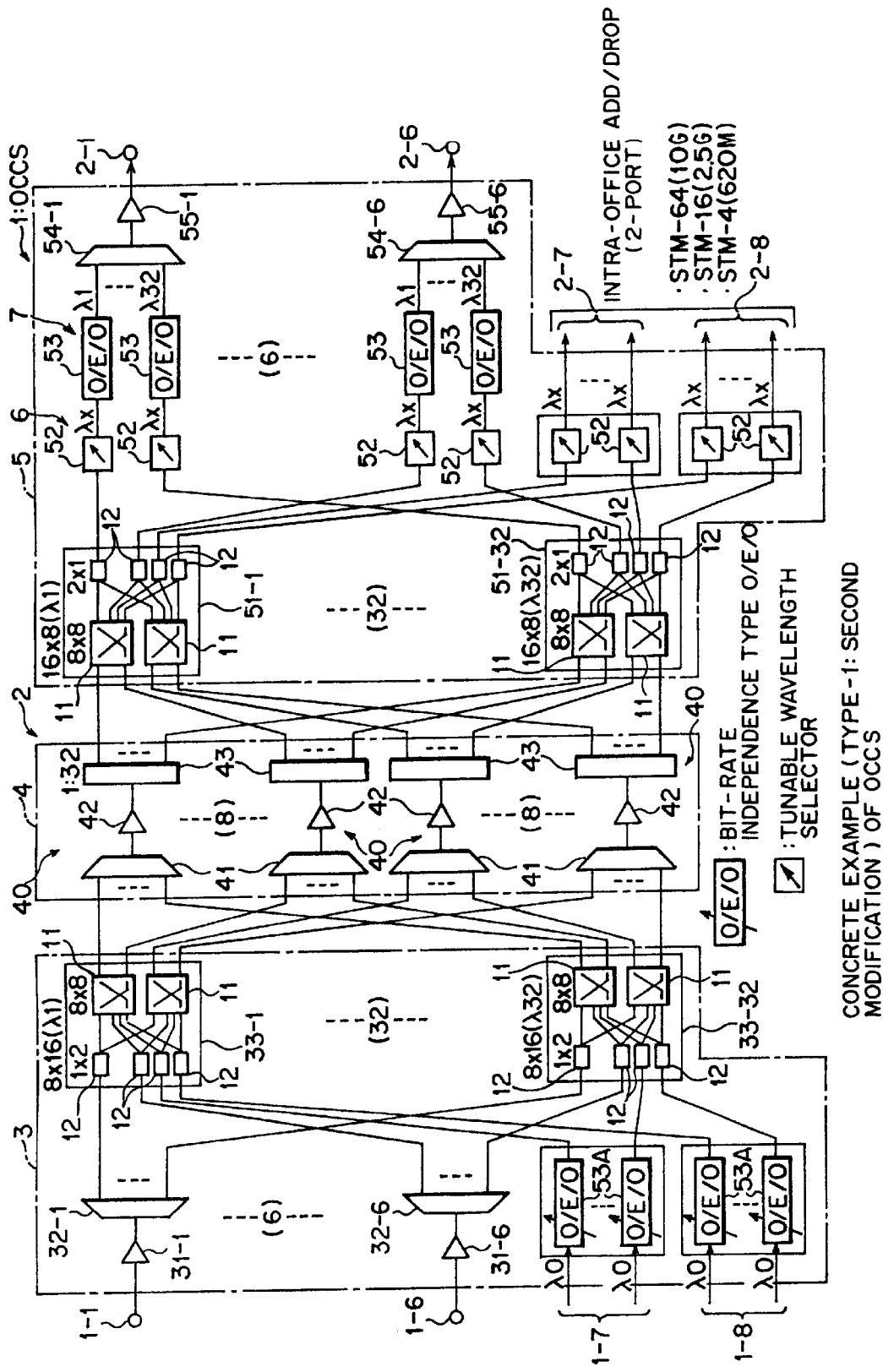
FIG. 12 is a block diagram showing a concrete example of the OCCS (Type-1: second modification) according to this embodiment.

That is, in the OCCS 1 (Type-1: second modification) shown in FIG. 12, the input ports 1-1 to 1-6 forming a portion of the input ports 1-1 to 1-8 accommodate a 32-wavelength multiplexed optical signal produced by multiplexing 32 kinds of input wavelengths $\lambda 1$ to $\lambda 32$, while the remaining input ports 1-7 and 1-8 are used for adding of optical signals of 32 kinds of wavelengths $\lambda 1$ to $\lambda 32$. Furthermore, the output ports 2-1 to 2-6 forming a portion of the output ports 2-1 to 2-8 accommodate a 32-wavelength multiplexed optical signal produced by wavelength-multiplexing optical signals of 32 kinds of output wavelengths $\lambda 1$ to $\lambda 32$, while the remaining output ports 2-7 and 2-8 are used for the dropping of optical signals of 32 kinds of wavelengths $\lambda 1$ to $\lambda 32$.

Naturally, the number of ports to be allocated for the intra-office interface (inter-office transmission dedication) can assume a value other than above-mentioned value.

Figure 13:
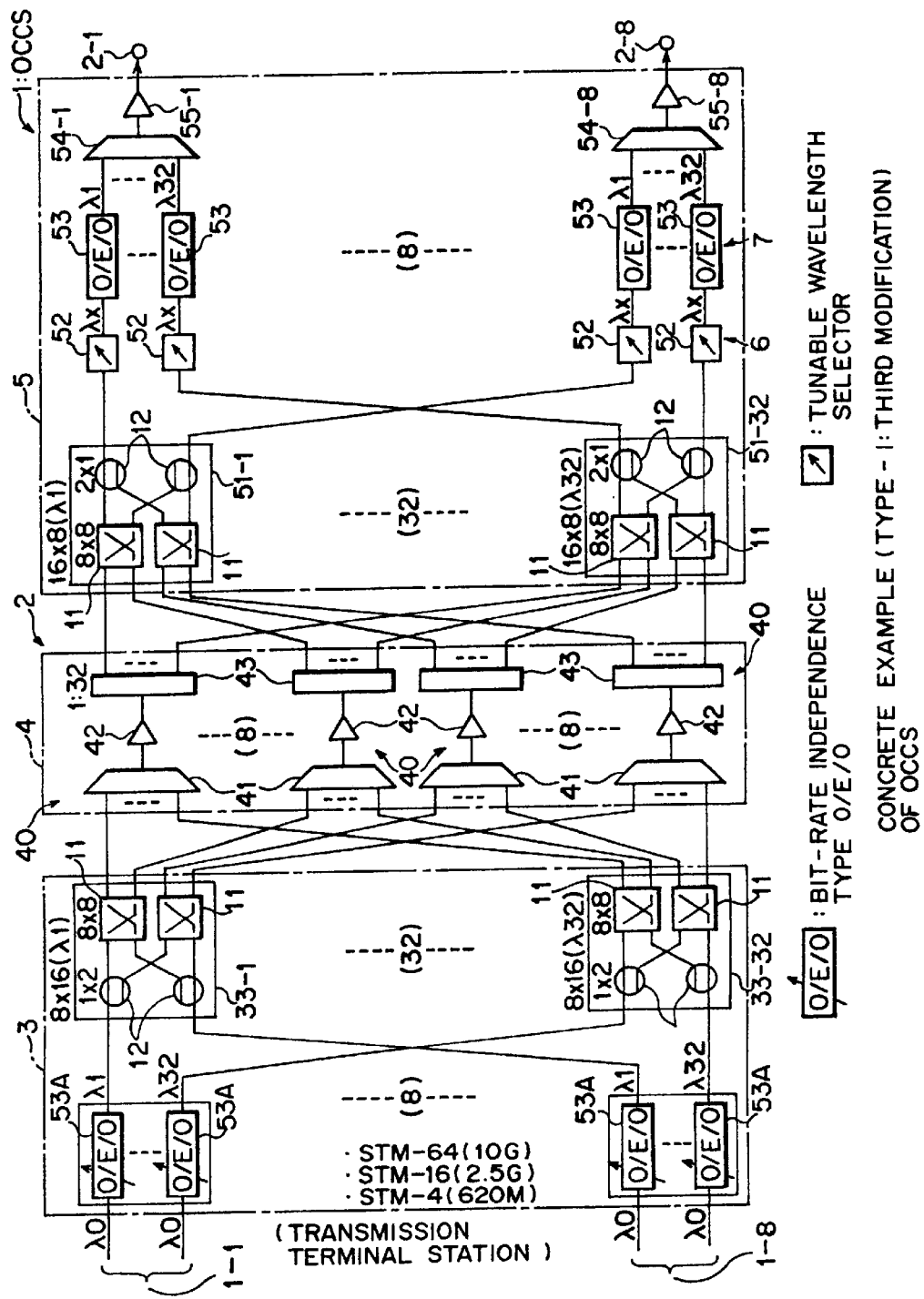
FIG. 13 is a block diagram showing a concrete example of the OCCS (Type-1: third modification) according to this embodiment.

Furthermore, in the OCCS 1 (Type-1: third modification) shown in FIG. 13, the optical demultiplexers 32-1 to 32-8 (the optical amplifiers 31-1 to 31-8) are removed with respect to all the input ports 1-1 to 1-8, while, as in the case shown in FIG. 12, the wavelength converters 53A are mounted instead so that, in connection with all the input ports 1-1 to 1-8, adding optical signals of arbitrary wavelengths $\lambda 0$ are converted into predetermined wavelengths $\lambda j$ and then sent to the optical routing section 2. Namely, only the output ports 2-1 to 2-8 are made to accommodate the 32-wavelength multiplexed optical signal.

Thus, this OCCS 1 (Type-1: third modification), in a distribution type optical network in which transmission is made from one basic point to a plurality of points, adds an optical signal of an arbitrary wavelength λ0 into a idle channel of an arbitrary one of the input ports 1-1 to 1-8, and converts that optical signal into an optical signal with a desired wavelength λj and sends it from a desired one of the output ports 2-1 to 2-8 (that is, it can be used for a point-to-multipoint type WDM transmission terminal station).

Figure 14:
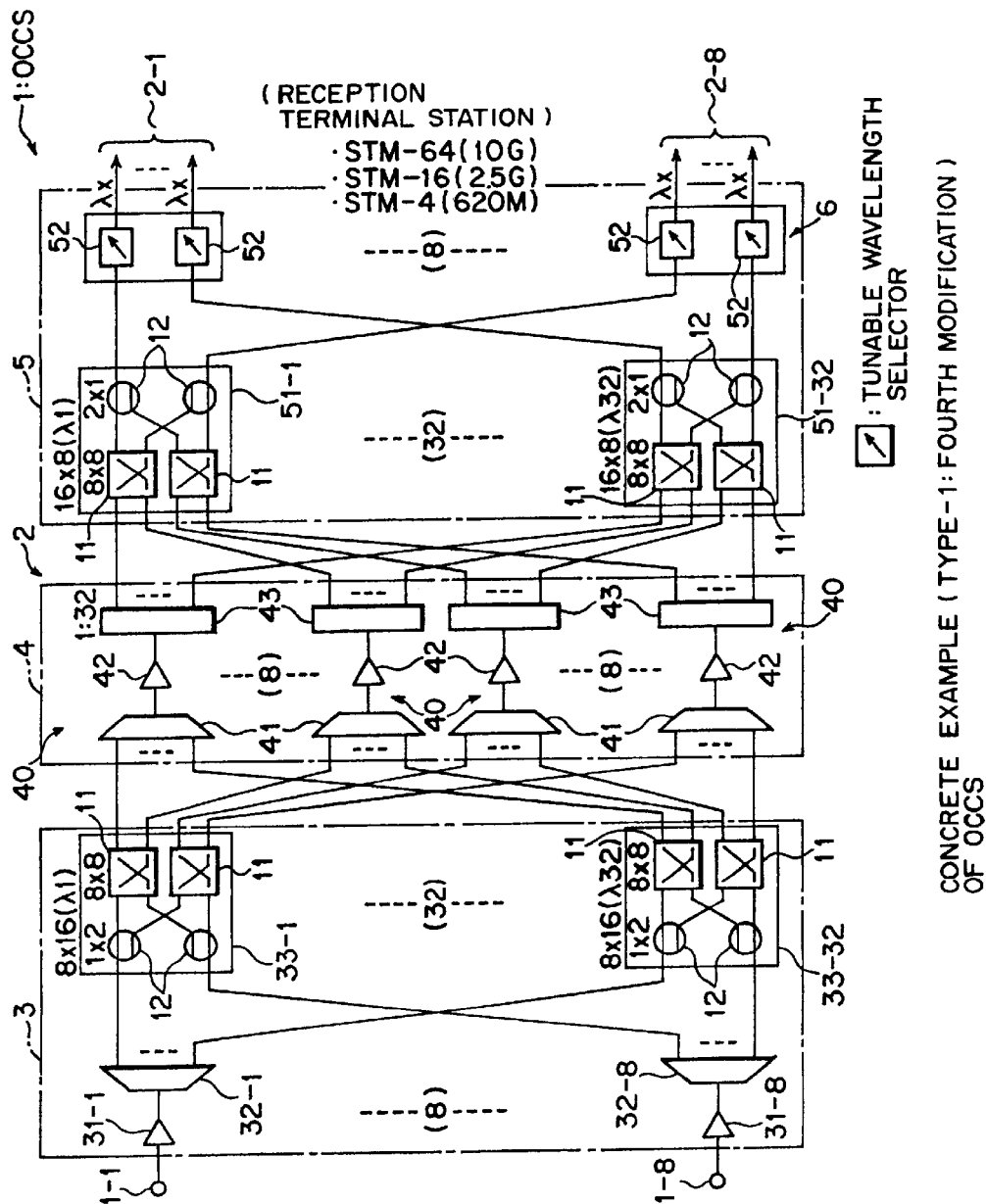
FIG. 14 is a block diagram showing a concrete example of the OCCS (Type-1: fourth modification) according to this embodiment.
Figure 15:
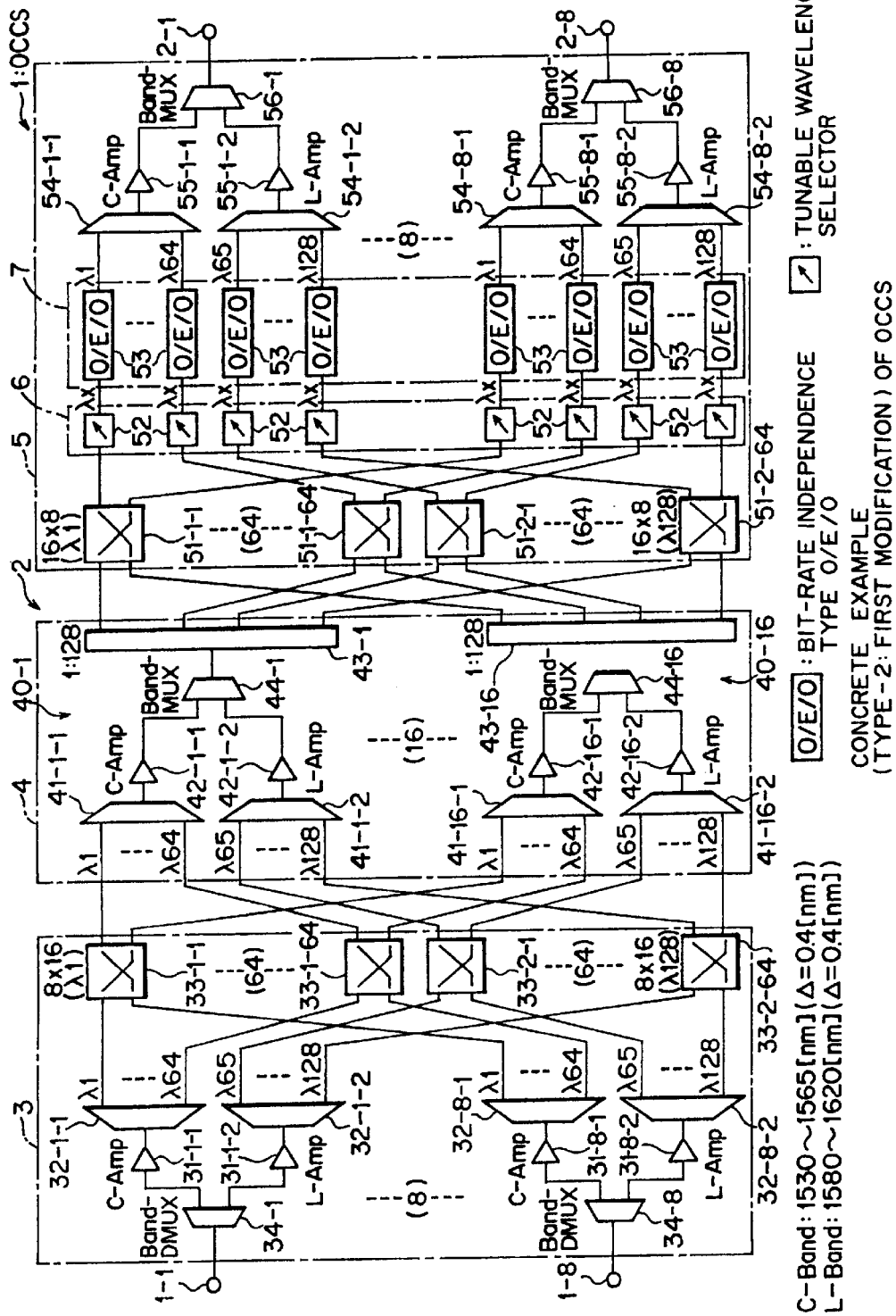
FIG. 15 is a block diagram showing a concrete example of the OCCS (Type-2: first modification) according to this embodiment.

In the OCCS 1 (Type-1: fourth modification) shown in FIG. 14, contrary to the OCCS shown in FIG. 13, the wavelength converters 53 and the optical multiplexers 54-1 to 54-8 (the optical amplifiers 55-1 to 55-8) are removed with respect to all the output ports 2-1 to 2-8, and each of only the input ports 1-1 to 1-8 is made to accommodate a 32-wavelength multiplexed optical signal.

Thus, this OCCS (Type-1: fourth modification), in a distribution type optical network in which transmission is made from a plurality of points to one basic point, can select an optical signal of a desired wavelength λ0 from arbitrary idle channels of arbitrary input ports 1-1 to 1-8 and receive it (that is, it can be used for a multipoint-to-point type WDM reception terminal station).

As described above; according to this embodiment, it is possible to very easily realize and offer an OCCS 1 suitable for a desired application mode. In addition, if the OCCSs 1 (Type-1: first to fourth modifications) having the above-described configurations are used properly, in various applications, it is possible to construct optical networks meeting the user's needs. Incidentally, likewise, the OCCS 1 (Type-5) shown in FIG. 5 can four kinds of configurations similar to those described above.

FIGS. 15 to 18 are block diagrams showing, as in the cases described above with reference to FIGS. 11 to 14, four kinds (first to fourth modifications) of concrete examples of the above-described OCCS 1 (Type-2) of FIG. 2 in cases in which the numbers of input ports and output ports are set at 8 (that is, the aforesaid k=8), optical signals of two kinds (that is, the aforesaid M=2) wavelength bands [C-Band (=the aforesaid Band-1: 1530 to 1565 (nm), L-Band (=the aforesaid Band-2 : 1580 to 1620 (nm)] are accommodated per port, the numbers n1, n2 of wavelengths to be multiplexed in the wavelength bands are taken as 64 (λ1 to λ64 and λ65 to λ128, totaling 128 waves), that is, the number N of input/output channels is taken as N=2×64×8=1024 and the interval Δ of the wavelengths λ1 to λ64 (λ65 to λ128) is taken as Δ=0.4 (nm).

As FIGS. 15 to 18 show, as in the case of the OCCS 1 (Type-1), the OCCS 1 (Type-2) can assume four kinds of configurations: a "router dedicated configuration (first modification)", a "standardized configuration (second modification)", a "configuration for point-to-multipoint type WDM transmission terminal station (third modification)", and a "configuration for multipoint-to-point type WDM reception terminal station (fourth modification)", thus permitting the constructions of optical networks meeting the user's needs in various applications. Additionally, the OCCS 1 (Type-6) shown in FIG. 6 also can take four kinds of configurations similar thereto.

FIGS. 19 to 22 are block diagrams showing four kinds (first to fourth modifications) concrete examples of the OCCS 1 (Type-3) shown in FIG. 3 in the case in which the numbers of input ports and output ports are taken to be 8 (that is, the aforesaid k=8), the number of wavelengths to be multiplexed is taken as 32 (that is, the aforesaid n=32) and the number N of input/output channels (total number of accommodation wavelengths) is taken as N=k×n=256.

That is, also in this case, as FIGS. 19 to 22 show, each of the optical switches 33-j and 51-j (where j=1 to 32) basically comprises an 8×8 switch 11 and a 1×2 switch 12. Additionally, each of the REGs 53' is constructed as a bit rate independence type O/E/O. In the illustrations, the same or corresponding components as or to those in FIG. 3 are marked with the same reference numerals as those in FIG. 3, and the description thereof will be omitted for simplicity.

Figure 19:
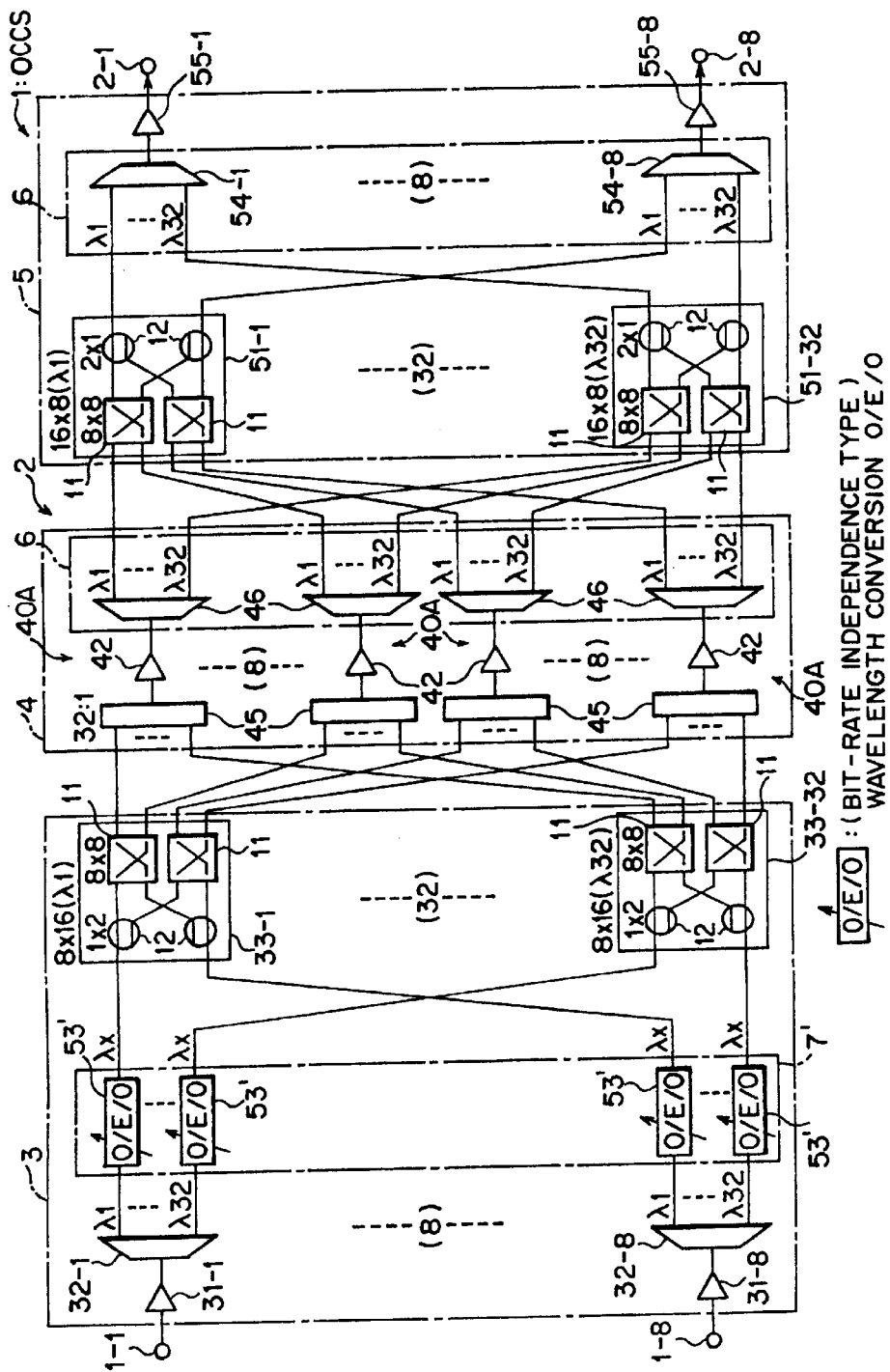
FIG. 19 is a block diagram showing a concrete example of the OCCS (Type-3: first modification) according to this embodiment.

In the OCCS 1 (Type-3: first modification) shown in FIG. 19, each of all the ports 1-1 to 1-8 and 2-1 to 2-8 is designed to be used as an inter-office transmission dedicated port which accommodates a 32-wavelength multiplexed optical signal, and also in this case, it is used as a "node dedicated to a router".

Figure 16:
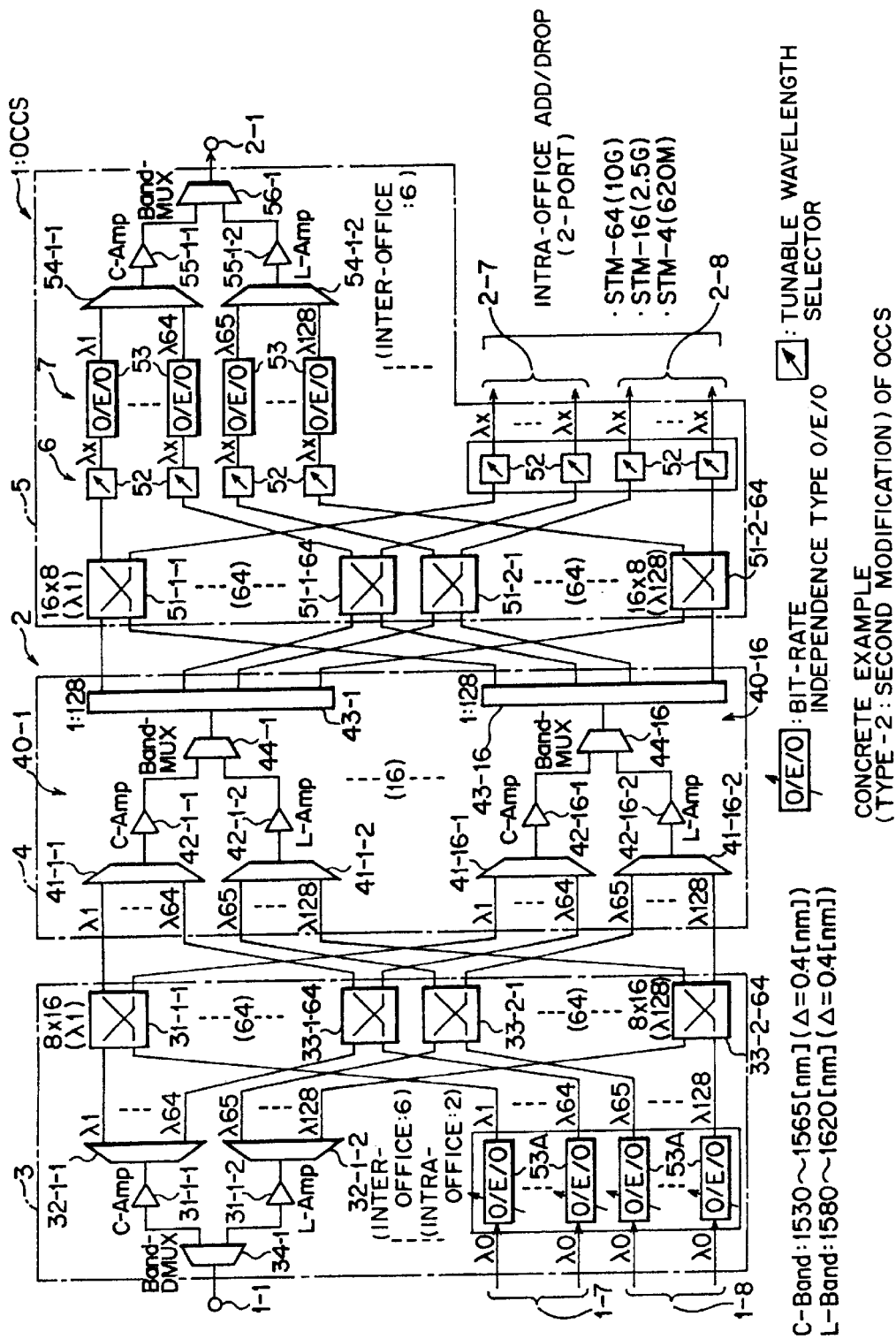
FIG. 16 is a block diagram showing a concrete example of the OCCS (Type-2: second modification) according to this embodiment.
Figure 20:
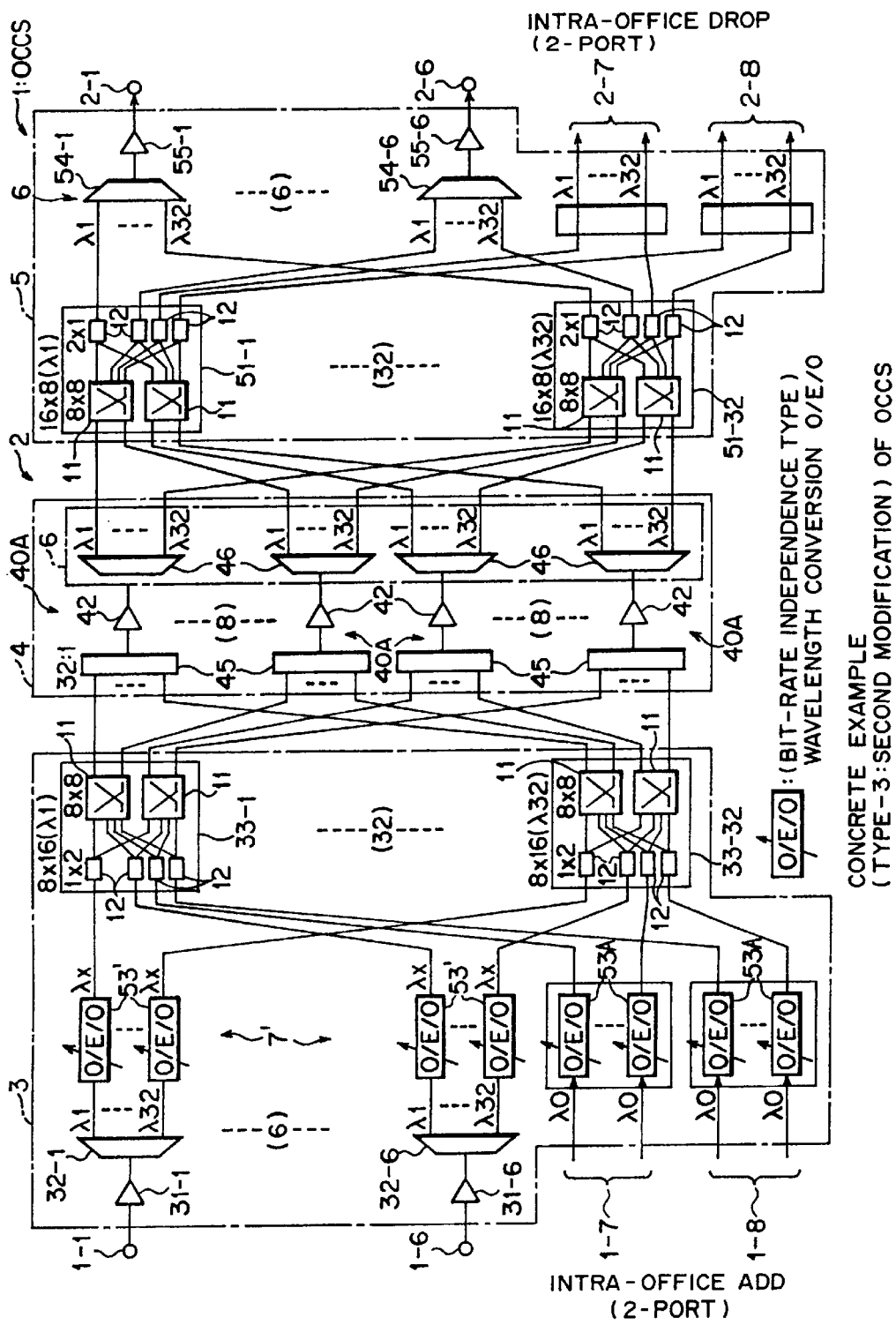
FIG. 20 is a block diagram showing a concrete example of the OCCS (Type-3: second modification) according to this embodiment.

In the OCCS 1 (Type-3: second modification) shown in FIG. 20, as in the case of the OCCSs 1 shown in FIGS. 12 and 16, two ports (1-7 and 1-8) of the input ports 1-1 to 1-8 and two ports (2-7 and 2-8) of the output ports 2-1 to 2-8 are allocated for the intra-office interface (add/drop). This configuration is also a generally standardized OCCS configuration.

Furthermore, also in this case, the optical demultiplexers 32-7 and 32-8 (the optical amplifiers 31-7 and 31-8) are removed with respect to the input ports 1-7 and 1-8 allocated for the intra-office interface, while wavelength converting units (O/E/O) 53A for 32 wavelengths, having fixed wavelength light sources of wavelengths λ1 to λ32, are mounted instead, thus converting an adding optical signal of an arbitrary wavelength λ0 into an optical signal with a predetermined wavelength λj and sending it to the optical routing section 2.

On the other hand, the optical multiplexers 54-7 and 54-8 (the optical amplifiers 55-7 and 55-8) are removed with respect to the output ports 2-7 and 2-8 allocated for the intra-office interface so that optical signals of desired wavelengths λj can be branched (dropped) after the routing by the optical switches 51-j.

Also in this case, naturally, the number of ports to be allocated for the intra-office interface (inter-office transmission dedication) can assume a value other than the above-mentioned value.

Figure 17:
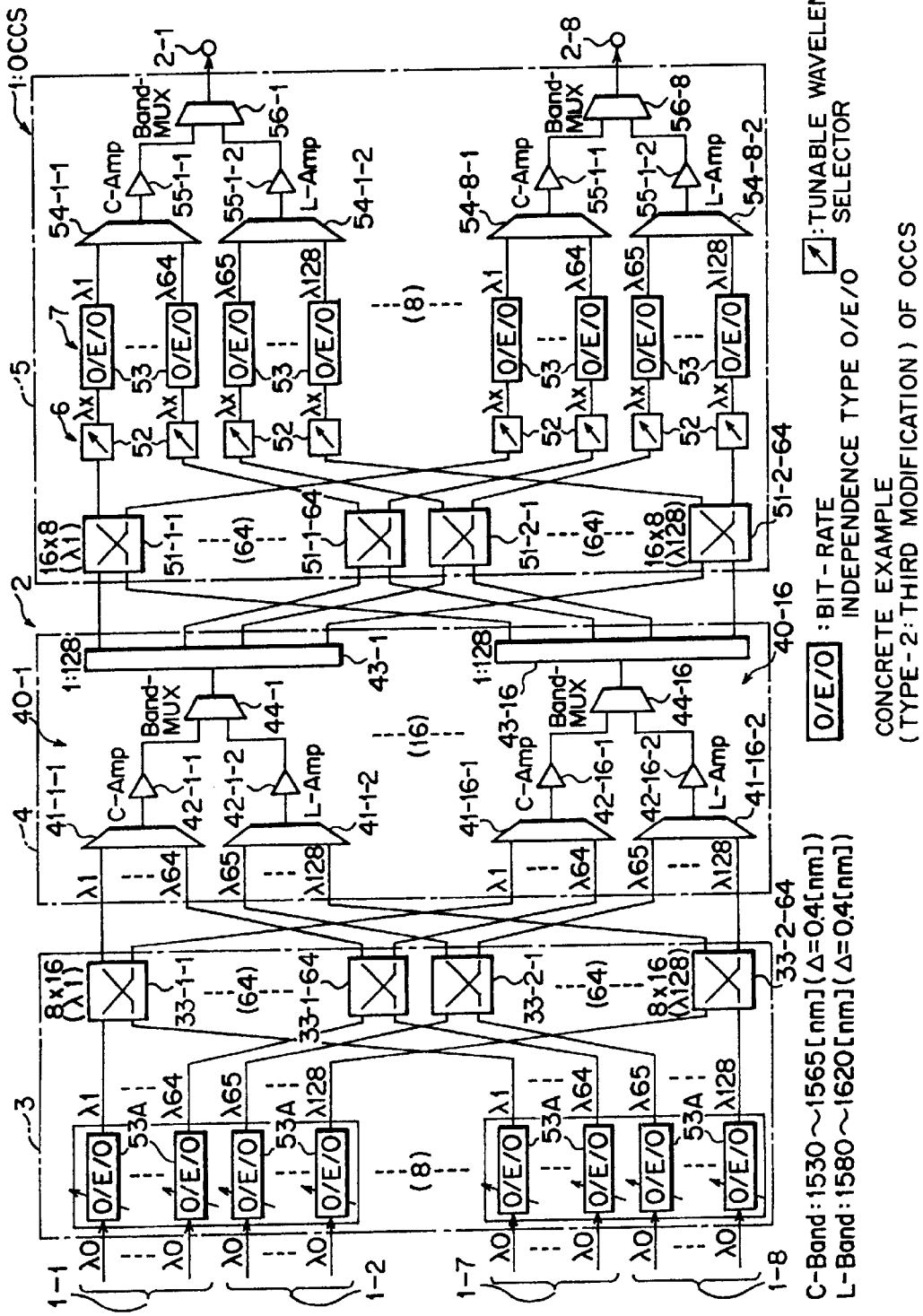
FIG. 17 is a block diagram showing a concrete example of the OCCS (Type-2: third modification) according to this embodiment.
Figure 18:
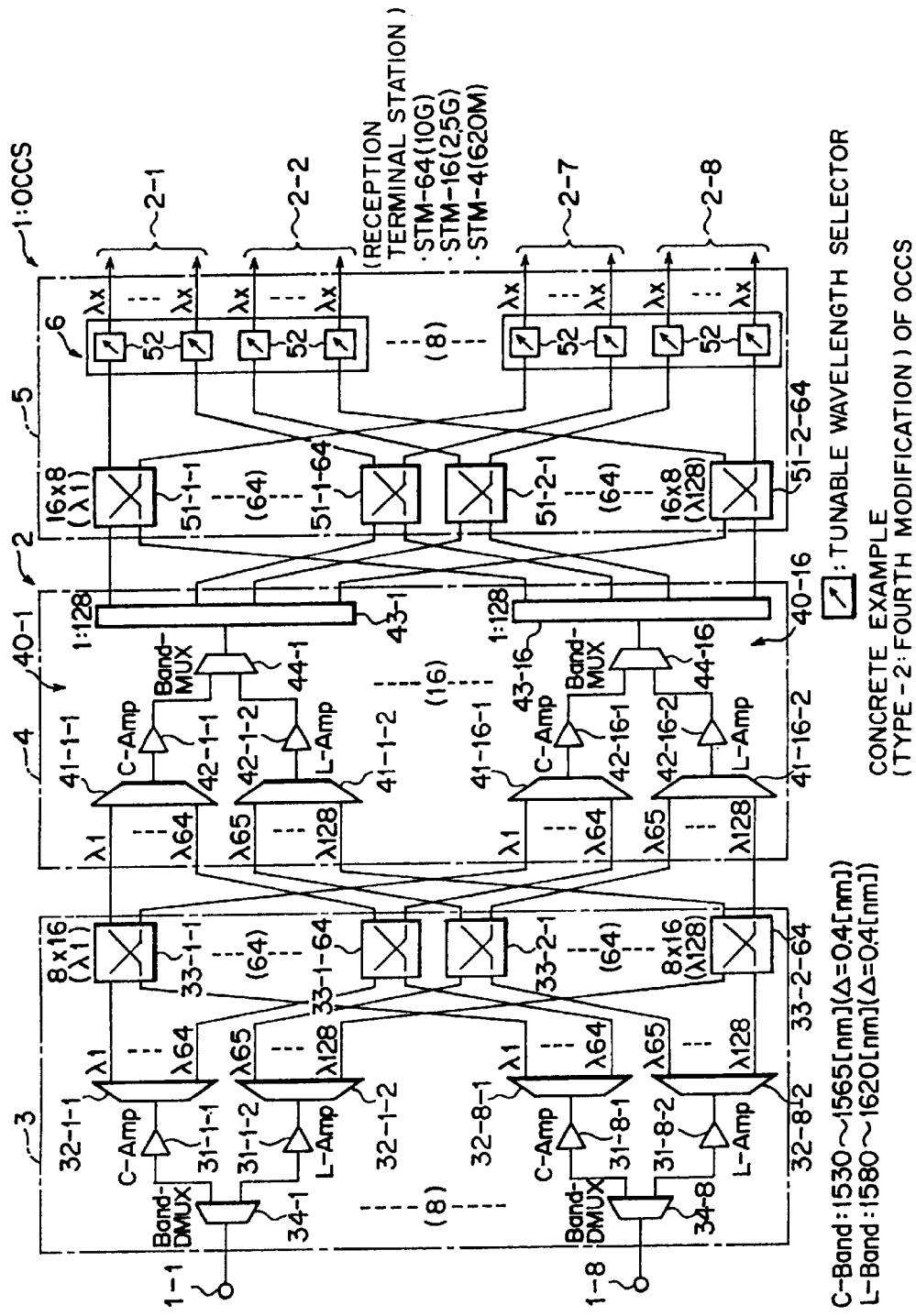
FIG. 18 is a block diagram showing a concrete example of the OCCS (Type-2: fourth modification) according to this embodiment.
Figure 21:
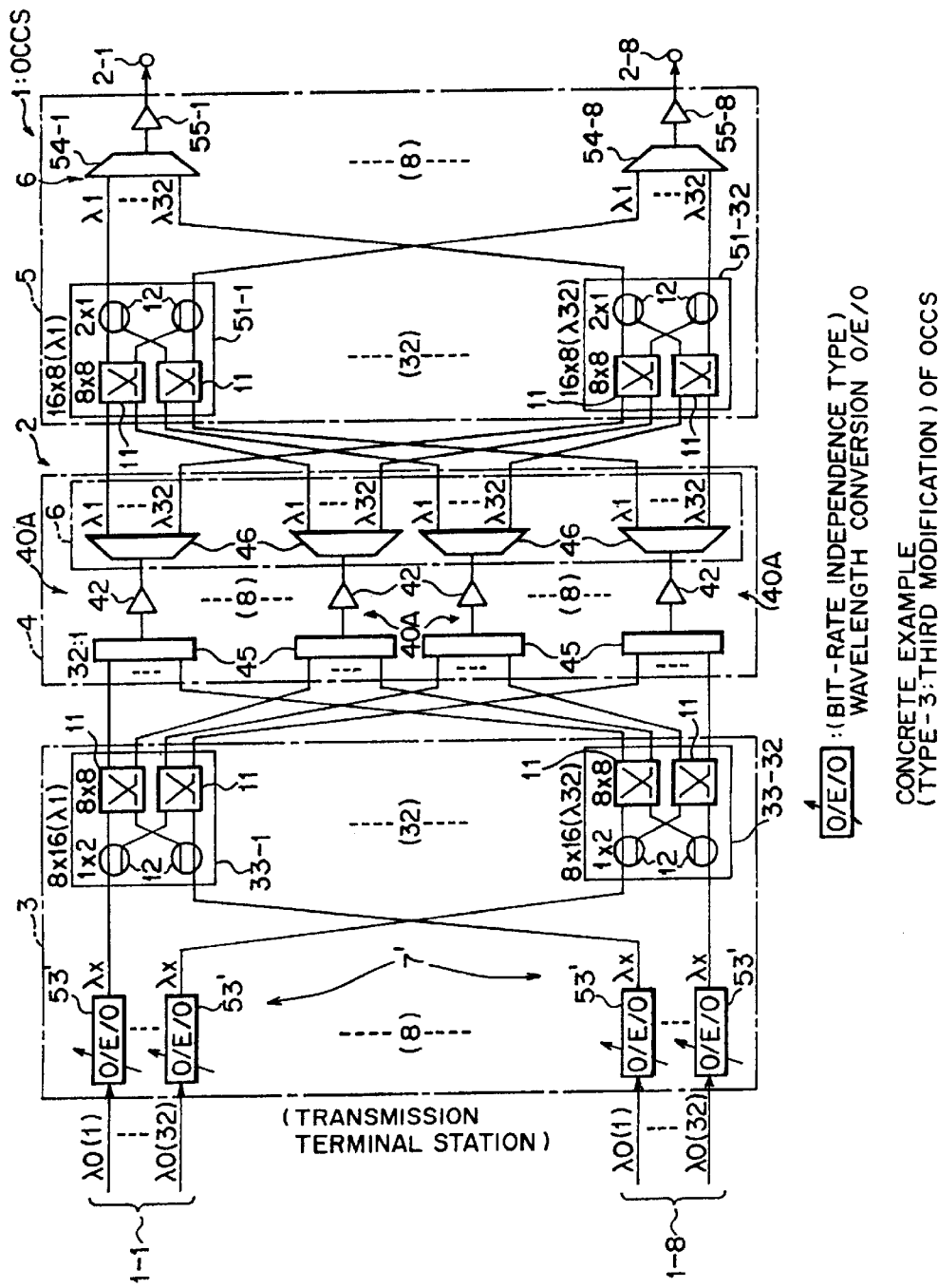
FIG. 21 is a block diagram showing a concrete example of the OCCS (Type-3: third modification) according to this embodiment.

In the OCCS 1 (Type-3: third modification) shown in FIG. 21, as with the OCCSs 1 shown in FIGS. 13 and 17, the optical demultiplexers 32-1 to 32-8 (the optical amplifiers 31-1 to 31-8) are removed with respect to all the input ports 1-1 to 1-8 so that, in connection with all the input ports, the remaining wavelength converters 53' convert adding optical signals of arbitrary wavelengths λ0 into optical signals of predetermined wavelengths λj and send them to the optical routing section 2. That is, each of the output ports 2-1 to 2-8 only accommodate the 32-wavelength multiplexed optical signal.

Thus, this OCCS 1 (Type-3: third modification), in the distribution type optical networks in which transmission is made from one basic point to a plurality of points, also can add an optical signal with an arbitrary wavelength λ0 into a idle channel of the arbitrary input ports 1-1 to 1-8 to convert that optical signal into an optical signal of a desired wavelength λj, and send it through the desired output port 2-1 to 2-8 (that is, it can be used for a point-to-multipoint type WDM transmission terminal station).

Figure 22:
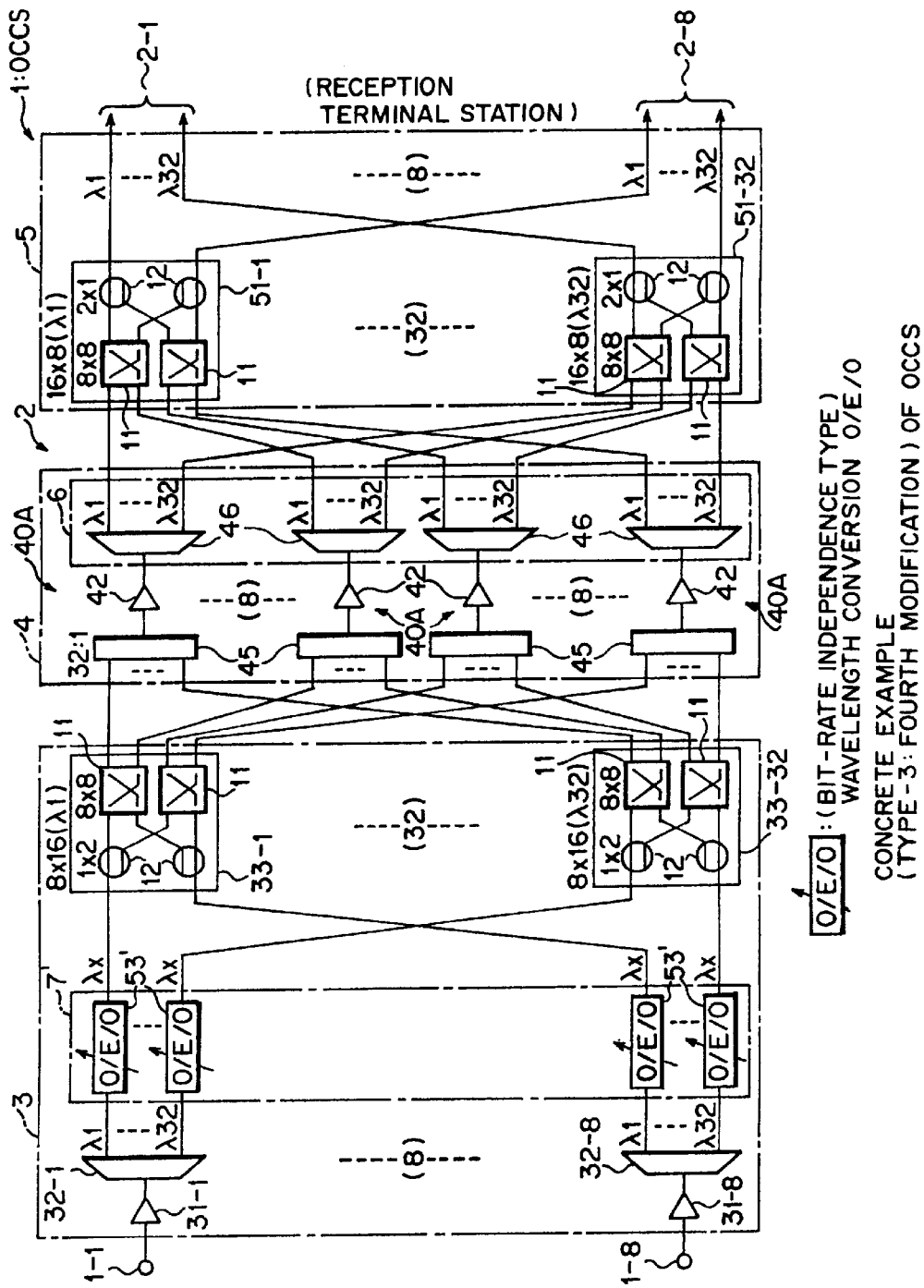
FIG. 22 is a block diagram showing a concrete example of the OCCS (Type-3: fourth modification) according to this embodiment.
Figure 23:
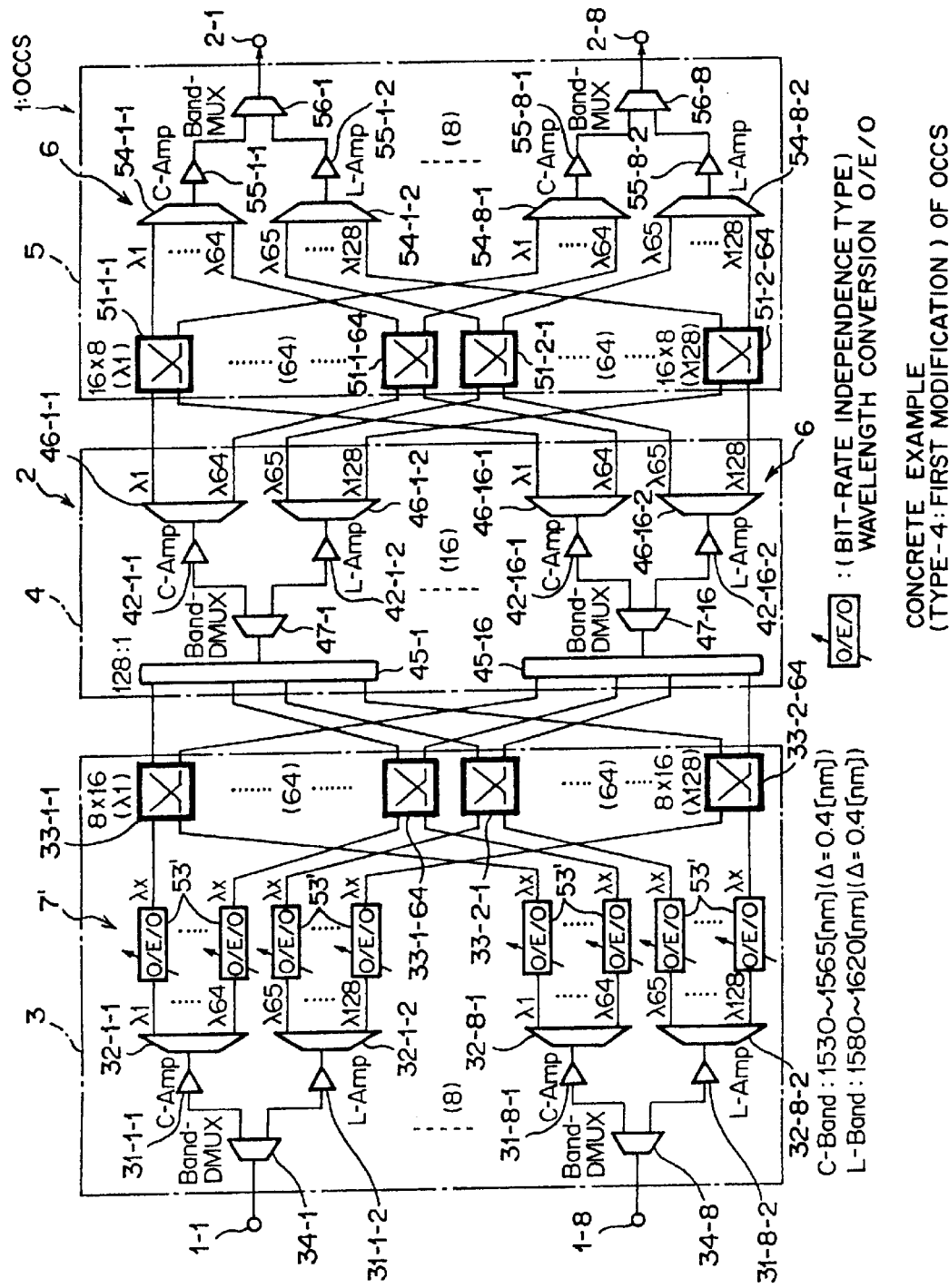
FIG. 23 is a block diagram showing a concrete example of the OCCS (Type-4: first modification) according to this embodiment.
Figure 24:
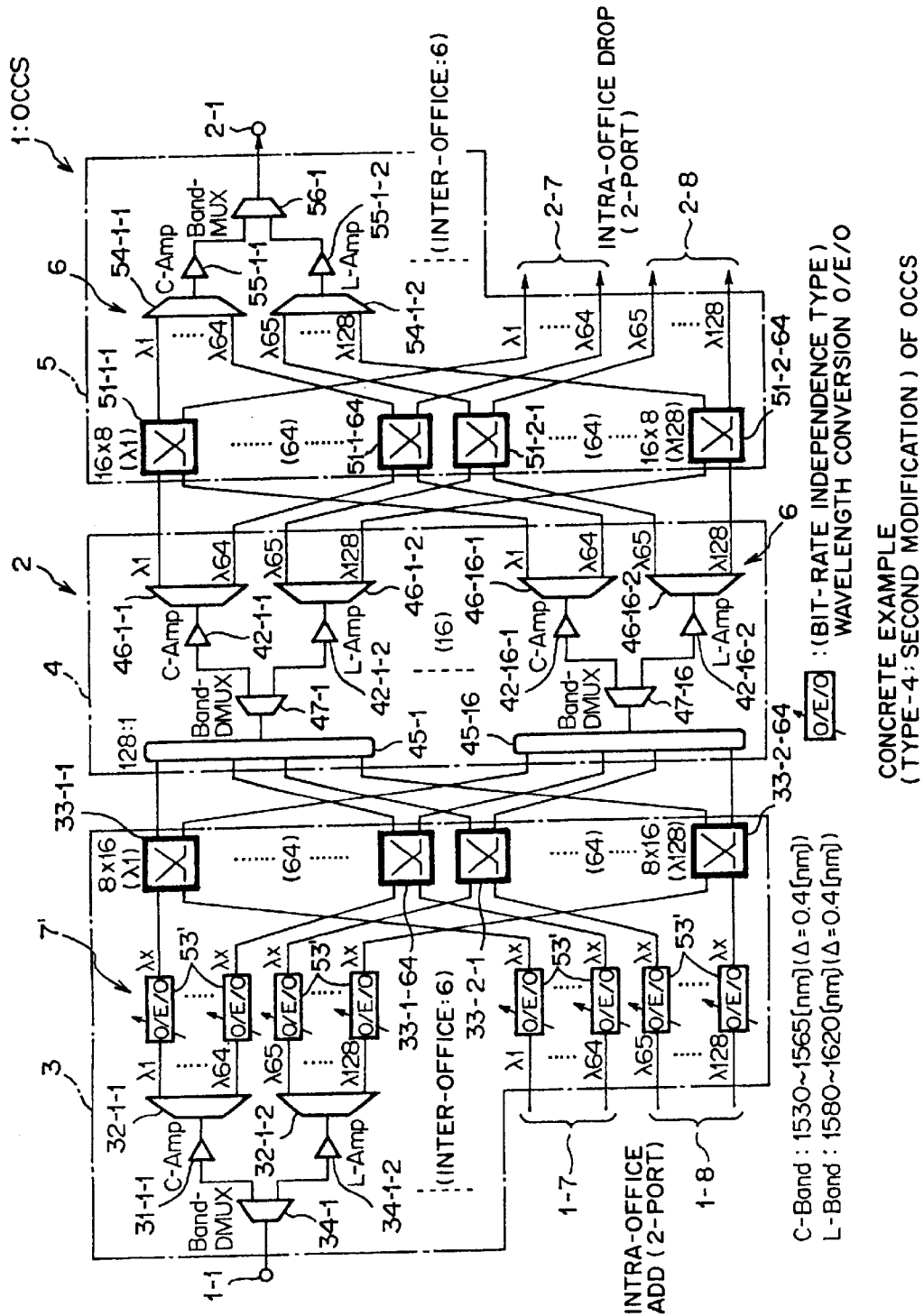
FIG. 24 is a block diagram showing a concrete example of the OCCS (Type-4: second modification) according to this embodiment.
Figure 25:
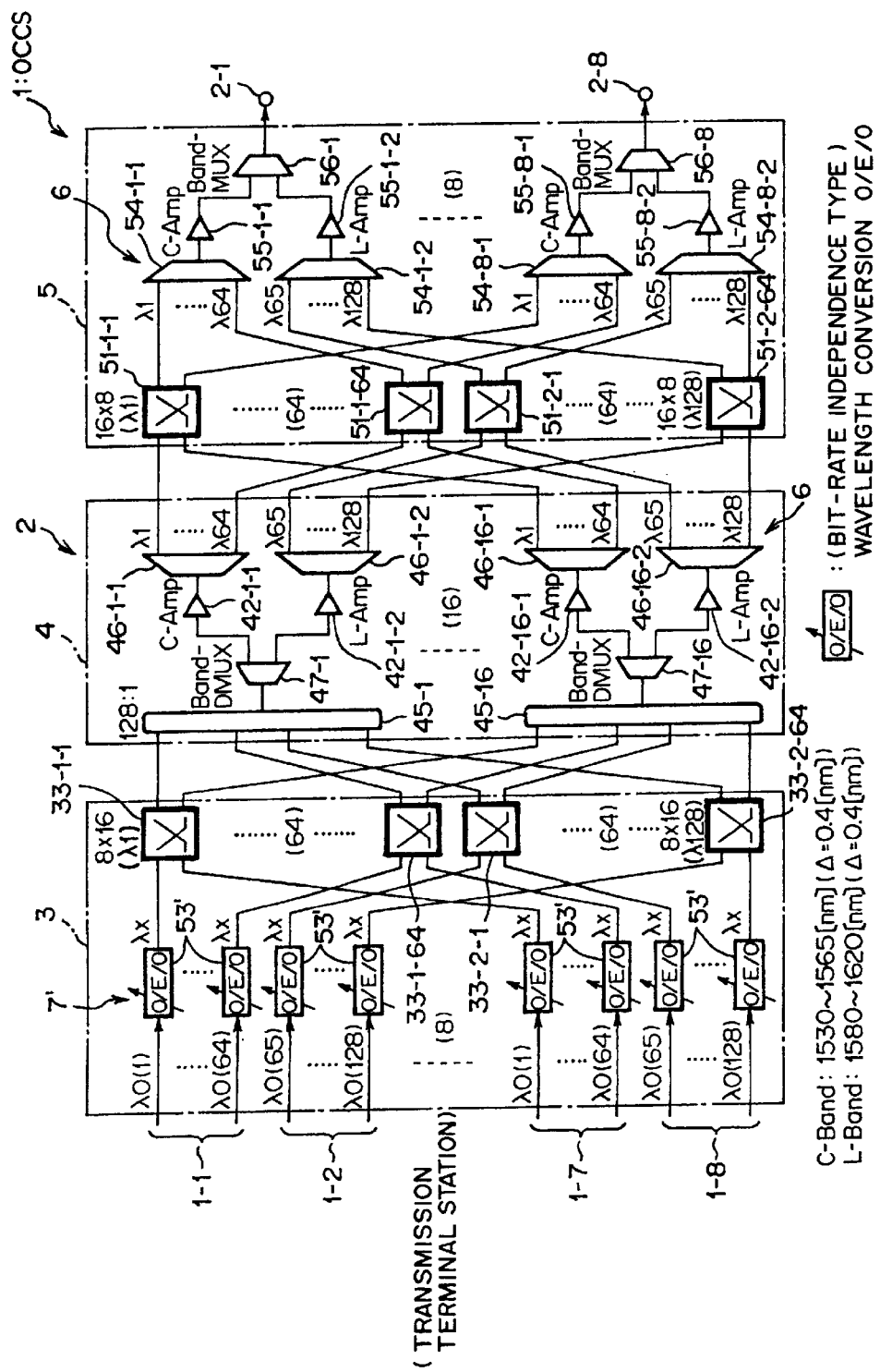
FIG. 25 is a block diagram showing a concrete example of the OCCS (Type-4: third modification) according to this embodiment.
Figure 26:
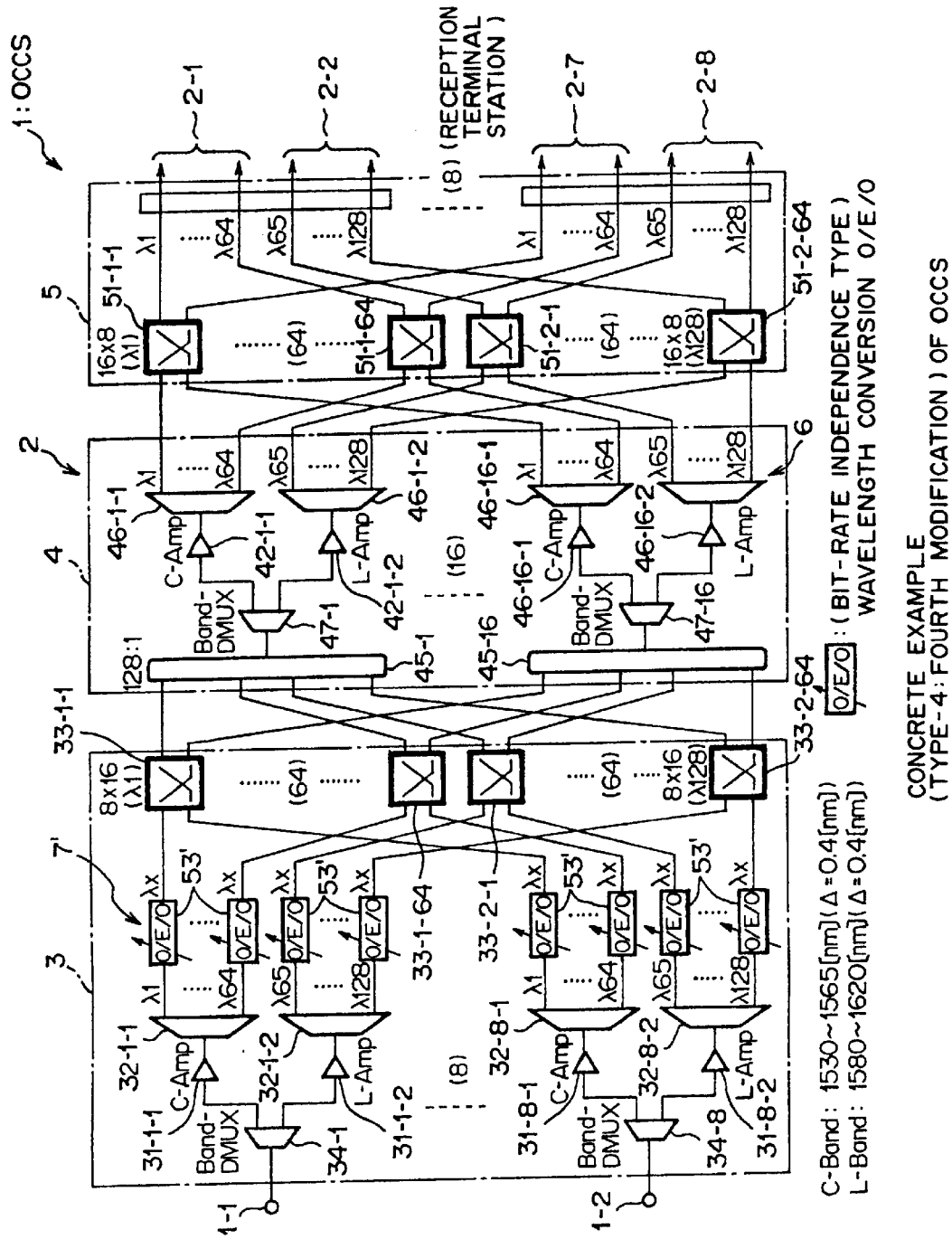
FIG. 26 is a block diagram showing a concrete example of the OCCS (Type-4: fourth modification) according to this embodiment.

In the OCCS 1 (type-3: fourth modification) shown in FIG. 22, contrary to the OCCS 1 shown in FIG. 21, the optical multiplexers 54-1 to 54-8 (the optical amplifiers 55-1 to 55-8) are removed with respect to all the output ports 2-1 to 2-8, thereby branching the optical signals of arbitrary wavelengths λj after the routing by the optical switches 51-1 to 51-8.

Thus, this OCCS 1 (Type-3: fourth modification), in the distribution type optical networks in which transmission is made from a plurality of points to one basic point, also can convert optical signals from arbitrary input ports 1-1 to 1-8 into desired wavelengths λj and receive them from arbitrary idle channel (that is, it can be used for a multipoint-to-point type WDM reception terminal station).

Accordingly, through the use of the OCCSs 1 (Type-3: first to fourth modifications) thus constructed, it is also possible to construct optical networks meeting the user's needs in various applications. The OCCS 1 (Type-7) can also take four kinds of configurations similar to those described above.

FIGS. 23 to 26 are block diagrams showing, as in the cases described above with reference to FIGS. 15 to 18, four kinds (first to fourth modifications) of concrete examples of the above-described OCCS 1 (Type-4) of FIG. 4 in cases in which the numbers of input ports and output ports are taken to be 8 (that is, the aforesaid k=8), optical signals of two kinds (that is, the aforesaid M=2) wavelength bands [C-Band (=the aforesaid Band-1: 1530 to 1565 (nm), L-Band (=the aforesaid Band-2 : 1580 to 1620 (nm)] are accommodated per port, the numbers n1, n2 of wavelengths to be multiplexed in the wavelength bands are taken as 64 (λ1 to λ64 and λ65 to λ128, totaling 128 waves), that is, the number N of input/output channels is taken as N=2×64×8= 1024 and the interval Δ of the wavelengths λ1 to λ64 (λ65 to λ128) is taken as Δ=0.4 (nm).

FIGS. 23 to 26 show, the OCCS 1 (Type-4) can assume four kinds of configurations: a "router dedicated configuration (first modification)", a "standardized configuration (second modification)", as "configuration for point-to-multipoint type WDM transmission terminal station (third modification)", and a "configuration for multipoint-to-point type WDM reception terminal station (fourth modification)", thus permitting the constructions of optical networks meeting the user's needs in various applications. Additionally, the OCCS 1 (Type-8) shown in FIG. 8 also can take four kinds of configurations similar thereto.

FIGS. 27 to 30 are block diagrams showing, in the basic configuration (Type-1) shown in FIG. 1, a configuration in the case in which the numbers of input and output ports are set at 2 in total, that is, inter-office port=1 and intra-port=1, (namely, the aforesaid k=2) and the OCCS 1 is used as an OADM (Optical Add Drop Multiplexer).

That is, in this case, the optical switches 33-j and the optical switches 51-j are constructed as 2×4 switches and 4×2 switches 12, respectively, each of which basically comprises a 2×2 switch 11 and a 1×2 switch 12. Furthermore, also in this case, each of the wavelength converters 53 shown in FIG.1 is constructed as a bit rate independence type O/E/O in FIGS. 27 to 30.

Figure 27:
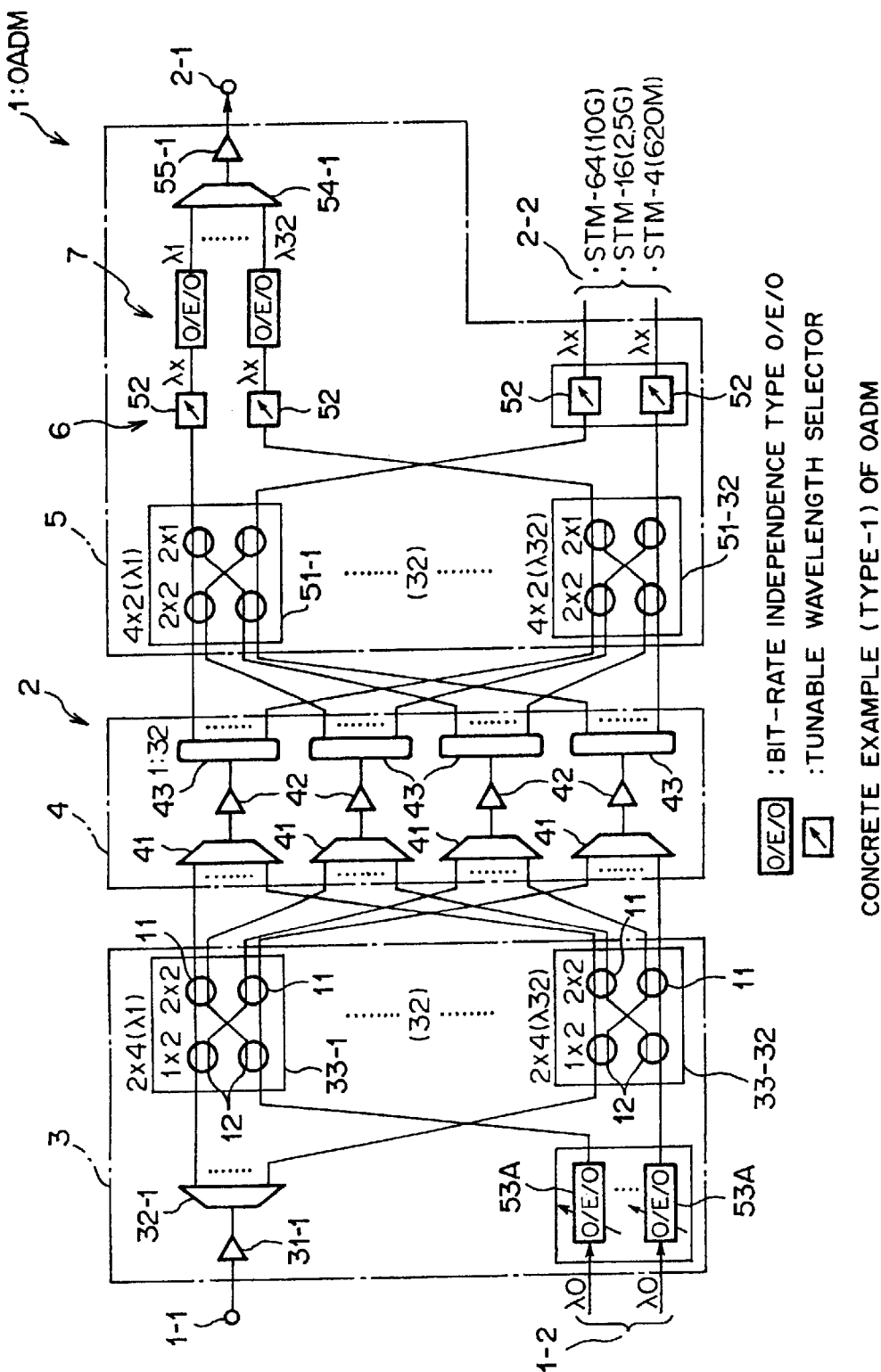
FIG. 27 is a block diagram showing a configuration of an OADM (Type-1) according to this embodiment.
Figure 28:
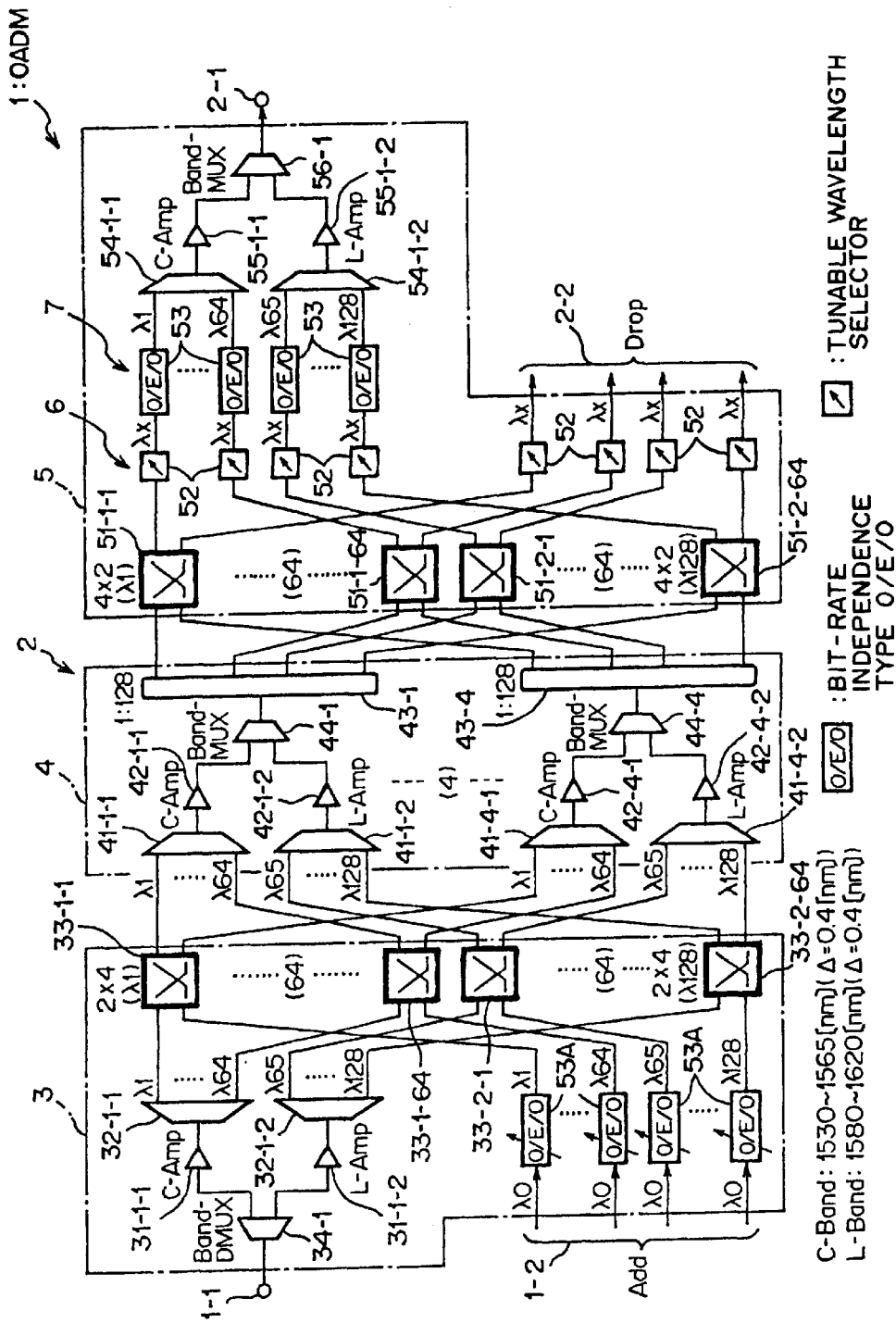
FIG. 28 is a block diagram showing a configuration of an OADM (Type-2) according to this embodiment.
Figure 29:
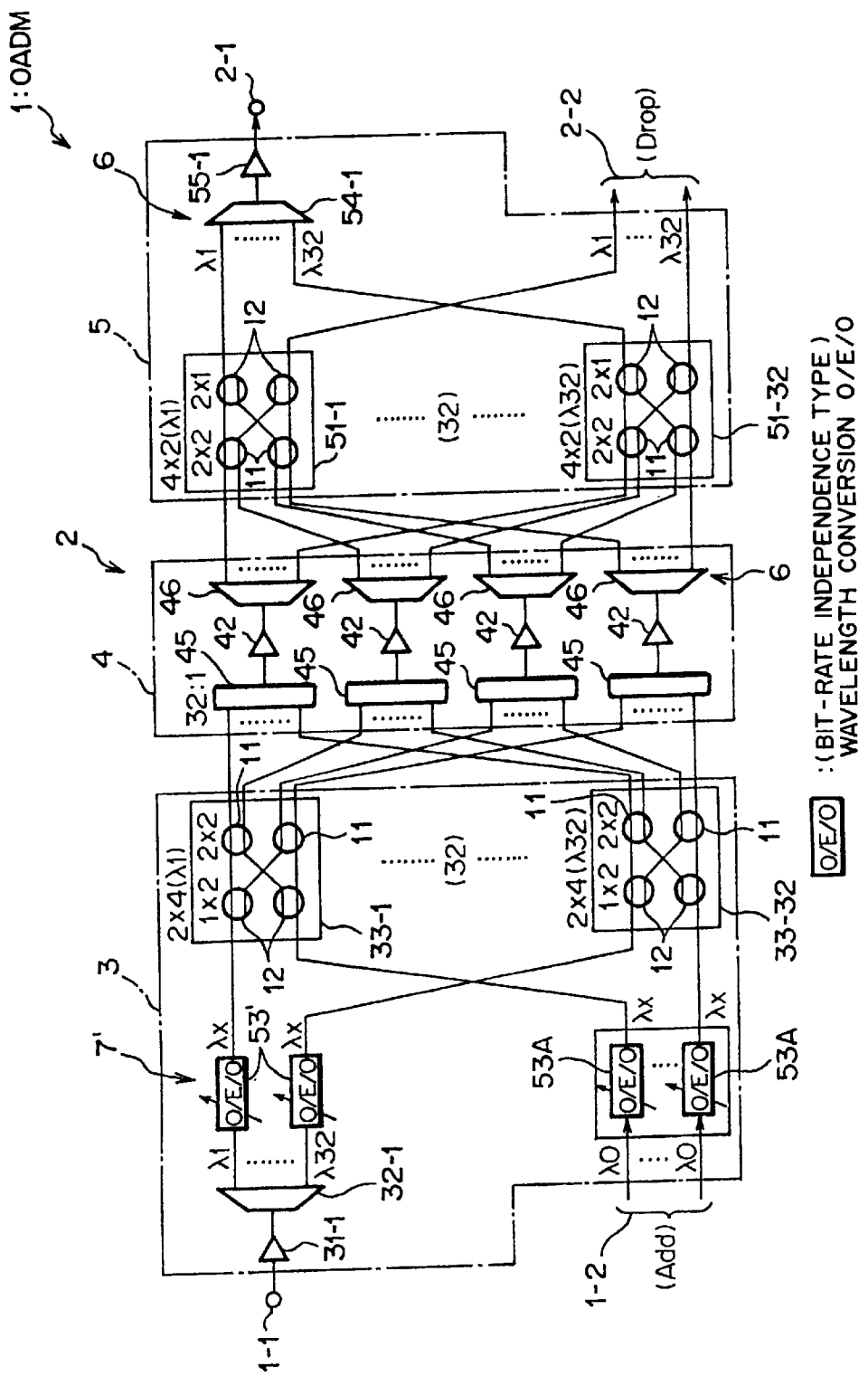
FIG. 29 is a block diagram showing a configuration of an OADM (Type-3) according to this embodiment.
Figure 30:
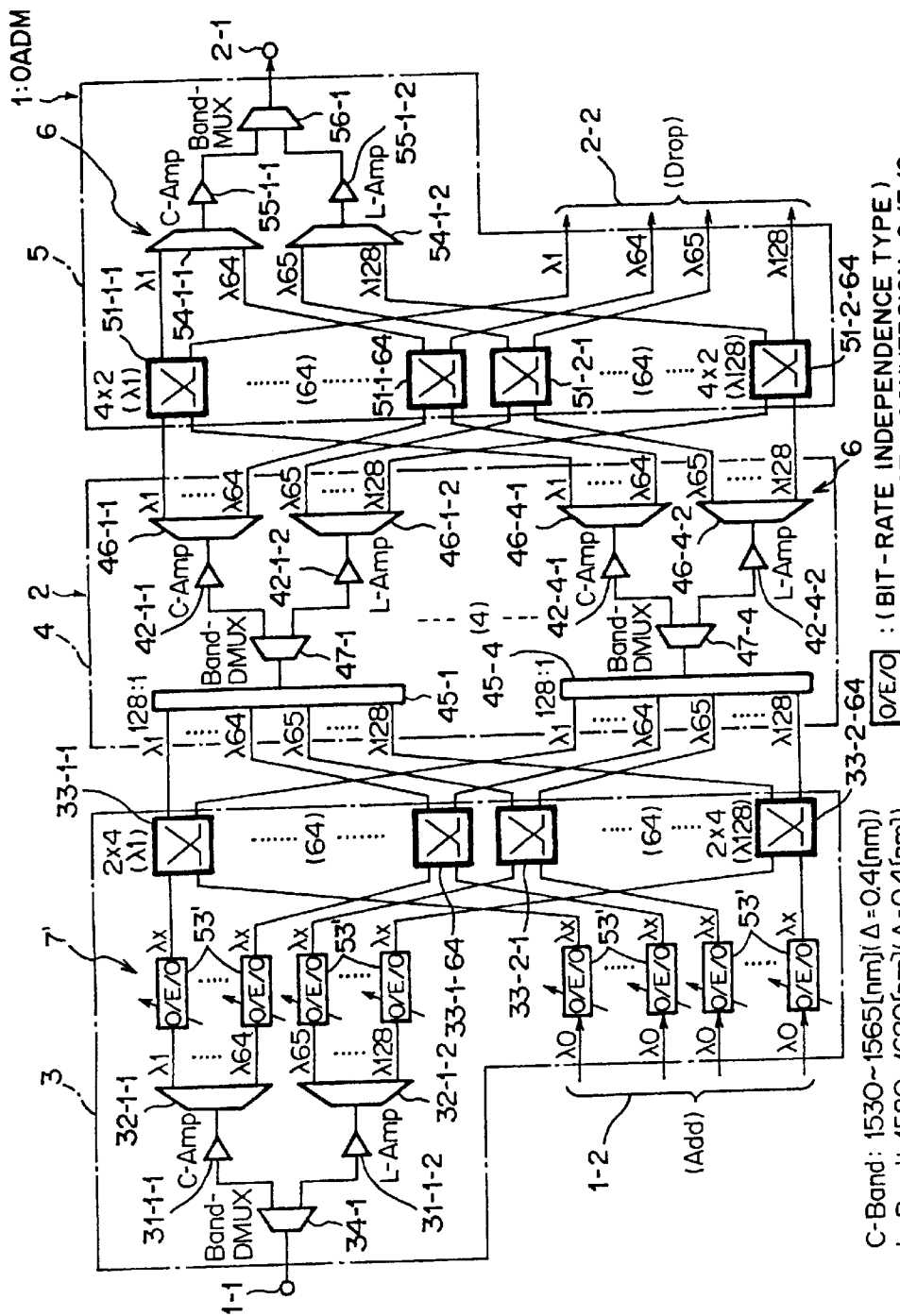
FIG. 30 is a block diagram showing a configuration of an OADM (Type-4) according to this embodiment.

Basically, the operation of the OADM (Type-1) 1 shown in FIG. 27 is similar to that of the OCCS 1 (Type-1) shown in FIG. 1, the operation of the OADM (Type-2) 1 shown in FIG. 28 is similar to that of the OCCS 1 (Type-2) shown in FIG. 2, the operation of the OADM (Type-3) shown in FIG. 29 is similar to that of the OCCS 1 (Type-3) shown in FIG. 3, and the operation of the OADM (Type-4) shown in FIG. 30 is similar to that of the OCCS 1 (Type-4) shown in FIG. 4. Accordingly, any type of the OADM 1 can cope with an increase in number of accommodation wavelengths without changing the basic switch size.

As described above, the OADM 1 based on the OCCS 1 differs from the existing OADM in having a wavelength conversion function in addition to an optical signal add/drop function, so that the add/drop of an optical signal with an arbitrary wavelength λj becomes possible, thus flexibly handling the needs on network constructions. Incidentally, this OADM 1 is applicable, for example, to a case in which ring networks existing independently are connected to each other. Additionally, the OADMs 1 described above can also be constructed on the basis of the OCCS 1 shown in FIGS. 5 to 8.

(C) Description of Optical Network

Figure 31:
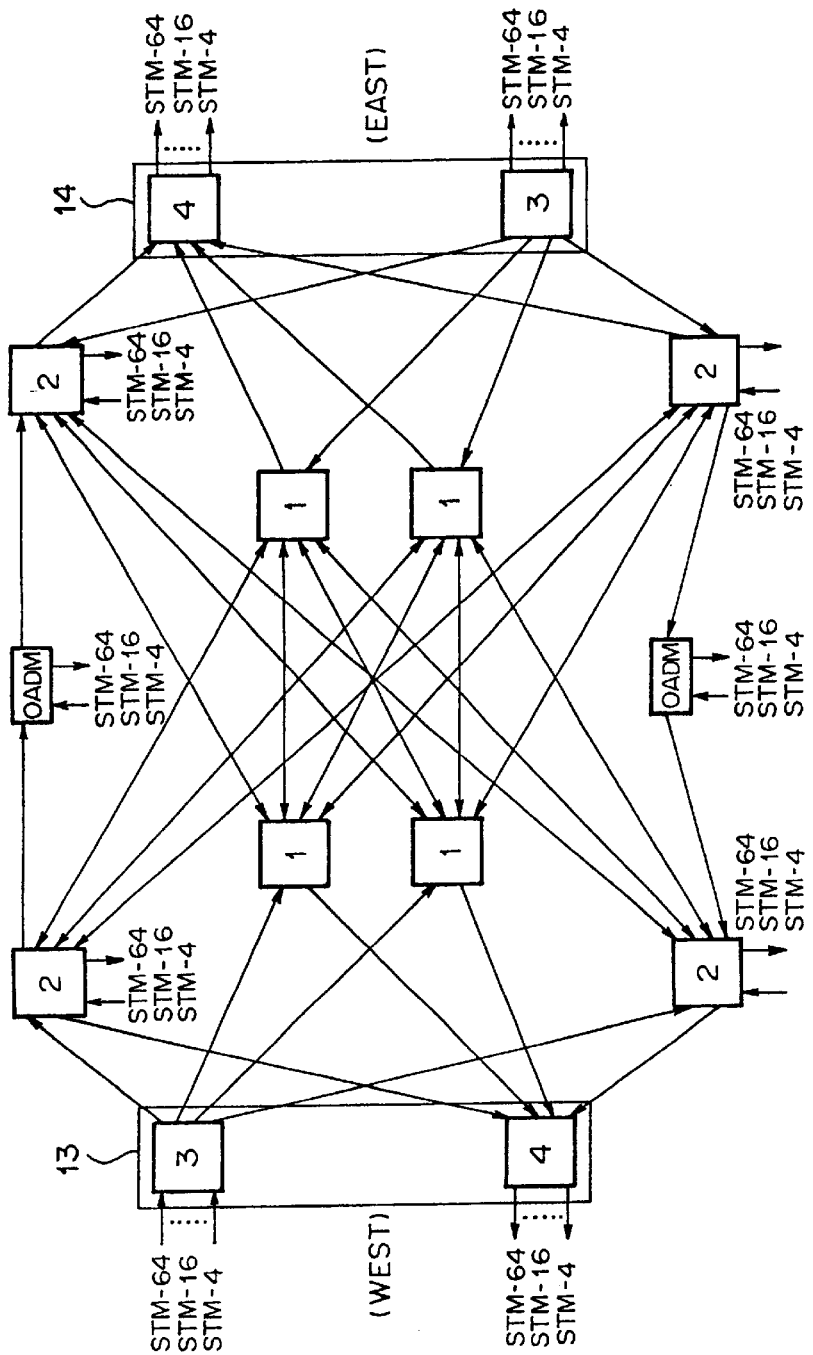
FIG. 31 is a block diagram showing, as one example, an optical network constructed through the use of the OCCS according to this embodiment.

FIG. 31 is a block diagram showing one example of optical network constructed with the above-described OCCSs 1 (Type-s: first to fourth modifications; where s=1 to 8).

As FIG. 31 shows, point-to-multipoint type (Type-s: third modification) and multipoint-to-point type (Type-s: fourth modification) OCCSs 1, indicated at reference numerals 13 and 14, are installed in communication basic point cities lying the West and the East, and standardized (Type-s: second modification) OCCSs 1 or OADMs 1 (Type-s) are located in relaying point cities lying therebetween. Additionally, router type OCCSs 1 are situated on the sea where no communication demand exists.

Furthermore, when these OCCSs (OADMs) 1 are connected in a mesh-like fashion, it becomes possible to construct a high-reliability optical network capable of setting various alternative routes at transmission line troubles. The optical network shown in FIG. 31 does not always require that all the OCCSs used here are the OCCSs 1 described above, but it is also acceptable that some OCCSs are the existing OCCSs or WDM transmission apparatus.

This means that it is also appropriate that the optical network shown in FIG. 31 is equipped with at least one OCCS 1 and this OCCS 1 is constructed as any one of the various types of OCCSs 1 (Type-s: first to fourth modifications). For example, even if a mesh-like optical network is constructed by using one point-to-multipoint type (Type-s: third modification) or multipoint-to-point type (Type-s: fourth modification) OCCS 1 and by using the existing WDM transmission apparatus as other OCCSs or the like, since various alternative routes can be set in preparation for occurrence of troubles, it is possible to construct a high-reliability optical network.

(D) Description of Second Concrete Example of OCCS

Secondly, referring to FIGS. 32 to 58C, a description will be given hereinbelow of a second concrete example (first to fourth modes) of an OCCS. In a case in which an OCCS is constructed actually, although there is a need to install optical amplifiers or the like for compensating for optical losses, because the point of this embodiment does not depend upon the installation locations of the optical amplifiers or the number thereof, the optical amplifiers will be omitted from the following description and the corresponding drawings. Additionally, demultiplexers for branching a wavelength multiplexed optical signal from an input port according to wavelength and multiplexers for producing a wavelength multiplexed optical signal to an output port will be omitted likewise.

(D1) Description of First Mode

Figure 32:
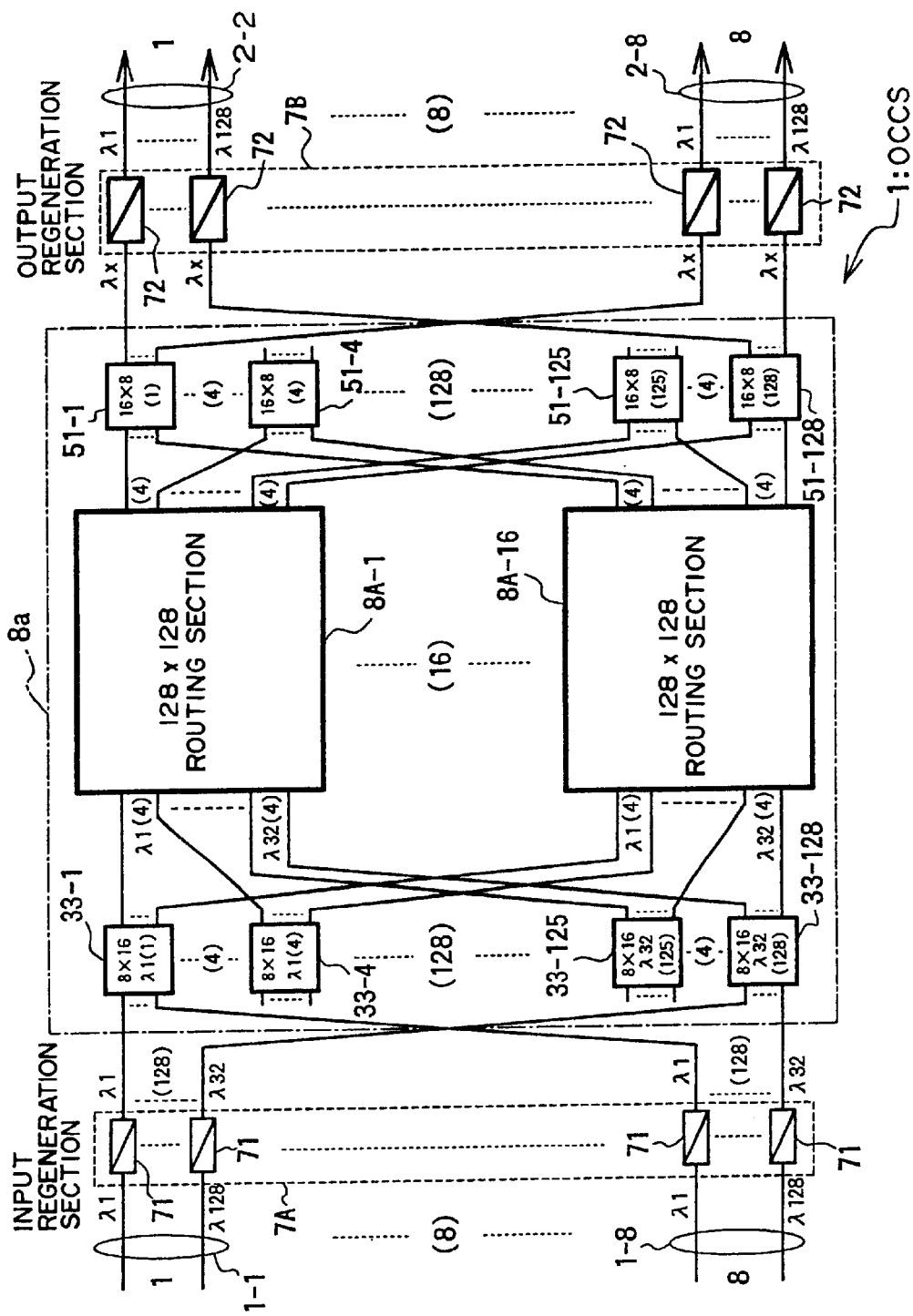
FIG. 32 is a block diagram showing a configuration of an OCCS (first mode) according to a second concrete example of this invention.

FIG. 32 is a block diagram showing an OCCS (first mode) according to a second concrete example of this invention. The OCCS 1 shown in FIG. 32 is constructed in a case in which the number k of input/output ports [input/output transmission lines (input/output optical fibers)] is taken to be k=8 [input ports (which sometimes will be referred to hereinafter as "input transmission lines") 1-1 to 1-8, and output ports (which sometimes will be referred to hereinafter as "output transmission lines") 2-1 to 2-8] and the number n of accommodation wavelengths per port (the number of wavelengths to be multiplexed) is taken as n=128 ($\lambda 1$ to $\lambda 128$) (that is, the number of accommodation channels=k× n=1024). This OCCS 1 is made up of an input regeneration section 7A, a routing section 8a and an output regeneration section 7B.

Figure 33:
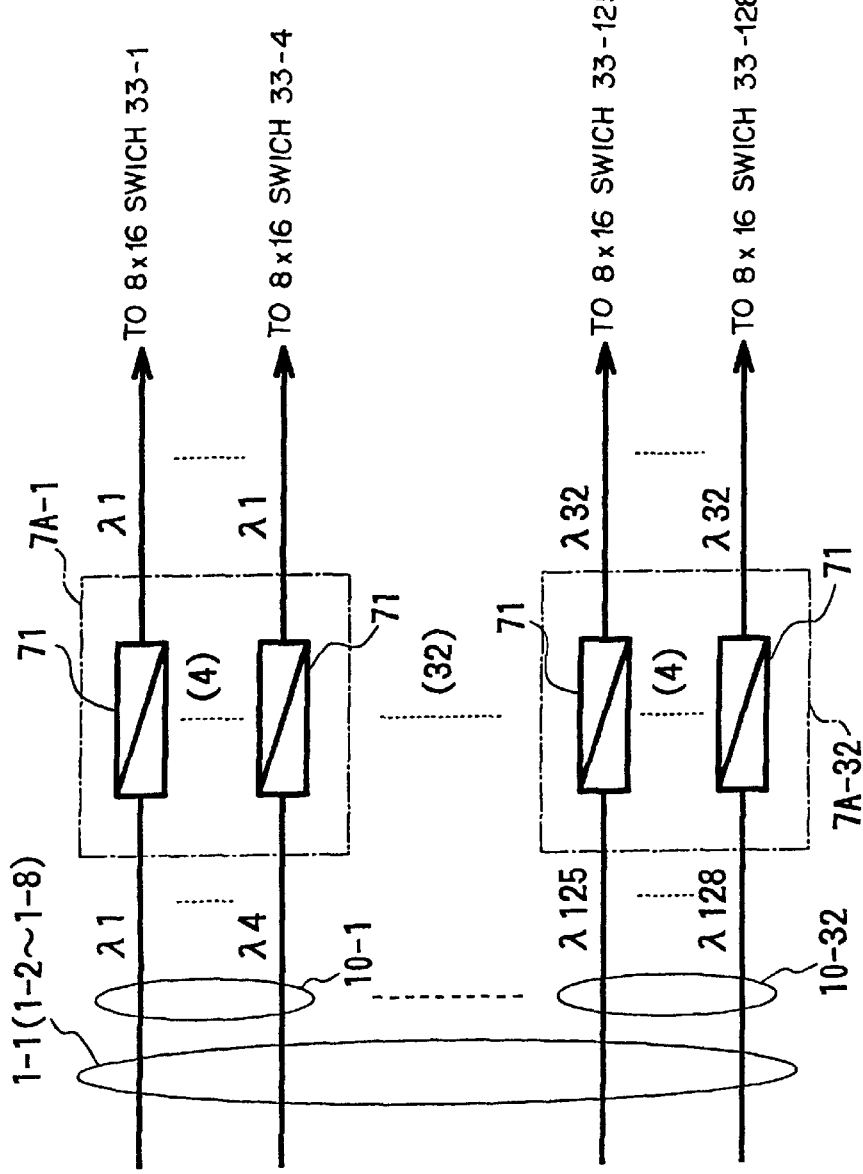
FIG. 33 is a block diagram showing an input regeneration section shown in FIG. 32.

In this configuration, the input regeneration section (input wavelength converting section) 7A is for converting an 128-wavelength ($\lambda 1$ to $\lambda 128$) optical signal, inputted through each of the input ports (which sometimes will be referred to hereinafter as "input transmission lines") 1-1 to 1-8, into m (for example, m=32) intra-apparatus wavelengths ($\lambda 1$ to $\lambda 32$) less in number than the inputted wavelengths ($\lambda 1$ to $\lambda 128$). Therefore, as FIG. 33 shows, the input ports 1-i are divided into sub-port groups 10-1 to 10-32 each comprising p=n/m=128/32=4 (<k) sub-ports, and in connection with the sub-port groups 10-r (r=1 to 32), sub-port wavelength converting sections (fixed wavelength converting sections) 7A-1 to 7A-32 are provided, each of which comprises four (fixed) wavelength converters (REGs) 71 for converting four kinds of input wavelengths into the same intra-apparatus wavelength $\lambda r$.

That is, in this input regeneration section 7A, the 128-wavelength optical signals from the input ports 1-i are processed in the sub-port wavelength converting sections 7A-r (k×n=8×128=1024 wavelength converters 71) so that the 128 wavelengths are divided into groups each comprising four wavelengths and the four wavelengths pertaining to each of the groups are converted into the same (intra-apparatus) wavelength $\lambda r$ (for example, the wavelengths $\lambda 1$ to $\lambda 4$ are converted into the wavelength $\lambda 1$, the wavelengths $\lambda 5$ to $\lambda 8$ are converted into the wavelength $\lambda 2$). This decreases the number of wavelengths to be handled in the apparatus to $^{32}/_{128}=\frac{1}{4}$. In this case, since the input wavelength $\lambda 1$ becomes the same $\lambda 1$ even after the conversion into the intra-apparatus wavelength, the wavelength converter 71 for $\lambda 1$ is omissible.

Furthermore, the routing section 8a is for routing, to desired output ports 2-i, the optical signals wavelength-converted into four sets of 32 intra-apparatus wavelengths $\lambda 1$ to $\lambda 32$ in the input regeneration section 7A as mentioned above. In this embodiment, the existence of the four sets of intra-apparatus wavelengths $\lambda 1$ to $\lambda 32$ requires the routing conducted to prevent the optical signals with the same wavelength $\lambda r$ from colliding with each other.

Figure 34:
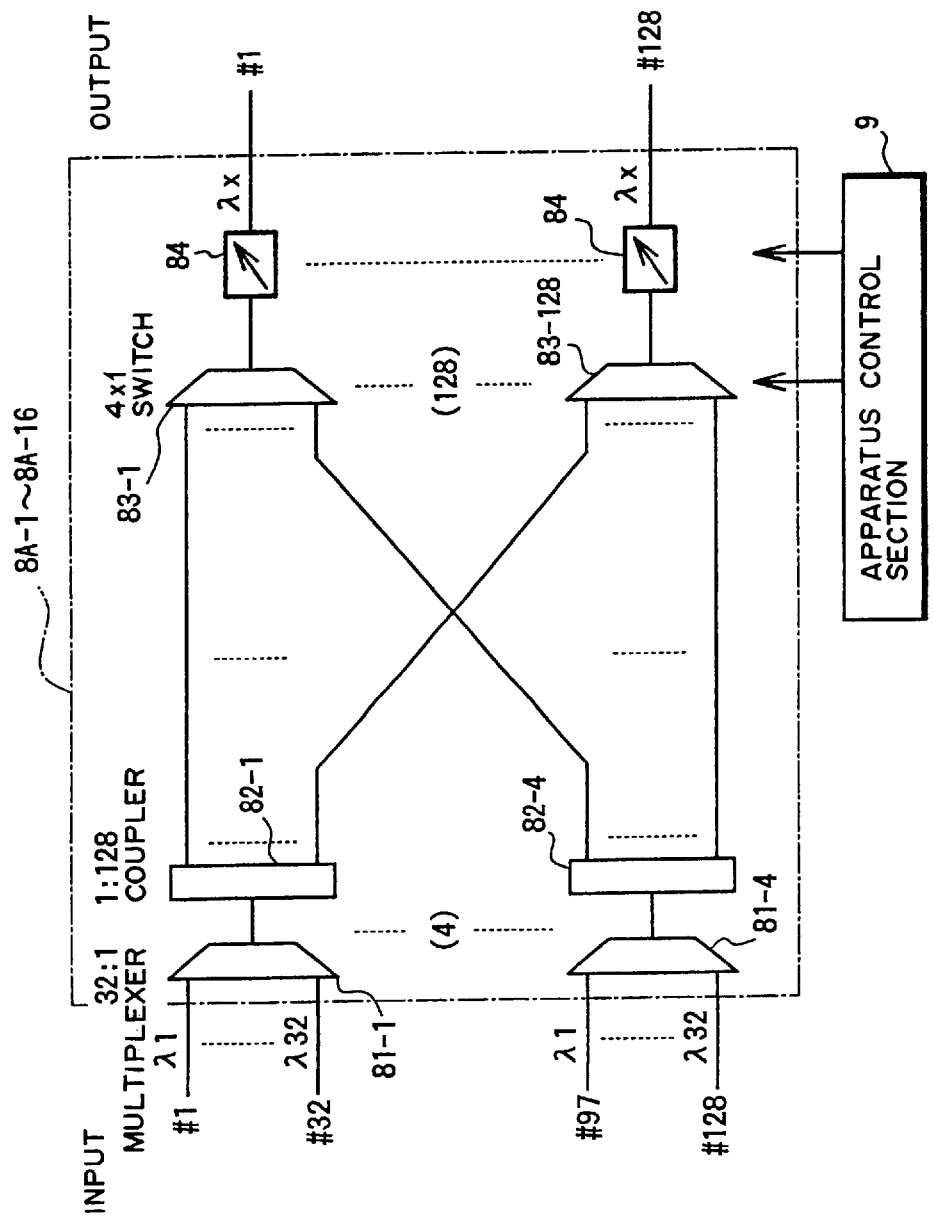
FIG. 34 is a block diagram showing a 128×128 routing section shown in FIG. 32.

For this reason, in the routing section 8a according to this embodiment, as shown in FIG. 32, in addition to k×2k (namely, 8×16) optical space switch circuits 33-1 to 33-128 and 2k×k (16×8) optical space switch circuits 51-1 to 51-128 which are similar to those in the above-described optical input switch section 3, there are provided 2k (=16) n×n (=128×128) routing sections 8A-1 to 8A-2k (=16) each having an arrangement, for example, shown in FIG. 34. In the following description, the "optical space switch circuit" is referred to simply as "switch" or "optical switch".

That is, in this routing section 8a, as shown in FIG. 34, there are provided 2k (=16) 128×128 routing sections 8A-s (s=1 to 2k) each comprising p (=4) 32:1 multiplexers 81-1 to 81-4, p (=4) 1:128 couplers 82-1 to 82-4, n (=128) p (=4)×1 switches, 83-1 to 83-128, and n (=128) tunable wavelength selectors (variable wavelength selectors) 84 for m (=32) wavelengths.

The 8×16 switches 33-j (j=1 to 128) concentrate the outputs (optical signals of the four sets of intra-apparatus wavelengths $\lambda 1$ to $\lambda 32$) of the wavelength converters 71 according to the identification of input wavelength $\lambda j$ arriving at the input ports 1-i (namely, according to input wavelength identification before the wavelength conversion) for routing them to an arbitrary output (any one of 128×128 routing sections 8A-1 to 8A-16) of 16 outputs (switch ports; routes). That is, these 8×16 switches 33-j are provided at every identical wavelength $\lambda j$, with one 8×16 switch 33-j corresponding to one input wavelength $\lambda j$.

In other words, in the 8×16 switch 33-1, optical signals of the input wavelength $\lambda 1$ coming in the input ports 1-1 to 1-8 are concentrated, while in the 8×16 switch 33-2, the optical signals of the input wavelength $\lambda 2$ coming in the input ports 1-1 to 1-8 are concentrated. Likewise, in the 8×16 switch 33-128, optical signals of the input wavelength $\lambda 128$ coming in the input ports 1-1 to 1-8 are concentrated. The concentrated optical signals are routed to any one of the 16 outputs.

Furthermore, in each of the 128×128 routing sections 8A-1 to 8A-16, each of the 32:1 multiplexers 81-1 to 81-4 concentrates each (different intra-apparatus wavelengths $\lambda 1$ to $\lambda 32$) of sets of the outputs (switch ports #1 to #128; four sets of intra-apparatus wavelengths $\lambda 1$ to $\lambda 32$) of the 8×16 switch 33-j and multiplexes (wavelength-multiplexes), while each of the 1:128 couplers 82-1 to 82-4 distributes the output (32 WDM signal) of the corresponding one of the 32:1 multiplexers 81-1 to 81-4 in the form of 128 optical signals.

That is, the sets of the 32:1 multiplexers 81-q [q=1 to p (=4)] and the 1:128 couplers 82-q function as p (=4) m:n multiplexing/distributing sections each of which 32-wavelength-multiplexes m (=32) kinds of optical signals of intra-apparatus wavelengths $\lambda 1$ to $\lambda 32$ from the 8×16 switches 33-1 to 33-128 for distributing the resultant 32-WDM signal (intra-apparatus wavelength multiplexed optical signal) as n (=128) optical signals.

Still furthermore, the aforesaid 4×1 (p×1) switches 83-1 to 83-128 concentrate one outputs (32-WDM signals) of the 4×128 systems from the 1:128 (1:n) couplers 82-1 to 82-4, namely, each concentrating four outputs in total, for selecting any one of these four sets of 32-WDM signals under the control of an apparatus control section 9. The tunable wavelength selectors (variable wavelength filters) 84 select optical signals of desired intra-apparatus wavelengths $\lambda x$ (x=1 to 32) from the 32-wavelength multiplexed optical signals, selected by the 4×1 switches 83-1 to 83-128, under the control of the apparatus control section 9.

That is, the 128×128 routing sections 8A-1 to 8A-16 concentrate the optical signals of the same intra-apparatus wavelength $\lambda r$ of the optical signals of four sets of intra-apparatus wavelengths $\lambda 1$ to $\lambda 32$, routed by the 8×16 switches 33-1 to 33-128, by p (p=4) for 32-wavelength-multiplexing the optical signals of different intra-apparatus wavelengths $\lambda r$, and distributively route each of the resultant 32-WDM signals to the 16×8 switches 51-1 to 51-128.

The aforesaid apparatus control section 9 not only controls the 4×1 switches 83-1 to 83-128 and the tunable wavelength selectors 84, but also performs the control of the routing to the 8×16 switches 33-j and the 16×8 switches 51-j and the control needed for the entire apparatus.

The 16×8 switches 51-j concentrate the outputs (optical signals of intra-apparatus wavelengths $\lambda x$) of the 128×128 routing sections 8A-1 to 8A-16 in units of intra-apparatus wavelengths (converted wavelengths) to be converted into the same output wavelength $\lambda j$, and send them to desired routes (namely, desired output ports 2-i) of the 8 outputs (routes). That is, one 16×8 switch 51-j corresponds to one converted wavelength (output wavelength) $\lambda j$. For example, in FIG. 32, the uppermost 16×8 switch 51-1 is connected to the output wavelength line to each of the output ports 2-i, while the lowermost 16×8 switch 51-128 is connected to the output wavelength λ128 line to each of the output ports 2-i.

As seen from the above-described configuration, in this embodiment, the routing section 8a functions as a wavelength multiplexing/distribution routing section for wavelength-multiplexing the optical signals of the intra-apparatus wavelengths λ1 to λ32 from the input regeneration section 7A to dristributively route the resultant 32-WDM signals (intra-apparatus wavelength multiplexed optical signals) to the desired output ports 2-i as optical signals including desired output wavelengths λj, while the tunable wavelength selectors 84 constitute an optical wavelength selecting section which selects optical signals of desired intra-apparatus wavelengths λr from the 32-WDM signals.

In FIG. 32, the output regeneration section (output wavelength converting section) 7B is for converting, into optical signals of predetermined output wavelengths λj, the optical signals of the intra-apparatus wavelengths λx routed from the routing section 8a in the above-mentioned way. Therefore, the (fixed) wavelength converters REGs) 72 for converting inputted optical signals of arbitrary intra-apparatus wavelengths λx into optical signal with predetermined output wavelengths λj to the output ports 2-i are provided by 128 (the number n of wavelengths to be multiplexed) (namely, k×n=8×128=1024 in total) in connection with each of the output ports 2-1 to 2-8.

A description will be given hereinbelow of an operation of the OCCS 1 thus constructed.

First of all, the optical signals of 128 wavelengths received through the input ports 1-i are converted by four wavelengths into the same wavelength λr in the wavelength converters 71 of the input regeneration section 7A as mentioned above to be converted into 32-intra-apparatus-wavelengths λ1 to λ32 (four sets). These optical signals of four sets of intra-apparatus wavelengths λ1 to λ32 are concentrated in the 8×16 switches 33-1 to 33-128 according to input wavelength λj before the wavelength conversion so that the identical intra-apparatus wavelengths)r do not collide with each other, and routed to arbitrary idle outputs (routes) of the 16 outputs.

Accordingly, the four sets of optical signals of intra-apparatus wavelengths λ1 to λ32 are inputted to the 128× 128 routing sections 8A-1 to 8A-16. As described above with reference to FIG. 34, the 128×128 routing sections 8A-1 to 8A-16 divide the optical signals of the intra-apparatus wavelengths λ1 to λ32 inputted from the 8×16 switches 33-1 to 33-128 into four groups according to adjacent 32 wavelengths, which in turn, are 32-wavelength-multiplexed in the 32:1 multiplexers 81-1 to 81-4, respectively. The outputs (32-WDM signals) thereof are 128-distributed through the 1:128 couplers 82-1 to 82-4 to the 4×1 switches 83-1 to 83-128.

The 4×1 switches 83-1 to 83-128, in accordance with instructions from the apparatus control sections 9, select 32-WDM signals to be outputted, from the 32-WDM signals distributed from the 1:128 couplers 82-1 to 82-4. Furthermore, the tunable wavelength selectors 84, in accordance with instructions from the apparatus control section 9, select desired intra-apparatus wavelengths λx to be outputted, from the selected 32-WDM signals.

In this case, since each of the tunable wavelength selectors 84 receives the optical signals of the intra-apparatus wavelengths λ1 to λ32, it is possible to considerably relieve the wavelength area to be covered by the tunable wavelength selectors 84 or the transmission band characteristics of by the tunable wavelength selectors 84. For example, assuming that the interval between the adjacent wavelengths is 0.8 nm, if continuous wavelength-grid wavelengths are allocated as the intra-apparatus wavelengths λ1 to λ32, the wavelength area in the case of 128 waves (λ1 to λ128) becomes above 100 nm (see FIG. 56A), whereas the wavelength area in the case of 32 waves (λ1 to λ32) decreases to 25.6 nm (see FIG. 56B or 56C). This means that the wavelength area can be cut up to approximately ¼ of that in the case of 128 waves.

On the other hand, if incontinuous wavelength-grid wavelengths are allocated as the intra-apparatus wavelengths λ1 to λ32, it is possible to relieve the transmission band characteristic of the tunable wavelength selectors 84. For example, if the wavelength-grid wavelengths are alternately allocated at a wavelength interval of 1.6 nm as the intra-apparatus wavelengths λ1 to λ32 as shown in FIG. 57B, the transmission band of the tunable wavelength selectors 84 can be relieved from 0.8 nm (see FIG. 57A) to 1.6 nm in the case of 128 waves.

Furthermore, as FIG. 57C shows, if the wavelength grids are allocated for the intra-apparatus wavelengths λ1 to λ32 to use a wavelength area (>100 nm) approximately equal to that in the case of 128 waves, the transmission band of the tunable wavelength selectors 84 can be relieved from 0.8 nm in the case of 128 waves to 3.2 nm. The allocation of the wavelength grids to the intra-apparatus wavelengths λ1 to λ32 is the same also in other modes which will be described herein after.

The optical signals of the intra-apparatus wavelengths λx selected as mentioned above are inputted to the 16×8 switches 51-1 to 51-128 according to converted output wavelength λj and routed to desired outputs of the 8 outputs to be inputted to the wavelength converters 72 of the output regeneration section 7B. In the output regeneration section 7B, the wavelength converters 72 convert the inputted optical signals of the intra-apparatus wavelengths λx into optical signals of predetermined output wavelengths λj and then output them to the output transmission lines 2-i.

As described above, according to this OCCS 1, the input regeneration section 7A converts optical signals of 128 waves (λ1 to λ128) from the input transmission lines 1-i into optical signals of 32 intra-apparatus wavelengths λ1 to λ32 to decrease the number of wavelengths to be handled in the apparatus, and the routing section 8a conducts the wavelength multiplexing/distribution routing so that the optical signals with the same intra-apparatus wavelength do not collide with each other. Therefore, as described above, it is possible to considerably relieve the given band characteristics (effective wavelength area, transmission band characteristic and wavelength demultiplexing characteristic) required in optical devices such as the tunable wavelength selectors 84 (the number of input/output wavelengths per port can decrease to 32 even in the case of 128 waves).

Therefore, it is possible to realize a large-capacity OCCS 1 on the basis of the existing optical devices, optical switch technique and wavelength multiplexing technique without, even if the number of input wavelengths per port increases, hybridizing the existing optical devices (optical amplifiers, wavelength filters, optical switches or the like) for some wavelength bands (L-Band, C-Band) for band enlargement or developing new wide-band optical devices as shown in FIGS. 58A to 58C.

In addition, also in this case, in the routing section 8a, the 128×128 routing sections 8A-1 to 8A-16 have a construction to conduct the wavelength multiplexing/distributing processing, and even if the number of input/output wavelengths per port increases, it is possible to cope with this if the number of wavelengths (the number of multiplexing or distributing optical signals) the 32:1 multiplexers 81-1 to 81-4, the 1:128 couplers 82-1 to 82-4 or the 4×1 switches 83-1 to 83-128 handle is changed, thus providing extremely excellent extensibility.

Even if the aforesaid 128×128 routing sections 8A-s (s=1 to 16) are constructed according to first to third modifications which will be described hereinbelow, the same functions as those described above are obtainable. (D1-1) Description of First Modification of 128×128 Routing Sections 8A-s

Figure 35:
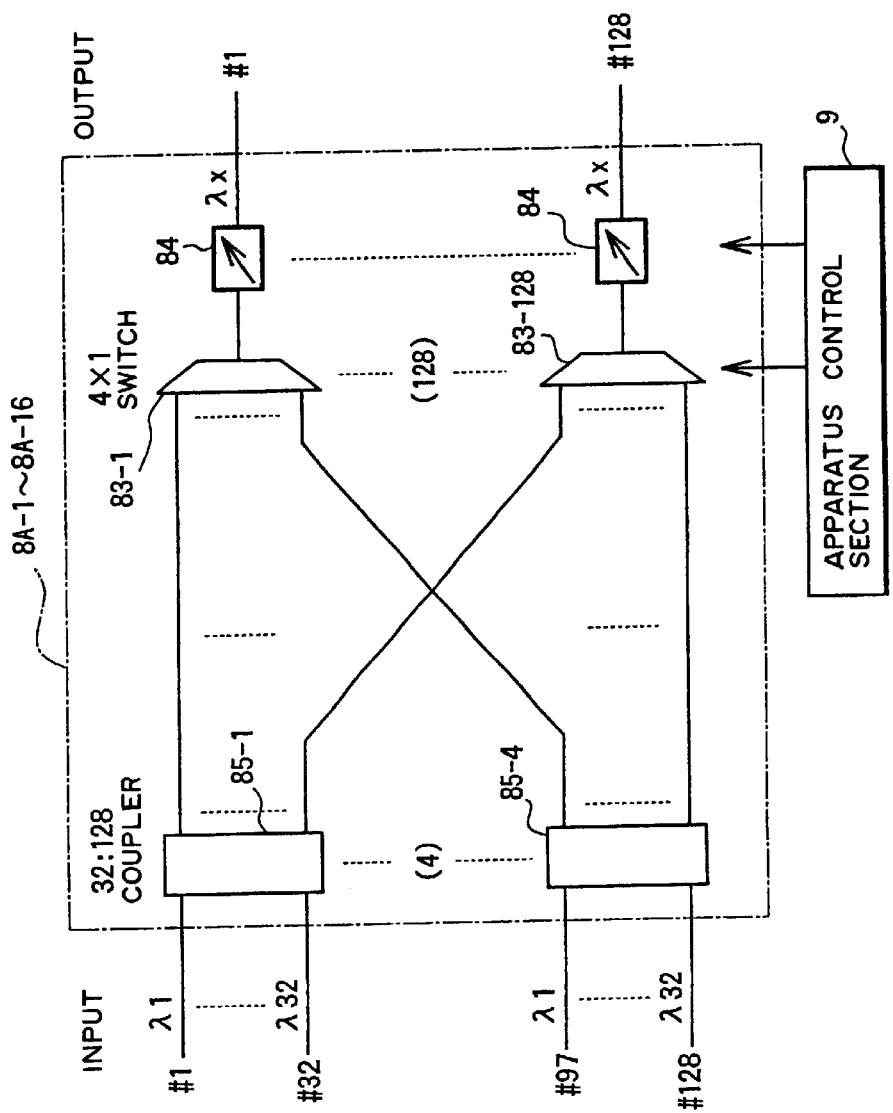
FIG. 35 is a block diagram showing a first modification of the 128×128 routing section shown in FIG. 32.

FIG. 35 is a block diagram showing a first modification of the 128×128 routing sections 8A-s. Each of the 128×128 routing sections 8A-s shown in FIG. 35 has a configuration in which the sets of the 32:1 multiplexers 81-1 to 81-4 and the 1:128 couplers 82-1 to 82-4 shown in FIG. 34 are replaced with 32:128 (m:n) couplers 85-1 to 85-4.

In this way, when the sets of the 32:1 multiplexers 81-1 to 81-4 and the 1:128 couplers 82-1 to 82-4 are replaced with the 32:128 (m:n) couplers 85-1 to 85-4, as compared with the 128×128 routing sections 8A-s shown in FIG. 34, it is-possible to decrease the number of optical devices required, which permits the reduction of that circuit scale, thus cutting the apparatus scale of the entire OCCS 1.

(D1-2) Description of Second Modification of 128×128 Routing Sections 8A-s

Figure 36:
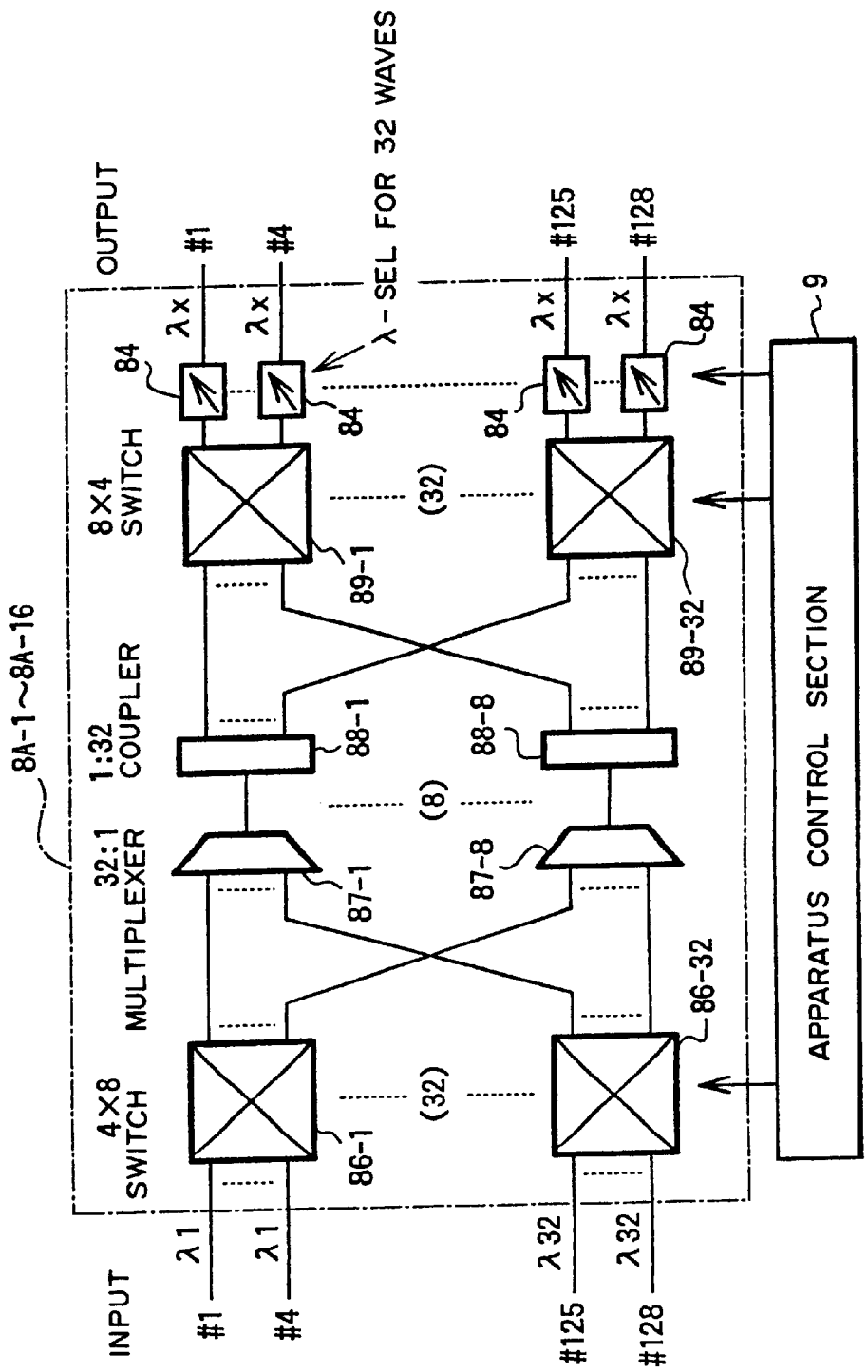
FIG. 36 is a block diagram showing a second modification of the 128×128 routing section shown in FIG. 32.

FIG. 36 is a block diagram showing a second modification of the 128×128 routing sections 8A-s. Each of the 128×128 routing sections 8A-s shown in FIG. 36 differs from the sections shown in FIG. 34 in that, on the front stage side of the tunable wavelength selectors 84, provided are 32 (the number m of intra-apparatus wavelengths) 4×8 (p×2p) switches 86-1 to 86-32, 8 (2p) 32:1 (m:1) multiplexers 87-1 to 87-8, 8 (2p) 1:32 (1:m) couplers 88-1 to 88-8 and 32 (m) 8×4 (2p×p) switches 89-1 to 89-32.

In this configuration, each of the 4×8 (p×2p) switches 86-1 to 86-32 is for concentrating the outputs (four sets of optical signals of 32 waves) of the 8×16 switches 33-1 to 33-128 in units of identical intra-apparatus wavelengths λr to route them to an arbitrary output (route) of the 16 outputs, while each of the 32:1 (m:1) multiplexers 87-1 to 87-8 is for concentrating and multiplexing one outputs of the 4×8 switches 86-1 to 86-32 to wavelength-multiplex optical signals of different intra-apparatus wavelengths λ1 to λ32.

Furthermore, each of the 1:32 couplers 88-1 to 88-8 is for distributing the resultant 32-WDM signal from the corresponding one of the 32:1 multiplexers 87-1 to 87-8 in the form of 32 (m) optical signals, while each of the 8×4 switches 89-1 to 89-32 is for concentrating one outputs (32-WDM signals) of the 1:32 couplers 88-1 to 88-8 to route them to an arbitrary output (route) of the four outputs.

That is, the sets of the 32:1 multiplexers 87-1 to 87-8 and the 1:32 couplers 88-1 to 88-8 function as 8 (2p) 32:32 (m:m) multiplexing/distributing sections each of which wavelength-multiplexes the outputs of the 4×8 switches 86-1 to 86-32 in terms of different intra-apparatus wavelengths λ1 to λ32 and distributes the resultant 32-WDM signal as 32 (m) optical signals.

With this configuration, in the 128×128 routing section 8A-s shown in FIG. 36, of the four sets of intra-apparatus wavelengths λ1 to λ32, the optical signals with the same wavelength λr are inputted to the 4×8 switches 86-r and sent to an arbitrary route. The outputs of these 4×8 switches 86-1 to 86-32 are wavelength-multiplexed in the 32:1 multiplexers 87-1 to 87-8 in terms of 32 different wavelengths and then distributed as 32 optical signals by means of the corresponding 1:32 couplers 88-1 to 88-8.

One outputs of the 1:32 couplers 88-1 to 88-8 are concentrated in each of the 8×4 switches 89-1 to 89-32 to be routed to a desired output (route) of the four outputs, and an optical signal of a desired intra-apparatus wavelength λx to be outputted is selected in each of the tunable wavelength selectors 84 and outputted to each of the 16×8 switches 51-1 to 51-128.

In this way, when the 128×128 routing section 8A-s includes the 4×8 switches 86-1 to 86-32 and the 8×4 switches 89-1 to 89-32, it is possible to reduce the number of 32-WDM signals, obtained by the 32:1 multiplexers 871 to 87-8, to be distributed from 128 to 32, which enables considerable reduction of the loss of the optical signals caused by the distribution, as compared with the configuration shown in FIG. 34 or 35.

(D1-3) Description of Third Modification of 128×128 Routing Sections 8A-s

Figure 37:
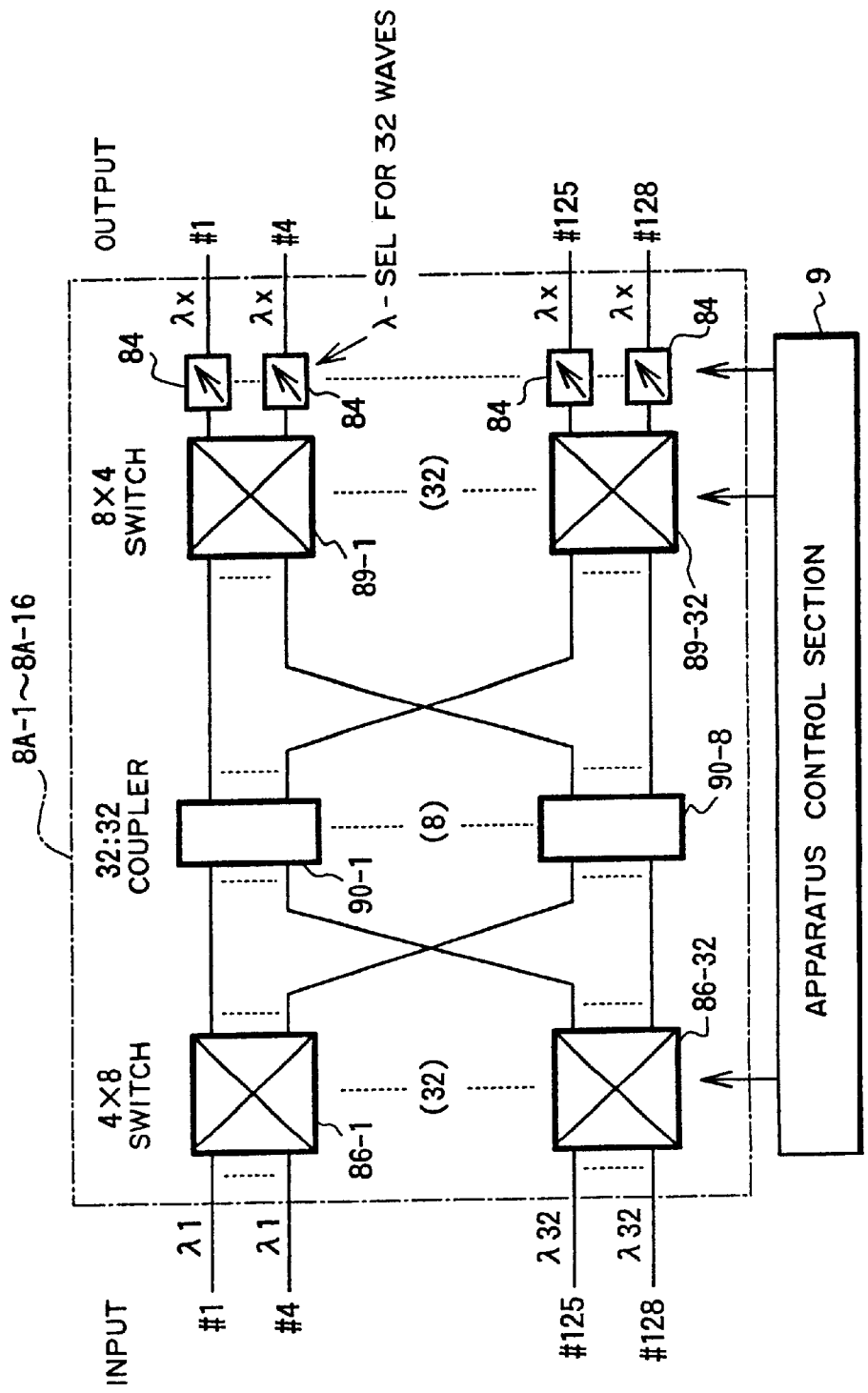
FIG. 37 is a block diagram showing a third modification of the 128×128 routing section shown in FIG. 32.

FIG. 37 is a block diagram showing a third modification of the 128×128 routing sections 8A-s. The 128×128 routing section 8A-s shown in FIG. 37 has a configuration in which the sets of 32:1 multiplexers 87-1 to 87-8 and 1:32 couplers 89-1 to 89-8 shown in FIG. 36 are replaced with 32:32 couplers 90-1 to 90-8, in other words, the aforesaid 8 32:32 multiplexing/distributing sections are constructed with the 32:32 couplers 90-1 to 90-8, respectively.

Also in this configuration, it is possible to decrease the number of optical devices required in the 128×128 routing section as compared with the configuration shown in FIG. 36, which contributes greatly to the reduction of the scale of the routing section 8a, and the apparatus scale of the entire OCCS 1.

(D2) Description of Second Mode

Figure 38:
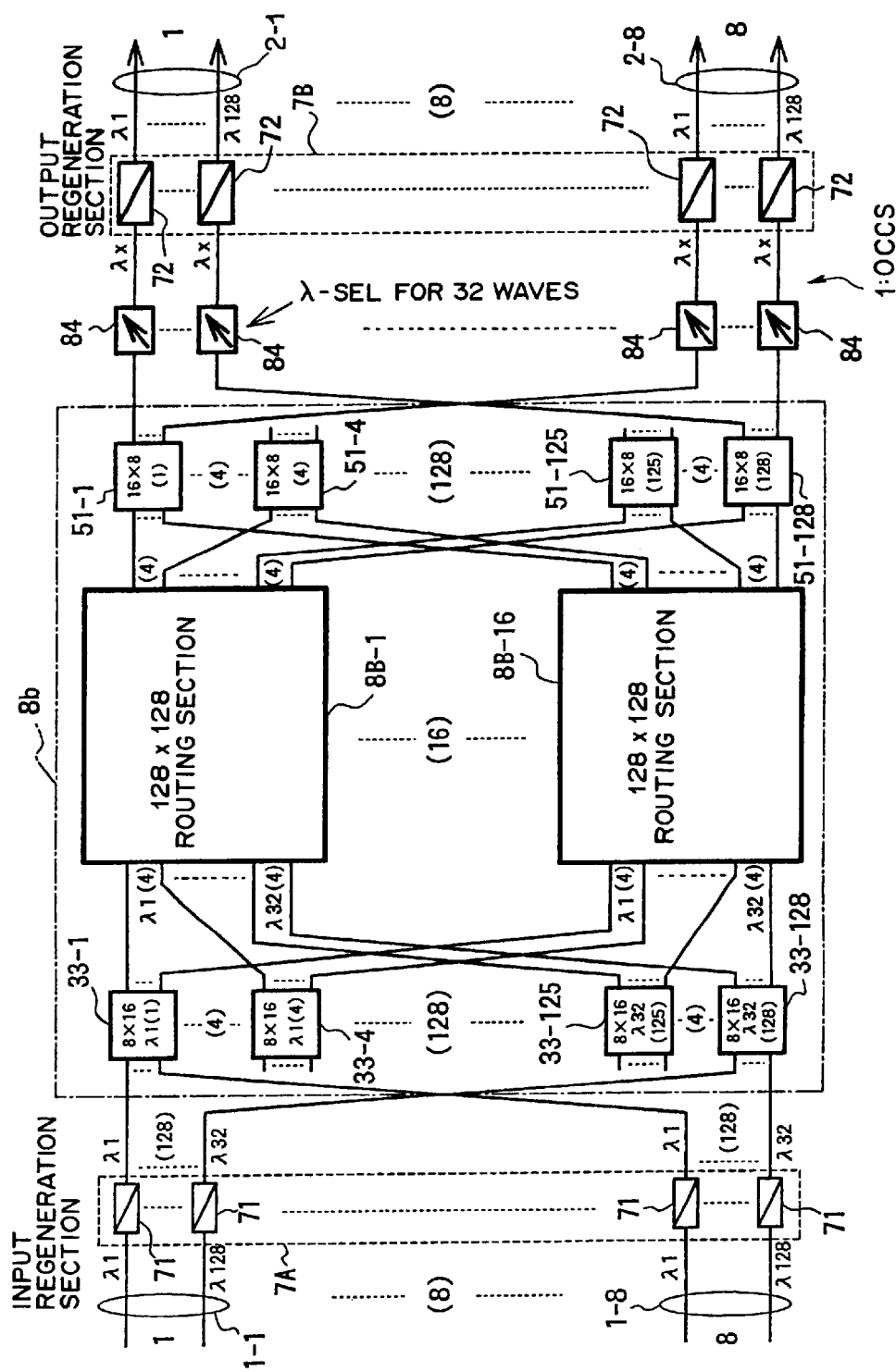
FIG. 38 is a block diagram showing a configuration of an OCCS (second mode) according to the second concrete example of this invention.

FIG. 38 is a block diagram showing a configuration of an OCCS (second mode) according to a second concrete example of this invention. In brief, the OCCS 1 shown in FIG. 38 has a configuration in which the 32-wavelength tunable wavelength selectors 84 shown in FIG. 34 are shifted to the rear stage of the 16×8 switches 51-1 to 51-128. That is, in this case, the tunable wavelength selectors 84 constitute a wavelength selecting section for selecting optical signals of desired intra-apparatus wavelengths λr from the outputs (32-WDM signals) of the 16×8 switches 51-1 to 51-128 in accordance with instructions from the apparatus control section 9.

Figure 39:
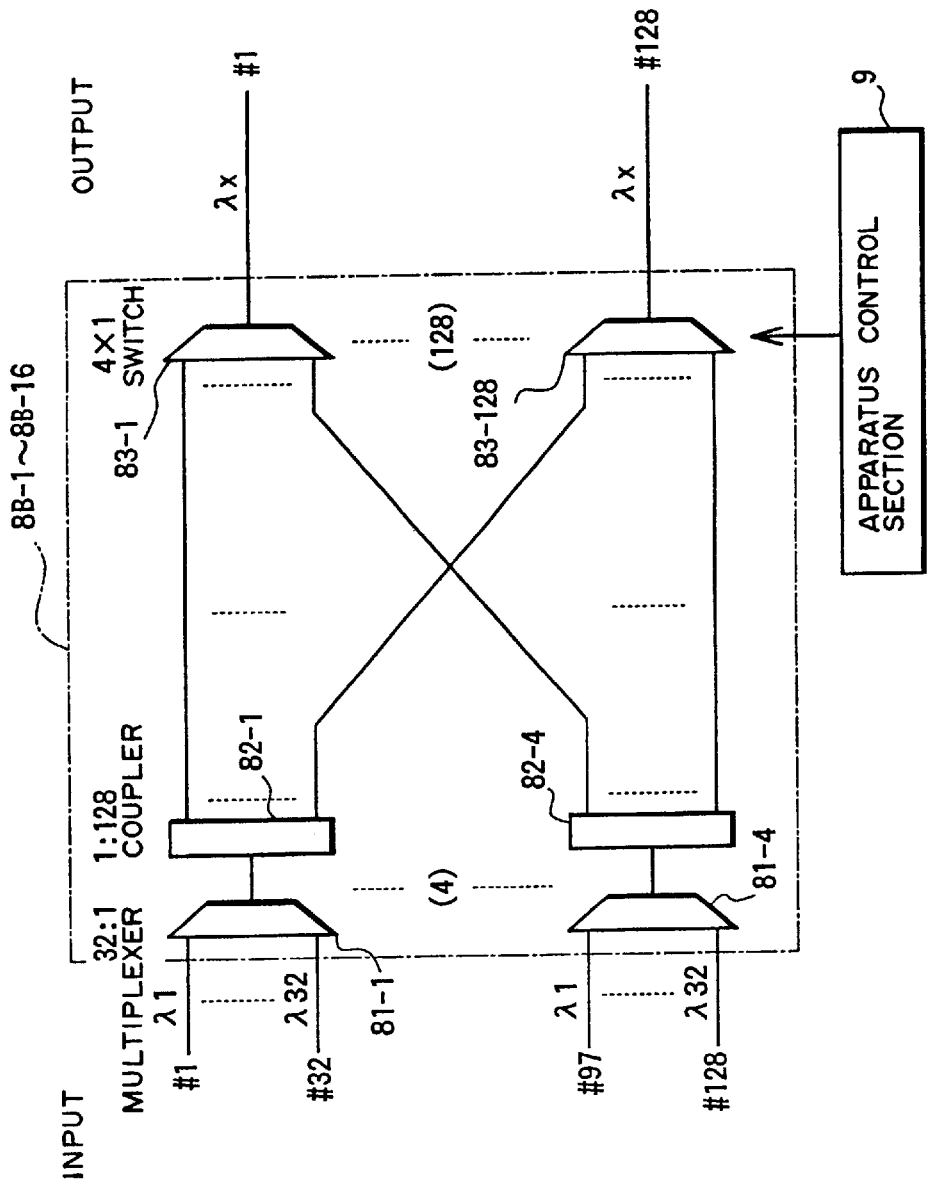
FIG. 39 is a block diagram showing a 128×128 routing section shown in FIG. 38.

Therefore, in a routing section 8b shown in FIG. 38, each of 128×128 routing sections 8B-1 to 8B-16 has a configuration in which the tunable wavelength selectors (wavelength filters) 84 shown in FIG. 34 are omitted as shown in FIG. 39. Other components and the functions and operations thereof are similar to those described above with reference to FIGS. 34 and 35.

With this configuration, this OCCS 1 also can considerably relieve the required band characteristics (effective wavelength areas transmission band characteristics, wavelength demultiplexing characteristics, and others) of the tunable wavelength selectors (wavelength filters) 84 and further can decrease the number of tunable wavelength selectors (wavelength filters) 84 needed to half, namely, from 128×16=2048 to 128×8=1024. Hence, it is possible to reduce the apparatus scale with respect to the configurations described above/with reference to FIGS. 34 and 35.

Figure 40:
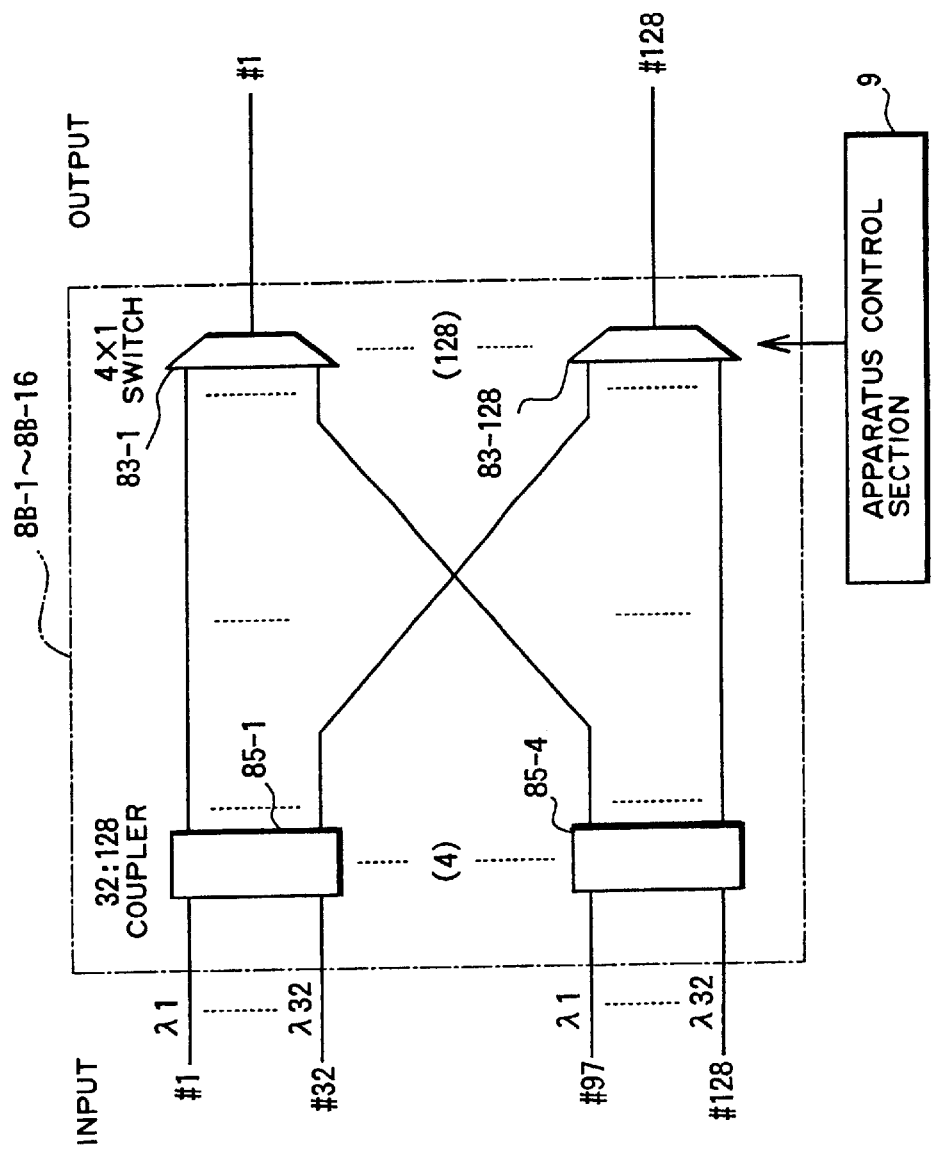
FIG. 40 is a block diagram showing a first modification of the 128×128 routing section shown in FIG. 38.
Figure 41:
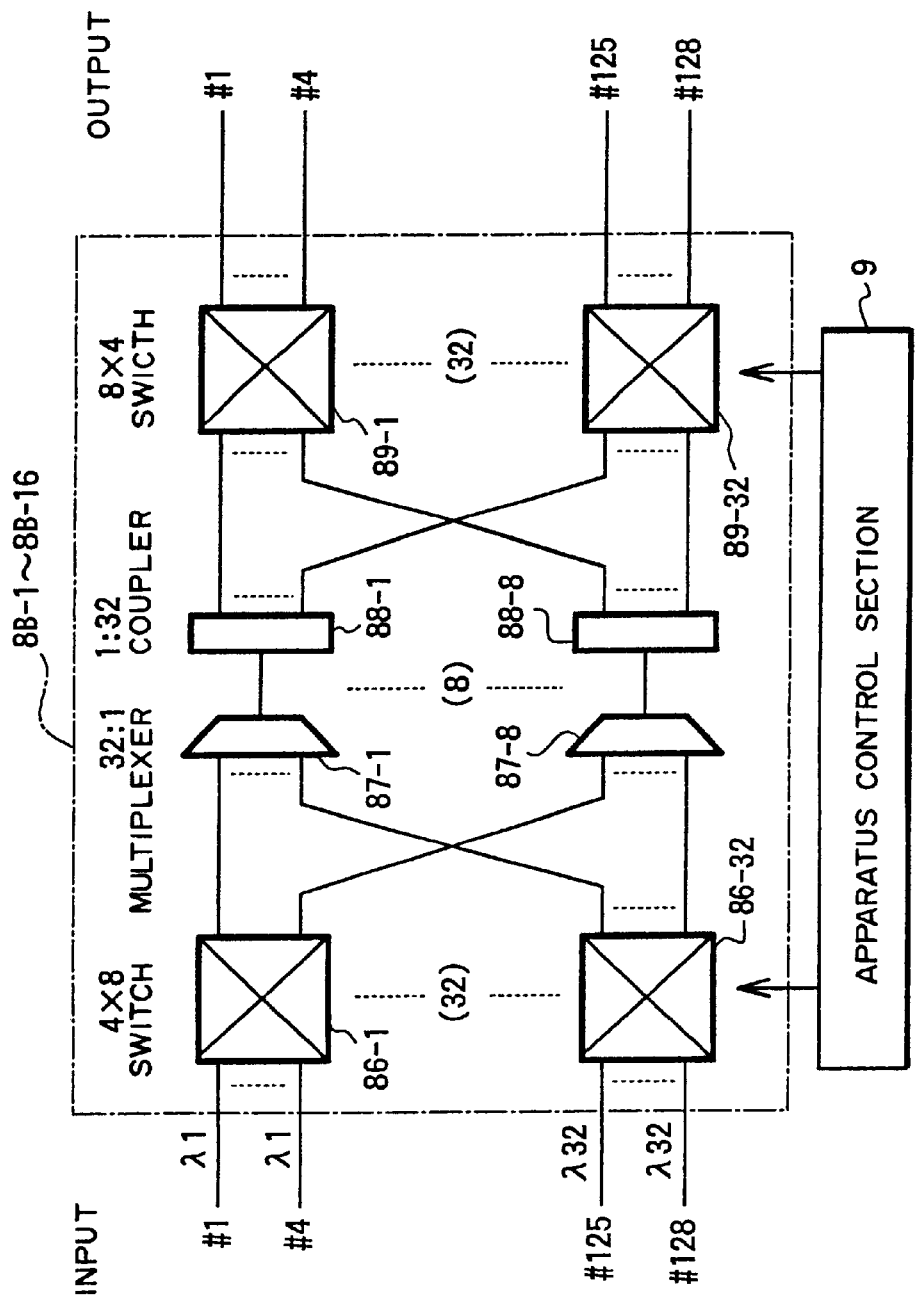
FIG. 41 is a block diagram showing a second modification of the 128×128 routing section shown in FIG. 38.
Figure 42:
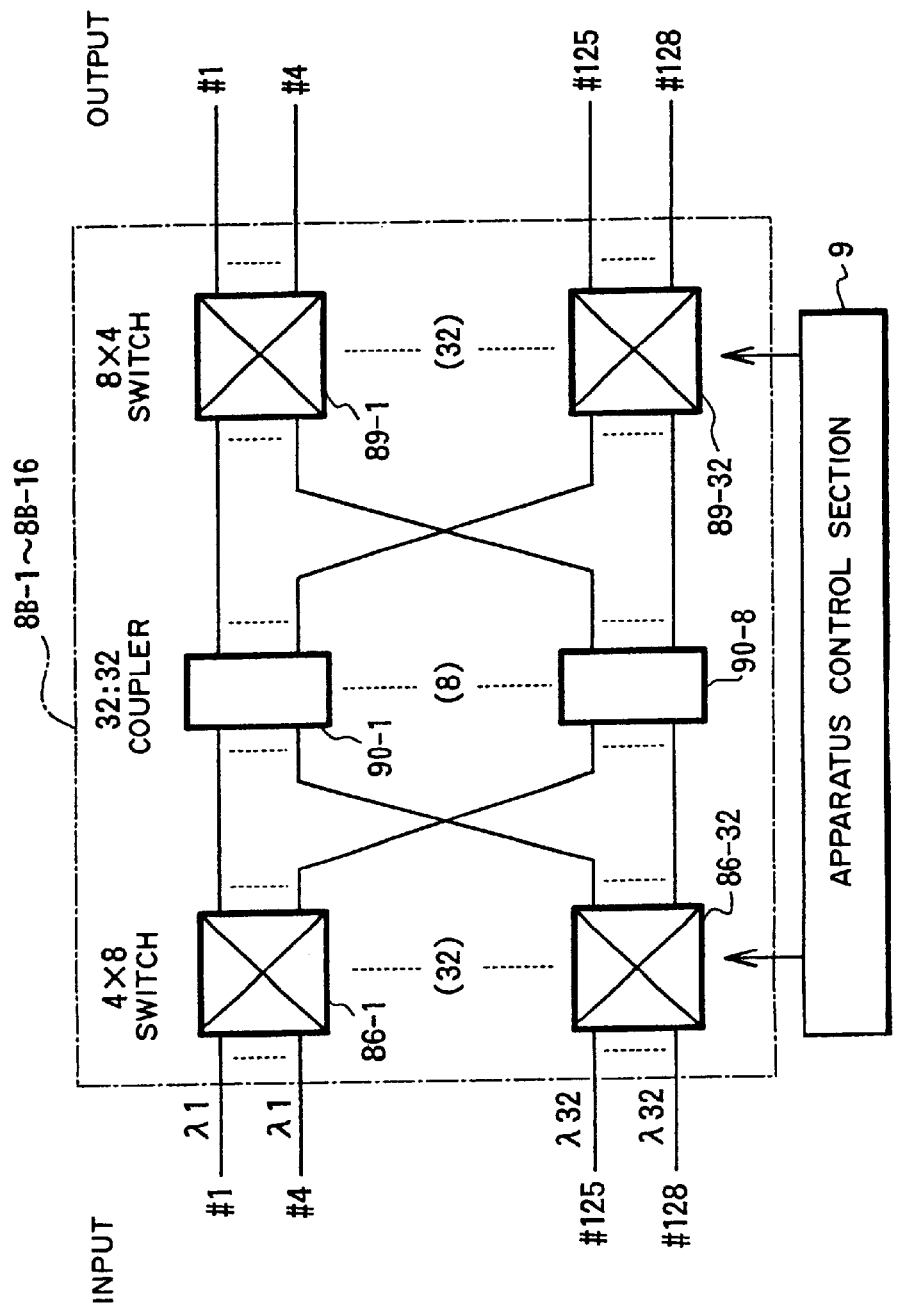
FIG. 42 is a block diagram showing a third modification of the 128×128 routing section shown in FIG. 38.

Incidentally, also in this second mode, the aforesaid 128×128 routing sections 8B-1 to 8B-16 can be constructed as shown in FIGS. 40 to 42 as well as the modifications of the first mode described above with reference to FIGS. 35 and 36. In every configuration, the same effects as those of the modifications of the first mode described above with reference to FIGS. 35 and 36 are obtainable.

Moreover, consideration is given to a case in which the foregoing configuration (FIG. 38) is taken as a basic configuration and the number n of wavelengths to be multiplexed a port (transmission line) increases, for example, a case in which the number n of wavelengths to be multiplexed per port increases to n=512 (that is, the number of accommodation channels is 512×8=4,096).

Figure 43:
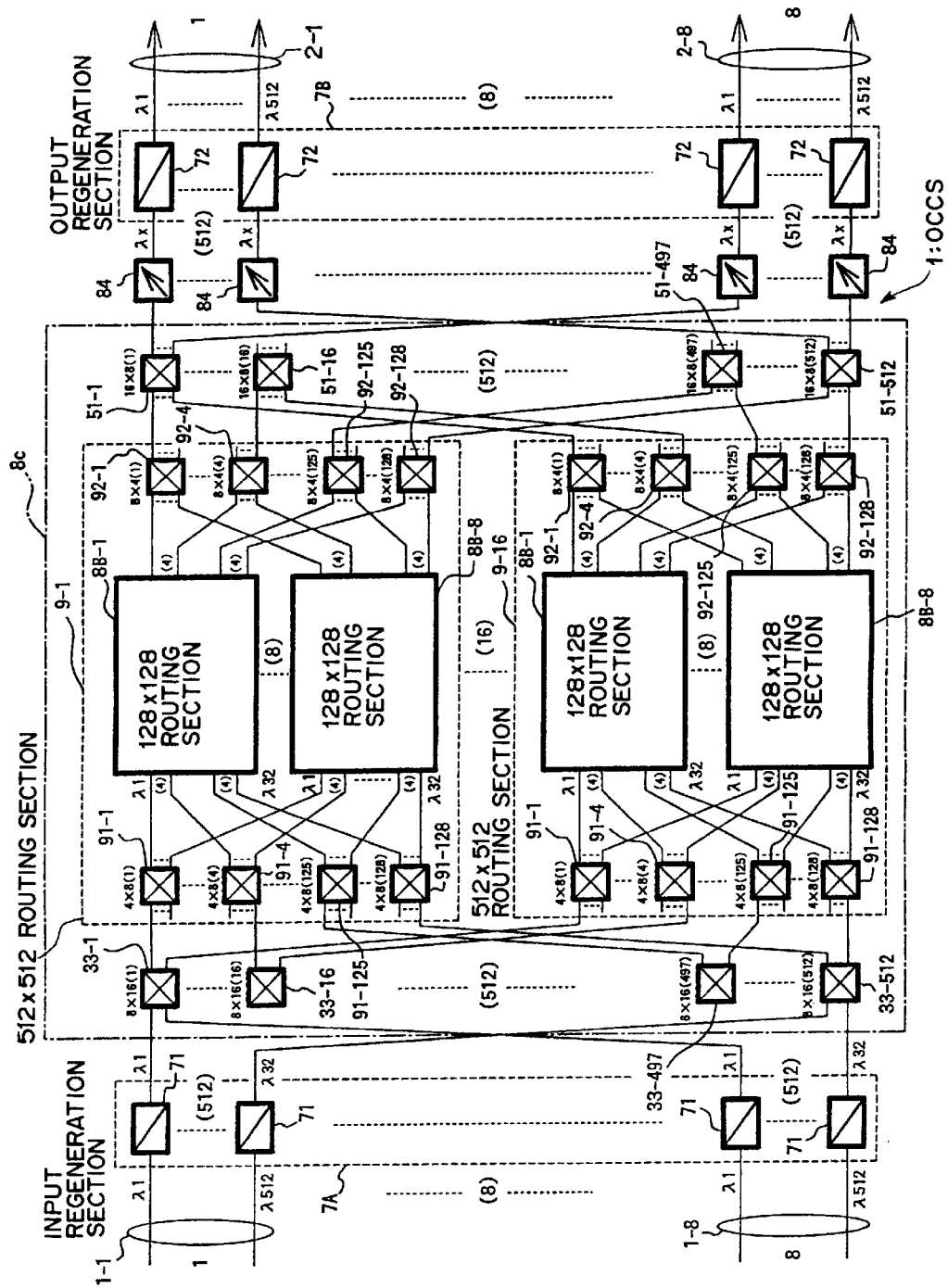
FIG. 43 is a block diagram showing a configuration to be taken in a case in which the number of wavelengths further increases in the OCCS shown in FIG. 38.

In this case, in the OCCS 1, for example as shown in FIG. 43, the aforesaid (fixed) wavelength converters 71 and 72 and the aforesaid tunable wavelength selectors 84 are each provided at n in number (namely, according to the number n of wavelengths to be multiplexed) in connection with each of input/output transmission lines 1-i and 2-i (that is, n×k= 4,096 in total), and in a routing section 8c, 8×16 switches 33-1 to 33-512 and 16×8 switches 51-1 to 51-512 are each provided according to the number n of wavelengths to be multiplexed (n=512 waves), and further 2k (=16) 512×512 routing sections 9-1 to 9-16 are put to use.

Figure 44:
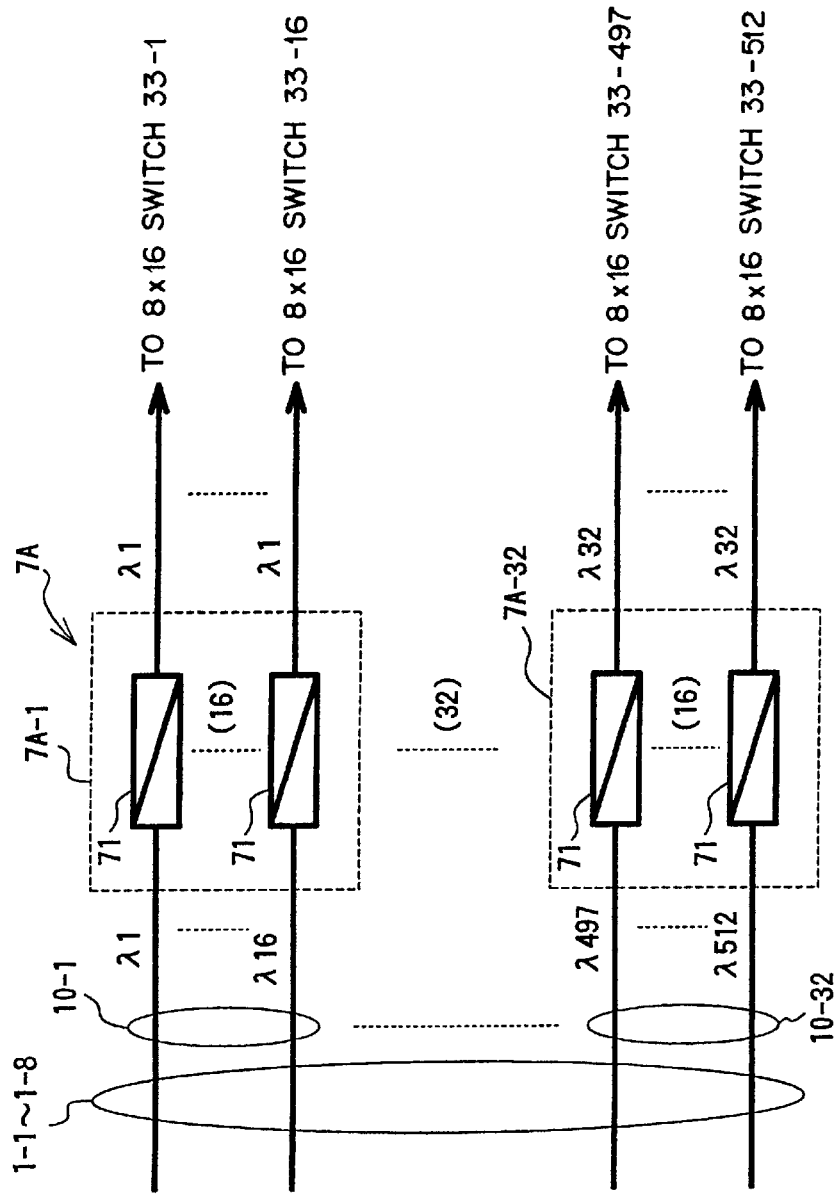
FIG. 44 is a block diagram showing a configuration of an input regeneration section shown in FIG. 43.

Furthermore, in an input regeneration section 7A, for example, as shown in FIG. 44, the 512 waves are divided into groups each 16 waves adjacent to each other (sub-ports 10-1 to 10-32; the number p of sub-ports=512/16=32), and the aforesaid wavelength converters 71 are divided into groups each comprising 16 wavelength converters, with each group constituting each of sub-port-wavelength converting sections 7A-1 to 7A-32 so that the optical signals of 512 waves from the input transmission lines 1-i are converted in units of 16 adjacent wavelengths into the same (intra-apparatus) wavelength $\lambda r$ (for example, each of the wavelengths $\lambda 1$ to $\lambda 16$ is converted into the wavelength $\lambda 1$, and each of the wavelengths $\lambda 17$ to $\lambda 32$ is converted into the wavelength $\lambda 2$), thereby decreasing the number of wavelengths to be handled in the apparatus to $p/n = 32/512 = 1/16$.

Still furthermore, in this case, the 8×16 switches 33-1 to 33-512 concentrate the outputs (16 sets of optical signals of intra-apparatus wavelengths $\lambda 1$ to $\lambda 32$) of the wavelength converters 71 according to the identification of input wavelength $\lambda 1$ to $\lambda 512$ before the wavelength conversion and routes them to an arbitrary output (that is, any one of the 512×512 routing sections 9-1 to 9-16) of the 16 outputs.

For example, the 8×16 switch 33-1 concentrates one optical signals with the input wavelength $\lambda 1$ before the conversion for 8 input ports to route them to any one of 16 outputs, while the 8×16 switch 33-2 concentrates one optical signals with the input wavelength $\lambda 2$ before the conversion for 8 input ports to route them to any one of 16 outputs. Likewise, the 8×16 switch 33-512 concentrates optical signals of the input wavelength $\lambda 512$ before the conversion for 8 input ports to route them to any one of 16 outputs.

That is, 16 sets of optical signals of intra-apparatus wavelengths $\lambda 1$ to $\lambda 32$ are inputted to the 512×512 routing sections 9-1 to 9-16 which in turn, route these input optical signals to arbitrary outputs (routes). Therefore, in each of the 512×512 routing sections 9-1 to 9-16 , as shown in FIG. 43, 128 4×8 switches 91-1 to 91-128 and 128 8×4 switches 92-1 to 92-128 are provided on the input and output sides of the 128×128 routing sections 8B-1 to 8B-8, respectively.

As well as the relationship between the 8×16 switches 33-1 to 33-512 and the 512×512 routing sections 9-1 to 9-16, the 4×8 switches 91-1 to 91-128 are for concentrating the outputs of the 8×16 switches 33-1 to 33-512 in units of four wavelengths according to intra-apparatus wavelength $\lambda r$ identification to route them to an arbitrary output (128×128 routing sections 8B-1 to 8B-8) of the eight outputs. Taking the optical signals of the intra-apparatus wavelength $\lambda 1$ for instance, the optical signals ($\lambda 1$) are concentrated in the 4×8 switches 91-1 to 91-4, with each of the optical signals (that is, four sets of optical signals with the intra-apparatus wavelength $\lambda 1$) being inputted from each of the 4×8 switches 91-1 to 91-4 to each of the 128×128 routing sections 8B-1 to 8B-8.

Accordingly, the input condition of the intra-apparatus wavelengths $\lambda 1$ to $\lambda 32$ to the 128×128 routing sections 8B-1 to 8B-8 is equivalent to that shown in FIG. 38, and the 128×128 routing sections 8B-1 to 8B-8 can be constructed as well as those described above with reference to FIGS. 39 to 42. This means that the optical signals of the intra-apparatus wavelengths $\lambda 1$ to $\lambda 32$ inputted to the 128×128 routing sections 8B-1 to 8B-8 are wavelength-multiplexed into 32-WDM signals and then sent to arbitrary routes.

Furthermore, each of 8×4 switches 92-1 to 92-128 is for concentrating one outputs (32-WDM signals) of the eight 128×128 routing sections 8B-1 to 8B-8 to send them to an arbitrary free route. In this case, one of the four outputs of the 16 sets of 8×4 switches 92-j (j=1 to 128) is concentrated in each of 16×8 switches 51-t (t=1 to 512).

That is, in this OCCS 1 shown in FIG. 43, with respect to a further increase in number n of wavelengths to be multiplexed per port, a section corresponding to the routing section 8b shown in FIG. 38 is provided as 2k (=16) n×n (512×512) routing sections 9-1 to 9-2k, thus providing a corresponding construction.

In the OCCS 1 thus constructed, first, the optical signals of 512 waves inputted to the input transmission lines 1-i are converted into identical wavelengths $\lambda r$ in units of 16 waves as described above with reference to FIG. 44 in the input regeneration section 7A. Therefore, the 16 sets of optical signals of the intra-apparatus wavelengths $\lambda 1$ to $\lambda 32$ obtained in connection with each of the input transmission lines 1-i are inputted to the 8×16 switches 33-1 to 33-512 according to input wavelength $\lambda 1$ to $\lambda 512$ identification and then sent to an arbitrary route (512×512 routing section 9-1 to 9-16).

Accordingly, 16 sets of the optical signals of the intra-apparatus wavelengths $\lambda 1$ to $\lambda 32$ are inputted to each of the 512×512 routing sections 9-1 to 9-16. In each of the 512×512 routing sections 9-1 to 9-16, of the 16 sets of optical signals of the intra-apparatus wavelengths $\lambda 1$ to $\lambda 32$, the optical signals of the same intra-apparatus wavelength $\lambda r$ are inputted in units of four wavelengths to the 4×8 switches 91-j (j=128) and then sent to an arbitrary route (128×128 routing section 8B-1 to 8B-8).

For example, the optical signals with the intra-apparatus wavelength $\lambda 1$ are inputted to the 4×8 switches 91-1 to 91-4, with each of the optical signals (four sets of optical signals of the intra-apparatus wavelength $\lambda 1$) being inputted to each of the 128×128 routing sections 8B-1 to 8B-8. Each of the 128×128 routing sections 8B-1 to 8B-8 perform 32-wavelength multiplexing/distribution processing in terms of different intra-apparatus wavelengths $\lambda 1$ to $\lambda 32$ to provide eight sets of 32-WDM signals totaling 128 signals.

Each of the 32-WDM signals obtained in the 128×128 routing sections 8B-1 to 8B-8 in this way is distributively inputted to each of the 8×4 switches 92-1 to 92-128 and then sent to an arbitrary route (any one of the 16×8 switches 51-1 to 51-512).

Additionally, each of the 32-WDM signals is sent through the 16×8 switches 51-1 to 51-512 to an arbitrary rout (tunable wavelength selector 84) so that an intra-apparatus wavelength $\lambda x$ to be outputted is selected in the tunable wavelength selector 84 and converted into a predetermined output wavelength $\lambda 1$ to $\lambda 512$ in the wavelength converter 72 of the output regeneration section 7B, thereafter outputted to the output port 2-i.

As described above, in the OCCS 1 described above, even if the number n of wavelengths to be multiplexed (the number of accommodation channels) per port increases, it is possible to cope with this without increasing the number of intra-apparatus wavelengths. That is, even if the number of accommodation channels increases largely, it is possible to control the wavelength area needed for needed optical devices such as the tunable wavelength selectors 84 to a minimum while maintaining the number of intra-apparatus wavelengths constant.

In other words, the OCCS 1 (the number n of wavelengths to be multiplexed=128) shown in FIG. 38 can further decrease the number of intra-apparatus wavelengths. For example, if the 32:32 couplers 90-1 to 90-8 of the 128×128 routing sections 8B-1 to 8B-8 described above with reference to FIG. 42 are replaced with 8:8 (M:M) routing sections (8-wavelength multiplexing and 8-distribution type routings) shown in FIG. 45, it is possible to decrease from 32 (m) waves to 8 (M) waves.

Figure 45:
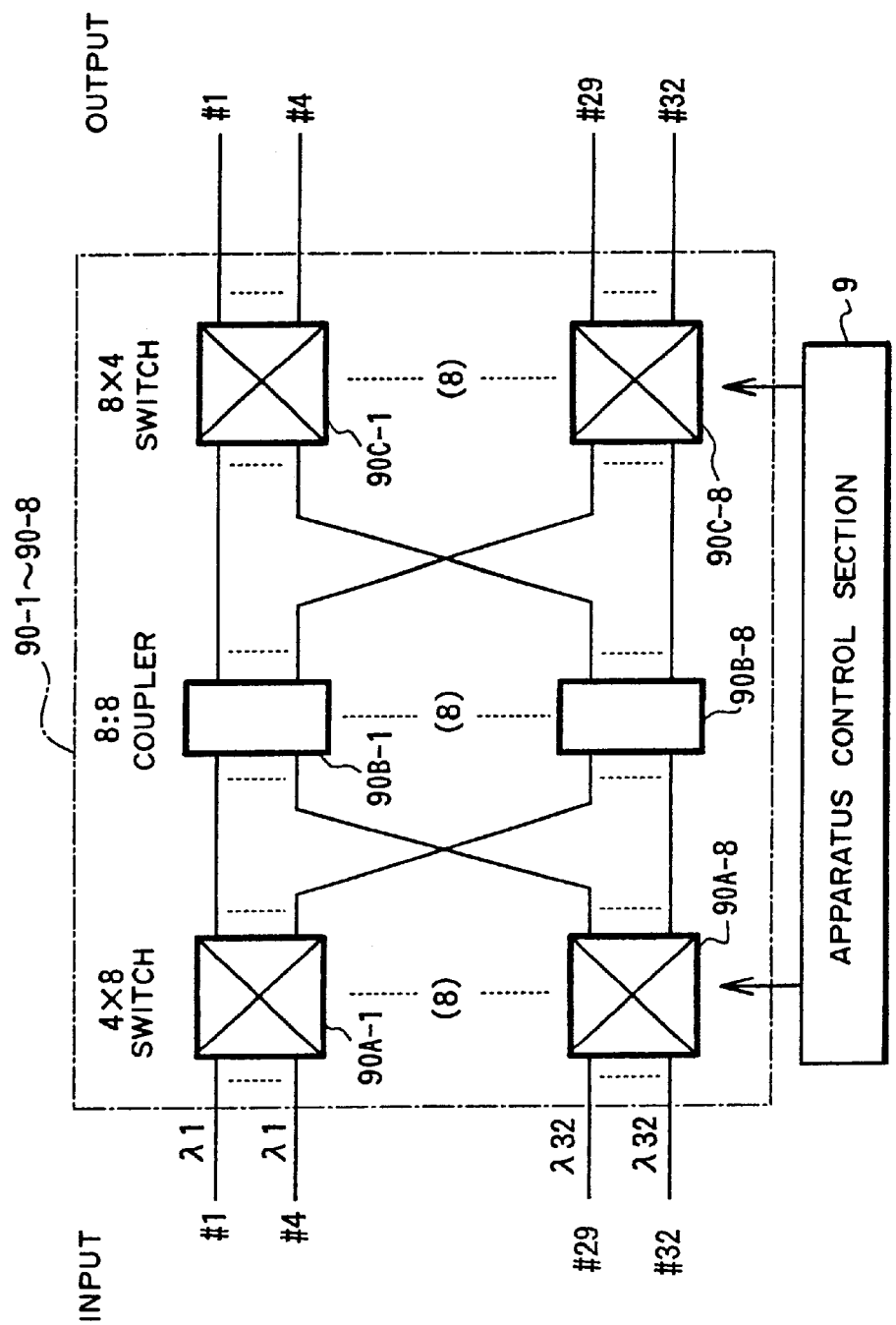
FIG. 45 is a block diagram showing a configuration to be taken in a case in which a 32:32 coupler in the 128×128 routing section shown in FIG. 42 is replaced with a 32:32 routing section.

That is, as FIG. 45 shows, provided are 8 (M) 4×8 [(m/M)×(2m/M)] switches 90A-1 to 90A-8, 8 (2m/M) 8:8 (M:M) couplers 90B-1 to 90B-8 and 8 (M) 8×4 [(2m/M)× (m/M)] switches 90C-1 to 90C-8.

The 4×8 switches 90A-1 to 90A-8 are for concentrating the outputs of the 4×8 switches 86-1 to 86-32, shown in FIG. 42, according to intra-apparatus wavelength identification to send them to an arbitrary route, while the 8:8 couplers (M:M multiplexing/distributing sections) 90B-1 to 90B-8 are for 8-wavelength-multiplexing the outputs of these 4×8 switches 90A-1 to 90A-8 in terms of different intra-apparatus wavelengths to distribute the resultant 8-WDM signal in the form of eight optical signals, and the 8×4 switches 90C-1 to 90C-8 are for concentrating one outputs of the 8:8 couplers 90B-1 to 90B-8 to send them to an arbitrary route.

Therefore, in the input regeneration section 7A, even if the input wavelengths $\lambda 1$ to $\lambda 128$ are converted in units of 16 waves into identical intra-apparatus wavelengths and the intra-apparatus wavelengths are converted into 8 waves: $\lambda 1$ to $\lambda 8$, no collision occurs among the identical intra-apparatus wavelengths $\lambda 1$ to $\lambda 8$, which enables the normal routing.

As described above, according to this OCCS 1, it is possible to conduct the normal routing with a desired number of intra-apparatus wavelengths without depending upon the number n of wavelengths to be multiplexed (the number of accommodation channels) per port, which realizes a large-capacity OCCS 1 by using the existing optical devices (the tunable wavelength selectors 84 and others), the existing WDM techniques and the existing optical switch techniques having the minimum band characteristics (effective wavelength area, transmission band characteristic, wavelength demulitplexing characteristic, and others) needed.

(D3) Description of Third Mode

Figure 46:
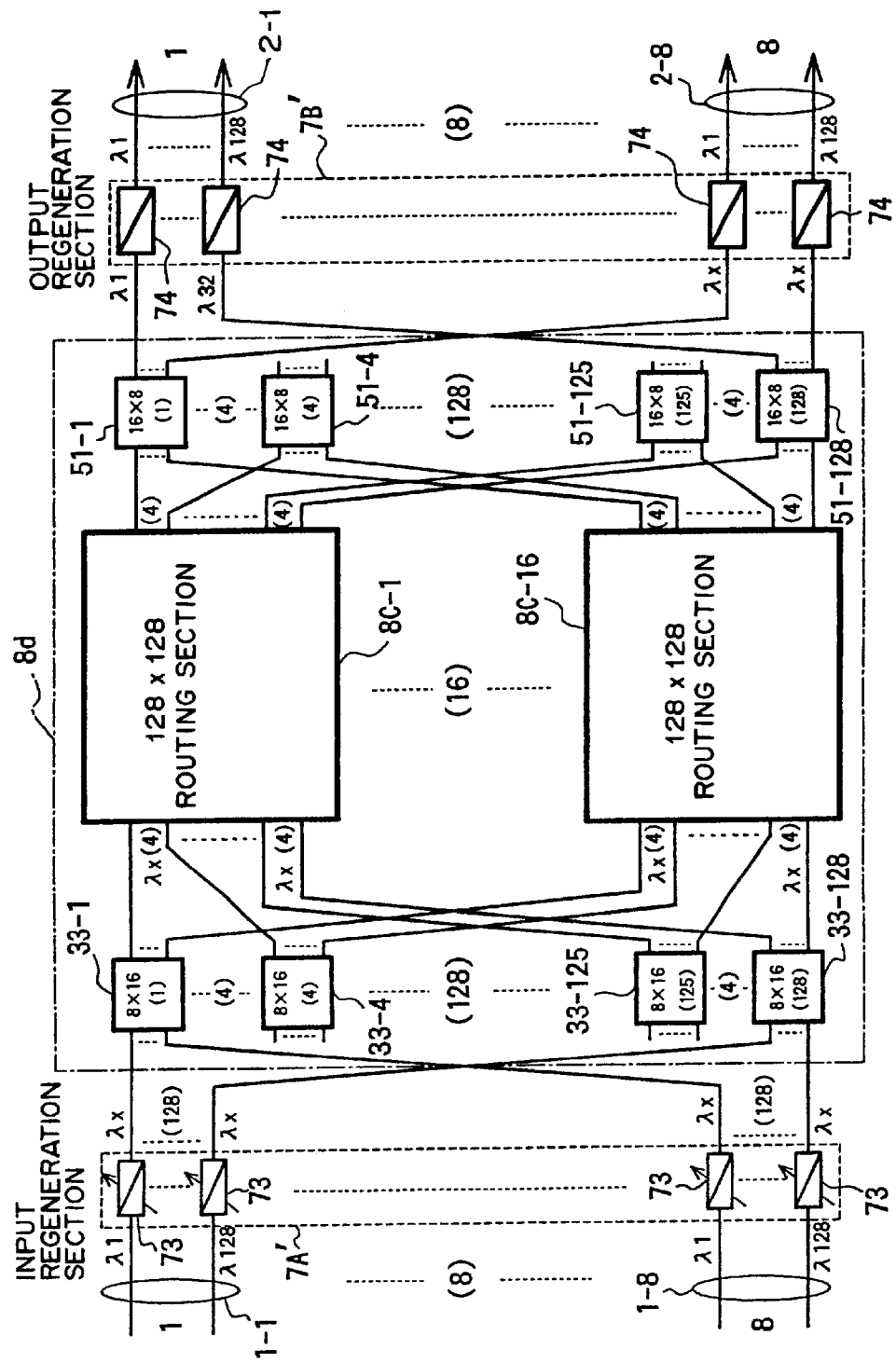
FIG. 46 is a block diagram showing a configuration of an OCCS (third mode) according to the second concrete example of this invention.

FIG. 46 is a block diagram showing a configuration of an OCCS (third mode) according to the second concrete example of this invention. This OCCS 1 shown in FIG. 46 also takes a configuration in a case in which the number k of input/output ports [input/output transmission lines (input/output optical fibers)] is set at k=8 [input ports (input transmission lines) 1-1 to 1-8, output ports (output transmission lines) 2-1 to 2-8], the number n of accommodation wavelengths (the number of wavelengths to be multiplexed) is set at n=128 ($\lambda 1$ to $\lambda 128$), and the number m of intra-apparatus wavelengths is set at m=32 ($\lambda 1$ to $\lambda 32$) (that is, in the case of the number of accommodation channels=k×n= 1024), and this third mode is provided with an input regeneration section 7A', a routing section 7d and an output regeneration section 7B'.

The input regeneration section 7A' is for converting 128 input wavelengths $\lambda 1$ to $\lambda 128$ from the input ports 1-1 to 1-8 into arbitrary intra-apparatus wavelengths $\lambda x$ (x=1 to 32) corresponding to arbitrary output wavelengths $\lambda j$ (j=1 to 128) to be finally outputted to the output ports 2-i (i=1 to 8). Hence, the input regeneration section 7A' includes (variable) wavelength converters (REGs) 73 (whose number is k×n= 8×128=1024 in total) which convert the input wavelengths $\lambda j$ into arbitrary intra-apparatus wavelengths $\lambda x$ according to the input wavelengths $\lambda 1$ to $\lambda 128$ from the input ports 1-1 to 1-8.

This means that the OCCS 1 according to this third mode is designed such that the input regeneration section 7A' first converts the input wavelengths $\lambda j$ into the intra-apparatus wavelengths (converted wavelengths) $\lambda x$ (four sets of intra-apparatus wavelengths $\lambda 1$ to $\lambda 32$ in total) corresponding to the arbitrary output wavelengths $\lambda j$ to be finally outputted to the arbitrary output port 2-i, and the routing section 7d then conducts a routing operation.

Furthermore, the routing section 7d is for routing the outputs (optical signals of the intra-apparatus wavelengths $\lambda x$) of the wavelength converters 73 to arbitrary routes. Also in this third mode, as with the first mode and the second mode, the routing section 7d includes, in addition to 128 (=the number n of wavelengths to be multiplexed) 8×16 switches 33-1 to 33-128 and 16×8 switches 51-1 to 51-128, 2k (=16) 128×128 (n×n) routing sections 8C-1 to 8C-16.

The 8×16 switches 33-1 to 33-128 are for concentrating the outputs of the wavelength converters 73 as in the case of the OCCS 1 according to the first mode or the second mode (see FIG. 32 or 38), that is, for concentrating the outputs thereof according to the identification of input wavelengths $\lambda j$ (the input wavelengths $\lambda j$ before the conversion into the intra-apparatus wavelengths) coming in the input ports 1-1 to 1-8 to send them to arbitrary outputs (routes). Each of the 128×128 routing sections 8C-1 to 8C-16 concentrates one outputs (128 in total) of the 8×16 switches 33-1 to 33-128 and sends them to an arbitrary route (any one of the 16×8 switches 51-1 to 51-128).

Figure 47:
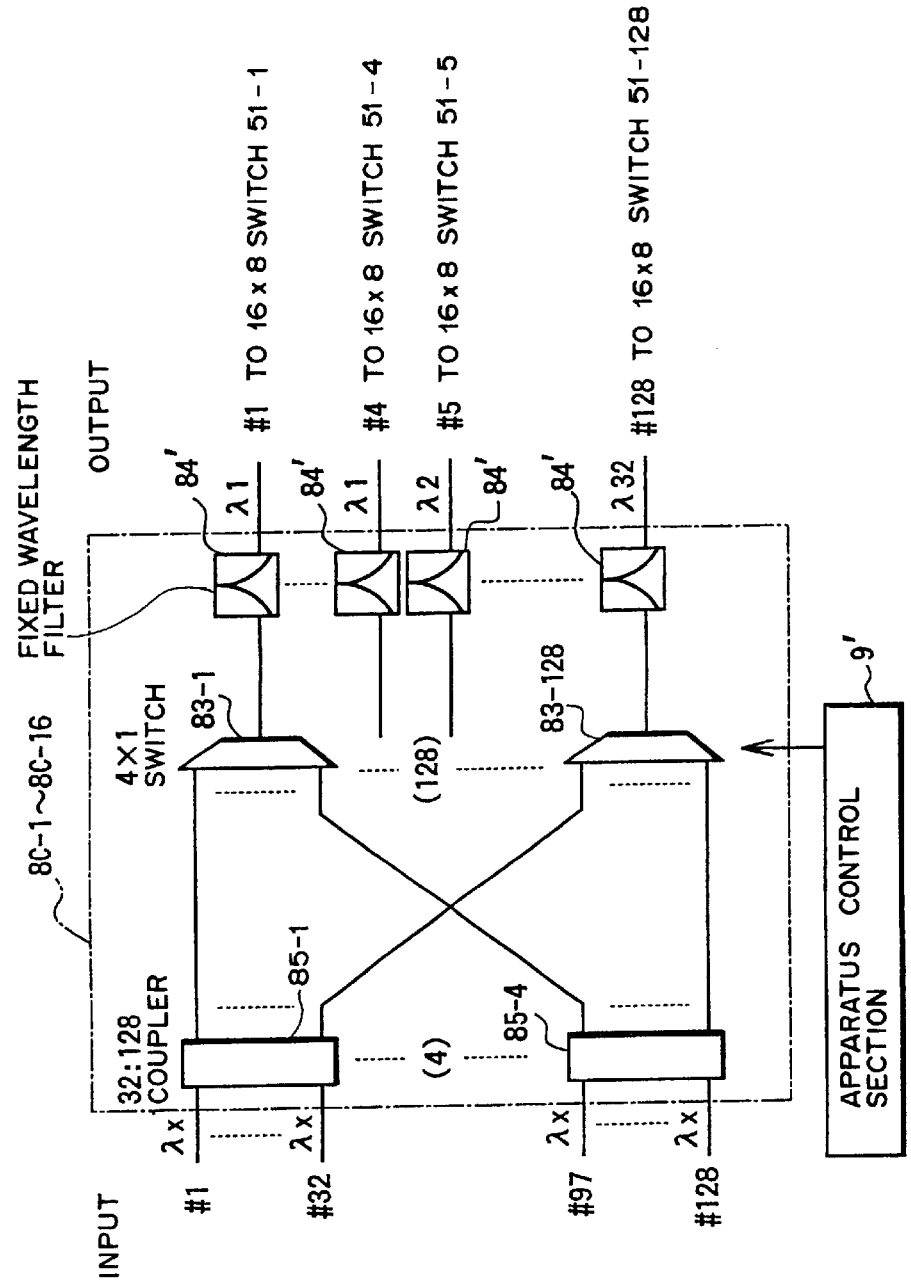
FIG. 47 is a block diagram showing a configuration of a 128×128 routing section shown in FIG. 46.

Accordingly, each of the 128×128 routing sections 8C-1 to 8C-16 in the third-mode, for example as shown in FIG. 47, is composed of 32:128 couplers 85-1 to 85-4 whose number corresponds to the number p (=4) of sub-ports which will be described later with reference to FIG. 48, 4×1 (p×1) switches 83-1 to 83-128 whose number corresponds to the number n (=128) of wavelengths to be multiplexed, and 128 fixed wavelength filters 84' each provided in connection with each of the 4×1 switches 83-1 to 83-128.

The 32:128 couplers (m:n multiplexing/distributing sections) 85-1 to 85-4 are for concentrating the outputs (intra-apparatus wavelength $\lambda x$) of the 8×16 switches 33-1 to 33-128 in units of 32 outputs as shown in FIG. 46 to conduct 32-wavelength multiplexing and further for distributing the resultant 32-WDM signals in the form of 128 optical signals. At this time, an apparatus control section 9' controls the wavelength converters 73 and the 8×16 switches 33-1 to 33-128 so that the optical signals of the same intra-apparatus wavelength $\lambda x$ are not inputted to one 32:128 coupler 85-1 to 85-4.

Furthermore, each of the 4×1 switches 83-1 to 83-128 is for concentrating one outputs (32-WDM signals) of the 32:128 couplers 85-1 to 85-4 to select an arbitrary 32-WDM signal in accordance with an instruction for the apparatus control section 9', while each of the fixed wavelength filters 84' is for selecting (extracting) a predetermined intra-apparatus wavelength λr (r=1 to 32) from the 32-WDM signal selected by the corresponding 4×1 switch 83-1 to 83-128. In this case, as FIG. 47 shows, the intra-apparatus wavelength λ1 is extracted from each of the outputs of the four sets of 4×1 switches 83-1 to 83-4 on the uppermost stage side, while the intra-apparatus wavelength λ2 is extracted from each of the outputs of the next four sets of 4×1 switches 83-5 to 83-8, thus extracting the identical wavelengths λr in units of four from the 128 WDM signals.

That is, also in this third mode, the routing section 7d functions as a wavelength multiplexing/distribution type routing section for wavelength-multiplexing the optical signals of the intra-apparatus wavelengths λ1 to λ32 from the input regeneration section 7A' to distributively route the resultant 32-WDM signals (intra-apparatus wavelength multiplexed optical signals) as optical signals including desired output wavelengths λj to desired output ports 2-i, while the fixed wavelength filters 84' constitute an optical wavelength selecting section for selecting optical signals of predetermined intra-apparatus wavelengths λr from the aforesaid 32-WDM signals.

The aforesaid apparatus control section 9' is made to, in addition to the control of the 4×1 switches 83-1 to 83-128, control the wavelength converters 73, the 8×16 switches 33-1 to 33-128 and the 16×8 switches 51-1 to 51-128 for the wavelength conversion control, the routing control and others.

Still furthermore, each of the 16×8 switches 51-1 to 51-128 shown in FIG. 46 is for concentrating (see FIG. 47) one outputs (four sets of optical signals of the intra-apparatus wavelengths λ1 to λ32 in total) of the fixed wavelength filters 84' from the 128×128 routing sections 8C-1 to 8C-16 to send them to an arbitrary route (an arbitrary wavelength converter 74 of the output regeneration section 7B' which will be described below).

Moreover, the output regeneration section 7B' is for wavelength-converting the outputs of the 16×8 switches 51-1 to 51-128 of the above-described routing section 7d into predetermined output wavelengths λ1 to λ128 to the output ports 2-i. Therefore, as FIGS. 47 and 48 show, 1024 (=k×n=8×128 in total) (fixed) wavelength converters (REGs) 74 are provided in connection with the output ports 2-1 to 2-8 and output wavelengths λ1 to λ128.

Figure 48:
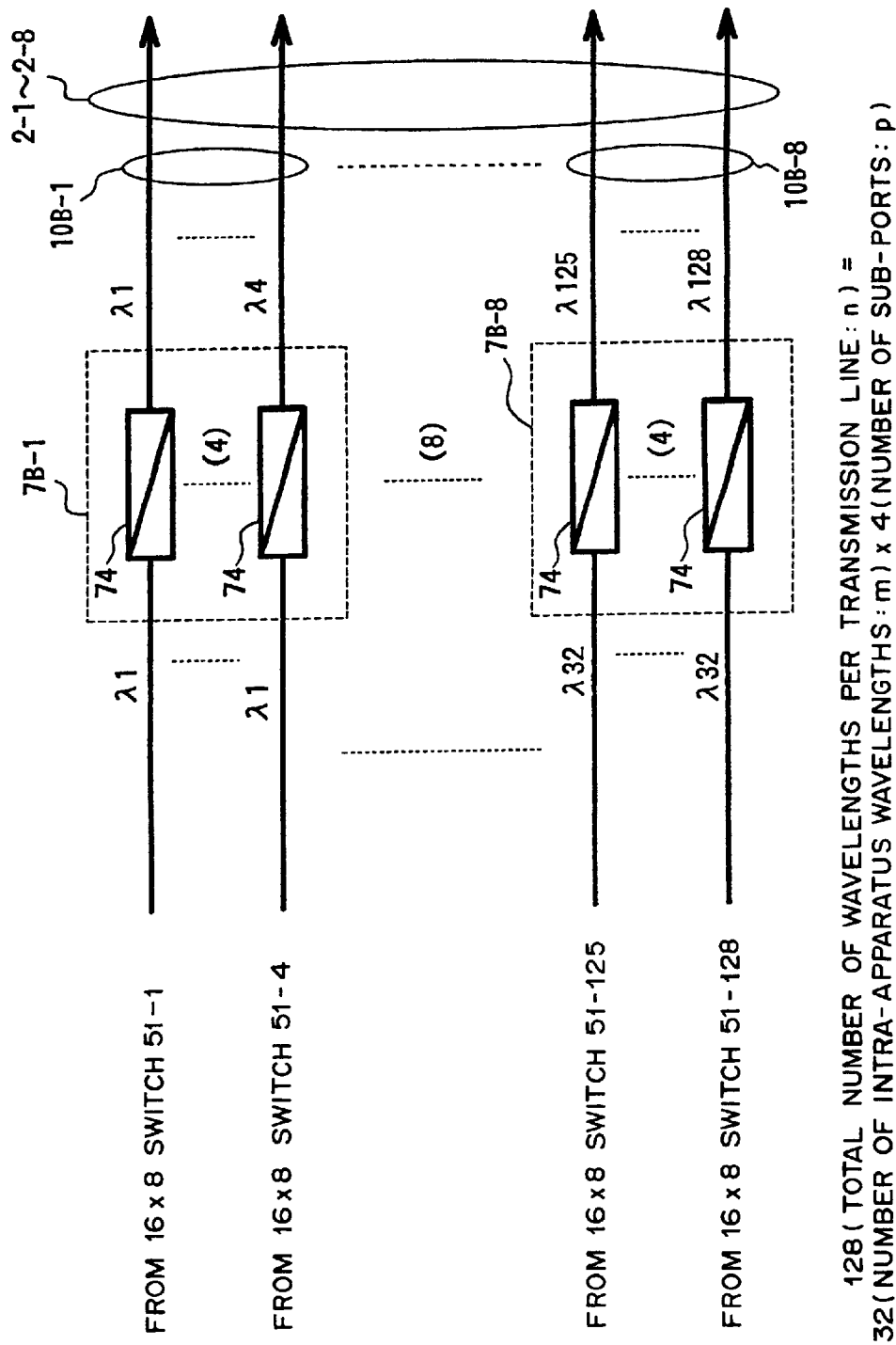
FIG. 48 is a block diagram showing a configuration of an output regeneration section shown in FIG. 46.

As FIG. 48 shows, the wavelength converters 74 are divided in units of four wavelengths (the number p of sub-ports) into eight sub-port groups 10B-1 to 10B-8 constitute sub-port wavelength converting sections (fixed wavelength converting sections) 7B-1 to 7B-8, respectively, and each of these sub-port wavelength converting sections 7B-1 to 7B-8 converts optical signals of four sets of identical intra-apparatus wavelengths λr into output wavelengths λj different from each other.

A detailed description will be given hereinbelow of an operation of the OCCS 1 according to this third mode thus constructed.

First of all, the input optical signals of 128 waves inputted to the input ports 1-1 to 1-8 are converted into optical signals of four sets of arbitrary 32 intra-apparatus wavelengths λ1 to λ32 in the wavelength converters 73 of the input regeneration section 7A' in accordance with an instruction from the apparatus control section 9'. The optical signals of the intra-apparatus wavelengths λ1 to λ32 after the conversion are concentrated in the 8×16 switches 33-1 to 33-128 of the routing section 7d according to the original input wavelengths λ1 to λ128 (before the conversion) arriving at the input ports 1-1 to 1-8 and sent to arbitrary free routes in accordance with an instruction from the apparatus control section 9' to be inputted to the desired 128×128 routing sections 8C-1 to 8C-16.

Accordingly, four sets of optical signals of the intra-apparatus wavelengths λ1 to λ32 are inputted to each of the 128×128 routing sections 8C-1 to 8C-16 to be sent to desired routes (16×8 switches 51-1 to 51-128). In the 128×128 routing sections 8C-1 to 8C-16, the inputted optical signals of intra-apparatus wavelengths λ1 to λ32 are divided into four wavelength groups according to 32-different wavelengths to be 32-wavelength-multiplexed in the 32:128 couplers 85-1 to 85-4, respectively, and distributed to the 4×1 switches 83-1 to 83-128 (in the form of 128 optical signals). At this time, the apparatus control section 9' controls the wavelength converters 73 and the 8×16 switches 33-1 to 33-128 so that the identical intra-apparatus wavelengths λx do not collide with each other in the 32:128 couplers 85-1 to 85-4.

The 4×1 switches 83-1 to 83-128, in accordance with instructions from the apparatus control section 9', select a desired wavelength groups (32-WDM signals) to be outputted, from the distributed 128 32-WDM signals. The 32-WDM signals selected through these 4×1 switches 83-1 to 83-128 are inputted to the fixed wavelength filters 84', respectively, where optical signals of predetermined intra-apparatus wavelengths λr are selected (extracted).

The optical signals of the intra-apparatus wavelengths λ1 to λ32 extracted by the fixed wavelength filters 84' are concentrated in the 16×8 switches 51-1 to 51-128 according to output wavelength λ1 to λ128 after the wavelength conversion to be forwarded to desired routes (toward the output ports 2-1 to 2-8), and in the output regeneration section 7B', the routed optical signals are converted into predetermined output wavelengths λj in the wavelength converters 74 and then outputted to the output ports 2-i.

As described above, in the OCCS 1 according to this third mode, in the input regeneration section 7A' the input wavelengths λ1 to λ128 are previously converted into the intra-apparatus wavelengths λ1 to λ32 corresponding to arbitrary output wavelengths λ1 to λ128, and in the routing section 7d, the wavelength multiplexing/distributing routing is conducted. This provides the following advantages.

1) Since the fixed wavelength filters 84' are applicable to the wavelength selection processing, as compared with the use of the variable wavelength filters 84, it is possible to reduce the circuit scale and cost of the 128×128 routing sections 8C-1 to 8C-16, which leads to the reduction of the apparatus scale and cost of the OCCS 1.

2) Since it is possible to considerably relieve the band characteristics (effective wavelength area, transmission band characteristic , wavelength demultiplexing characteristic and others) required in each of optical devices such as the fixed wavelength filters 84'and the wavelength converters 73, even if the number of input wavelengths per port increases, it is possible to realize a large-capacity OCCS 1 on the basis of the existing optical switch techniques and wavelength multiplexing techniques without requiring developing new devices.

3) since the wavelength multiplexing/distribution processing is conducted in the routing section 7d (128×128 routing sections 8C-1 to 8C-16), even if the number of input/output wavelengths per port increases, it is possible to cope with this by changing the number of wavelengths (the number of wavelengths to be multiplexed, the number of wavelengths to be distributed, or the like) the 32:128 couplers 85-1 to 85-4 or the 4×1 switches 83-1 to 83-128 handle, which offers extremely excellent extensibility.

Figure 49:
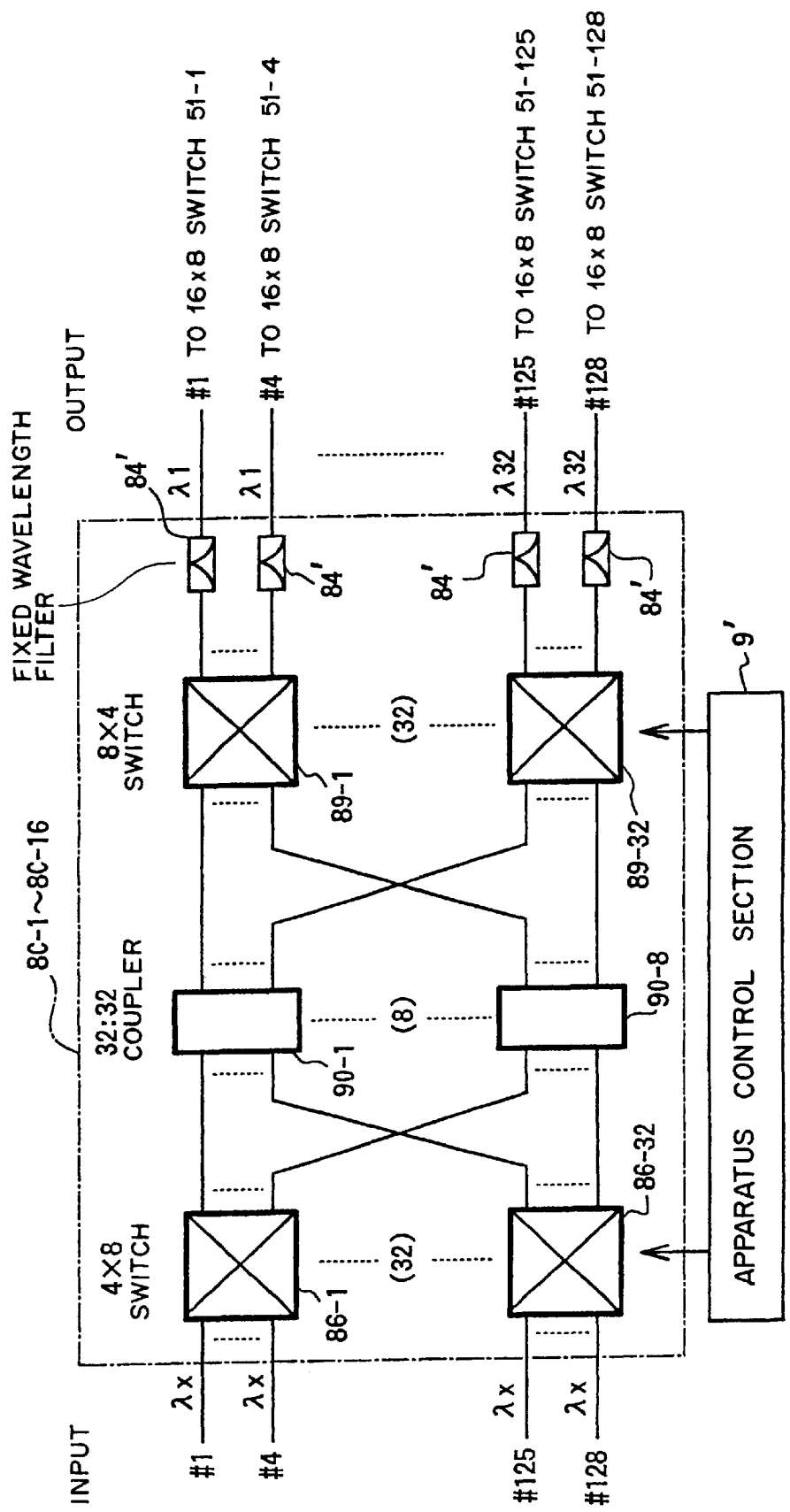
FIG. 49 is a block diagram showing a modification of the 128×128 routing section shown in FIG. 46.

Incidentally, it is also appropriate that, in the 128×128 routing sections 8C-1 to 8C-16, the 32:128 couplers 85-1 to 85-4 shown in FIG. 47 are constructed with combinations of the 32:1 multiplexers and 1:128 couplers as in the case of the 128×128 routing sections 8A-1 to 8A-16 described above with reference to FIG. 34, or that, for example, as shown in FIG. 49, the 128×128 routing sections 8C-1 to 8C-16 are constructed as wavelength multiplexing/distribution type 32:32 routing sections each comprising 4×8 switches 86-1 to 86-32, 32:32 couplers 90-1 to 90-8 and 8×4 switches 89-1 to 89-32. Additionally, it is also acceptable that the 32:32 couplers 90-1 to 90-8 shown in FIG. 49 are constructed with combinations of 32:1 multiplexers and 1:32 couplers.

In any configuration, in addition to the above-mentioned advantages, the same effects as those of the modifications according to the first mode, described above with reference to FIGS. 35 and 36, are obtainable.

(D4) Description of Fourth Mode

Figure 50:
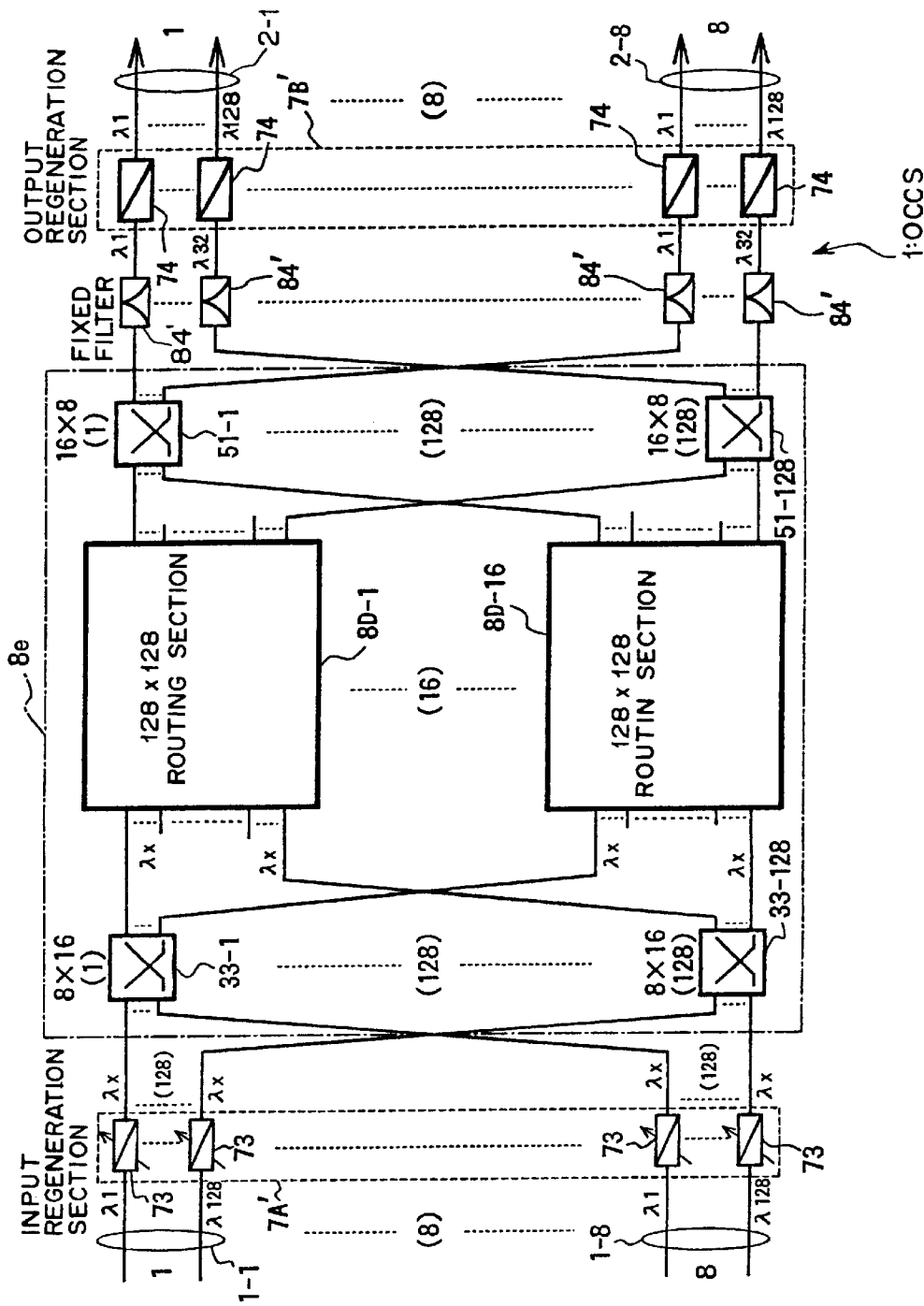
FIG. 50 is a block diagram showing a configuration of an OCCS (fourth mode) according to the second concrete example of this invention.

FIG. 50 is a block diagram showing a configuration of an OCCS (fourth mode) according to the second concrete example of this invention. This OCCS 1 shown in FIG. 50, in brief, has a configuration in which the fixed wavelength filters 84' for 32 wavelengths shown in FIG. 47 are shifted to the rear stages of the 16×8 switches 51-1 to 51-128. That is, in this case, the fixed wavelength filters 84' constitute a wavelength selecting section for selecting optical signals of predetermined intra-apparatus wavelengths $\lambda r$ from the outputs (32-WDM signals) of the 16×8 switches 51-1 to 51-128 in accordance with instructions from the apparatus control section 9'.

Accordingly, in a routing section 8e shown in FIG. 50, each of the 128×128 routing sections 8D-1 to 8D-16 is constructed such that the fixed wavelength filters 84' are omitted as shown in FIG. 51. Other components and the functions and operations thereof are similar to those of the OCCS 1 according to the third mode described above with reference to FIGS. 46 and 47.

With the above-mentioned configuration, also in this OCCS 1, in a manner that wavelength grids are allocated to the intra-apparatus wavelengths $\lambda 1$ to $\lambda 32$, it is possible to decrease the wavelength areas of the fixed-wavelength filters 84' and the wavelength converters 73 to approximately ¼ of that in the case of 128 waves, and to decrease the number of fixed wavelength filters 84' required to half, that is, from 128×16=2048 to 128×8=1024. Thus, it is possible to further reduce the apparatus scale as compared with the configurations described above with reference to FIGS. 34 and 35.

Figure 52:
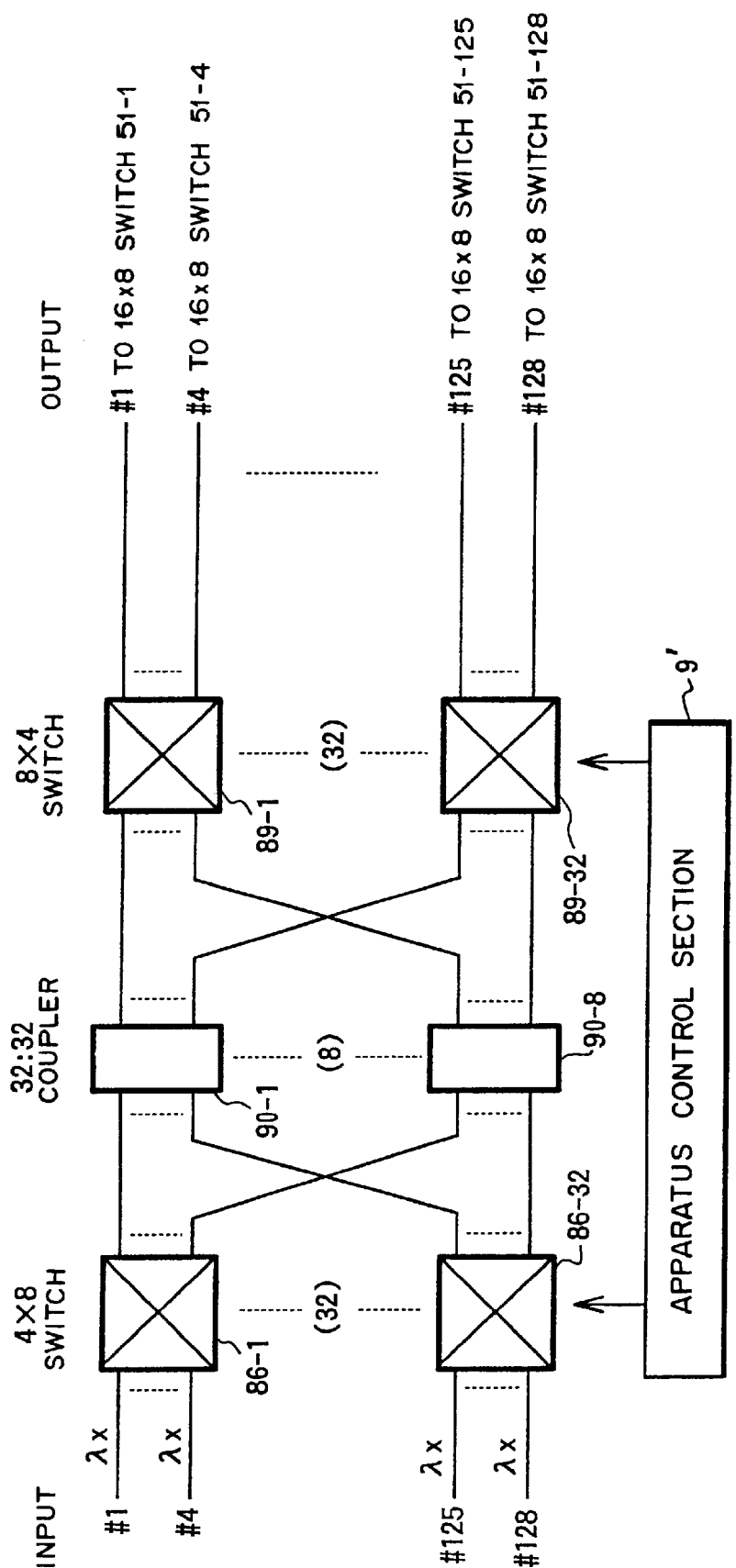
FIG. 52 is a block diagram showing a modification of the 128×128 routing section shown in FIG. 50.

In addition, it is also appropriate that, in the 128×128 routing sections 8D-1 to 8D-16, the 32:128 couplers 85-1 to 85-4 shown in FIG. 51 are replaced with combinations of 32:1 multiplexers and 1:128 couplers, or that the 128×128 routing sections 8D-1 to 8D-16 are constructed as wavelength multiplexing/distribution type 32:32 routing sections each comprising 4×8 switches 86-1 to 86-32, 32:32 couplers 90-1 to 90-8 and 8×4 switches 89-1 to 89-32 as shown in FIG. 52. Additionally, it is also acceptable that the 32:32 couplers 90-1 to 90-8 are constructed with combinations of 32:1 multiplexers and 1:32 couplers. In any case, in addition to the above-mentioned advantages, the same effects as those of the modifications according to the first mode described above with reference to FIGS. 35 and 36 are obtainable.

Secondly, consideration is given to a case in which the foregoing configuration (FIG. 50) is taken as a basic configuration and, in a state in which the number k of input/output ports is set at k=8, the number n of wavelengths to be multiplexed a port (transmission line) increases, for example, a case in which the number n of wavelengths to be multiplexed per port increases to n=512 (that is, the number of accommodation channels is 512×8=4,096).

Figure 53:
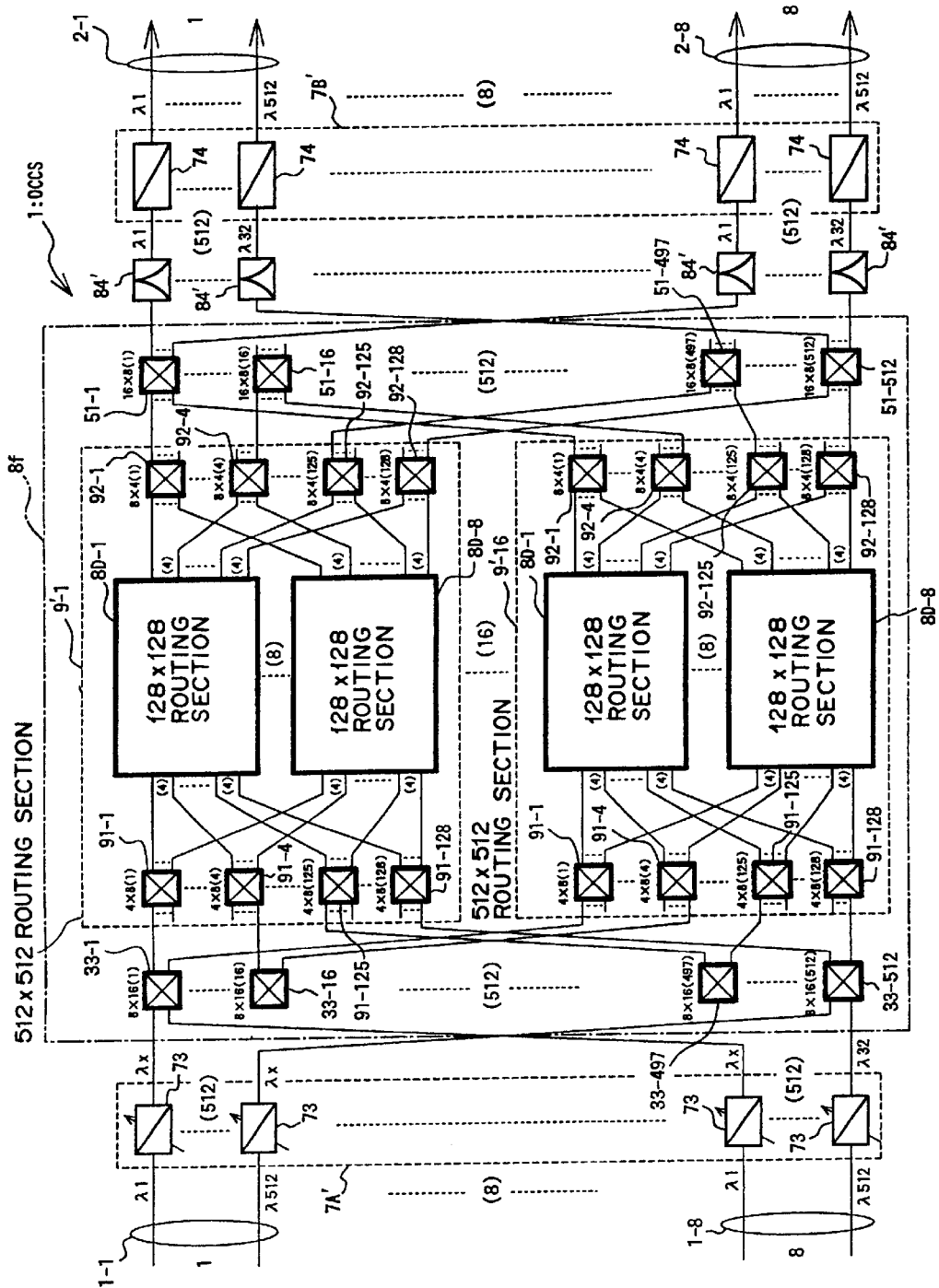
FIG. 53 is a block diagram showing a configuration to be taken in a case in which the number of wavelengths further increases in the OCCS shown in FIG. 50.

In this case, in the OCCS 1, for example as shown in FIG. 53, the aforesaid (fixed) wavelength converters 73 and 74 and the aforesaid fixed wavelength selectors 84' are each provided according to the number n of wavelengths to be multiplexed (that is, n×k=4,096) in connection with each of input/output transmission lines 1-i and 2-i, and in a routing section 8f, 8×16 switches 33-1 to 33-512 and 16×8 switches 51-1 to 51-512 are each provided according to the number n of wavelengths to be multiplexed (n=512 waves), and further 2k (=16) 512×512 routing sections 9'-1 to 9'-16 are put to use.

Furthermore, in the input regeneration section 7A', the wavelength converters 73 convert 512-wavelength input optical signals from the input ports 1-1 to. 1-8 into arbitrary 32 intra-apparatus wavelengths $\lambda x$ (x=1 to 32) in accordance with instructions from the apparatus control section 9', thereby decreasing the number of wavelengths to be handled in the apparatus to $p/n = {}^{32}\!/_{512} = {}^{1}\!/_{16}$ (where, p denotes the number of sub-ports which will be mentioned later, p=512/16=32).

Figure 54:
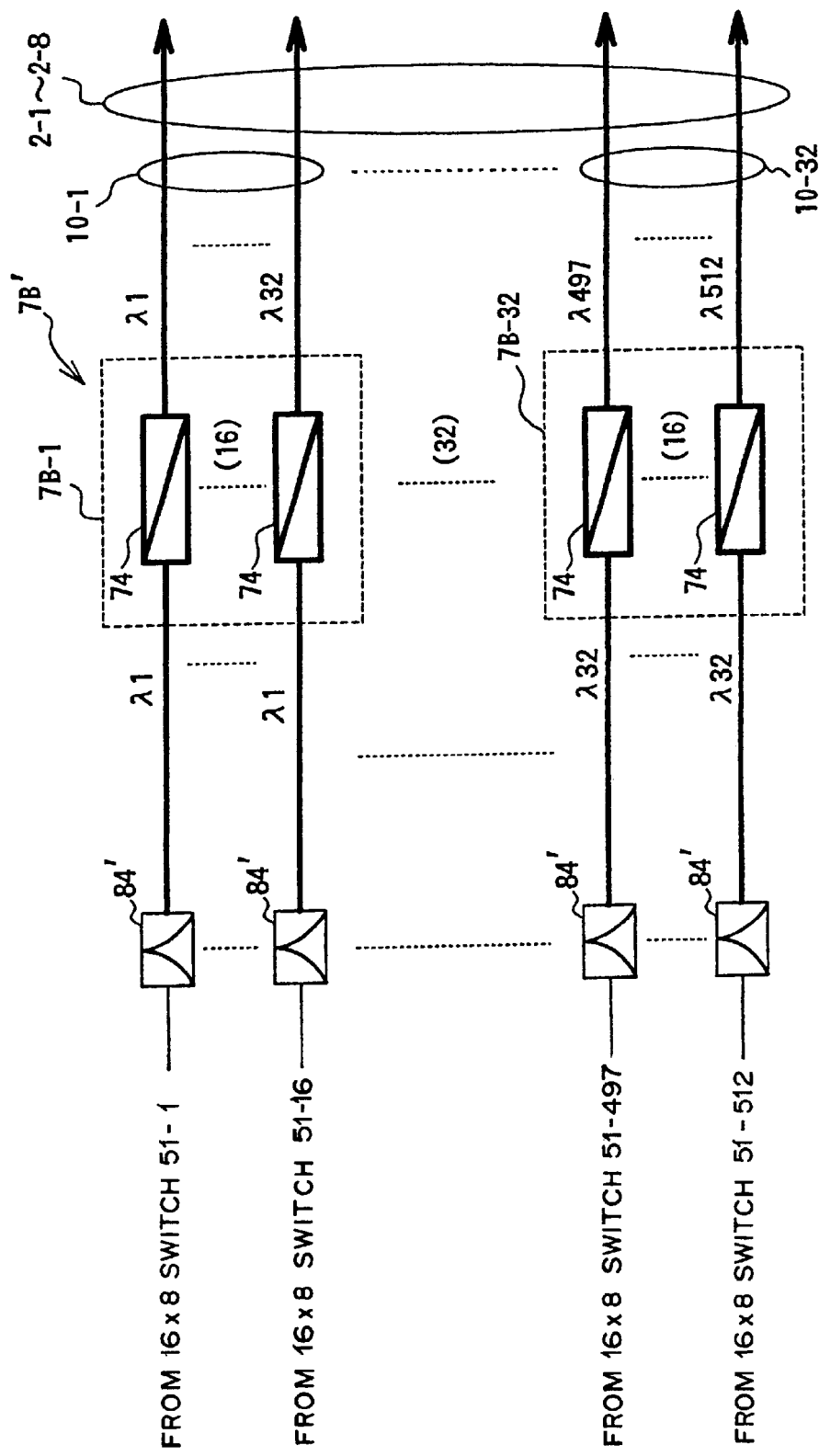
FIG. 54 is a block diagram showing a configuration of an output regeneration section shown in FIG. 53.

On the other hand, in the output regeneration section 7B', for example as shown in FIG. 54, 512 waves are divided into groups comprising 16 waves adjacent to each other (sub-port groups 10-1 to 10-32 whose number corresponds to the number p of sub-ports), and the aforesaid wavelength converters 74 are also divided into groups each comprising 16 wavelength converters 74, which constitute sub-port wavelength converting sections 7B-1 to 7B-32, and the outputs (16 sets of intra-apparatus wavelengths)1 to $\lambda 32$) of the 16×8 switches 51-1 to 51-512 are converted into different output wavelengths $\lambda 1$ to $\lambda 512$ in units of 16 wavelengths (for example, 16 sets of $\lambda 1$ are $\lambda 1$ to $\lambda 16$, 16 sets of $\lambda 2$ are $\lambda 17$ to $\lambda 32$) so that the intra-apparatus wavelengths $\lambda 1$ to $\lambda 32$ are converted into predetermined output wavelengths $\lambda 1$ to $\lambda 512$.

Furthermore, in this case, the 8×16 switches 33-1 to 33-512 concentrate the outputs of the wavelength converters 73 according to input wavelength $\lambda r$ before the conversion into the intra-apparatus wavelengths to forward them to an arbitrary route (any one of 512×512 routing sections 9'-1 to 9'-16).

For example, also in this case, the 8×16 switch 33-1 concentrates one optical signals corresponding to the input wavelength $\lambda 1$ before the wavelength conversion for eight ports to route any one of the 16 outputs, while the 8×16 switch 33-2 concentrates one optical signals corresponding to the input wavelength $\lambda 2$ before the wavelength conversion for eight ports to route any one of the 16 outputs. Likewise, the 8×16 switch 33-512 concentrates one optical signals corresponding to the input wavelength $\lambda 512$ before the wavelength conversion for eight ports to route any one of the 16 outputs.

Furthermore, in each of the 512×512 routing sections 9'-1 to 9'-16 , as shown in FIG. 53, 128 4×8 switches 91-1 to 91-128 and 128 8×4 switches 92-1 to 92-128 are provided on the input and output sides of the 128×128 routing sections 8D-1 to 8D-8, respectively.

As well as the relationship between the 8×16 switches 33-1 to 33-512 and the 512×512 routing sections 9'-1 to 9'-16, the 4×8 switches 91-1 to 91-128 are for concentrating the outputs of the 8×16 switches 33-1 to 33-512 in units of four wavelengths according to intra-apparatus wavelength $\lambda r$ identification to route them to an arbitrary output (128× 128 routing sections 8D-1 to 8D-8) of the eight outputs.

Taking the optical signals of the intra-apparatus wavelength λ1 for instance, the optical signals (λ1) are concentrated in the 4×8 switches 91-1 to 91-4, with each of the optical signals (that is, four sets of optical signals with the intra-apparatus wavelength λ1) being inputted from each of the 4×8 switches 91-1 to 91-4 to each of the 128×128 routing sections 8D-1 to 8D-8.

Accordingly, the input condition of the intra-apparatus wavelengths λ1 to λ32 to the 128×128 routing sections 8D-1 to 8D-8 is equivalent to that shown in FIG. 50, and the 128×128 routing sections 8D-1 to 8D-8 can be constructed as well as the above-described modifications. This means that the optical signals of the intra-apparatus wavelengths λ1 to λ32 inputted to the 128×128 routing sections 8D-1 to 8D-8 are wavelength-multiplexed into 32-WDM signals and then sent to arbitrary routes.

Furthermore, each of 8×4 switches 92-1 to 92-128 is made to concentrate one outputs (32-WDM signals) of the eight 128×128 routing sections 8D-1 to 8D-8 for routing them to four arbitrary routes. In this case, one of the four outputs of the 16 sets of 8×4 switches 92-j (j=1 to 128) is concentrated in each of 16×8 switches 51-t (t=1 to 512).

That is, in this OCCS 1 shown in FIG. 53, with respect to a further increase in number n of wavelengths to be multiplexed per port, a section corresponding to the routing section 8e shown in FIG. 50 is provided as 2k (=16) n×n (512×512) routing sections 9'-1 to 9'-2k, thus providing a corresponding construction.

In the OCCS 1 thus constructed, first, the optical signals of 512 waves inputted to the input transmission lines 1-i are converted into arbitrary intra-apparatus wavelengths λx in the wavelength converters 73 of the input regeneration section 7A'. The optical signals of the intra-apparatus wavelengths λx obtained in this way are inputted to the 8×16 switches 33-1 to 33-512 according to the identification of input wavelengths λ1 to λ512 and then sent to arbitrary routes (512×512 routing section 9'-1 to 9'-16).

In each of the 512×512 routing sections 9'-1 to 9'-16, optical signals of the intra-apparatus wavelengths λx are routed to arbitrary routes (128×128 routing sections 8D-1 to 8D-8) by means of the 4×8 switches 91-j (=1 to 128). Each of the 128×128 routing sections 8D-1 to 8D-8 conducts the 32-wavelength multiplexing/distribution processing to provide 8 sets of 32-WDM signals totaling 128, as mentioned above with reference to FIGS. 50 to 52.

In this way, the 32-WDM signals obtained in the 128×128 routing sections 8D-1 to 8D-8 are distributively inputted to the 8×4 switches 92-1 to 92-128, respectively and forwarded to an arbitrary route (any one of 16×8 switches 51-1 to 51-512).

In addition, the 32-WDM signals are forwarded through the 16×8 switches 51-1 to 51-512 to arbitrary routes (fixed wavelength filters 84'), and predetermined intra-apparatus wavelengths λr are selected (extracted) in the fixed wavelength filters 84'. The optical signals of the intra-apparatus wavelengths λr are subsequently converted into optical signals of predetermined output wavelengths λ1 to λ512 in the wavelength converters 74 of the output regeneration section 7B', and outputted to an output port 2-i.

As described above, also in the above-described OCCS 1 of a type in which the input wavelengths λ1 to λ512 are previously converted into intra-apparatus wavelengths λr corresponding to the converted output wavelengths λ1 to λ512, even if the number n of wavelengths to be multiplexed (the number of accommodation channels) per port further increases, it is possible to cope with this without increasing the number of intra-apparatus wavelengths. That is, even if the number of accommodation channels increases largely, it is possible to control the branch characteristics (effective wavelength area, transmission band characteristic, wavelength demultiplexing characteristics, and others) required in optical devices such as the tunable wavelength selectors 84 to a minimum while maintaining the number of intra-apparatus wavelengths constant.

Figure 55:
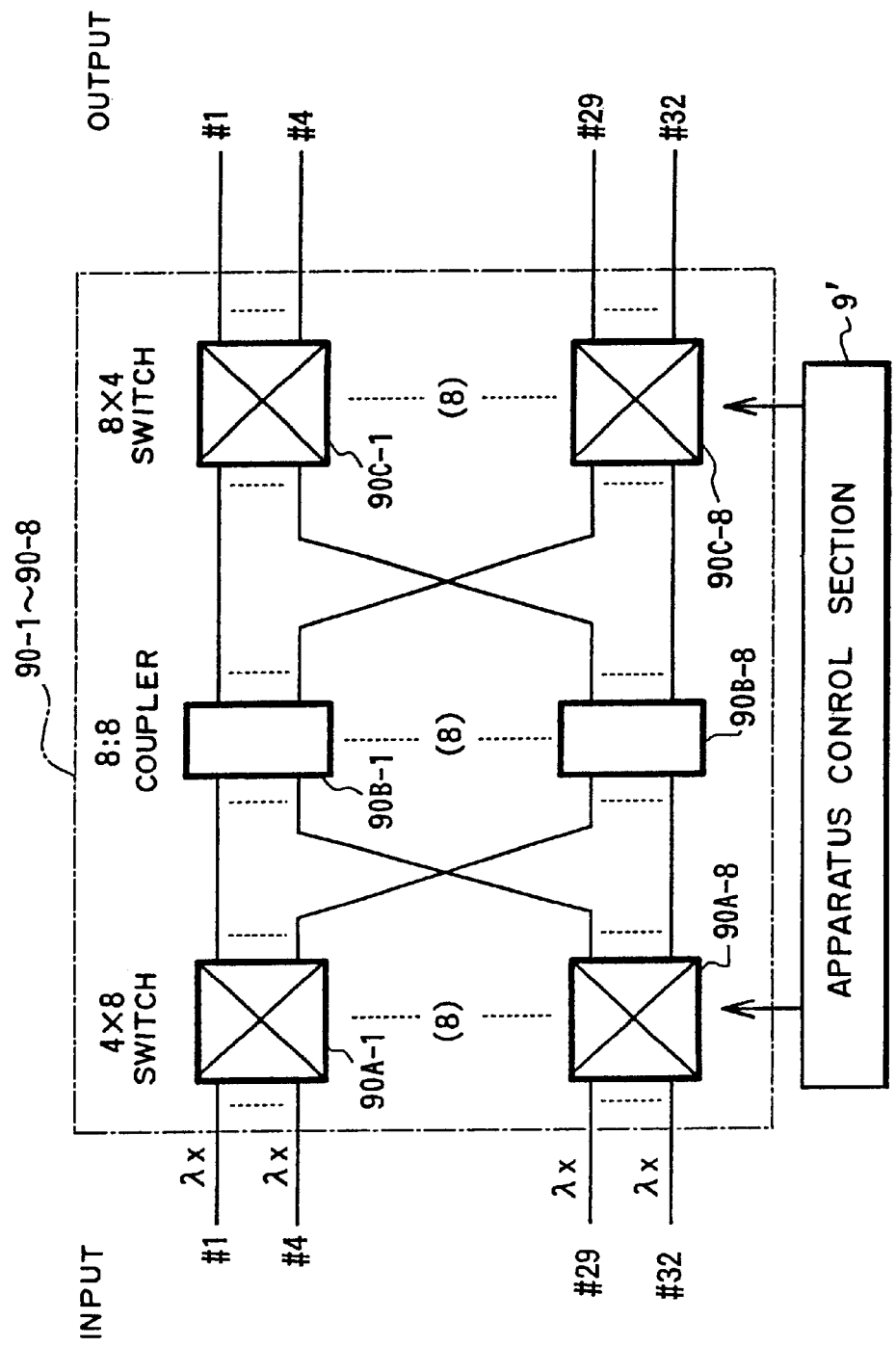
FIG. 55 is a block diagram showing a configuration to be taken in a case in which a 32:32 coupler in the 128×128 routing section shown in FIG. 52 is replaced with a 32:32 routing section.
Figure 56A:
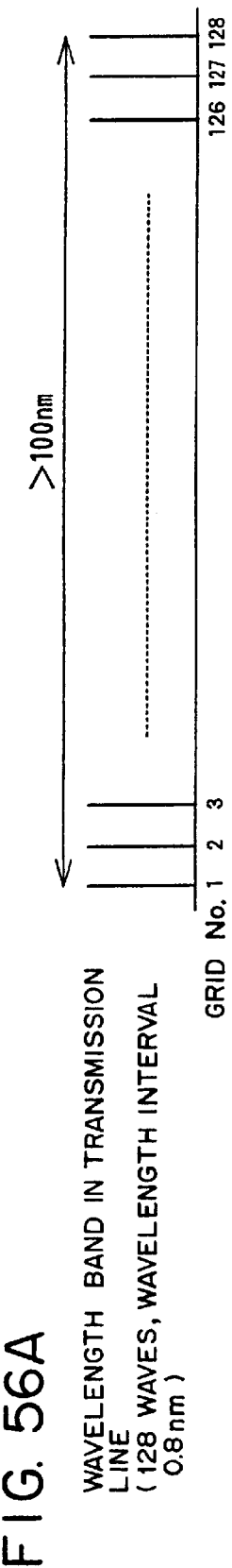
FIGS. 56A to 56C are illustrations for explaining an intra-apparatus allocation wavelength grid (continuous)
Figure 56B:
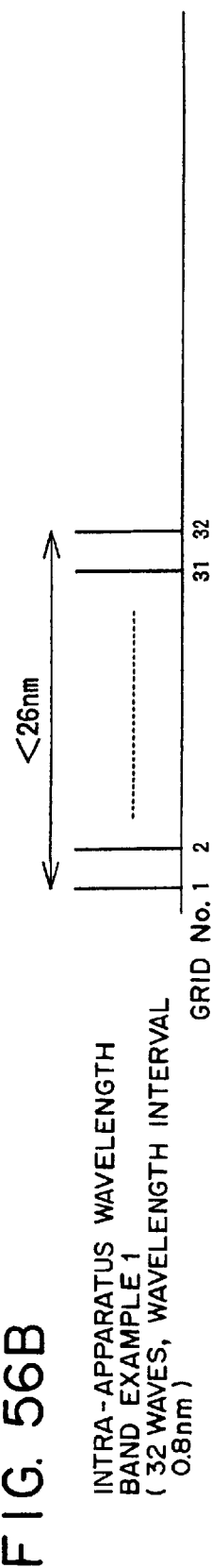
Figure 56C:
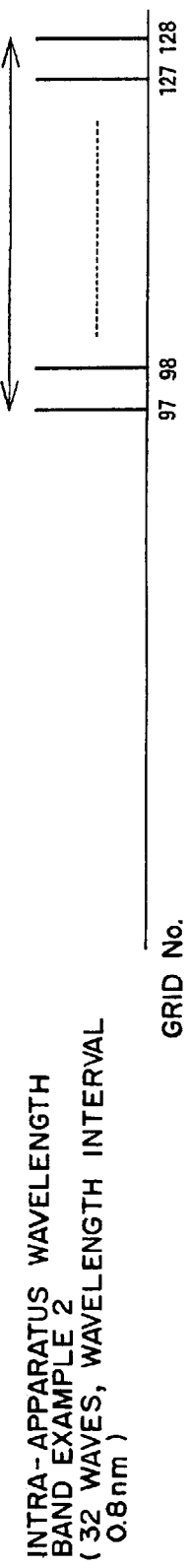

In other words, also in this case, the configuration (the number n of wavelengths to be multiplexed=128) shown in FIG. 50 can further decrease the number of intra-apparatus wavelengths. For example, if the 32:32 couplers 90-1 to 90-8 of the 128×128 routing sections 8D-1 to 8D-8 described above with reference to FIG. 52 are replaced with 8:8 (M:M) routing sections (8-wavelength multiplexing and 8-distribution type routings) shown in FIG. 55, it is possible to decrease from 32 (m) waves to 8 (M) waves. That is, as FIG. 55 shows, provided are 8 (M) 4×8 [(m/M)×(2m/M)] switches 90A-1 to 90A-8, 8 (2m/M) 8:8 (M:M) couplers 90B-1 to 90B-8 and 8 (M) 8×4 [(2m/M)×(m/M)] switches 90C-1 to 90C-8.

The 4×8 switches 90A-1 to 90A-8 are for concentrating the outputs (intra-apparatus wavelengths λx) of the 4×8 switches 86-1 to 86-32, shown in FIG. 52, in units of four wavelengths to send them to an arbitrary route, while the 8:8 couplers (M:M multiplexing/distributing sections) 90B-1 to 90B-8 are for 8-wavelength-multiplexing the outputs of these 4×8 switches 90A-1 to 90A-8 in terms of different intra-apparatus wavelengths λx to distribute the resultant 8-WDM signal in the form of eight optical signals, and the 8×4 switches 90C-1 to 90C-8 are for concentrating one outputs of the 8:8 couplers 90B-1 to 90B-8 to send them to an arbitrary route.

Therefore, in the input regeneration section 7A', even if the input wavelengths λ1 to λ128 are converted into intra-apparatus wavelengths λx and the number of intra-apparatus wavelengths are set at 8 waves as mentioned above, no collision occurs among the identical intra-apparatus wavelengths λ1 to λ8, which enables the normal routing.

As described above, also in this OCCS 1, it is possible to conduct the normal routing at a desired number of intra-apparatus wavelengths without depending upon the number n of wavelengths to be multiplexed (the number of accommodation channels) per port, which realizes a large-capacity OCCS 1 by using the existing optical devices (the tunable wavelength selectors 84' and others), the existing WDM techniques and the existing optical switch techniques having the minimum band characteristics (effective wavelength area, transmission band characteristic, wavelength demultiplexing characteristic, and others) needed.

As well as the various OCCSs 1 (Type-s; first to four modifications, where s=1 to 8) described as the first concrete example, the OCCSs 1 according to the modes of the second concrete example can also be constructed as various types of OCCSs, such as a point-to-multipoint type, a multipoint-to-point type, a standardized type, a router type, an OADM and others, by the inter-office/intra-office allocation of the input ports 1-i and the output ports 2-i. Additionally, also in this case, as described above with reference to FIG. 31, if an optical network is constructed through the use of these OCCS 1, various alternative routes can be set in preparation for occurrence of troubles, thus constructing a high-reliability optical network.

(E) Detailed Description of Principal Optical Parts for Use in OCCSs

Secondly, a detailed description will be given hereinbelow of principal optical parts (optical devices; a portion of reference numerals will be omitted), such as the optical switches 31-j, 51-j, the tunable wavelength selectors 48, 52, 84 and 84', the wavelength converters 53, 53', 53A and 71 to 74.

Figure 59:
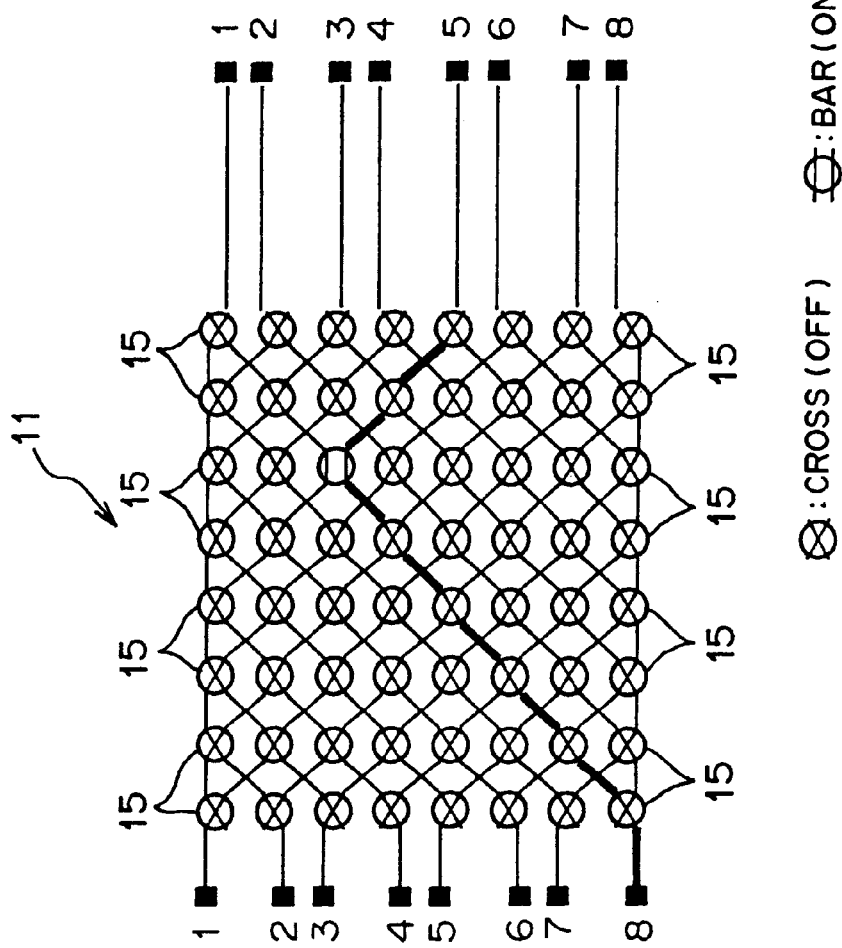
FIG. 59 is a block diagram showing a configurational example of an 8×8 switch for use in the OCCS according to this embodiment.

FIG. 59 is a block diagram showing a configurational example of the 8×8 switch (space switch type) 11 constituting the aforesaid optical switches 31-j, 51-j. As FIG. 59 shows, the 8×8 switch 11 is constructed by disposing 64 2-input 2-output type (2×2) basic optical switch cells 15 (similar to the aforesaid optical switch 12) in an 8×8 matrix fashion and interconnecting them.

In addition, as FIG. 59 shows, when only one arbitrary basic optical cell 15 is set to a "bar" (ON) condition, an optical signal coming in an arbitrary input switch port (1 to 8) can be outputted (routed) to a desired output switch port (1 to 8). In fact, each of the basic switch cells 15 is equivalent to each of intersections of optical waveguides formed on a substrate of $LiNbO_3$ or the like, and the transmission paths of optical signals are switched by controlling the temperature of the intersections for changing the optical refractive index.

Figure 60:
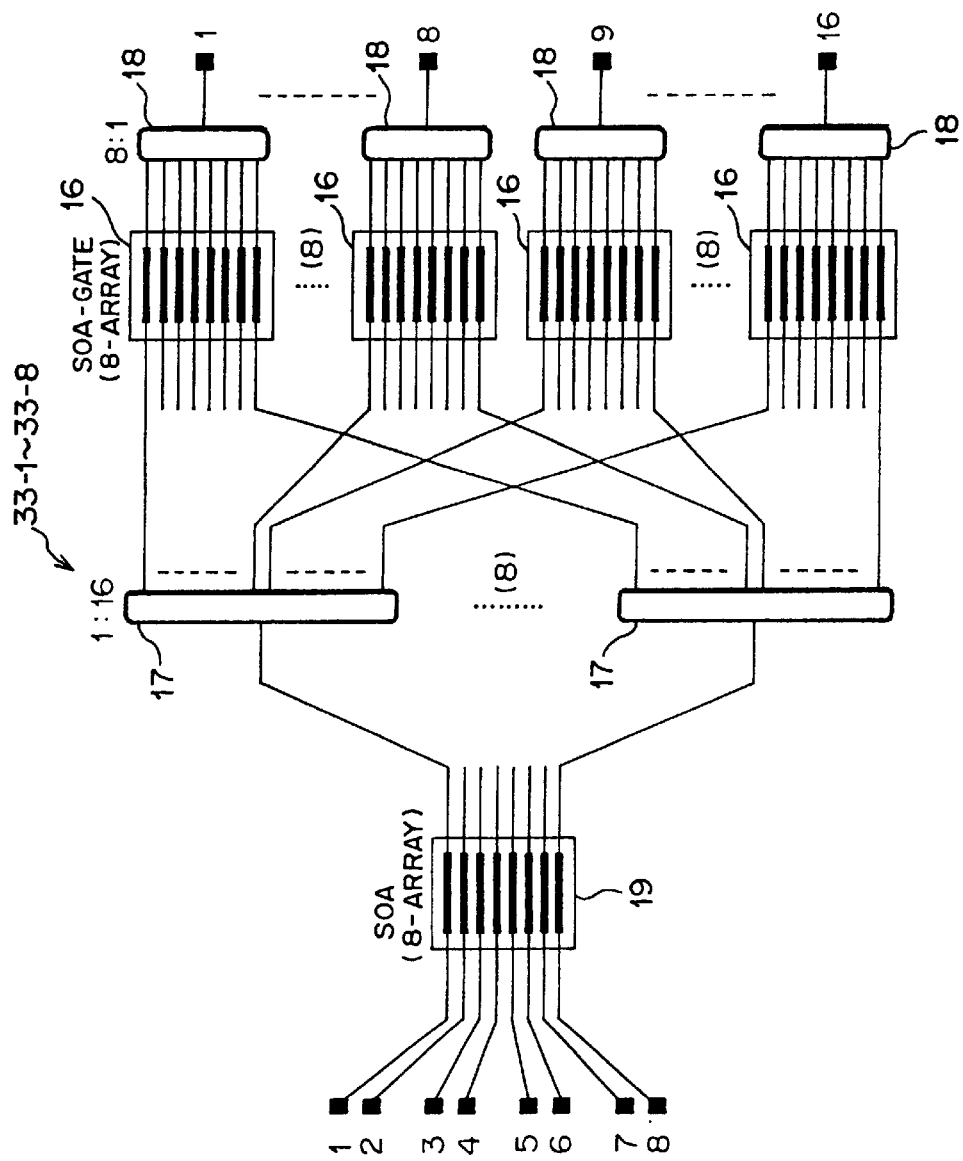
FIG. 60 is a block diagram showing a configurational example of an 8×16 switch for use in the OCCS according to this embodiment.

Furthermore, the 8×16 switch 33-j (gate switch type), for example as shown in FIG. 60, uses SOA (Semiconductor Optical Amplifier) arrays 16 as optical gate switches, which can be coupled with optical couplers 17 and 18. In FIG. 60, reference numeral 19 denotes an SOA array. That is, the SOA can simply be used not only as an optical amplifier but also as an optical switch. Incidentally, the 8×8 switch 11 is also realizable with a similar configuration. Additionally, as the optical switch, it is also possible to use, for example, a mechanical type switch using a motor.

Figures 61A, 61B:
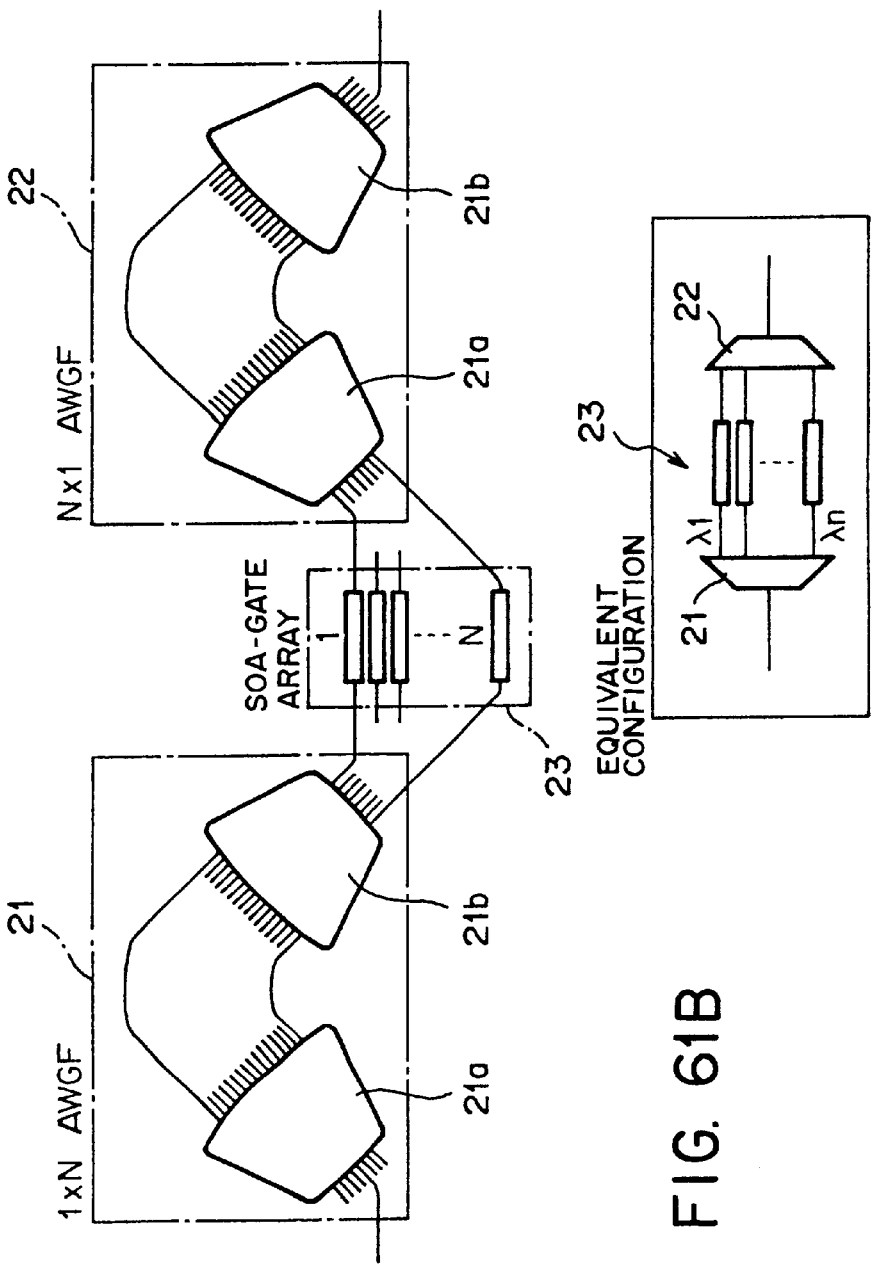
FIG. 61A is a block diagram showing a configurational example of a tunable wavelength selector according to this embodiment.
FIG. 61B is a block diagram showing an equivalent configuration of the tunable wavelength selector shown in FIG. 61A.

FIG. 61A is a block diagram showing a configurational example of each of the aforesaid tunable wavelength selectors 52 (48), FIG. 61B is a block diagram showing an equivalent configuration of the tunable wavelength selector 52 (48) shown in FIG. 61A. As FIGS. 61A and 61B show, the tunable wavelength selector 52 (48) can be constructed as a discrete type wavelength selector in which an SOA gate array 23 is interposed between a 1×n optical demultiplexer 21 and an n×1 optical multiplexer 22, which are made using an AWGF (Array-Waveguide Grating Filter). In FIG. 61A, numerals 21a and 21b designate a slab waveguide.

In addition, it is considered that the tunable wavelength selector 52 (48) is constructed using a tunable wavelength filter such as an AOTF (Acousto-Optical Tunable Filter). However, in the case of the use of the SOA gate array 23, its wavelength selection speed is extremely higher (selection is feasible in several nanoseconds).

Figure 62A:
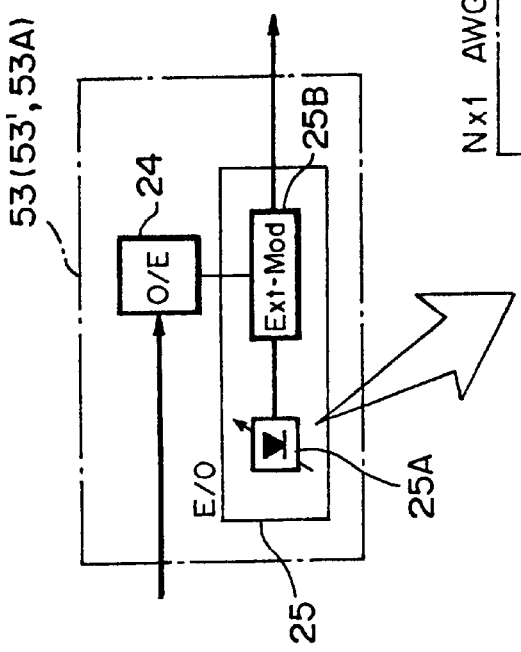
FIG. 62A is a block diagram showing a configurational example of a wavelength converter according to this embodiment.

FIG. 62A is a block diagram showing a constructional example of the wavelength (REG) 53 (53', 53A). As FIG. 62A shows, as mentioned before, as the REG 53 (53', 53A), a combination of an O/E converter 24 and an E/O converter has come into widespread use. Incidentally, the REGs 71 to 74 can also take the construction shown in FIG. 62A.

Figure 62B:
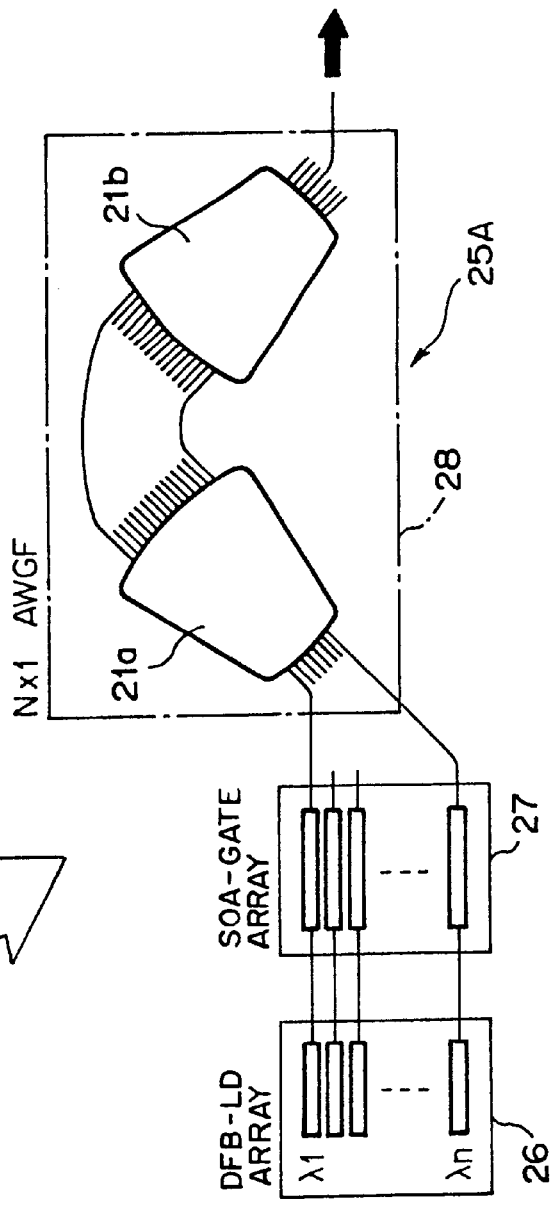
FIG. 62B is a block diagram showing a configurational example of a wavelength light source shown in FIG. 62A.
Figure 63:
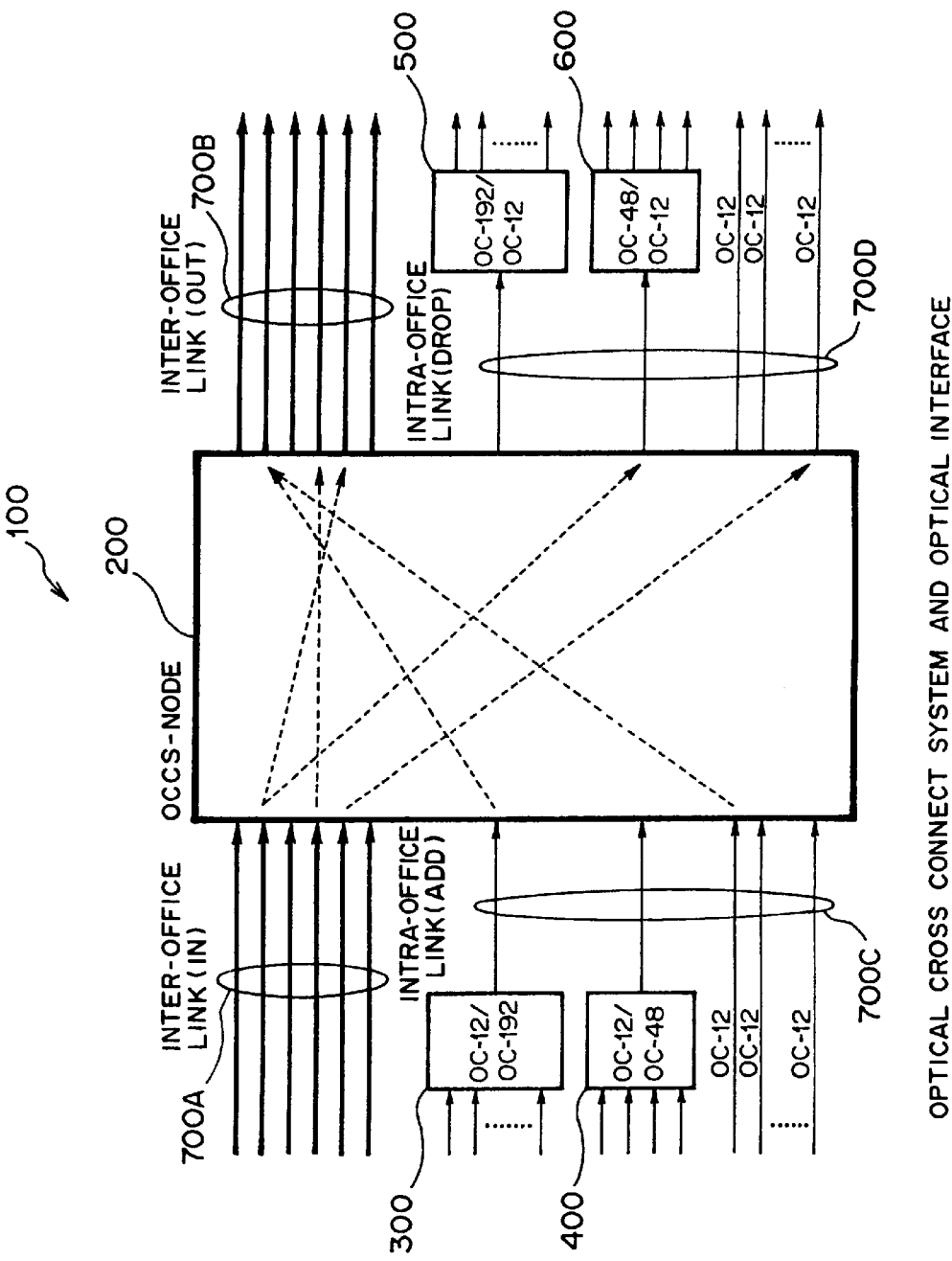
FIG. 63 is a block diagram showing a configurational example of an existing OCCS.

As the E/O converter 24, there may be two types: one (REGs 53, 71, 73) is equipped with a fixed wavelength light source, the other (REGs 53', 53A, 72, 74) is provided with a variable wavelength light source. For example, for a variable wavelength light source 25A for use in the latter REG 53' (53A), it is considered to couple a wavelength light source (DGB-LD) array 26 for wavelengths λ1 to λn, an SOA gate array 27 and an n×1 optical multiplexer 28 using AWGFs (slab waveguides 21a and 21b) as shown in FIG. 62. In FIG. 62A, numeral 25B denotes an optical modulator.

Additionally, various types, such as a type utilizing a gain modulating effect of the SOA, are applicable to the REGs 53, 53', 53A and 71 to 74.

Incidentally, the optical device technology for the WDM transmission system has been developed variously, and it is also possible to properly use devices other than the above-mentioned optical devices. However, in the case of the foregoing devices, particularly their size reduction is expectable in future in the fields of optical waveguides, semiconductors and hybrid integration techniques of both, so the use of the above-mentioned optical devices contributes greatly to the size reduction of the apparatus itself.

Meanwhile, although the above-described embodiments have focused consistently on the extensibility of the OCCSs 1 (OADMs) on an increase in number of accommodation wavelengths, even if, on the contrary, the number of accommodation wavelengths decreases, it is also possible to flexibly cope with the decrease in the number of wavelengths without changing the basic switch sizes, such as by reducing the optical switches 33-j and 51-j.

Furthermore, although the description of the second concrete example relates chiefly to relieving the needed band characteristics of the wavelength filters, such as wavelength band characteristic, transmission wavelength characteristic and wavelength demultiplexing characteristic, also with respect to the other optical devices such as optical switches and optical amplifiers, it is naturally possible to relieve the band characteristics required in connection with an increase in the number of accommodation wavelengths per port.

Still furthermore, although, in all the above-described second concrete examples, the routing sections 8a to 8f are constructed as wavelength multiplexing/distribution type routing sections, even in a case in which they are constructed as ordinary (use of only optical switches) routing sections, it is possible to relieve the required band characteristics of at least optical devices by decreasing the number of intra-apparatus wavelengths as mentioned above.

Moreover, although the description of the embodiments relates to the increase of the number of accommodation wavelengths (the number of wavelengths to be multiplexed) n per port up to 512 waves, this invention is not limited to this, but the same effects as those stated above are obtainable irrespective of further increase in the number of wavelengths.

It should be understood that the present invention is not limited to the above-described embodiments, and that it is intended to cover all changes and modifications of the embodiments of the invention herein which do not constitute departures from the spirit and scope of the invention.

What is claimed is:

1. An optical cross connect apparatus comprising:

a plurality of input ports for accommodating optical signals of a plurality of kinds of input wavelengths;

a plurality of output ports for accommodating optical signals of a plurality of kinds of output wavelengths;

an optical input switch section using switch circuits corresponding in number to kinds of accommodation wavelengths for routing optical signals from said input ports for same input wavelength group;

an optical output switch section using switch circuits corresponding in number to the kinds of accommodation wavelengths for routing input optical signals to a desired output port for same output wavelength group;

an optical multiplexing/distributing section provided between said optical input switch section and said optical output switch section, for wavelength-multiplexing optical signals of wavelengths after the routing operation by said switch circuits of said optical input switch section and for distributively outputting the resultant multiplexed optical signal as an input optical signal to said switch circuits of said optical output switch section; and an optical wavelength selecting section for conducting wavelength selecting processing to lead, of the multiplexed optical signal, an optical signal with a desired wavelength to a desired output port.

2. An optical cross connect apparatus according to claim 1, wherein said optical output switch section includes a first wavelength converting section for converting an optical signal with an arbitrary input wavelength after the routing operation by said switch circuits of said optical output switch section into an optical signal with a desired output wavelength so that an optical signal with said arbitrary input wavelength coming in an arbitrary one of said input ports is outputted as an optical signal with a desired output wavelength from said output port.

3. An optical cross connect apparatus according to claim 2, wherein said input ports and said output ports are respectively k in number (where k denotes an integer equal to or more than 2), and said optical input switch section includes:
k×2k switch circuits provided for same input wavelength group, each for accommodating k optical signals with the same input wavelength signal to route the accommodated optical signals to any one of 2k outputs, said optical multiplexing/distributing section includes:
2k first multiplexing/distributing units for multiplexing outputs of said k×2k switch circuits for different input wavelengths to distributively output the resultant multiplexed optical signal to routes corresponding in number to the kinds of accommodation wavelengths, said optical output switch section includes:
2k×k switch circuits provided for same output wavelength group, each for accommodating outputs of said first multiplexing/distributing units for the same output wavelength to route the accommodated outputs to any one of the k outputs;

wavelength selectors provided for each of accommodation wavelengths for selecting, of multiplexed optical signals after the routing operation by said 2k×k switch circuits, an optical signal having an input wavelength to be converted into a desired output wavelength; and wavelength converters provided for each of accommodation wavelengths for converting said wavelength of said optical signal selected by each of said wavelength selectors into said output wavelength, said wavelength selectors constitute said optical wavelength selecting section, while said wavelength converters organize said first wavelength converting section.

4. An optical cross connect apparatus according to claim 2, wherein said input ports and said output ports are respectively k in number (where k denotes an integer equal to or more than 2), and each accommodates an optical signal having a plurality of kinds of wavelength bands each said composed of a plurality of kinds of wavelengths, and said optical input switch section includes:
k×2k switch circuits provided for same input wavelength group of each input wavelength bands, each for accommodating k optical signals with the same input wavelength in the same input wavelength band, coming in said input ports, and for routing the accommodated k optical signals to any one of 2k outputs, said multiplexing/distributing section includes:
2k second multiplexing/distributing units for multiplexing outputs of said k×2k switch circuits for different input wavelengths of the same input wavelength band, and for band-multiplexing the resultant multiplexed optical signals in each wavelength band to distributively output the band-multiplexed optical signal to routes corresponding in number to the kinds of accommodation wavelengths, said optical output switch section includes:
2k×k switch circuits provided for same output wavelength group of each output wavelength bands, each for accommodating 2k outputs of said second multiplexing/distributing units for the same output wavelength in the same output wavelength band to said output port and for routing the accommodated 2k outputs to any one of the k outputs;

wavelength selectors provided for each accommodation wavelength, each for selecting an optical signal with an input wavelength to be converted into a desired output wavelength from the multiplexed optical signal after the routing operation by said 2k×k switch circuits; and wavelength converters provided for each accommodation wavelength, each for converting the wavelength of said optical signal selected by said wavelength selector into said output wavelength, said wavelength selectors constitute said optical wavelength selecting section, while said wavelength converters organize said first wavelength converting section.

5. An optical cross connect apparatus according to claim 2, wherein said input ports and said output ports are respectively k in number (where k denotes an integer equal to or more than 2), and said optical input switch section includes:
k×2k switch circuits provided for same input wavelength group, each for accommodating k optical signals with the same input wavelength, coming in said input ports, and for routing the accommodated k optical signals to any one of 2k outputs, said optical multiplexing/distributing section includes:
2k first coupling/distributing units each for coupling outputs of said k×2k switch circuits for different input wavelengths and for distributively outputting the resultant coupled output signal to routes corresponding in number to the kinds of accommodation wavelengths; and wavelength selectors provided for each of the distributed output signals, each for selecting an optical signal having an input wavelength to be converted into a desired output wavelength, from each of the distributed output signals of said first coupling/distributing units, said optical output switch section includes:
2k×k switch circuits provided for same output wavelength group, each for accommodating 2k outputs of said wavelength selectors for the same output wavelength to said output ports and for routing the accommodated 2k outputs to any one of k outputs; and wavelength converters provided for all the accommodation wavelengths, each for converting the output of said 2k×k switch circuit into the desired output wavelength, said wavelength selectors constitute said optical wavelength selecting section, while said wavelength converters organize said first wavelength converting section.

6. An optical cross connect apparatus according to claim 2, wherein said input ports and said output ports are respectively k in number (where k denotes an integer equal to or more than 2), and each accommodates an optical signal having a plurality of kinds of wavelength bands each composed of a plurality of kinds of wavelengths, and said optical input section includes:
k×2k switch circuits provided for same input wavelength group of each input wavelength bands, each for accommodating k optical signals with the same input wavelength in the same input wavelength band, coming in said input ports, and for routing the accommodated k optical signals to any one of the 2k outputs, said optical multiplexing/distributing section includes:
2k second coupling/distributing units each for coupling outputs of said k×2k switch circuits for different input wavelengths and for distributively outputting the resultant coupled output signal to routes corresponding in number to all the kinds of accommodation wavelengths; and wavelength selectors provided for each of the distributed output signals, each for selecting, from the distributed output signals of said second coupling/distributing units, an optical signal having an input wavelength to be converted into a desired output wavelength, said optical output switch section includes:
2k×k switch circuits provided for same output wavelength group of each output wavelength bands, each for accommodating 2k outputs of said wavelength selectors for the same output wavelength in the same output wavelength band to said output ports and for routing the accommodated 2k outputs to any one of the k outputs; and wavelength converters provided for each accommodation wavelength, each for converting the wavelength of each of the optical signals from said 2k×k switch circuits into the output wavelength, said wavelength selectors constitute said optical wavelength selecting section, while said wavelength converters constitute said first wavelength converting section.

7. An optical cross connect apparatus according to claim 1, wherein said optical input switch section includes a second wavelength converting section for converting an optical signal with an arbitrary optical input wavelength before the routing operation by said switch circuits of said optical input switch section into an optical signal with a desired output wavelength so that an optical signal with said arbitrary input wavelength coming in an arbitrary one of said input ports is outputted as an optical signal with a desired output wavelength from said output port.

8. An optical cross connect apparatus according to claim 7, wherein said input ports and said output ports are respectively k in number (where k denotes an integer equal to or more than 2), and said input switch section includes:
wavelength converters provided for each accommodation wavelength, each for converting an optical signal with a wavelength from each of said input ports into a desired output wavelength; and
k×2k switch circuits provided for same input wavelength group, each for accommodating k outputs of said wavelength converters for the same input wavelength before the wavelength conversion and for routing the accommodated k outputs to any one of the 2k outputs, said optical multiplexing/distributing section includes:
2k first coupling/demultiplexing units for coupling outputs of said k×2k switch circuits for different input wavelengths before the wavelength conversion and further for demultiplexing the coupled signal, said optical output switch section includes:
2k×k switch circuits provided for same output wavelength group, each for accommodating 2k outputs of said first coupling/demultiplexing units for the same output wavelength to said output ports and for routing the accommodated 2k outputs to any one of the k outputs, said first coupling/demultiplexing units constitute said optical wavelength selecting section, while said wavelength converters organize said second wavelength converting section.

9. An optical cross connect apparatus according to claim 3, wherein said input ports and said output ports are respectively k in number (where k denotes an integer equal to or more than 2), and each accommodates an optical signal having a plurality of kinds of wavelength bands composed of a plurality of kinds of wavelengths, and said optical input section includes:
wavelength converters provided for each accommodation wavelength, each for converting an optical signal having a wavelength from each of said input ports into a desired output wavelength; and
k×2k switch circuits provided for same input wavelength group of each input wavelength bands, each for accommodating k optical signals with the same input wavelength in the same input wavelength band, coming in said input ports, and for routing the accommodated k optical signals to any one of the 2k outputs, said optical multiplexing/distributing section includes:
second coupling/demultiplexing units each for coupling outputs of said k×2k switch circuits for different input wavelengths before the wavelength conversion and then for band-demultiplexing the multiplexed output signal into optical signals pertaining to the wavelength bands to demultiplex an optical signal pertaining to each of the wavelength bands after the band demultiplexing, said optical output switch section includes:
2k×k switch circuits provided for same output wavelength group of each output wavelength bands, each for accommodating outputs of said second coupling/demultiplexing units for the same output wavelength in the same output wavelength band to said output ports and for routing the accommodated 2k outputs to any one of the k outputs, said second coupling/demultiplexing units constitute said optical wavelength selecting section, while said wavelength converters organize said second wavelength converting section.

10. An optical cross connect apparatus according to claim 7, wherein said input ports and said output ports are respectively k in number (where k denotes an integer equal to or more than 2), and said optical input switch section includes:
wavelength converters provided for each accommodation wavelength, each for converting an optical signal having each of wavelengths from said input ports into a desired output wavelength; and k×2k switch circuits provided for same input wavelength group, each for accommodating k outputs of said wavelength converters for the same input wavelength before the wavelength conversion and for routing the accommodated k outputs to any one of the 2k outputs, said optical multiplexing/distributing section includes:

2k third coupling/distributing units for coupling outputs of said k×2k switch circuits for different input wavelengths before the wavelength conversion and for distributively outputting the resultant coupled output signals to routes corresponding in number to the kinds of accommodation wavelengths; and wavelength selectors provided for each distributed output signal, each for selecting, from the distributed output signals of the third coupling/distributing units, an optical signal having an input wavelength to be converted into a desired output wavelength, said optical output switch section includes:

2k×k switch circuits provided for same output wavelength group, each for accommodating 2k outputs of said wavelength selectors for the same output wavelength to said output ports and for routing the accommodated 2k outputs to any one of the k outputs, said wavelength selectors constitute said optical wavelength selecting section, while said wavelength converters constitute said second wavelength converting section.

11. An optical cross connect apparatus according to claim 7, wherein said input ports and said output ports are respectively k in number (where k denotes an integer equal to or more than 2), and each accommodates an optical signal having a plurality of kinds of wavelength bands each composed of a plurality of kinds of wavelengths, and said optical input section includes:

wavelength converters provided for each accommodation wavelength, each for converting an optical signal with an wavelength from each of said input ports into a desired output wavelength; and k×2k switch circuits provided for same input wavelength group of each input wavelength bands, each for accommodating k optical signals having the same input wavelength in the same input wavelength band, coming in said input ports and for routing the accommodated k optical signals to any one of the 2k outputs, said optical multiplexing/distributing section includes:

2k fourth coupling/distributing units each for coupling outputs of said k×2k switch circuits for different input wavelengths before wavelength conversion and for distributively outputting the resultant coupled output to routes corresponding in number to all the kinds of accommodation wavelengths; and wavelength selectors provided for each distributed output signal, each for selecting, from distributed output signals of said fourth coupling/distributing units, an optical signal having an input wavelength to be converted into a desired output wavelength, said optical output switch section includes:

2k×k switch circuits provided for same output wavelength group of each output wavelength bands, each for accommodating 2k outputs of said wavelength selectors for the same output wavelength in the same output wavelength band to said output ports and for routing the accommodated 2k outputs to any one of the k outputs, said wavelength selectors constitute said optical wavelength selecting section, while said wavelength converters organize said second wavelength converting section.

12. An optical cross connect apparatus according to claim 1, wherein each of said input ports each accommodates a wavelength-multiplexed optical signal having a plurality of kinds of input wavelengths while each of said output ports accommodates a wavelength-multiplexed optical signal having a plurality of kinds of output wavelengths.

13. An optical cross connect apparatus according to claim 1, wherein a portion of said input ports each accommodates a wavelength-multiplexed optical signal having a plurality of kinds of input wavelengths while the remaining input ports are each used for adding an optical signal having an arbitrary wavelength, and a portion of said output ports each accommodates a wavelength-multiplexed optical signal having a plurality of kinds of output wavelengths while the remaining output ports are each used for dropping an optical signal having an arbitrary wavelength.

14. An optical cross connect apparatus according to claim 1, wherein only said output ports each accommodates a wavelength-multiplexed optical signal having a plurality of kinds of output wavelengths.

15. An optical cross connect apparatus according to claim 1, wherein only said input ports each accommodates a wavelength-multiplexed optical signal having a plurality of kinds of wavelengths.

16. An optical network having at least one optical cross connect apparatus, said optical cross connect apparatus comprising:

a plurality of input ports for accommodating optical signals of a plurality of kinds of input wavelengths;

a plurality of output ports for accommodating optical signals of a plurality of kinds of output wavelengths;

an optical input switch section using switch circuits corresponding in number to kinds of accommodation wavelengths for routing optical signals from said input ports for same input wavelength group;

an optical output switch section using switch circuits corresponding in number to the kinds of accommodation wavelengths for,routing input optical signals to a desired output port for same output wavelength group;

an optical multiplexing/distributing section provided between said optical input switch section and said optical output switch section for wavelength-multiplexing optical signals of wavelengths after routing operation by said switch circuits of said optical input switch section and for distributively outputting the resultant multiplexed optical signal as an input optical signal to said switch circuits of said optical output switch section; and an optical wavelength selecting section for conducting wavelength selecting processing to lead, of the multiplexed optical signal, an optical signal with a desired wavelength to a desired output port.

17. An optical cross connect apparatus comprising:

a plurality of input ports for accommodating optical signals of a plurality of kinds of input wavelengths;

a plurality of output ports for accommodating optical signals of a plurality of kinds of output wavelengths;

an input wavelength converting section for converting the input wavelengths into intra-apparatus wavelengths less in number of kinds than the number of kinds of input wavelengths;

a wavelength multiplexing/distribution routing section for wavelength-multiplexing optical signals with the infra-apparatus wavelengths from said input wavelength converting section to distribute and route the resultant intra-apparatus wavelength multiplexed optical signal as an optical signal including a desired output wavelength to a desired output port;

an optical wavelength selecting section for selecting an optical signal with a desired intra-apparatus wavelength from the wavelength multiplexed optical signal; and an output wavelength converting section for converting an intra-wavelength of the optical signal, selected by said optical wavelength selecting section, into said output wavelength.

18. An optical cross connect apparatus according to claim 17, wherein, when the numbers of said input ports and said output ports are respectively taken as k (k is an integer equal to or more than 2), the number of kinds of wavelengths each of said ports accommodates is taken as n (n is an integer equal to or more than 2) and the number of kinds of intra-apparatus wavelengths is taken as m (m is an integer which satisfies $2 \leq m < n$), said input wavelength converting section includes:

m fixed wavelength converting sections for converting said optical signals of said input wavelengths into optical signals of the same intra-apparatus wavelengths in units of p waves [where p is an integer satisfying p=n/m (<k)], said wavelength multiplexing/distribution routing section includes:

n k×2k switches each for accommodating k outputs of said fixed wavelength converting sections for same input wavelength before the wavelength conversion into the intra-apparatus wavelengths to route the accommodated k outputs to any one of 2k outputs;

2k n×n routing sections for wavelength-multiplexing optical signals with p sets of different intra-apparatus wavelengths from said k×2k switches to distributively route the resultant intra-apparatus wavelength multiplexed optical signal; and 2k×k switches each for accommodating outputs of said n×n routing sections for intra-apparatus wavelengths to be converted into the same output wavelength to route the accommodated outputs to a desired output port, said output wavelength converting section includes:

k×n fixed output wavelength converters for converting outputs of said 2k×k switches into optical signals of predetermined output wavelengths.

19. An optical cross connect apparatus according to claim 18, wherein each of said n×n routing sections includes:

p m:n multiplexing/distributing sections for wavelength-multiplexing optical signals of p sets of different intra-apparatus wavelengths from said k×2k switches and further for distributing the resultant intra-apparatus wavelength multiplexed optical signal in the form of n optical signals;

n p×1 switches for selecting a desired intra-apparatus wavelength multiplexed optical signal from the p sets of intra-apparatus wavelength multiplexed optical signals from said m:n multiplexing/distributing sections; and n tunable wavelength filters each for selecting an optical signal of desired intra-apparatus wavelength from outputs of said p×1 switches, with said n tunable wavelength filters constituting said optical wavelength selecting section.

20. An optical cross connect apparatus according to claim 18, wherein each of said n×n routing sections includes:

m p×2p switches each for accommodating optical signals of p sets of different intra-apparatus wavelengths from said k×2k switches for same intra-apparatus Wavelength to route the p accommodated optical signals to any one of 2p outputs;

2p m:m multiplexing/distributing sections for multiplexing outputs of said p×2p switches for different intra-apparatus wavelengths to distribute the resultant intra-apparatus,wavelength multiplexed optical signal in the form of m optical signals;

m 2p×p switches each for routing 2p outputs from said m:m multiplexing/distributing sections to any one of p outputs; and n tunable wavelength filters each for selecting an optical signal of desired intra-apparatus wavelength from outputs of said 2p×p switches, with said n tunable wavelength filters constituting said optical wavelength selecting section.

21. An optical cross connect apparatus according to claim 18, wherein said optical wavelength selecting section includes n×k tunable wavelength filters each for selecting an optical signal with a desired intra-apparatus wavelength from outputs of said 2k×k switches.

22. An optical cross connect apparatus according to claim 21, wherein each of said n×n routing sections includes:

p m:n multiplexing/distributing sections for wavelength-multiplexing optical signals of p sets of different intra-apparatus wavelengths from said k×2k switches to distribute the resultant intra-apparatus wavelength multiplexed optical signal in the form of n optical signals; and n p×1 switches each for selecting a desired intra-apparatus wavelength multiplexed signal from outputs of said m:n multiplexing/distributing sections.

23. An optical cross connect apparatus according to claim 21, wherein each of said n×n routing sections includes:

m p×2p switches each for accommodating optical signals of p sets of different intra-apparatus wavelengths from said k×2k switches to route the accommodated p optical signals to any one of 2p outputs;

2p m:m multiplexing/distributing sections for multiplexing outputs of said p×2p switches for different intra-apparatus wavelengths to distribute the resultant wavelength multiplexed optical signal in the form of m optical signals; and m 2p×p switches for routing 2p outputs from said m:m multiplexing/distributing sections to any one of p outputs.

24. An optical cross connect apparatus according to claim 23, wherein each of said m:m multiplexing/distributing sections is constructed as a wavelength multiplexing/distribution type m:m routing section including:

M (M<m) (m/M)×(2m/M) switches each for accommodating, of outputs of said p×2p switches, optical signals with the same intra-apparatus wavelength to route the accommodated optical signals to any one of (2m/M) outputs;

2m/M M:M multiplexing/distributing sections for wavelength-multiplexing optical signals for different intra-apparatus wavelengths from the (m/M)×(2m/M)

switches to distribute the resultant wavelength multiplexed optical signal in the form of M optical signals; and M (2m/M)×(m/M) switches for routing (2m/M) outputs from said M:M multiplexing/distributing sections to any one of (m/M) outputs.

25. An optical cross connect apparatus according to claim 17, wherein said input wavelength converting section includes:

k×n variable wavelength converters for converting the optical signals of said input wavelengths into optical signals of arbitrary intra-apparatus wavelengths of p sets of different intra-apparatus wavelengths, said wavelength multiplexing/distribution routing section includes:

k×2k switches each for accommodating outputs of said variable wavelength converters for same input wavelength before the wavelength conversion into intra-apparatus wavelengths to route the accommodated k outputs to any one of 2k outputs;

2k n×n routing sections for wavelength-multiplexing optical signals of p sets of different intra-apparatus wavelengths from said k×2k switches to distributively route the resultant intra-apparatus wavelength multiplexed optical signal; and n 2k×k switches each for accommodating outputs from said n×n routing sections for intra-apparatus wavelengths to be converted into the same output wavelength to route the accommodated outputs to desired output ports, said output wavelength converting section includes:

m fixed wavelength converting sections for converting optical signals of p sets of same intra-apparatus wavelengths from said 2k×k switches into optical signals of predetermined output wavelengths.

26. An optical cross connect apparatus according to claim 25, wherein each of said n×n routing sections includes:

p m:n multiplexing/distributing sections for wavelength-multiplexing optical signals of p sets of different intra-apparatus wavelengths from said k×2k switches to distribute the resultant intra-apparatus wavelength multiplexed optical signal in the form of n optical signals;

n p×1 switches each for selecting a desired intra-apparatus wavelength multiplexed optical signal from the p sets of intra-apparatus wavelength multiplexed optical signals from said m:n multiplexing/distributing sections; and n fixed wavelength filters each for selecting an optical signal of predetermined intra-apparatus wavelength from outputs of said p×1 switches, with said n fixed wavelength filters constituting said optical wavelength selecting section.

27. An optical cross connect apparatus according to claim 25, wherein each of said n×n routing sections includes:

m p×2p switches each for routing the optical signals of the p sets of different intra-apparatus wavelengths from said k×2k switches to any one of 2p outputs;

2p m:m multiplexing/distributing sections for multiplexing outputs of said p×2p switches for different intra-apparatus wavelengths to distribute the resultant intra-apparatus wavelength multiplexed optical signal in the form of m optical signals;

m 2p×p switches each for routing 2p sets of outputs of said m:m multiplexing/distributing sections to desired 2k×k switches; and n fixed wavelength filters each for selecting an optical signal of predetermined intra-apparatus wavelength from outputs of said 2p×p switches, with said n fixed wavelength filters constituting said optical wavelength selecting section.

28. An optical cross connect apparatus according to claim 25, wherein said optical wavelength selecting 3 section includes n×k fixed wavelength filters each for selecting an optical signal of predetermined intra-apparatus wavelengths from outputs of said 2k×k switches.

29. An optical cross connect apparatus according to claim 28, wherein each of said n×n routing sections includes:

m p×2p switches each for routing optical signals of p sets of different intra-apparatus wavelengths from said k×2k switches to any one of 2p outputs;

2p m:m multiplexing/distributing sections for wavelength-multiplexing outputs of said p×2p switches for different intra-apparatus wavelengths to distribute the resultant intra-apparatus wavelength multiplexed optical signal in the form of m optical signals; and m 2p×p switches each for routing 2p sets of outputs of said m:m multiplexing/distributing sections to desired 2k×k switches.

30. An optical cross connect apparatus according to claim 29, wherein each of said m:m multiplexing/distributing sections is constructed as a wavelength multiplexing/distribution type m:m routing section including:

M (M<m) (m/M)×(2m/M) switches for accommodating (m/M) optical signals of arbitrary intra-apparatus wavelengths from said p×2p switches to route the accommodated optical signals to any one of (2m/M) outputs;

2m/M M:M multiplexing/distributing sections for wavelength-multiplexing optical signals of different intra-apparatus wavelengths from said (m/M)×(2m/M) switches to distribute the resultant intra-apparatus wavelength multiplexed optical signal in the form of M optical signals; and M (2m/M)×(m/M) switches each for routing 2m/M outputs from said M:M multiplexing/distributing sections to desired 2k×k switches.

31. An optical cross connect apparatus according to claim 17, wherein continuous wavelength-grid wavelengths are allocated as said intra-apparatus wavelengths.

32. An optical cross connect apparatus according to claim 17, wherein incontinuous wavelength-grid wavelengths are allocated as said intra-apparatus wavelengths.

33. An optical cross connect apparatus comprising:

a plurality of input ports for accommodating optical signals of a plurality of kinds of input wavelengths;

a plurality of output ports for accommodating optical signals of a plurality of kinds of output wavelengths;

an input wavelength on converting section for converting the input wavelengths into intra-apparatus wavelengths less in number of kinds than said input wavelengths;

a routing section for routing optical signals of intra-apparatus wavelengths from said input wavelength converting section to desired output ports; and an output wavelength converting section for converting intra-wavelengths of optical signals from said routing section into predetermined output wavelengths.

* * * * *

UNITED STATES PATENT AND TRADEMARK OFFICE
CERTIFICATE OF CORRECTION

PATENT NO.    : 6,404,940 B1
DATED         : June 11, 2002
INVENTOR(S)   : Isao Tsuyama et al.

It is certified that error appears in the above-identified patent and that said Letters Patent is hereby corrected as shown below:

Column 63,
Line 30, "said" should begin a new paragraph;
Line 43, "said" should begin a new paragraph.

Column 66,
Line 45, delete ",".

Column 67,
Line 44, change "2kxk" to -- n2kxk --.

Column 69,
Line 16, "kx2k" to -- nkx2k --.

Column 70,
Line 7, delete "3".

Signed and Sealed this

Twenty-ninth Day of October, 2002

*Attest:*

*Attesting Officer*

JAMES E. ROGAN
*Director of the United States Patent and Trademark Office*